US009112611B2

(12) United States Patent
Palanisamy et al.

(10) Patent No.: US 9,112,611 B2
(45) Date of Patent: Aug. 18, 2015

(54) OPTICAL FIBER-BASED DISTRIBUTED ANTENNA SYSTEMS, COMPONENTS, AND RELATED METHODS FOR CALIBRATION THEREOF

(71) Applicant: Corning Cable Systems LLC, Hickory, NC (US)

(72) Inventors: Rajeshkannan Palanisamy, Painted Post, NY (US); David Robert Peters, Painted Post, NY (US); Eric Michael Sadowski, Olmsted Township, OH (US); Michael Sauer, Corning, NY (US); Dale Alan Webb, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 241 days.

(21) Appl. No.: 13/915,882

(22) Filed: Jun. 12, 2013

(65) Prior Publication Data

US 2013/0272696 A1 Oct. 17, 2013

Related U.S. Application Data

(63) Continuation of application No. 13/194,410, filed on Jul. 29, 2011, now Pat. No. 8,532,492, which is a continuation of application No. PCT/US2010/022857, filed on Feb. 2, 2010.

(60) Provisional application No. 61/230,463, filed on Jul. 31, 2009, provisional application No. 61/149,553, filed on Feb. 3, 2009.

(51) Int. Cl.
*H04B 10/00* (2013.01)
*H04B 10/27* (2013.01)
(Continued)

(52) U.S. Cl.
CPC ........ *H04B 10/271* (2013.01); *H04B 10/25754* (2013.01); *H04B 10/25758* (2013.01); *H04W 88/085* (2013.01)

(58) Field of Classification Search
CPC .................... H04B 10/2575; H04B 10/25752; H04B 10/25753; H04B 10/25754; H04B 10/25756; H04B 10/25758; H04B 10/25759
See application file for complete search history.

(56) References Cited

U.S. PATENT DOCUMENTS

| | | | |
|---|---|---|---|
| 4,365,865 | A | 12/1982 | Stiles |
| 4,449,246 | A | 5/1984 | Seiler et al. |

(Continued)

FOREIGN PATENT DOCUMENTS

| | | | |
|---|---|---|---|
| AU | 645192 | B | 10/1992 |
| AU | 731180 | B2 | 3/1998 |

(Continued)

OTHER PUBLICATIONS

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

(Continued)

*Primary Examiner* — Daniel Dobson

(57) ABSTRACT

Optical fiber-based wireless systems and related components and methods are disclosed. The systems support radio frequency (RF) communications with clients over optical fiber, including Radio-over-Fiber (RoF) communications. The systems may be provided as part of an indoor distributed antenna system (IDAS) to provide wireless communication services to clients inside a building or other facility. The communications can be distributed between a head end unit (HEU) that receives carrier signals from one or more service or carrier providers and converts the signals to RoF signals for distribution over optical fibers to end points, which may be remote antenna units (RAUs). In one embodiment, calibration of communication downlinks and communication uplinks is performed to compensate for signal strength losses in the system.

23 Claims, 73 Drawing Sheets

(51) Int. Cl.

| | |
|---|---|
| ***H04B 10/2575*** | (2013.01) |
| ***H04W 88/08*** | (2009.01) |
| *H04B 10/08* | (2006.01) |

(56) References Cited

U.S. PATENT DOCUMENTS 4,573,212 A 2/1986 Lipsky
4,665,560 A 5/1987 Lange
4,867,527 A 9/1989 Dotti et al.
4,889,977 A 12/1989 Haydon
4,896,939 A 1/1990 O'Brien
4,916,460 A 4/1990 Powell
4,939,852 A 7/1990 Brenner
4,972,346 A 11/1990 Kawano et al.
5,039,195 A 8/1991 Jenkins et al.
5,042,086 A 8/1991 Cole et al.
5,056,109 A 10/1991 Gilhousen et al.
5,059,927 A 10/1991 Cohen
5,125,060 A 6/1992 Edmundson
5,187,803 A 2/1993 Sohner et al.
5,189,718 A 2/1993 Barrett et al.
5,189,719 A 2/1993 Coleman et al.
5,206,655 A 4/1993 Caille et al.
5,208,812 A 5/1993 Dudek et al.
5,210,812 A 5/1993 Nilsson et al.
5,260,957 A 11/1993 Hakimi
5,263,108 A 11/1993 Kurokawa et al.
5,267,122 A 11/1993 Glover et al.
5,268,971 A 12/1993 Nilsson et al.
5,278,690 A 1/1994 Vella-Coleiro
5,278,989 A 1/1994 Burke et al.
5,280,472 A 1/1994 Gilhousen et al.
5,299,947 A 4/1994 Barnard
5,301,056 A 4/1994 O'Neill
5,325,223 A 6/1994 Bears
5,339,058 A 8/1994 Lique
5,339,184 A 8/1994 Tang
5,343,320 A 8/1994 Anderson
5,377,035 A 12/1994 Wang et al.
5,379,455 A 1/1995 Koschek ....................... 455/273
5,381,459 A 1/1995 Lappington
5,396,224 A 3/1995 Dukes et al.
5,400,391 A 3/1995 Emura et al.
5,420,863 A 5/1995 Taketsugu et al.
5,424,864 A 6/1995 Emura
5,444,564 A 8/1995 Newberg
5,457,557 A 10/1995 Zarem et al.
5,459,727 A 10/1995 Vannucci
5,469,523 A 11/1995 Blew et al.
5,519,830 A 5/1996 Opoczynski
5,543,000 A 8/1996 Lique
5,546,443 A 8/1996 Raith
5,557,698 A 9/1996 Gareis et al.
5,574,815 A 11/1996 Kneeland
5,598,288 A 1/1997 Collar
5,606,725 A 2/1997 Hart
5,615,034 A 3/1997 Hori
5,627,879 A 5/1997 Russell et al.
5,640,678 A 6/1997 Ishikawa et al.
5,642,405 A 6/1997 Fischer et al.
5,644,622 A 7/1997 Russell et al.
5,648,961 A 7/1997 Ebihara
5,651,081 A 7/1997 Blew et al.
5,657,374 A 8/1997 Russell et al.
5,668,562 A 9/1997 Cutrer et al.
5,677,974 A 10/1997 Elms et al.
5,682,256 A 10/1997 Motley et al.
5,694,232 A 12/1997 Parsay et al.
5,703,602 A 12/1997 Casebolt
5,708,681 A 1/1998 Malkemes et al.
5,726,984 A 3/1998 Kubler et al.
5,765,099 A 6/1998 Georges et al.
5,790,536 A 8/1998 Mahany et al.
5,790,606 A 8/1998 Dent
5,793,772 A 8/1998 Burke et al.
5,802,173 A 9/1998 Hamilton-Piercy et al.
5,802,473 A 9/1998 Rutledge et al.
5,805,975 A 9/1998 Green, Sr. et al.
5,805,983 A 9/1998 Naidu et al. ................. 455/67.6
5,809,395 A 9/1998 Hamilton-Piercy et al.
5,809,431 A 9/1998 Bustamante et al.
5,812,296 A 9/1998 Tarusawa et al. ............. 359/173
5,818,619 A 10/1998 Medved et al.
5,818,883 A 10/1998 Smith et al.
5,821,510 A 10/1998 Cohen et al.
5,825,651 A 10/1998 Gupta et al.
5,838,474 A 11/1998 Stilling
5,839,052 A 11/1998 Dean et al.
5,852,651 A 12/1998 Fischer et al.
5,854,986 A 12/1998 Dorren et al.
5,859,719 A 1/1999 Dentai et al.
5,862,460 A 1/1999 Rich
5,867,485 A 2/1999 Chambers et al.
5,867,763 A 2/1999 Dean et al.
5,881,200 A 3/1999 Burt
5,883,882 A 3/1999 Schwartz
5,896,568 A 4/1999 Tseng et al.
5,903,834 A 5/1999 Wallstedt et al.
5,910,776 A 6/1999 Black
5,913,003 A 6/1999 Arroyo et al.
5,917,636 A 6/1999 Wake et al.
5,930,682 A 7/1999 Schwartz et al.
5,936,754 A 8/1999 Ariyavisitakul et al.
5,943,372 A 8/1999 Gans et al.
5,946,622 A 8/1999 Bojeryd
5,949,564 A 9/1999 Wake
5,953,670 A 9/1999 Newson
5,959,531 A 9/1999 Gallagher, III et al.
5,960,344 A 9/1999 Mahany
5,969,837 A 10/1999 Farber et al.
5,983,070 A 11/1999 Georges et al.
5,987,303 A 11/1999 Dutta et al.
6,005,884 A 12/1999 Cook et al.
6,006,069 A 12/1999 Langston et al.
6,006,105 A 12/1999 Rostoker et al.
6,011,980 A 1/2000 Nagano et al.
6,014,546 A 1/2000 Georges et al.
6,016,426 A 1/2000 Bodell
6,023,625 A 2/2000 Myers, Jr.
6,037,898 A 3/2000 Parish et al.
6,061,161 A 5/2000 Yang et al.
6,069,721 A 5/2000 Oh et al.
6,088,381 A 7/2000 Myers, Jr.
6,118,767 A 9/2000 Shen et al.
6,122,529 A 9/2000 Sabat, Jr. et al.
6,127,917 A 10/2000 Tuttle
6,128,470 A 10/2000 Naidu et al. .................... 455/16
6,128,477 A 10/2000 Freed
6,148,041 A 11/2000 Dent
6,150,921 A 11/2000 Werb et al.
6,157,810 A 12/2000 Georges et al.
6,192,216 B1 2/2001 Sabat, Jr. et al.
6,194,968 B1 2/2001 Winslow
6,212,397 B1 4/2001 Langston et al.
6,222,503 B1 4/2001 Gietema
6,223,201 B1 4/2001 Reznak
6,232,870 B1 5/2001 Garber et al.
6,236,789 B1 5/2001 Fitz
6,236,863 B1 5/2001 Waldroup et al.
6,240,274 B1 5/2001 Izadpanah
6,246,500 B1 6/2001 Ackerman
6,268,946 B1 7/2001 Larkin et al.
6,275,990 B1 8/2001 Dapper et al.
6,279,158 B1 8/2001 Geile et al.
6,286,163 B1 9/2001 Trimble
6,292,673 B1 9/2001 Maeda et al.
6,295,451 B1 9/2001 Mimura
6,301,240 B1 10/2001 Slabinski et al.
6,307,869 B1 10/2001 Pawelski
6,314,163 B1 11/2001 Acampora
6,317,599 B1 11/2001 Rappaport et al.
6,323,980 B1 11/2001 Bloom
6,324,391 B1 11/2001 Bodell
6,330,241 B1 12/2001 Fort

(56) References Cited

U.S. PATENT DOCUMENTS

| | | | | |
|---|---|---|---|---|
| 6,330,244 | B1 | 12/2001 | Swartz et al. | |
| 6,334,219 | B1 | 12/2001 | Hill et al. | |
| 6,336,021 | B1 | 1/2002 | Nukada | |
| 6,336,042 | B1 | 1/2002 | Dawson et al. | |
| 6,337,754 | B1 | 1/2002 | Imajo | |
| 6,340,932 | B1 | 1/2002 | Rodgers et al. | |
| 6,353,406 | B1 | 3/2002 | Lanzl et al. | 342/118 |
| 6,353,600 | B1 | 3/2002 | Schwartz et al. | |
| 6,359,714 | B1 | 3/2002 | Imajo | |
| 6,370,203 | B1 | 4/2002 | Boesch et al. | |
| 6,374,078 | B1 | 4/2002 | Williams et al. | |
| 6,374,124 | B1 | 4/2002 | Slabinski | |
| 6,389,010 | B1 | 5/2002 | Kubler et al. | |
| 6,400,318 | B1 | 6/2002 | Kasami et al. | |
| 6,400,418 | B1 | 6/2002 | Wakabayashi | |
| 6,404,775 | B1 | 6/2002 | Leslie et al. | |
| 6,405,018 | B1 | 6/2002 | Reudink et al. | |
| 6,405,058 | B2 | 6/2002 | Bobier | |
| 6,405,308 | B1 | 6/2002 | Gupta et al. | |
| 6,414,624 | B2 | 7/2002 | Endo et al. | |
| 6,415,132 | B1 | 7/2002 | Sabat, Jr. | |
| 6,421,327 | B1 | 7/2002 | Lundby et al. | |
| 6,438,301 | B1 | 8/2002 | Johnson et al. | |
| 6,438,371 | B1 | 8/2002 | Fujise et al. | |
| 6,448,558 | B1 | 9/2002 | Greene | |
| 6,452,915 | B1 | 9/2002 | Jorgensen | |
| 6,459,519 | B1 | 10/2002 | Sasai et al. | |
| 6,459,989 | B1 | 10/2002 | Kirkpatrick et al. | |
| 6,477,154 | B1 | 11/2002 | Cheong et al. | |
| 6,480,702 | B1 | 11/2002 | Sabat, Jr. | |
| 6,486,907 | B1 | 11/2002 | Farber et al. | |
| 6,496,290 | B1 | 12/2002 | Lee | |
| 6,501,965 | B1 | 12/2002 | Lucidarme | |
| 6,504,636 | B1 | 1/2003 | Seto et al. | |
| 6,504,831 | B1 | 1/2003 | Greenwood et al. | |
| 6,512,478 | B1 | 1/2003 | Chien | |
| 6,519,395 | B1 | 2/2003 | Bevan et al. | |
| 6,519,449 | B1 | 2/2003 | Zhang et al. | |
| 6,525,855 | B1 | 2/2003 | Westbrook et al. | |
| 6,535,330 | B1 | 3/2003 | Lelic et al. | |
| 6,535,720 | B1 | 3/2003 | Kintis et al. | |
| 6,556,551 | B1 | 4/2003 | Schwartz | |
| 6,577,794 | B1 | 6/2003 | Currie et al. | |
| 6,577,801 | B2 | 6/2003 | Broderick et al. | |
| 6,580,402 | B2 | 6/2003 | Navarro et al. | |
| 6,580,905 | B1 | 6/2003 | Naidu et al. | |
| 6,580,918 | B1 | 6/2003 | Leickel et al. | |
| 6,583,763 | B2 | 6/2003 | Judd | |
| 6,587,514 | B1 | 7/2003 | Wright et al. | |
| 6,594,496 | B2 | 7/2003 | Schwartz | |
| 6,597,325 | B2 | 7/2003 | Judd et al. | |
| 6,598,009 | B2 | 7/2003 | Yang | |
| 6,606,430 | B2 | 8/2003 | Bartur et al. | |
| 6,615,074 | B2 | 9/2003 | Mickle et al. | |
| 6,628,732 | B1 | 9/2003 | Takaki | |
| 6,634,811 | B1 | 10/2003 | Gertel et al. | |
| 6,636,747 | B2 | 10/2003 | Harada et al. | |
| 6,640,103 | B1 | 10/2003 | Inman et al. | |
| 6,643,437 | B1 | 11/2003 | Park | |
| 6,652,158 | B2 | 11/2003 | Bartur et al. | |
| 6,654,590 | B2 | 11/2003 | Boros et al. | |
| 6,654,616 | B1 | 11/2003 | Pope, Jr. et al. | |
| 6,657,535 | B1 | 12/2003 | Magbie et al. | |
| 6,658,269 | B1 | 12/2003 | Golemon et al. | |
| 6,665,308 | B1 | 12/2003 | Rakib et al. | |
| 6,670,930 | B2 | 12/2003 | Navarro | |
| 6,674,966 | B1 | 1/2004 | Koonen | |
| 6,675,294 | B1 | 1/2004 | Gupta et al. | |
| 6,678,509 | B2 | 1/2004 | Skarman et al. | |
| 6,687,437 | B1 | 2/2004 | Starnes et al. | |
| 6,690,328 | B2 | 2/2004 | Judd | |
| 6,701,137 | B1 | 3/2004 | Judd et al. | |
| 6,704,298 | B1 | 3/2004 | Matsumiya et al. | |
| 6,704,545 | B1 | 3/2004 | Wala | |
| 6,710,366 | B1 | 3/2004 | Lee et al. | |
| 6,714,800 | B2 | 3/2004 | Johnson et al. | |
| 6,731,880 | B2 | 5/2004 | Westbrook et al. | |
| 6,745,013 | B1 | 6/2004 | Porter et al. | |
| 6,758,913 | B1 | 7/2004 | Tunney et al. | |
| 6,763,226 | B1 | 7/2004 | McZeal, Jr. | |
| 6,771,862 | B2 | 8/2004 | Karnik et al. | |
| 6,771,933 | B1 | 8/2004 | Eng et al. | |
| 6,784,802 | B1 | 8/2004 | Stanescu | |
| 6,785,558 | B1 | 8/2004 | Stratford et al. | |
| 6,788,666 | B1 | 9/2004 | Linebarger et al. | |
| 6,801,767 | B1 * | 10/2004 | Schwartz et al. | 455/426.2 |
| 6,807,374 | B1 | 10/2004 | Imajo et al. | |
| 6,812,824 | B1 | 11/2004 | Goldinger et al. | 340/10.1 |
| 6,812,905 | B2 | 11/2004 | Thomas et al. | |
| 6,823,174 | B1 | 11/2004 | Masenten et al. | |
| 6,826,163 | B2 | 11/2004 | Mani et al. | |
| 6,826,164 | B2 | 11/2004 | Mani et al. | |
| 6,826,337 | B2 | 11/2004 | Linnell | |
| 6,836,660 | B1 | 12/2004 | Wala | |
| 6,836,673 | B1 | 12/2004 | Trott | |
| 6,842,433 | B2 | 1/2005 | West et al. | |
| 6,847,856 | B1 | 1/2005 | Bohannon | |
| 6,850,510 | B2 | 2/2005 | Kubler | |
| 6,865,390 | B2 | 3/2005 | Goss et al. | |
| 6,873,823 | B2 | 3/2005 | Hasarchi | |
| 6,876,056 | B2 | 4/2005 | Tilmans et al. | |
| 6,879,290 | B1 | 4/2005 | Toutain et al. | |
| 6,882,311 | B2 | 4/2005 | Walker et al. | |
| 6,883,710 | B2 | 4/2005 | Chung | |
| 6,885,344 | B2 | 4/2005 | Mohamadi | |
| 6,885,846 | B1 | 4/2005 | Panasik et al. | |
| 6,889,060 | B2 | 5/2005 | Fernando et al. | |
| 6,909,399 | B1 | 6/2005 | Zegelin et al. | |
| 6,915,058 | B2 | 7/2005 | Pons | |
| 6,915,529 | B1 | 7/2005 | Suematsu et al. | |
| 6,919,858 | B2 | 7/2005 | Rofougaran | |
| 6,920,330 | B2 | 7/2005 | Caronni et al. | |
| 6,924,997 | B2 | 8/2005 | Chen et al. | |
| 6,930,987 | B1 | 8/2005 | Fukuda et al. | |
| 6,931,183 | B2 | 8/2005 | Panak et al. | |
| 6,931,659 | B1 | 8/2005 | Kinemura | |
| 6,933,849 | B2 | 8/2005 | Sawyer | |
| 6,934,511 | B1 | 8/2005 | Lovinggood et al. | |
| 6,934,541 | B2 | 8/2005 | Miyatani | |
| 6,941,112 | B2 | 9/2005 | Hasegawa | |
| 6,946,989 | B2 | 9/2005 | Vavik | |
| 6,961,312 | B2 | 11/2005 | Kubler et al. | |
| 6,963,289 | B2 | 11/2005 | Aljadeff et al. | |
| 6,963,552 | B2 | 11/2005 | Sabat, Jr. et al. | |
| 6,965,718 | B2 | 11/2005 | Koertel | |
| 6,967,347 | B2 | 11/2005 | Estes et al. | |
| 6,968,107 | B2 | 11/2005 | Belardi et al. | |
| 6,970,652 | B2 | 11/2005 | Zhang et al. | |
| 6,973,243 | B2 | 12/2005 | Koyasu et al. | |
| 6,974,262 | B1 | 12/2005 | Rickenbach | |
| 6,977,502 | B1 | 12/2005 | Hertz | |
| 7,002,511 | B1 | 2/2006 | Ammar et al. | |
| 7,006,465 | B2 | 2/2006 | Toshimitsu et al. | |
| 7,013,087 | B2 | 3/2006 | Suzuki et al. | |
| 7,015,826 | B1 | 3/2006 | Chan et al. | |
| 7,020,473 | B2 | 3/2006 | Splett | |
| 7,020,488 | B1 | 3/2006 | Bleile et al. | |
| 7,024,166 | B2 | 4/2006 | Wallace | |
| 7,035,512 | B2 | 4/2006 | Van Bijsterveld | |
| 7,039,399 | B2 | 5/2006 | Fischer | |
| 7,043,271 | B1 | 5/2006 | Seto et al. | |
| 7,047,028 | B2 | 5/2006 | Cagenius et al. | |
| 7,050,017 | B2 | 5/2006 | King et al. | |
| 7,053,838 | B2 | 5/2006 | Judd | |
| 7,054,513 | B2 | 5/2006 | Herz et al. | |
| 7,069,577 | B2 | 6/2006 | Geile et al. | |
| 7,072,586 | B2 | 7/2006 | Aburakawa et al. | |
| 7,082,320 | B2 | 7/2006 | Kattukaran et al. | |
| 7,084,769 | B2 | 8/2006 | Bauer et al. | |
| 7,093,985 | B2 | 8/2006 | Lord et al. | |
| 7,103,119 | B2 | 9/2006 | Matsuoka et al. | |
| 7,103,377 | B2 | 9/2006 | Bauman et al. | 455/522 |
| 7,106,252 | B2 | 9/2006 | Smith et al. | |
| 7,106,931 | B2 | 9/2006 | Sutehall et al. | |

(56) References Cited

U.S. PATENT DOCUMENTS 7,110,795 B2 9/2006 Doi
7,114,859 B1 10/2006 Tuohimaa et al.
7,127,175 B2 10/2006 Mani et al.
7,127,176 B2 10/2006 Sasaki
7,142,503 B1 11/2006 Grant et al.
7,142,535 B2 11/2006 Kubler et al.
7,142,619 B2 11/2006 Sommer et al.
7,146,506 B1 12/2006 Hannah et al.
7,160,032 B2 1/2007 Nagashima et al.
7,171,244 B2 1/2007 Bauman ........................ 455/566
7,184,728 B2 2/2007 Solum ........................ 455/234.1
7,190,748 B2 3/2007 Kim et al.
7,194,023 B2 3/2007 Norrell et al.
7,199,443 B2 4/2007 Elsharawy
7,200,305 B2 4/2007 Dion et al.
7,200,391 B2 4/2007 Chung et al. .................. 455/423
7,228,072 B2 6/2007 Mickelsson et al.
7,263,293 B2 8/2007 Ommodt et al.
7,269,311 B2 9/2007 Kim et al.
7,280,011 B2 10/2007 Bayar et al.
7,286,843 B2 10/2007 Scheck
7,286,854 B2 10/2007 Ferrato et al.
7,295,119 B2 11/2007 Rappaport et al.
7,310,430 B1 12/2007 Mallya et al.
7,313,415 B2 12/2007 Wake et al.
7,315,735 B2 1/2008 Graham
7,324,730 B2 1/2008 Varkey et al.
7,343,164 B2 3/2008 Kallstenius
7,348,843 B1 3/2008 Qiu et al.
7,349,633 B2 3/2008 Lee et al.
7,359,408 B2 4/2008 Kim
7,359,674 B2 4/2008 Markki et al.
7,366,150 B2 4/2008 Lee et al.
7,366,151 B2 4/2008 Kubler et al.
7,369,526 B2 5/2008 Lechleider et al.
7,379,669 B2 5/2008 Kim
7,388,892 B2 6/2008 Nishiyama et al.
7,392,025 B2 6/2008 Rooyen et al.
7,392,029 B2 6/2008 Pronkine
7,394,883 B2 7/2008 Funakubo et al.
7,403,156 B2 7/2008 Coppi et al.
7,409,159 B2 8/2008 Izadpanah
7,412,224 B2 8/2008 Kotola et al.
7,424,228 B1 9/2008 Williams et al.
7,444,051 B2 10/2008 Tatat et al.
7,450,853 B2 11/2008 Kim et al.
7,450,854 B2 11/2008 Lee et al.
7,451,365 B2 11/2008 Wang et al.
7,454,222 B2 11/2008 Huang et al.
7,460,507 B2 12/2008 Kubler et al.
7,460,829 B2 12/2008 Utsumi et al.
7,460,831 B2 12/2008 Hasarchi
7,466,925 B2 12/2008 Iannelli
7,469,105 B2 12/2008 Wake et al.
7,477,597 B2 1/2009 Segel
7,483,504 B2 1/2009 Shapira et al.
7,483,711 B2 1/2009 Burchfiel
7,496,070 B2 2/2009 Vesuna
7,496,384 B2 2/2009 Seto et al. .................. 455/562.1
7,505,747 B2 3/2009 Solum ........................ 455/234.1
7,512,419 B2 3/2009 Solum
7,522,552 B2 4/2009 Fein et al.
7,539,509 B2 5/2009 Bauman et al. ............... 455/522
7,542,452 B2 6/2009 Penumetsa
7,546,138 B2 6/2009 Bauman ........................ 455/504
7,548,138 B2 6/2009 Kamgaing
7,548,695 B2 6/2009 Wake
7,551,641 B2 6/2009 Pirzada et al.
7,557,758 B2 7/2009 Rofougaran
7,580,384 B2 8/2009 Kubler et al.
7,586,861 B2 9/2009 Kubler et al.
7,590,354 B2 9/2009 Sauer et al.
7,593,704 B2 9/2009 Pinel et al.
7,599,420 B2 10/2009 Forenza et al.
7,599,672 B2 10/2009 Shoji et al.
7,610,046 B2 10/2009 Wala
7,630,690 B2 12/2009 Kaewell, Jr. et al.
7,633,934 B2 12/2009 Kubler et al.
7,639,982 B2 12/2009 Wala
7,646,743 B2 1/2010 Kubler et al.
7,646,777 B2 1/2010 Hicks, III et al.
7,653,397 B2 1/2010 Pernu et al.
7,668,565 B2 2/2010 Ylänen et al.
7,675,936 B2 3/2010 Mizutani et al.
7,688,811 B2 3/2010 Kubler et al.
7,693,486 B2 4/2010 Kasslin et al.
7,697,467 B2 4/2010 Kubler et al.
7,697,574 B2 4/2010 Suematsu et al.
7,715,375 B2 5/2010 Kubler et al.
7,720,510 B2 5/2010 Pescod et al.
7,751,374 B2 7/2010 Donovan
7,751,838 B2 7/2010 Ramesh et al.
7,760,703 B2 7/2010 Kubler et al.
7,761,093 B2 7/2010 Sabat, Jr. et al.
7,768,951 B2 8/2010 Kubler et al.
7,773,573 B2 8/2010 Chung et al.
7,778,603 B2 8/2010 Palin et al.
7,787,823 B2 8/2010 George et al.
7,805,073 B2 9/2010 Sabat, Jr. et al.
7,809,012 B2 10/2010 Ruuska et al.
7,812,766 B2 10/2010 Leblanc et al.
7,812,775 B2 10/2010 Babakhani et al.
7,817,969 B2 10/2010 Castaneda et al.
7,835,328 B2 11/2010 Stephens et al.
7,848,316 B2 12/2010 Kubler et al.
7,848,770 B2 12/2010 Scheinert
7,853,234 B2 12/2010 Afsahi
7,870,321 B2 1/2011 Rofougaran
7,880,677 B2 2/2011 Rofougaran et al.
7,881,755 B1 2/2011 Mishra et al.
7,894,423 B2 2/2011 Kubler et al.
7,899,007 B2 3/2011 Kubler et al.
7,907,972 B2 3/2011 Walton et al.
7,912,043 B2 3/2011 Kubler et al.
7,912,506 B2 3/2011 Lovberg et al.
7,916,706 B2 3/2011 Kubler et al.
7,917,177 B2 3/2011 Bauman ..................... 455/562.1
7,920,553 B2 4/2011 Kubler et al.
7,920,858 B2 4/2011 Sabat, Jr. et al.
7,924,783 B1 4/2011 Mahany et al.
7,936,713 B2 5/2011 Kubler et al.
7,949,364 B2 5/2011 Kasslin et al.
7,957,777 B1 6/2011 Vu et al.
7,962,111 B2 6/2011 Solum ........................ 455/234.1
7,969,009 B2 6/2011 Chandrasekaran
7,969,911 B2 6/2011 Mahany et al.
7,990,925 B2 8/2011 Tinnakornsrisuphap et al.
7,996,020 B1 8/2011 Chhabra
8,018,907 B2 9/2011 Kubler et al.
8,023,886 B2 9/2011 Rofougaran
8,027,656 B2 9/2011 Rofougaran et al.
8,036,308 B2 10/2011 Rofougaran
8,082,353 B2 12/2011 Huber et al.
8,086,192 B2 12/2011 Rofougaran et al.
8,135,102 B2 3/2012 Wiwel et al.
8,213,401 B2 7/2012 Fischer et al.
8,223,795 B2 7/2012 Cox et al.
8,238,463 B1 8/2012 Arslan et al.
8,270,387 B2 9/2012 Cannon et al.
8,290,483 B2 10/2012 Sabat, Jr. et al.
8,306,563 B2 11/2012 Zavadsky et al.
8,346,278 B2 1/2013 Wala et al.
8,428,510 B2 4/2013 Stratford et al.
8,462,683 B2 6/2013 Uyehara et al.
8,472,579 B2 6/2013 Uyehara et al.
8,509,215 B2 8/2013 Stuart
8,509,850 B2 8/2013 Zavadsky et al.
8,526,970 B2 9/2013 Wala et al.
8,532,242 B2 9/2013 Fischer et al.
8,626,245 B2 1/2014 Zavadsky et al.
8,737,454 B2 5/2014 Wala et al.
8,743,718 B2 6/2014 Grenier et al.
8,743,756 B2 6/2014 Uyehara et al.
8,837,659 B2 9/2014 Uyehara et al.

(56) References Cited

U.S. PATENT DOCUMENTS 8,837,940 B2 9/2014 Smith et al.
8,873,585 B2 10/2014 Oren et al.
8,929,288 B2 1/2015 Stewart et al.
2001/0036163 A1 11/2001 Sabat, Jr. et al.
2001/0036199 A1 11/2001 Terry
2002/0003645 A1 1/2002 Kim et al.
2002/0009070 A1 1/2002 Lindsay et al.
2002/0012336 A1 1/2002 Hughes et al.
2002/0012495 A1 1/2002 Sasai et al.
2002/0016827 A1 2/2002 McCabe et al.
2002/0045519 A1 4/2002 Watterson et al.
2002/0048071 A1 4/2002 Suzuki et al.
2002/0051434 A1 5/2002 Ozluturk et al.
2002/0075906 A1 6/2002 Cole et al.
2002/0092347 A1 7/2002 Niekerk et al.
2002/0097564 A1 7/2002 Struhsaker et al.
2002/0103012 A1 8/2002 Kim et al.
2002/0111149 A1 8/2002 Shoki
2002/0111192 A1 8/2002 Thomas et al.
2002/0114038 A1 8/2002 Arnon et al. .................. 359/145
2002/0123365 A1 9/2002 Thorson et al.
2002/0126967 A1 9/2002 Panak et al.
2002/0128009 A1 9/2002 Boch et al.
2002/0130778 A1 9/2002 Nicholson
2002/0181668 A1 12/2002 Masoian et al.
2002/0190845 A1 12/2002 Moore
2002/0197984 A1 12/2002 Monin et al.
2003/0002604 A1 1/2003 Fifield et al.
2003/0007214 A1 1/2003 Aburakawa et al.
2003/0016418 A1 1/2003 Westbrook et al.
2003/0045284 A1 3/2003 Copley et al.
2003/0069922 A1 4/2003 Arunachalam
2003/0078074 A1 4/2003 Sesay et al.
2003/0112826 A1 6/2003 Smith et al.
2003/0141962 A1 7/2003 Barink
2003/0161637 A1 8/2003 Yamamoto et al.
2003/0165287 A1 9/2003 Krill et al.
2003/0174099 A1 9/2003 Bauer et al.
2003/0209601 A1 11/2003 Chung
2004/0001719 A1 1/2004 Sasaki
2004/0008114 A1 1/2004 Sawyer
2004/0017785 A1 1/2004 Zelst
2004/0037565 A1 2/2004 Young et al. .................. 398/115
2004/0041714 A1 3/2004 Forster
2004/0043764 A1 3/2004 Bigham et al.
2004/0047313 A1 3/2004 Rumpf et al.
2004/0078151 A1 4/2004 Aljadeff et al.
2004/0095907 A1 5/2004 Agee et al.
2004/0100930 A1 5/2004 Shapira et al.
2004/0106435 A1 6/2004 Bauman et al.
2004/0126068 A1 7/2004 Van Bijsterveld
2004/0126107 A1 7/2004 Jay et al.
2004/0139477 A1 7/2004 Russell et al.
2004/0146020 A1 7/2004 Kubler et al.
2004/0149736 A1 8/2004 Clothier
2004/0151164 A1 8/2004 Kubler et al.
2004/0151503 A1 8/2004 Kashima et al.
2004/0157623 A1 8/2004 Splett
2004/0160912 A1 8/2004 Kubler et al.
2004/0160913 A1 8/2004 Kubler et al.
2004/0162084 A1 8/2004 Wang
2004/0162115 A1 8/2004 Smith et al.
2004/0162116 A1 8/2004 Han et al.
2004/0165573 A1 8/2004 Kubler et al.
2004/0175173 A1 9/2004 Deas
2004/0196404 A1 10/2004 Loheit et al.
2004/0202257 A1 10/2004 Mehta et al.
2004/0203703 A1 10/2004 Fischer
2004/0203704 A1 10/2004 Ommodt et al.
2004/0203846 A1 10/2004 Caronni et al.
2004/0204109 A1 10/2004 Hoppenstein
2004/0208526 A1 10/2004 Mibu
2004/0208643 A1 10/2004 Roberts et al.
2004/0215723 A1 10/2004 Chadha
2004/0218873 A1 11/2004 Nagashima et al.
2004/0233877 A1 11/2004 Lee et al.
2004/0258105 A1 12/2004 Spathas et al.
2004/0267971 A1 12/2004 Seshadri
2005/0052287 A1 3/2005 Whitesmith et al.
2005/0058451 A1 3/2005 Ross
2005/0068179 A1 3/2005 Roesner
2005/0076982 A1 4/2005 Metcalf et al.
2005/0078006 A1 4/2005 Hutchins
2005/0093679 A1 5/2005 Zai et al.
2005/0099343 A1 5/2005 Asrani et al.
2005/0116821 A1 6/2005 Wilsey et al.
2005/0123232 A1 6/2005 Piede et al.
2005/0141545 A1 6/2005 Fein et al.
2005/0143077 A1 6/2005 Charbonneau
2005/0147067 A1 7/2005 Mani et al.
2005/0147071 A1 7/2005 Karaoguz et al.
2005/0148306 A1 7/2005 Hiddink
2005/0159108 A1 7/2005 Fletcher
2005/0174236 A1 8/2005 Brookner
2005/0176458 A1 8/2005 Shklarsky et al.
2005/0201323 A1 9/2005 Mani et al.
2005/0201761 A1 9/2005 Bartur et al.
2005/0219050 A1 10/2005 Martin
2005/0224585 A1 10/2005 Durrant et al.
2005/0226625 A1 10/2005 Wake et al.
2005/0232636 A1 10/2005 Durrant et al.
2005/0242188 A1 11/2005 Vesuna
2005/0252971 A1 11/2005 Howarth et al.
2005/0266797 A1 12/2005 Utsumi et al.
2005/0266854 A1 12/2005 Niiho et al.
2005/0269930 A1 12/2005 Shimizu et al.
2005/0271396 A1 12/2005 Iannelli
2005/0272439 A1 12/2005 Picciriello et al.
2006/0002326 A1 1/2006 Vesuna
2006/0014548 A1 1/2006 Bolin
2006/0017633 A1 1/2006 Pronkine
2006/0028352 A1 2/2006 McNamara et al.
2006/0045054 A1 3/2006 Utsumi et al.
2006/0045524 A1 3/2006 Lee et al.
2006/0045525 A1 3/2006 Lee et al.
2006/0053324 A1 3/2006 Giat et al.
2006/0056327 A1 3/2006 Coersmeier
2006/0062579 A1 3/2006 Kim et al.
2006/0083520 A1 4/2006 Healey et al.
2006/0094470 A1 5/2006 Wake et al.
2006/0104643 A1 5/2006 Lee et al.
2006/0159388 A1 7/2006 Kawase et al.
2006/0172775 A1 8/2006 Conyers et al.
2006/0182446 A1 8/2006 Kim et al.
2006/0182449 A1 8/2006 Iannelli et al.
2006/0189354 A1 8/2006 Lee et al.
2006/0209745 A1 9/2006 MacMullan et al.
2006/0223439 A1 10/2006 Pinel et al.
2006/0233506 A1 10/2006 Noonan et al.
2006/0239630 A1 10/2006 Hase et al.
2006/0268738 A1 11/2006 Goerke et al.
2006/0274704 A1 12/2006 Desai et al.
2007/0009266 A1 1/2007 Bothwell
2007/0050451 A1 3/2007 Caspi et al.
2007/0054682 A1 3/2007 Fanning et al.
2007/0058978 A1 3/2007 Lee et al.
2007/0060045 A1 3/2007 Prautzsch
2007/0060055 A1 3/2007 Desai et al.
2007/0071128 A1 3/2007 Meir et al. .................... 375/297
2007/0076649 A1 4/2007 Lin et al.
2007/0093273 A1 4/2007 Cai
2007/0149250 A1 6/2007 Crozzoli et al.
2007/0166042 A1 7/2007 Seeds et al.
2007/0173288 A1 7/2007 Skarby et al.
2007/0174889 A1 7/2007 Kim et al.
2007/0224954 A1 9/2007 Gopi
2007/0230328 A1 10/2007 Saitou
2007/0243899 A1 10/2007 Hermel et al.
2007/0248358 A1 10/2007 Sauer
2007/0253714 A1 11/2007 Seeds et al.
2007/0257796 A1 11/2007 Easton et al.
2007/0264009 A1 11/2007 Sabat, Jr. et al.
2007/0264011 A1 11/2007 Sone et al.
2007/0268846 A1 11/2007 Proctor et al.

(56) References Cited

U.S. PATENT DOCUMENTS

| | | | |
|---|---|---|---|
| 2007/0274279 A1 | 11/2007 | Wood et al. | |
| 2007/0292143 A1 | 12/2007 | Yu et al. | |
| 2007/0297005 A1 | 12/2007 | Montierth et al. | |
| 2008/0002652 A1 | 1/2008 | Gupta et al. | |
| 2008/0007453 A1 | 1/2008 | Vassilakis et al. | 342/368 |
| 2008/0013909 A1 | 1/2008 | Kostet et al. | |
| 2008/0013956 A1 | 1/2008 | Ware et al. | |
| 2008/0013957 A1 | 1/2008 | Akers et al. | |
| 2008/0014948 A1 | 1/2008 | Scheinert | |
| 2008/0026765 A1 | 1/2008 | Charbonneau | |
| 2008/0031628 A1 | 2/2008 | Dragas et al. | |
| 2008/0043714 A1 | 2/2008 | Pernu | |
| 2008/0056167 A1 | 3/2008 | Kim et al. | |
| 2008/0058018 A1 | 3/2008 | Scheinert | |
| 2008/0063397 A1 | 3/2008 | Hu et al. | |
| 2008/0070502 A1 | 3/2008 | George et al. | |
| 2008/0080863 A1 | 4/2008 | Sauer et al. | |
| 2008/0098203 A1 | 4/2008 | Master et al. | |
| 2008/0118014 A1 | 5/2008 | Reunamaki et al. | |
| 2008/0119198 A1 | 5/2008 | Hettstedt et al. | |
| 2008/0124086 A1 | 5/2008 | Matthews | |
| 2008/0124087 A1 | 5/2008 | Hartmann et al. | |
| 2008/0129634 A1 | 6/2008 | Pera et al. | |
| 2008/0134194 A1 | 6/2008 | Liu | |
| 2008/0145061 A1 | 6/2008 | Lee et al. | |
| 2008/0150514 A1 | 6/2008 | Codreanu et al. | 324/76.77 |
| 2008/0166094 A1 | 7/2008 | Bookbinder et al. | |
| 2008/0194226 A1 | 8/2008 | Rivas et al. | |
| 2008/0207253 A1 | 8/2008 | Jaakkola et al. | |
| 2008/0212969 A1 | 9/2008 | Fasshauer et al. | |
| 2008/0219670 A1 | 9/2008 | Kim et al. | |
| 2008/0232305 A1 | 9/2008 | Oren et al. | |
| 2008/0232799 A1 | 9/2008 | Kim | |
| 2008/0247716 A1 | 10/2008 | Thomas | |
| 2008/0253280 A1 | 10/2008 | Tang et al. | |
| 2008/0253351 A1 | 10/2008 | Pernu et al. | |
| 2008/0253773 A1 | 10/2008 | Zheng | |
| 2008/0260388 A1 | 10/2008 | Kim et al. | |
| 2008/0261656 A1 | 10/2008 | Bella et al. | |
| 2008/0268766 A1 | 10/2008 | Narkmon et al. | |
| 2008/0268833 A1 | 10/2008 | Huang et al. | |
| 2008/0273844 A1 | 11/2008 | Kewitsch | |
| 2008/0279137 A1 | 11/2008 | Pernu et al. | |
| 2008/0280569 A1 | 11/2008 | Hazani et al. | |
| 2008/0291830 A1 | 11/2008 | Pernu et al. | |
| 2008/0292322 A1 | 11/2008 | Daghighian et al. | |
| 2008/0298813 A1 | 12/2008 | Song et al. | |
| 2008/0304831 A1 | 12/2008 | Miller, II et al. | |
| 2008/0310464 A1 | 12/2008 | Schneider | |
| 2008/0310848 A1 | 12/2008 | Yasuda et al. | |
| 2008/0311876 A1 | 12/2008 | Leenaerts et al. | |
| 2008/0311944 A1 | 12/2008 | Hansen et al. | |
| 2009/0022304 A1 | 1/2009 | Kubler et al. | |
| 2009/0028087 A1 | 1/2009 | Nguyen et al. | |
| 2009/0028317 A1 | 1/2009 | Ling et al. | |
| 2009/0041413 A1 | 2/2009 | Hurley | |
| 2009/0047023 A1 | 2/2009 | Pescod et al. | |
| 2009/0059903 A1 | 3/2009 | Kubler et al. | |
| 2009/0061796 A1 | 3/2009 | Arkko et al. | |
| 2009/0061939 A1 | 3/2009 | Anderson et al. | 455/562.1 |
| 2009/0073916 A1 | 3/2009 | Zhang et al. | |
| 2009/0081985 A1 | 3/2009 | Rofougaran et al. | |
| 2009/0087179 A1 | 4/2009 | Underwood et al. | |
| 2009/0088071 A1 | 4/2009 | Rofougaran | |
| 2009/0088072 A1 | 4/2009 | Rofougaran et al. | |
| 2009/0135078 A1 | 5/2009 | Lindmark et al. | |
| 2009/0141780 A1 | 6/2009 | Cruz-Albrecht et al. | |
| 2009/0149221 A1 | 6/2009 | Liu et al. | |
| 2009/0154621 A1 | 6/2009 | Shapira et al. | |
| 2009/0169163 A1 | 7/2009 | Abbott, III et al. | |
| 2009/0175214 A1 | 7/2009 | Sfar et al. | |
| 2009/0180407 A1 | 7/2009 | Sabat et al. | |
| 2009/0180426 A1 | 7/2009 | Sabat et al. | |
| 2009/0218407 A1 | 9/2009 | Rofougaran | |
| 2009/0218657 A1 | 9/2009 | Rofougaran | |
| 2009/0237317 A1 | 9/2009 | Rofougaran | |
| 2009/0245084 A1 | 10/2009 | Moffatt et al. | |
| 2009/0245153 A1 | 10/2009 | Li et al. | |
| 2009/0245221 A1 | 10/2009 | Piipponen | |
| 2009/0247109 A1 | 10/2009 | Rofougaran | |
| 2009/0252136 A1 | 10/2009 | Mahany et al. | |
| 2009/0252139 A1 | 10/2009 | Ludovico et al. | |
| 2009/0252205 A1 | 10/2009 | Rheinfelder et al. | |
| 2009/0258652 A1 | 10/2009 | Lambert et al. | |
| 2009/0278596 A1 | 11/2009 | Rofougaran et al. | |
| 2009/0279593 A1 | 11/2009 | Rofougaran et al. | |
| 2009/0285147 A1 | 11/2009 | Subasic et al. | |
| 2009/0316608 A1* | 12/2009 | Singh et al. | 370/280 |
| 2009/0319909 A1 | 12/2009 | Hsueh et al. | |
| 2010/0002626 A1 | 1/2010 | Schmidt et al. | |
| 2010/0002661 A1 | 1/2010 | Schmidt et al. | |
| 2010/0002662 A1 | 1/2010 | Schmidt et al. | |
| 2010/0014494 A1 | 1/2010 | Schmidt et al. | |
| 2010/0027443 A1 | 2/2010 | LoGalbo et al. | |
| 2010/0056200 A1 | 3/2010 | Tolonen | |
| 2010/0080154 A1 | 4/2010 | Noh et al. | |
| 2010/0080182 A1 | 4/2010 | Kubler et al. | |
| 2010/0091475 A1 | 4/2010 | Toms et al. | |
| 2010/0118864 A1 | 5/2010 | Kubler et al. | |
| 2010/0127937 A1 | 5/2010 | Chandrasekaran et al. | |
| 2010/0134257 A1 | 6/2010 | Puleston et al. | |
| 2010/0142598 A1 | 6/2010 | Murray et al. | |
| 2010/0142955 A1 | 6/2010 | Yu et al. | |
| 2010/0144285 A1 | 6/2010 | Behzad et al. | |
| 2010/0148373 A1 | 6/2010 | Chandrasekaran | |
| 2010/0156721 A1 | 6/2010 | Alamouti et al. | |
| 2010/0159859 A1 | 6/2010 | Rofougaran | |
| 2010/0188998 A1 | 7/2010 | Pernu et al. | |
| 2010/0189439 A1 | 7/2010 | Novak et al. | |
| 2010/0190509 A1 | 7/2010 | Davis | |
| 2010/0202326 A1 | 8/2010 | Rofougaran et al. | |
| 2010/0225413 A1 | 9/2010 | Rofougaran et al. | |
| 2010/0225520 A1 | 9/2010 | Mohamadi et al. | |
| 2010/0225556 A1 | 9/2010 | Rofougaran et al. | |
| 2010/0225557 A1 | 9/2010 | Rofougaran et al. | |
| 2010/0232323 A1 | 9/2010 | Kubler et al. | |
| 2010/0246558 A1 | 9/2010 | Harel | |
| 2010/0255774 A1 | 10/2010 | Kenington | |
| 2010/0258949 A1 | 10/2010 | Henderson et al. | |
| 2010/0260063 A1 | 10/2010 | Kubler et al. | |
| 2010/0261501 A1 | 10/2010 | Behzad et al. | |
| 2010/0266287 A1 | 10/2010 | Adhikari et al. | |
| 2010/0278530 A1 | 11/2010 | Kummetz et al. | |
| 2010/0284323 A1 | 11/2010 | Tang et al. | |
| 2010/0290355 A1 | 11/2010 | Roy et al. | |
| 2010/0309049 A1 | 12/2010 | Reunamäki et al. | |
| 2010/0311472 A1 | 12/2010 | Rofougaran et al. | |
| 2010/0311480 A1 | 12/2010 | Raines et al. | |
| 2010/0329161 A1 | 12/2010 | Ylanen et al. | |
| 2010/0329166 A1 | 12/2010 | Mahany et al. | |
| 2010/0329680 A1 | 12/2010 | Presi et al. | |
| 2011/0002687 A1 | 1/2011 | Sabat, Jr. et al. | |
| 2011/0007724 A1 | 1/2011 | Mahany et al. | |
| 2011/0007733 A1 | 1/2011 | Kubler et al. | |
| 2011/0008042 A1 | 1/2011 | Stewart | |
| 2011/0019999 A1 | 1/2011 | George et al. | |
| 2011/0021146 A1 | 1/2011 | Pernu | |
| 2011/0021224 A1 | 1/2011 | Koskinen et al. | |
| 2011/0026932 A1 | 2/2011 | Yeh et al. | |
| 2011/0045767 A1 | 2/2011 | Rofougaran et al. | |
| 2011/0065450 A1 | 3/2011 | Kazmi | |
| 2011/0066774 A1 | 3/2011 | Rofougaran | |
| 2011/0069668 A1 | 3/2011 | Chion et al. | |
| 2011/0071734 A1 | 3/2011 | Van Wiemeersch et al. | |
| 2011/0086614 A1 | 4/2011 | Brisebois et al. | |
| 2011/0116393 A1 | 5/2011 | Hong et al. | |
| 2011/0116572 A1 | 5/2011 | Lee et al. | |
| 2011/0122912 A1 | 5/2011 | Benjamin et al. | |
| 2011/0126071 A1 | 5/2011 | Han et al. | |
| 2011/0149879 A1 | 6/2011 | Noriega et al. | |
| 2011/0158298 A1 | 6/2011 | Djadi et al. | |
| 2011/0182230 A1 | 7/2011 | Ohm et al. | |
| 2011/0194475 A1 | 8/2011 | Kim et al. | |
| 2011/0200328 A1 | 8/2011 | In De Betou et al. | |

(56) References Cited

U.S. PATENT DOCUMENTS

| | | | |
|---|---|---|---|
| 2011/0201368 | A1 | 8/2011 | Faccin et al. |
| 2011/0204504 | A1 | 8/2011 | Henderson et al. |
| 2011/0206383 | A1 | 8/2011 | Chien et al. |
| 2011/0211439 | A1 | 9/2011 | Manpuria et al. |
| 2011/0215901 | A1 | 9/2011 | Van Wiemeersch et al. |
| 2011/0222415 | A1 | 9/2011 | Ramamurthi et al. |
| 2011/0222434 | A1 | 9/2011 | Chen |
| 2011/0222619 | A1 | 9/2011 | Ramamurthi et al. |
| 2011/0227795 | A1 | 9/2011 | Lopez et al. |
| 2011/0244887 | A1 | 10/2011 | Dupray et al. |
| 2011/0256878 | A1 | 10/2011 | Zhu et al. |
| 2011/0268033 | A1 | 11/2011 | Boldi et al. |
| 2011/0274021 | A1 | 11/2011 | He et al. |
| 2011/0281536 | A1 | 11/2011 | Lee et al. |
| 2012/0177026 | A1 | 7/2012 | Uyehara et al. |
| 2013/0012195 | A1 | 1/2013 | Sabat, Jr. et al. |
| 2013/0089332 | A1 | 4/2013 | Sauer et al. |
| 2013/0210490 | A1 | 8/2013 | Fischer et al. |
| 2014/0016583 | A1 | 1/2014 | Smith |
| 2014/0140225 | A1 | 5/2014 | Wala |
| 2014/0146797 | A1 | 5/2014 | Zavadsky et al. |
| 2014/0146905 | A1 | 5/2014 | Zavadsky et al. |
| 2014/0146906 | A1 | 5/2014 | Zavadsky et al. |
| 2014/0219140 | A1 | 8/2014 | Uyehara et al. |

FOREIGN PATENT DOCUMENTS

| | | | |
|---|---|---|---|
| CA | 2065090 | C | 2/1998 |
| CA | 2242707 | A1 | 1/1999 |
| CN | 101389148 | A | 3/2009 |
| CN | 101547447 | A | 9/2009 |
| DE | 20104862 | U1 | 8/2001 |
| DE | 10249414 | A1 | 5/2004 |
| EP | 0477952 | A2 | 4/1992 |
| EP | 0477952 | A3 | 4/1992 |
| EP | 0461583 | B1 | 3/1997 |
| EP | 851618 | A2 | 7/1998 |
| EP | 0687400 | B1 | 11/1998 |
| EP | 0993124 | A2 | 4/2000 |
| EP | 1037411 | A2 | 9/2000 |
| EP | 1267447 | B1 | 1/2001 |
| EP | 1227605 | B1 | 1/2002 |
| EP | 1179895 | A1 | 2/2002 |
| EP | 1267447 | A1 | 12/2002 |
| EP | 1347584 | A2 | 9/2003 |
| EP | 1363352 | A1 | 11/2003 |
| EP | 1391897 | A1 | 2/2004 |
| EP | 1443687 | A1 | 8/2004 |
| EP | 1455550 | A2 | 9/2004 |
| EP | 1501206 | A1 | 1/2005 |
| EP | 1503451 | A1 | 2/2005 |
| EP | 1530316 | A1 | 5/2005 |
| EP | 1511203 | B1 | 3/2006 |
| EP | 1267447 | B1 | 8/2006 |
| EP | 1693974 | A1 | 8/2006 |
| EP | 1742388 | A1 | 1/2007 |
| EP | 1179895 | B1 | 7/2007 |
| EP | 1227605 | B1 | 1/2008 |
| EP | 1954019 | A1 | 8/2008 |
| EP | 1968250 | A1 | 9/2008 |
| EP | 1056226 | B1 | 4/2009 |
| EP | 1357683 | B1 | 5/2009 |
| EP | 2276298 | A1 | 1/2011 |
| EP | 1570626 | B1 | 11/2013 |
| GB | 2323252 | A | 9/1998 |
| GB | 2370170 | A | 6/2002 |
| GB | 2399963 | A | 9/2004 |
| GB | 2428149 | A | 1/2007 |
| JP | H4189036 | A | 7/1992 |
| JP | 05260018 | A | 10/1993 |
| JP | 09083450 | A | 3/1997 |
| JP | 09162810 | A | 6/1997 |
| JP | 09200840 | A | 7/1997 |
| JP | 11068675 | A | 3/1999 |
| JP | 2000152300 | A | 5/2000 |
| JP | 2000341744 | A | 12/2000 |
| JP | 2002264617 | A | 9/2002 |
| JP | 2002353813 | A | 12/2002 |
| JP | 2003148653 | A | 5/2003 |
| JP | 2003172827 | A | 6/2003 |
| JP | 2004172734 | A | 6/2004 |
| JP | 2004245963 | A | 9/2004 |
| JP | 2004247090 | A | 9/2004 |
| JP | 2004264901 | A | 9/2004 |
| JP | 2004265624 | A | 9/2004 |
| JP | 2004317737 | A | 11/2004 |
| JP | 2004349184 | A | 12/2004 |
| JP | 2005018175 | A | 1/2005 |
| JP | 2005087135 | A | 4/2005 |
| JP | 2005134125 | A | 5/2005 |
| JP | 2007228603 | A | 9/2007 |
| JP | 2008172597 | A | 7/2008 |
| KR | 20010055088 | A | 7/2001 |
| WO | 9603823 | A1 | 2/1996 |
| WO | 9810600 | A1 | 3/1998 |
| WO | 0042721 | A1 | 7/2000 |
| WO | 0072475 | A1 | 11/2000 |
| WO | 0178434 | A1 | 10/2001 |
| WO | 0184760 | A1 | 11/2001 |
| WO | 0221183 | A1 | 3/2002 |
| WO | 0230141 | A1 | 4/2002 |
| WO | 02102102 | A1 | 12/2002 |
| WO | 03024027 | A1 | 3/2003 |
| WO | 03098175 | A1 | 11/2003 |
| WO | 2004030154 | A2 | 4/2004 |
| WO | 2004047472 | A1 | 6/2004 |
| WO | 2004056019 | A1 | 7/2004 |
| WO | 2004059934 | A1 | 7/2004 |
| WO | 2004086795 | A2 | 10/2004 |
| WO | 2004093471 | A2 | 10/2004 |
| WO | 2005062505 | A1 | 7/2005 |
| WO | 2005069203 | A2 | 7/2005 |
| WO | 2005073897 | A1 | 8/2005 |
| WO | 2005079386 | A2 | 9/2005 |
| WO | 2005101701 | A2 | 10/2005 |
| WO | 2005111959 | A2 | 11/2005 |
| WO | 2006011778 | A1 | 2/2006 |
| WO | 2006018592 | A1 | 2/2006 |
| WO | 2006019392 | A1 | 2/2006 |
| WO | 2006039941 | A1 | 4/2006 |
| WO | 2006046088 | A1 | 5/2006 |
| WO | 2006051262 | A1 | 5/2006 |
| WO | 2006060754 | A2 | 6/2006 |
| WO | 2006077569 | A1 | 7/2006 |
| WO | 2006105185 | A2 | 10/2006 |
| WO | 2006133609 | A1 | 12/2006 |
| WO | 2006136811 | A1 | 12/2006 |
| WO | 2007048427 | A1 | 5/2007 |
| WO | 2007077451 | A1 | 7/2007 |
| WO | 2007088561 | A1 | 8/2007 |
| WO | 2007091026 | A1 | 8/2007 |
| WO | WO2007/091026 | A1 | 8/2007 |
| WO | 2008008249 | A2 | 1/2008 |
| WO | 2008027213 | A2 | 3/2008 |
| WO | 2008033298 | A2 | 3/2008 |
| WO | 2008039830 | A2 | 4/2008 |
| WO | 2008116014 | A2 | 9/2008 |
| WO | 2010090999 | A1 | 8/2010 |
| WO | 2010132739 | A1 | 11/2010 |
| WO | WO2011/017700 | A1 | 2/2011 |
| WO | 2011023592 | A1 | 3/2011 |
| WO | 2011100095 | A1 | 8/2011 |
| WO | 2011139939 | A1 | 11/2011 |
| WO | 2012148938 | A1 | 11/2012 |
| WO | 2012148940 | A1 | 11/2012 |
| WO | 2013122915 | A1 | 8/2013 |

OTHER PUBLICATIONS

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

(56) References Cited

OTHER PUBLICATIONS

Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, 11 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 mailed Aug. 30, 2012, 10 pages.
International Search Report for PCT/US2010/022847 mailed Jul. 12, 2010, 3 pages.
International Search Report for PCT/US2010/022857 mailed Jun. 18, 2010, 3 pages.
Decision on Appeal for U.S. Appl. No. 11/451,237 mailed Mar. 19, 2013, 7 pages.
Decision on Rejection for Chinese patent application 200780022093.6 mailed Feb. 5, 2013, 9 pages.
International Search Report and Written Opinion for International patent application PCT/US2007/013802 mailed May 8, 2008, 12 pages.
Decision on Appeal for U.S. Appl. No. 11/406,976, mailed Nov. 3, 2014, 6 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report for PCT/US2011/034733 mailed Aug. 1, 2011, 5 pages.
International Preliminary Report on Patentability for PCT/US2011/034733 mailed Nov. 6, 2012, 7 pages.
Author Unknown, "VCSEL Chaotic Synchronization and Modulation Characteristics," Master's Thesis, Southwest Jiatong University, Professor Pan Wei, Apr. 2006, 8 pages (machine translation).
Translation of the First Office Action for Chinese Patent Application No. 201180008168.1, mailed Jun. 5, 2014, 9 pages.
Notification of First Office Action for Chinese Patent Application No. 201010557770.8, mailed Jul. 3, 2014, 14 pages.
Non-final Office Action for U.S. Appl. No. 12/618,613 mailed Dec. 29, 2011, 10 pages.
Non-final Office Action for U.S. Appl. No. 12/618,613 mailed Jul. 5, 2012, 9 pages.
Translation of the First Office Action for Chinese Patent Application No. 201080055264.7, mailed Jun. 5, 2014, 6 pages.
Extended European Search Report for European patent application 12777604.5 mailed Oct. 1, 2014, 7 pages.
Extended European Search Report for European patent application 12776915.6 mailed Oct. 13, 2014, 7 pages.
Examiner's Answer to the Appeal Brief for U.S. Appl. No. 12/712/758, mailed Jul. 7, 2014, 12 pages.
Notice of Allowance for U.S. Appl. No. 13/592,502, mailed May 9, 2014, 9 pages.
Patent Cooperation Treaty, International Search Report and Written Opinion, Jun. 18, 2010, 13 pages.

(56) References Cited

OTHER PUBLICATIONS

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Notice of Reexamination for Chinese patent application 20078002293.6 mailed Nov. 28, 2014, 22 pages.
Non-final Office Action for U.S. Appl. No. 13/688,448 mailed Dec. 29, 2014, 16 pages.
Non-final Office Action for U.S. Appl. No. 14/063,245 mailed Jan. 26, 2015, 22 pages.
Examination Report for European patent application 10702806.0 mailed Nov. 14, 2014, 7 pages.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 mailed Sep. 16, 2013, 3 pages.
Final Office Action for U.S. Appl. No. 12/712,758 mailed May 24, 2013, 17 pages.
Non-final Office Action for U.S. Appl. No. 12/712,758 mailed Jan. 10, 2012, 14 pages.
Examination Report for European patent application 07835803.3 mailed Aug. 13, 2013, 6 pages.
Extended European Search Report for patent application 10014262.9 mailed Mar. 14, 2011, 6 pages.
International Search Report and Written Opinion for PCT/US2012/034853 mailed Aug. 6, 2012, 12 pages.
International Search Report and Written Opinion for PCT/US2012/034855 mailed Jul. 26, 2012, 10 pages.
Written Opinion of the International Searching Authority for European patent application 11701916.6 mailed Sep. 21, 2012, 10 pages.
International Search Report for PCT/US2011/021799 mailed Apr. 6, 2011, 4 pages.
Examination Report for European patent application 10702806.0 mailed Sep. 12, 2013, 11 pages.
Non-final Office Action for U.S. Appl. No. 13/194,429 mailed Mar. 1, 2013, 22 pages.
Notice of Allowance for U.S. Appl. No. 13/194,429 mailed Jul. 9, 2013, 9 pages.

* cited by examiner

959

| MODULE | LABEL ON MODULE | | STATE | | | |
|---|---|---|---|---|---|---|
| | | QTY | OFF (961) | GREEN (963) | YELLOW (987) | RED (983) |
| | | | | | | |
| PROCESSOR (958) | | | | | | |
| POWER | POWER | 1 | NO CONNECTION | SOLID-NORMAL | --- | --- |
| STATUS | STATUS | 1 | --- | SOLID-NORMAL | SOLID-DEGRADED | SOLID-BROKEN |
| ETHERNET PORT | ETHERNET | 1 | NO CONNECTION | FLASHING-DATA | | |
| SWITCH (907) | | | | | | |
| POWER | POWER | 1 | NO CONNECTION | SOLID-NORMAL | --- | --- |
| STATUS | STATUS | 1 | --- | SOLID-NORMAL | SOLID-DEGRADED | SOLID-BROKEN |
| ETHERNET PORTS | ETHERNET | 6 | NO CONNECTION | FLASHING-DATA | | |
| BIC (903) | | | | | | |
| POWER | POWER | 1 | NO CONNECTION | SOLID-NORMAL | --- | --- |
| STATUS | STATUS | 1 | --- | SOLID-NORMAL | SOLID-DEGRADED | SOLID-BROKEN |
| RF PORTS DL | DOWNLINK | 4 | NO CONNECTION | SOLID-ACTIVE | SOLID-OVERLOAD | |
| RF PORTS UL | UPLINK | 4 | NO CONNECTION | SOLID-ACTIVE | | |
| OIM (910) | | | | | | |
| POWER | POWER | 1 | NO CONNECTION | SOLID-NORMAL | --- | --- |
| STATUS | STATUS | 1 | --- | SOLID-NORMAL | SOLID-DEGRADED | SOLID-FAIL |
| OPTICAL PORTS DL | TX | 6 | LASER OFF | SOLID-LASER ON<br>FLASH RAU COMMUNICATION | | |
| OPTICAL PORTS UL | RAU STATUS | 6 | NO RAU STATUS AVAILABLE | SOLID-NORMAL | SOLID-DEGRADED | SOLID-FAIL |
| RAU (906) | | | | STATE-MADE | STATE-MADE | STATE-MADE |
| POWER | DC | 1 | NO CONNECTION | SOLID-NORMAL | --- | --- |
| STATUS | STAT | 1 | NO DL DETECTED | SOLID-NORMAL | SOLID-DEGRADED | SOLID-FAIL |
| OPTICAL PORT UL | OPT | 1 | LASER OFF | SOLID-LASER ON<br>FLASHING-HEU COMMUNICATION | | |
| RF PORT | RF | 1 | NO BAND SELECTED | SOLID-NORMAL | SOLID-AGC ACTIVE (OVERLOAD DETECTED) | |

| HARDWARE LEVEL DETAILS | | | | | | | | | | | | | |
|---|---|---|---|---|---|---|---|---|---|---|---|---|---|
| BOARD | DEVICE | HW RANGE | HW SIGNAL NAME | PIN NAME | PIN # | HW CHARACTERISTIC | CPLD-ADDR | DEFAULT | STATE | EQUATIONS | UNITS | SPECS | HW DESCRIPTION |
| RAU | MSP430 | | CPLD_UP_CLK | P1.0 | 12 | OUTPUT | 12 | | | | | | CLOCK TO CPLD TO CLOCK IN SERIAL DATA |
| DL BIC | MSP430 | | CPLD_UP_CLK | P1.0 | 12 | OUTPUT | 18 | | | | | | CLOCK TO CPLD TO CLOCK IN SERIAL DATA |
| UL BIC | MSP430 | | CPLD_UP_DAT | P1.1 | 13 | OUTPUT | 3 | | | | | | DATA TO CPLD FOR SERIAL COMM |
| OIM | MSP430 | | SLOT_ADDR1 | P1.4 | 16 | INPUT | | LOW | NACK | | | | HIGH FROM CPLD ACK. MSG. |

| COMMS LEVEL POINT DETAILS | | | | | | |
|---|---|---|---|---|---|---|
| CODE VARIABLE NAME | POINT ABBREV. | DATA TYPE | PERMISSIONS | SLOPE (M) | Y INTERCEPT (B) | UNITS |
| RAU_BAND3_CAL_SWITCH | RB3CSE | | | | | |
| DLBIC_OUT_SWITCH12_ON/OFF | DOUS12 | | | | | |
| ULBIC_SERIAL_NO | USYSER | | | | | |
| OIM_BAND1_CAL_SWITCH_ON/OFF | OB1CSE | | | | | |

| | |
|---|---|
| OFFSET | 0 |
| STEP SIZE | 1 |
| MAX HYSTERESIS | 2 |
| MIN HYSTERESIS | 3 |
| MAX THRESHOLD | 4 |
| MIN THRESHOLD | 5 |
| HYSTERESIS | 6 |
| THRESHOLD | 7 |
| SETPOINT | 8 |
| NAME | 9 |
| VALUE | 10 |
| TYPE EXT | 11 |
| UNALLOCATED | 12 |
| UNALLOCATED | 13 |
| INIT VALUE FCN | 14 |
| INIT SETPT FCN | 15 |
| INIT THOLD FCN | 16 |
| INIT HYSTER FCN | 17 |
| INIT STEPSZ FCN | 18 |
| INIT OFFSET FCN | 19 |
| DYNAMIC | 20 |
| ALARM TYPE LO | 21 |
| ALARM TYPE HI | 22 |
| MODULE ALARM | 23 |
| ALARMABLE | 24 |
| WRITEABLE | 25 |
| TYPE LO | 26 |
| TYPE HI | 27 |
| UNITS LO | 28 |
| UNITS MID | 29 |
| UNITS HI | 30 |
| UL/DL PATH | 31 |

FIG. 29

FROM FIG. 33A

OPTICAL FIBER-BASED DISTRIBUTED ANTENNA SYSTEMS, COMPONENTS, AND RELATED METHODS FOR CALIBRATION THEREOF

RELATED APPLICATIONS

This application is a continuation of U.S. application Ser. No. 13/194,410, filed Jul. 29, 2011, which is a continuation of International Application No. PCT/US2010/022857, filed Feb. 2, 2010, which claims the benefit of priority of U.S. Provisional Application No. 61/149,553, filed Feb. 3, 2009 and entitled "Distributed Antenna System," and to U.S. Provisional Application No. 61/230,463, filed Jul. 31, 2009 and entitled "Optical Fiber-Based Distributed Antenna Systems, Components, and Related Methods for Calibration Thereof," the contents of which are relied upon and incorporated herein by reference in their entireties.

This application is related to International Application No. PCT/US2010/022847, filed Feb. 2, 2010, and to U.S. Provisional Application No. 61/230,472 filed Jul. 31, 2009 and entitled "Optical Fiber-Based Distributed Antenna Systems, Components, and Related Methods for Monitoring the Status Thereof," which are incorporated herein by reference in their entireties.

BACKGROUND

1. Field of the Disclosure

The technology of the disclosure relates to optical fiber-based distributed antenna systems for distributing radio frequency (RF) signals over optical fiber to remote antenna units and related control systems and methods.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Wireless communication systems communicate with wireless devices called "clients," which must reside within the wireless range or "cell coverage area" in order to communicate with an access point device.

One approach to deploying a wireless communication system involves the use of "picocells." Picocells are radio frequency (RF) coverage areas. Picocells can have a radius in the range from a few meters up to twenty meters as an example. Combining a number of access point devices creates an array of picocells that cover an area called a "picocellular coverage area." Because the picocell covers a small area, there are typically only a few users (clients) per picocell. This allows for minimizing the amount of RF bandwidth shared among the wireless system users. It may be desirable to provide picocells in a building or other facility to provide wireless communication system access to clients within the building or facility. However, it may be desirable to employ optical fiber to distribute communication signals. Benefits of optical fiber include higher signal-to-noise ratios and increased bandwidth.

SUMMARY OF THE DETAILED DESCRIPTION

Embodiments disclosed in the detailed description include optical fiber-based distributed antenna systems that provide communication signals over optical fiber to clients. The communication signals may be wireless communication signals. The distributed antenna systems may be provided as part of an indoor distributed antenna system (IDAS) to provide wireless communication services to clients inside a building or other facility, as an example. The systems may distribute communication signals by employing Radio-over-Fiber (RoF) communications utilizing fiber optic cable distribution.

In one embodiment, a wireless communication system comprises a downlink base transceiver station (BTS) interface configured to receive downlink electrical radio frequency (RF) signals from at least one BTS, and at least one optical interface module (OIM). The OIM is configured to receive and convert the downlink electrical RF signals from the downlink BTS interface into downlink Radio-over-Fiber (RoF) signals on at least one communication downlink, and receive and convert uplink RoF signals from at least one remote antenna unit (RAU) into uplink electrical RF signals on at least one communication uplink. The system further comprises an uplink BTS interface configured to receive and communicate the uplink electrical RF signals from the at least one communication uplink to the at least one BTS, and a controller. The controller is configured to inject at least one calibration signal over the at least one communication downlink, calibrate at least one downlink gain in the at least one communication downlink based on a loss incurred in the at least one calibration signal in the at least one communication downlink, cause the at least one calibration signal to be switched from the at least one communication downlink to the at least one communication uplink, and calibrate at least one uplink gain in the at least one communication uplink based on a loss incurred in the at least one calibration signal in the at least one communication uplink.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 25B is a table illustrating visual indicators that can be provided on a module of the optical fiber-based wireless system;

FIG. 28B is an exemplary hardware points list for storing hardware information about points provided in the optical fiber-based wireless system of FIG. 23;

FIG. 28C is an exemplary points list accessible by a communications module in the HEU of the optical fiber-based wireless system of FIG. 23;

FIG. 29 is an exemplary flagbits format to provide characteristic information regarding its points to the head-end unit (HEU) for various components in the optical fiber-based wireless system of FIG. 23;

DETAILED DESCRIPTION

Figure 1:
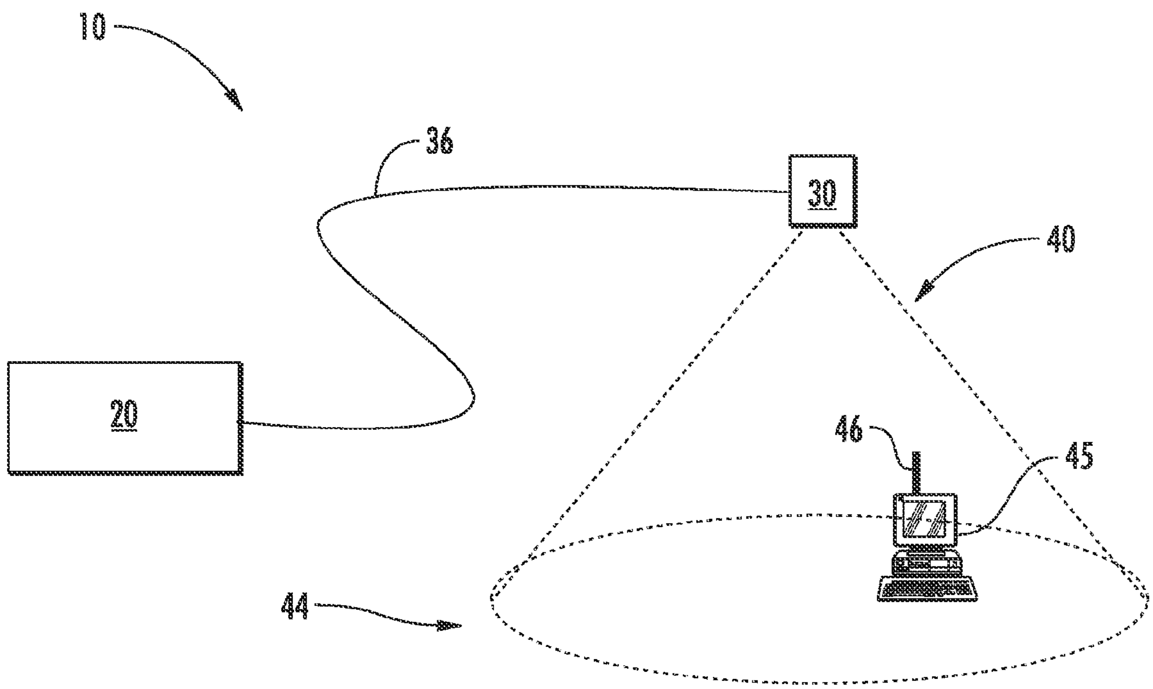
FIG. 1 is a schematic diagram of an exemplary optical fiber-based wireless system, according to one embodiment.

Reference will now be made in detail to exemplary embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include optical fiber-based distributed antenna systems that provide communication signals over optical fiber to clients. The communication signals may be wireless communication signals. The distributed antenna systems may be provided as part of an indoor distributed antenna system (IDAS) to provide wireless communication services to clients inside a building or other facility, as an example. The systems may distribute communication signals by employing Radio-over-Fiber (RoF) communications utilizing fiber optic cable distribution.

In one embodiment, the optical fiber-based wireless systems can employ a head-end unit (HEU) or controller that receives radio frequency (RF) carrier signals from one or more service or carrier providers. The HEU is a host neutral device that supports and distributes carrier signal communications over optical fibers to end points, which may be remote antenna units (RAUs). The RF carrier signals are converted to RoF signals and provided to the RAUs, wherein the RoF signals are converted back to electrical RF signals and wirelessly communicated to client devices in the coverage area of the RAUs. The RAUs can be installed in locations throughout a building or facility to form a seamless coverage area. The HEU can be configured to interface with a desired number of RAUs to define coverage areas.

In one embodiment, the HEU contains a downlink base transceiver station (BTS) interface and an uplink BTS interface to support interfacing with downlink and uplink communication links for one or more BTSs. The downlink BTS interface is configured to receive electrical RF signals from multiple BTSs and provide the electrical RF signals to optical interface modules (OIMs). The OIMs contain electrical-to-optical (E/O) converters that convert the electrical RF signals received on the downlink into RoF signals (for transmission over optical fiber to RAUs supported by the OIMs. The RoF signals received by the RAUs on the downlink are converted into electrical RF signals using an optical-to-electrical (O/E) converter and radiated through antennas to client devices in range of the antennas to establish downlink communications between client devices and the BTSs. For uplink communications, the RAUs are also configured to receive electrical RF signals at the antennas from clients, which are converted to RoF signals and communicated back to the OIM over an uplink optical fiber link. The RoF signals received by the OIMs are converted to electrical RF signals, which are then communicated to the HEU and to the appropriate BTS to establish uplink communications between the client devices and the BTSs.

In one embodiment, calibration of the communication downlinks and uplinks in the optical fiber-based wireless system can be performed to compensate for losses that may occur therein. For example, the HEU controller may be configured to calibrate a downlink gain for the communication downlink. The calibration downlink gain may be determined for each RAU. The calibration downlink gain may be applied in the downlink BTS interface and/or for each RAU. The HEU controller may also be configured to calibrate an uplink gain for the communication uplink. The calibration uplink gain may be applied in the uplink BTS interface and/or for each OIM. The BTS error component of the calibration gains may be determined to calibrate BTS interfaces separate from the RAUs and OIMs. The calibration gains may be determined by injecting one or more calibration signals on the communication downlink and/or communication uplink. The calibration signal injected on the communication downlink may also be used to calibrate the communication uplink, or a separate calibration signal(s) may be injected on the communication uplink.

Before discussing the various features and their details regarding the microcontroller or microprocessor-based control system or controllers that may be provided in components of the system, examples of optical fiber-based distributed antenna systems are their RF communications functionalities are first described below with regard to FIGS. 1-23. FIGS. 24-54 are discussed with respect to exemplary controllers that execute software instructions to provide various control and reporting features for the optical fiber-based distributed antenna systems that co-exist or reside along with the RF communication capabilities of the optical fiber-based distributed antenna systems.

In this regard, FIG. 1 is a schematic diagram of a generalized embodiment of an optical fiber-based distributed antenna system. In this embodiment, the system is an optical-fiber-based wireless system 10 that is configured to create one or more picocells. The optical fiber-based wireless system 10 includes a head-end unit 20, one or more transponder or remote antenna units (RAUs) 30 and an optical fiber RF communication link 36 that optically couples the head-end unit (HEU) 20 to the RAU 30. As discussed in detail below, the optical fiber-based wireless system 10 has a picocell 40 that can be substantially centered about the RAU 30. The remote antenna transponder units, or simply "RAUs" 30, form a picocellular coverage area 44. The HEU 20 is adapted to perform or to facilitate any one of a number of Radio-over-Fiber (RoF) applications, such as radio frequency (RF) identification (RFID), wireless local-area network (WLAN) communication, or cellular phone service. Shown within the picocell 40 is a client device 45 in the form of a personal computer. The client device 45 includes an antenna 46 (e.g., a wireless card) adapted to receive and/or send electromagnetic RF signals.

Figure 2:
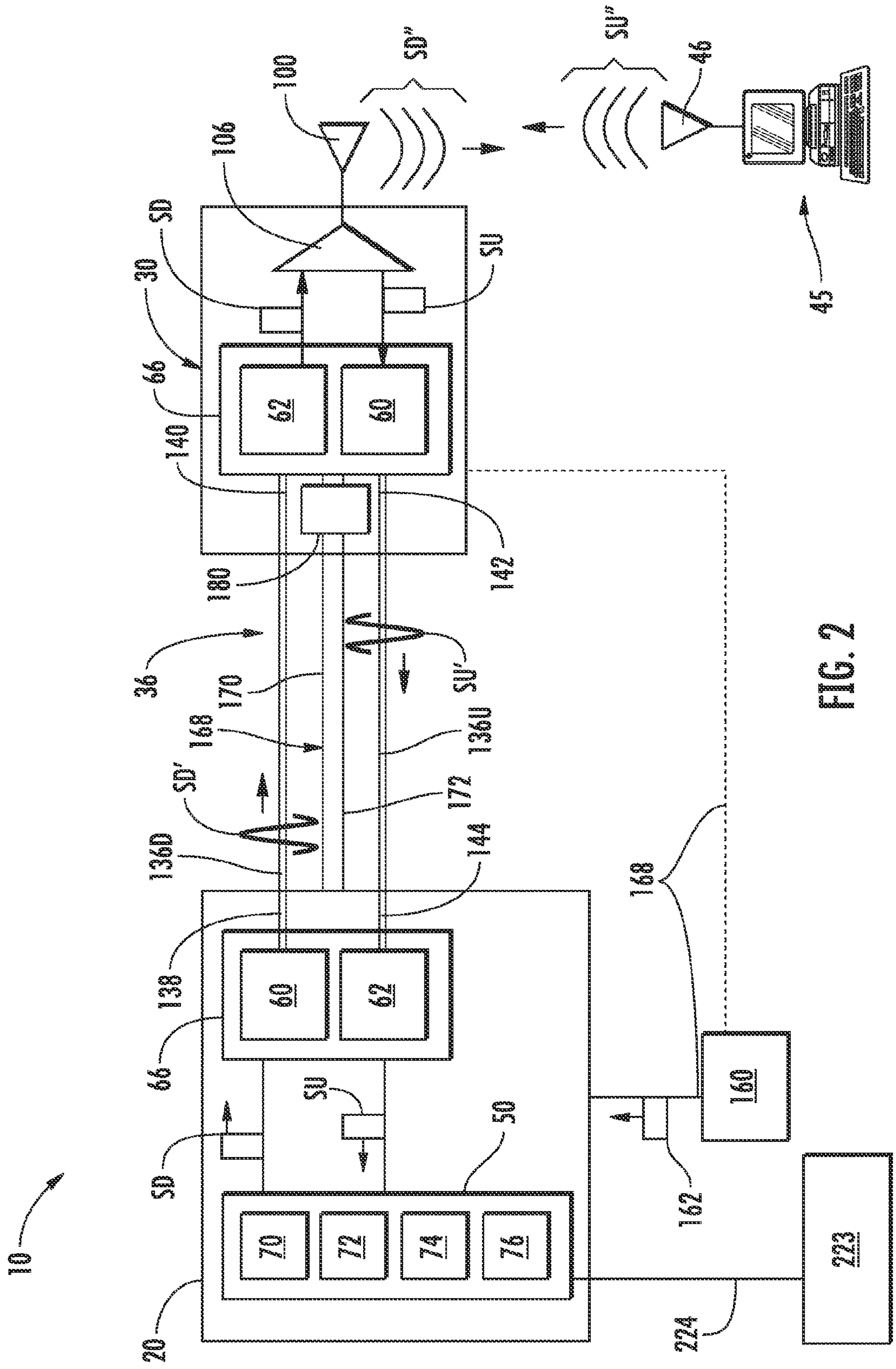
FIG. 2 is a schematic diagram of the optical fiber-based wireless system of FIG. 1.

FIG. 2 is a schematic diagram of an example embodiment of the optical fiber-based wireless system 10 of FIG. 1. In an example embodiment, the HEU 20 includes a service unit 50 that provides electrical RF service signals for a particular wireless service or application. In an example embodiment, the service unit 50 provides electrical RF service signals by passing (or conditioning and then passing) such signals from one or more outside networks 223, as described below. In a particular example embodiment, this includes providing WLAN signal distribution as specified in the IEEE 802.11 standard, i.e., in the frequency range from 2.4 to 2.5 GHz and from 5.0 to 6.0 GHz. In another example embodiment, the service unit 50 provides electrical RF service signals by generating the signals directly. In another example embodiment, the service unit 50 coordinates the delivery of the electrical RF service signals between client devices within the picocellular coverage area 44.

The service unit 50 is electrically coupled to an electrical-to-optical (E/O) converter 60 that receives an electrical RF service signal from the service unit and converts it to a corresponding RoF signal, as discussed in further detail below. RoF refers to a technology whereby light is modulated by an electrical RF signal and transmitted over an optical fiber link to facilitate wireless access. For example, a data-carrying RF signal at a given frequency is imposed on a lightwave signal before being transported over an optical link. Therefore, wireless signals are optically distributed at the given frequency and converted from the optical to the electrical domain before being amplified and radiated by an antenna. As a result, no frequency up/down conversion is required, thereby resulting in simple and rather cost-effective implementations. Advantages of RoF include reduced attenuation of the RF signal over an optical medium when compared to wireless medium, and further travel of the RF signal without the need for as many repeaters. Further, because optical fibers are designed to handle Gigabit data rates, RoF implementations will be easily adapted in the future for higher speed networks with protocol and bit-rate transparency.

In an example embodiment, the E/O converter 60 includes a laser suitable for delivering sufficient dynamic range for the RoF applications, and optionally includes a laser driver/amplifier electrically coupled to the laser. Examples of suitable lasers for the E/O converter 60 include laser diodes, distributed feedback (DFB) lasers, Fabry-Perot (FP) lasers, and vertical cavity surface emitting lasers (VCSELs).

The HEU 20 also includes an optical-to-electrical (O/E) converter 62 electrically coupled to service unit 50. The O/E converter 62 receives an optical RF service signal and converts it to a corresponding electrical signal. In an example embodiment, the O/E converter 62 is a photodetector, or a photodetector electrically coupled to a linear amplifier. The E/O converter 60 and the O/E converter 62 constitute a "converter pair" 66.

In an example embodiment, the service unit 50 includes an RF signal modulator/demodulator unit 70 that generates an RF carrier of a given frequency and then modulates RF signals onto the carrier. The modulator/demodulator unit 70 also demodulates received RF signals. The service unit 50 also includes a digital signal processing unit ("digital signal processor") 72, a central processing unit (CPU) 74 for processing data and otherwise performing logic and computing operations, and a memory unit 76 for storing data, such as system settings and status information, RFID tag information, etc. In an example embodiment, the different frequencies associated with the different signal channels are created by the modulator/demodulator unit 70 generating different RF carrier frequencies based on instructions from the CPU 74. Also, as described below, the common frequencies associated with a particular combined picocell are created by the modulator/demodulator unit 70 generating the same RF carrier frequency.

With continuing reference to FIG. 2, in an example embodiment a RAU 30 includes a converter pair 66, wherein the E/O converter 60 and the O/E converter 62 therein are electrically coupled to an antenna system 100 via a RF signal-directing element 106, such as a circulator. The RF signal-directing element 106 serves to direct the downlink and uplink electrical RF service signals, as discussed below. In an example embodiment, the antenna system 100 includes one or more patch antennas, such as disclosed in U.S. patent application Ser. No. 11/504,999 entitled "Radio-Over-Fiber Transponder With A Dual-Band Patch Antenna System" and filed on Aug. 16, 2006, which patent application is incorporated herein by reference.

RAUs 30 differ from the typical access point device associated with wireless communication systems in that the preferred embodiment of the RAU 30 has just a few signal-conditioning elements and no digital information processing capability. Rather, the information processing capability is located remotely in the HEU 20, and in a particular example, in the service unit 50. This allows the RAU 30 to be very compact and virtually maintenance free. In addition, the preferred example embodiment of the RAU 30 consumes very little power, is transparent to RF signals, and does not require a local power source, as described below.

With reference again to FIG. 2, an example embodiment of the optical fiber RF communication link 36 includes a downlink optical fiber 136D having an input end 138 and an output end 140, and an uplink optical fiber 136U having an input end 142 and an output end 144. The downlink and uplink optical fibers 136D and 136U optically couple the converter pair 66 at the HEU 20 to the converter pair 66 at the RAU 30. Specifically, the downlink optical fiber input end 138 is optically coupled to the E/O converter 60 of the HEU 20, while the output end 140 is optically coupled to the O/E converter 62 at the RAU 30. Similarly, the uplink optical fiber input end 142 is optically coupled to the E/O converter 60 of the RAU 30, while the output end 144 is optically coupled to the O/E converter 62 at the HEU 20.

In an example embodiment, the optical fiber-based wireless system 10 employs a known telecommunications wavelength, such as 850 nm, 1300 nm, or 1550 nm. In another example embodiment, the optical fiber-based wireless system 10 employs other less common but suitable wavelengths such as 980 nm.

Example embodiments of the optical fiber-based wireless system 10 include either single-mode optical fiber or multi-mode optical fiber for downlink and the uplink optical fibers 136D and 136U. The particular type of optical fiber depends on the application of the optical fiber-based wireless system 10. For many in-building deployment applications, maximum transmission distances typically do not exceed 300 meters. The maximum length for the intended RF-over-fiber transmission needs to be taken into account when considering using multi-mode optical fibers for the downlink and uplink optical fibers 136D and 136U. For example, it has been shown that a 1400 MHz·km multi-mode fiber bandwidth-distance product is sufficient for 5.2 GHz transmission up to 300 m.

In an example embodiment, a 50 μm multi-mode optical fiber is used for the downlink and uplink optical fibers 136D and 136U, and the E/O converters 60 operate at 850 nm using commercially available VCSELs specified for 10 Gb/s data transmission. In a more specific example embodiment, OM3 50 μm multi-mode optical fiber is used for the downlink and uplink optical fibers 136D and 136U.

The optical fiber-based wireless system 10 also includes a power supply 160 that generates an electrical power signal 162. The power supply 160 is electrically coupled to the HEU 20 for powering the power-consuming elements therein. In an example embodiment, an electrical power line 168 runs through the HEU 20 and over to the RAU 30 to power the E/O converter 60 and O/E converter 62 in the converter pair 66, the optional RF signal-directing element 106 (unless element 106 is a passive device such as a circulator), and any other power-consuming elements (not shown). In an example embodiment, the electrical power line 168 includes two wires 170 and 172 that carry a single voltage and that are electrically coupled to a DC power converter 180 at the RAU 30. The DC power converter 180 is electrically coupled to the E/O converter 60 and the O/E converter 62, and changes the voltage or levels of the electrical power signal 162 to the power level(s) required by the power-consuming components in the RAU 30. In an example embodiment, the DC power converter 180 is either a DC/DC power converter, or an AC/DC power converter, depending on the type of electrical power signal 162 carried by the electrical power line 168. In an example embodiment, the electrical power line 168 includes standard electrical-power-carrying electrical wire(s), e.g., 18-26 AWG (American Wire Gauge) used in standard telecommunications and other applications. In another example embodiment, the electrical power line 168 (dashed line) runs directly from the power supply 160 to the RAU 30 rather than from or through the HEU 20. In another example embodiment, the electrical power line 168 includes more than two wires and carries multiple voltages. In an example embodiment, the HEU 20 is operably coupled to an outside network 223 via a network link 224.

With reference to the optical fiber-based wireless system 10 of FIG. 1 and FIG. 2, the service unit 50 generates an electrical downlink RF service signal SD ("electrical signal SD") corresponding to its particular application. In an example embodiment, this is accomplished by the digital signal processor 72 providing the RF signal modulator/demodulator unit 70 with an electrical signal (not shown) that is modulated onto an RF carrier to generate a desired electrical signal SD. The electrical signal SD is received by the E/O converter 60, which converts this electrical signal into a corresponding optical downlink RF service signal SD' ("optical signal SD'"), which is then coupled into the downlink optical fiber 136D at the input end 138. It is noted here that in an example embodiment, the optical signal SD' is tailored to have a given modulation index. Further, in an example embodiment, the modulation power of the E/O converter 60 is controlled (e.g., by one or more gain-control amplifiers, not shown) to vary the transmission power from the antenna system 100. In an example embodiment, the amount of power provided to the antenna system 100 is varied to define the size of the associated picocell 40, which in example embodiments ranges anywhere from about a meter across to about twenty meters across.

The optical signal SD' travels over the downlink optical fiber 136D to the output end 140, where it is received by the O/E converter 62 in RAU 30. The O/E converter 62 converts the optical signal SD' back into an electrical signal SD, which then travels to the RF signal-directing element 106. The RF signal-directing element 106 then directs the electrical signal SD to the antenna 100. The electrical signal SD is fed to the antenna system 100, causing it to radiate a corresponding electromagnetic downlink RF service signal SD" ("electromagnetic signal SD"").

Because the client device 45 is within the picocell 40, the electromagnetic signal SD" is received by the client device antenna 46, which may be part of a wireless card, or a cell phone antenna, for example. The antenna 46 converts the electromagnetic signal SD" into an electrical signal SD in the client device (signal SD is not shown therein). The client device 45 then processes the electrical signal SD, e.g., stores the signal information in memory, displays the information as an e-mail or text message, or other display of information, etc. The client device 45 can generate electrical uplink RF signals SU (not shown in the client device 45), which are converted into electromagnetic uplink RF service signals SU" (electromagnetic signal SU"") by the antenna 46.

Because the client device 45 is located within the picocell 40, the electromagnetic signal SU" is detected by the antenna system 100 in the RAU 30, which converts this signal back into an electrical signal SU. The electrical signal SU is directed by the RF signal-directing element 106 to the E/O converter 60, which converts this electrical signal into a corresponding optical uplink RF service signal SU' ("optical signal SU'"), which is then coupled into the input end 142 of the uplink optical fiber 136U. The optical signal SU' travels over the uplink optical fiber 136U to the output end 144, where it is received by the O/E converter 62 at the HEU 20. The O/E converter 62 converts the optical signal SU' back into electrical signal SU, which is then directed to the service unit 50. The service unit 50 receives and processes the electrical signal SU, which in an example embodiment includes one or more of the following: storing the signal information; digitally processing or conditioning the signals; sending the signals to one or more outside networks 223 via network links 224; and sending the signals to one or more client devices 45 in the picocellular coverage area 44. In an example embodiment, the processing of the electrical signal SU includes demodulating this electrical signal SU in the RF signal modulator/demodulator unit 70, and then processing the demodulated signal in the digital signal processor 72.

Figure 3:
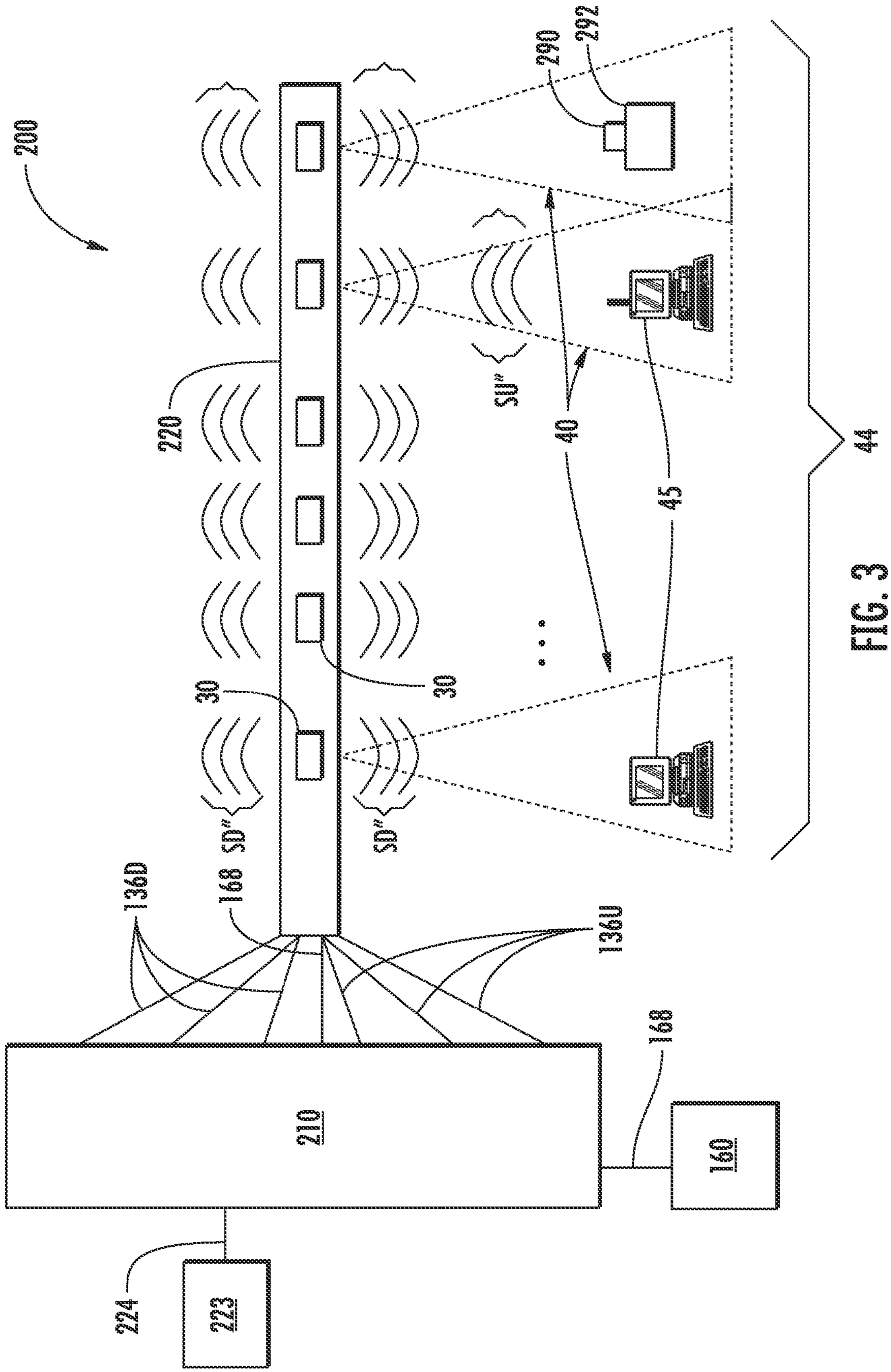
FIG. 3 is a schematic diagram of an exemplary optical fiber-based wireless system that includes a central head-end unit.

FIG. 3 is a schematic diagram of an example embodiment of an optical fiber-based wireless system 200 that includes a central HEU 210. The central HEU 210 can be thought of as a HEU 20 adapted to handle one or more service units 50 and one or more RAUs 30. The central HEU 210 is optically coupled to an optical fiber cable 220 that includes multiple RAUs 30. The optical fiber cable 220 is constituted by multiple optical fiber RF communication links 36 (FIG. 2), with each link optically coupled to a corresponding RAU 30. In an example embodiment, multiple RAUs 30 are spaced apart along the length of optical fiber cable 220 (e.g., at eight (8) meter intervals) to create a desired picocell coverage area 44 made up of picocells 40, which may overlap at their edges.

Figure 4:
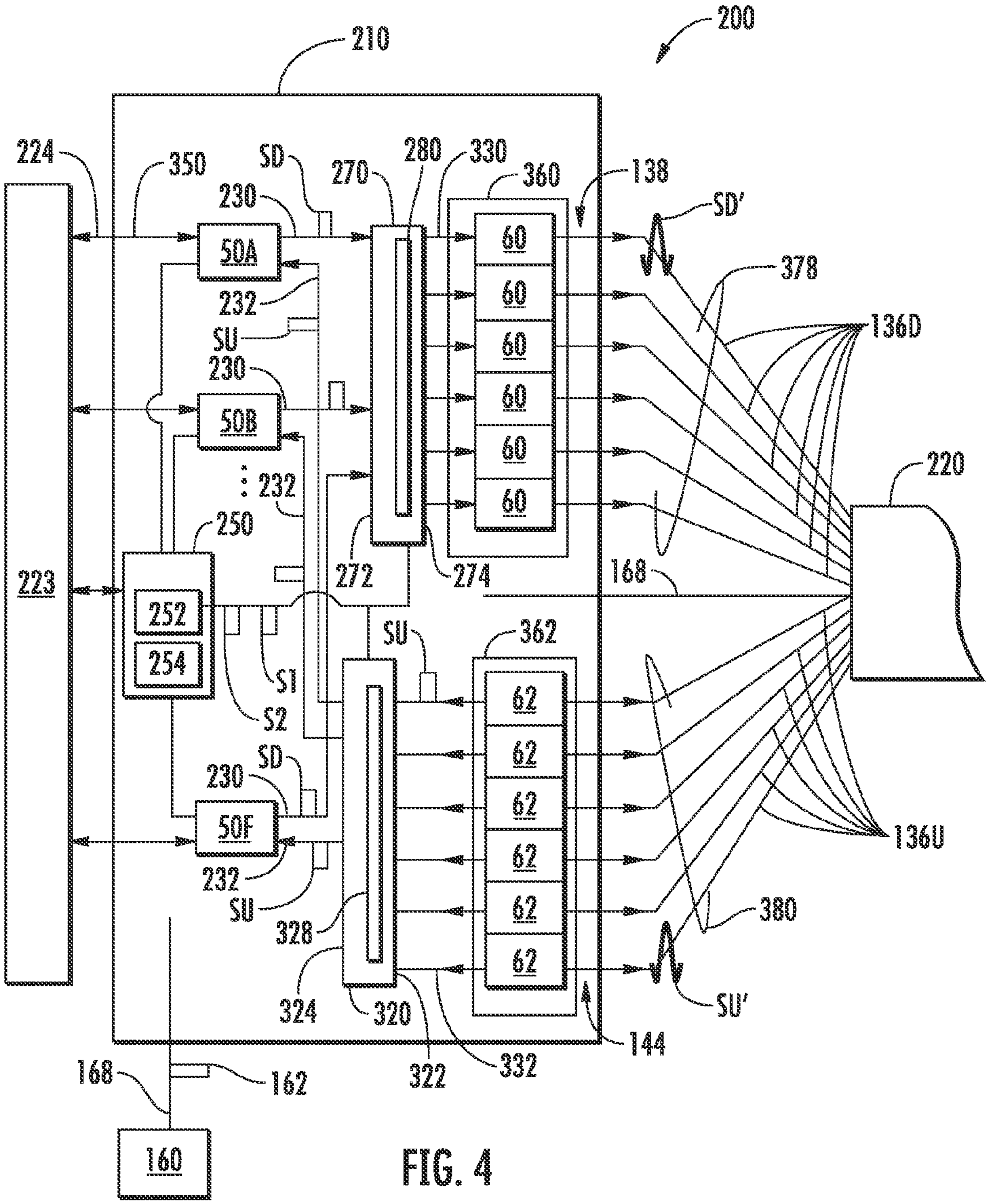
FIG. 4 is a schematic diagram of an exemplary central head-end unit.

FIG. 4 is a detailed schematic diagram of an example embodiment of the central HEU 210. Rather than including multiple HEUs 20 of FIG. 1 directly into the central HEU 210, in an example embodiment the HEUs 20 are modified to allow for each service unit 50 to communicate with one, some, or all of RAUs 30, depending on the particular application of a given service unit 50. The service units 50 are each electrically coupled to an RF transmission line 230 and an RF receiving line 232. In FIG. 4, only three of six service units 50A through 50F are shown for the purposes of clarity of illustration.

In an example embodiment, the optical fiber-based wireless system 200 further includes a main controller 250 operably coupled to the service units 50 and adapted to control and coordinate the operation of the service units 50 in communicating with the RAUs 30. In an example embodiment, the main controller 250 includes a central processing unit (CPU) 252 and a memory unit 254 for storing data. The CPU 252 is adapted (e.g., is programmed) to process information provided to the main controller 250 by one or more of the service units 50. In an example embodiment, the main controller 250 is or includes a programmable computer adapted to carry out instructions (programs) provided to it or otherwise encoded therein on a computer-readable medium.

The central HEU 210 further includes a downlink RF signal multiplexer ("downlink multiplexer") 270 operably coupled to the main controller 250. The downlink multiplexer 270 has an input side 272 and an output side 274. RF transmission lines 230 are electrically connected to the downlink multiplexer 270 at the input side 272.

In an example embodiment, the downlink multiplexer 270 includes an RF signal-directing element 280 (e.g., a RF switch) that allows for selective communication between the service units 50 and the RAUs 30, as described below. In an example, the selective communication involves sequentially addressing RAUs 30 for polling corresponding picocells 40. Such sequential polling can be used, for example, when one of the service units 50 is an RFID reader searching for RFID tags 290 in picocells 40 (FIG. 3). In an example embodiment, the RFID tags 290 are attached to an item 292 (FIG. 3) to be tracked or otherwise monitored via the attached RFID tag 290. In another example embodiment, the selective communication involves simultaneously addressing some or all of the RAUs 30. Such simultaneous addressing can be used, for example, when one of the service units 50 is a cellular phone transmitter or an RF-signal feed-through unit that provides simultaneous coverage of some or all of the picocells 40.

The central HEU 210 also includes an uplink RF signal multiplexer ("uplink multiplexer") 320 operably coupled to the main controller 250 and having an input side 322 and an output side 324. Receiving lines 232 are electrically connected to the uplink multiplexer 320 at the output side 324. In an example embodiment, the uplink multiplexer 320 includes an RF signal-directing element 328.

The central HEU 210 also includes a number of E/O converters 60 that make up an E/O converter array 360, and a corresponding number of O/E converters 62 that make up an O/E converter array 362. The E/O converters 60 are electrically coupled to the output side 274 of downlink multiplexer 270 via electrical lines 330, and are optically coupled to the input ends 138 of corresponding downlink optical fibers 136D. The O/E converters 62 are electrically coupled to the input side 322 of the uplink multiplexer 320 via electrical lines 332, and are optically coupled to the output ends 144 of corresponding uplink optical fibers 136U. The downlink optical fibers 136D constitute a downlink optical fiber cable 378 and the uplink optical fibers 136U constitute an uplink optical fiber cable 380.

Figure 5A:
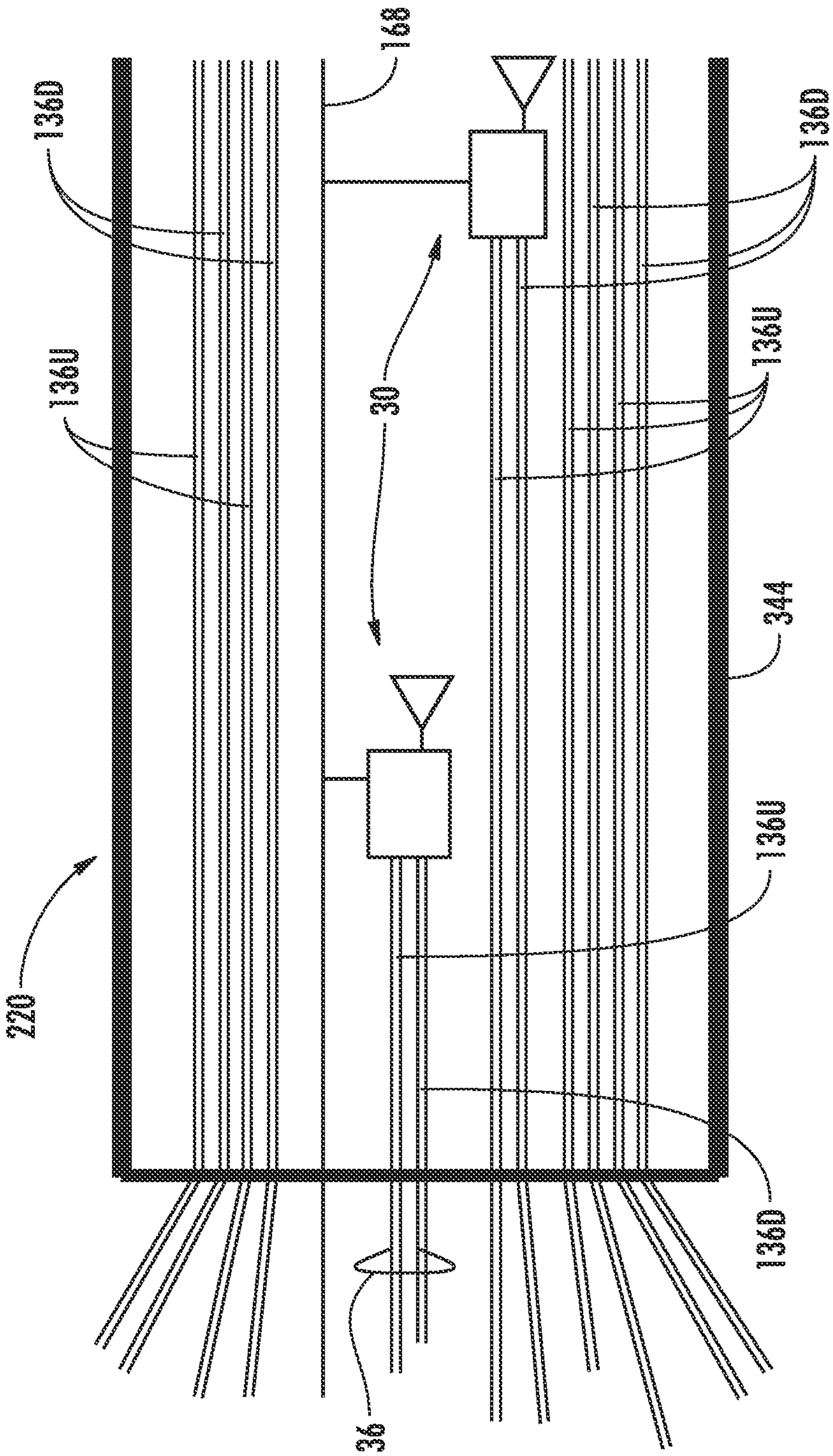
FIG. 5A is a close-up schematic diagram of an optical fiber cable showing downlink and uplink optical fibers connected to remote units incorporated in an outer jacket of the optical fiber cable.
Figure 5B:
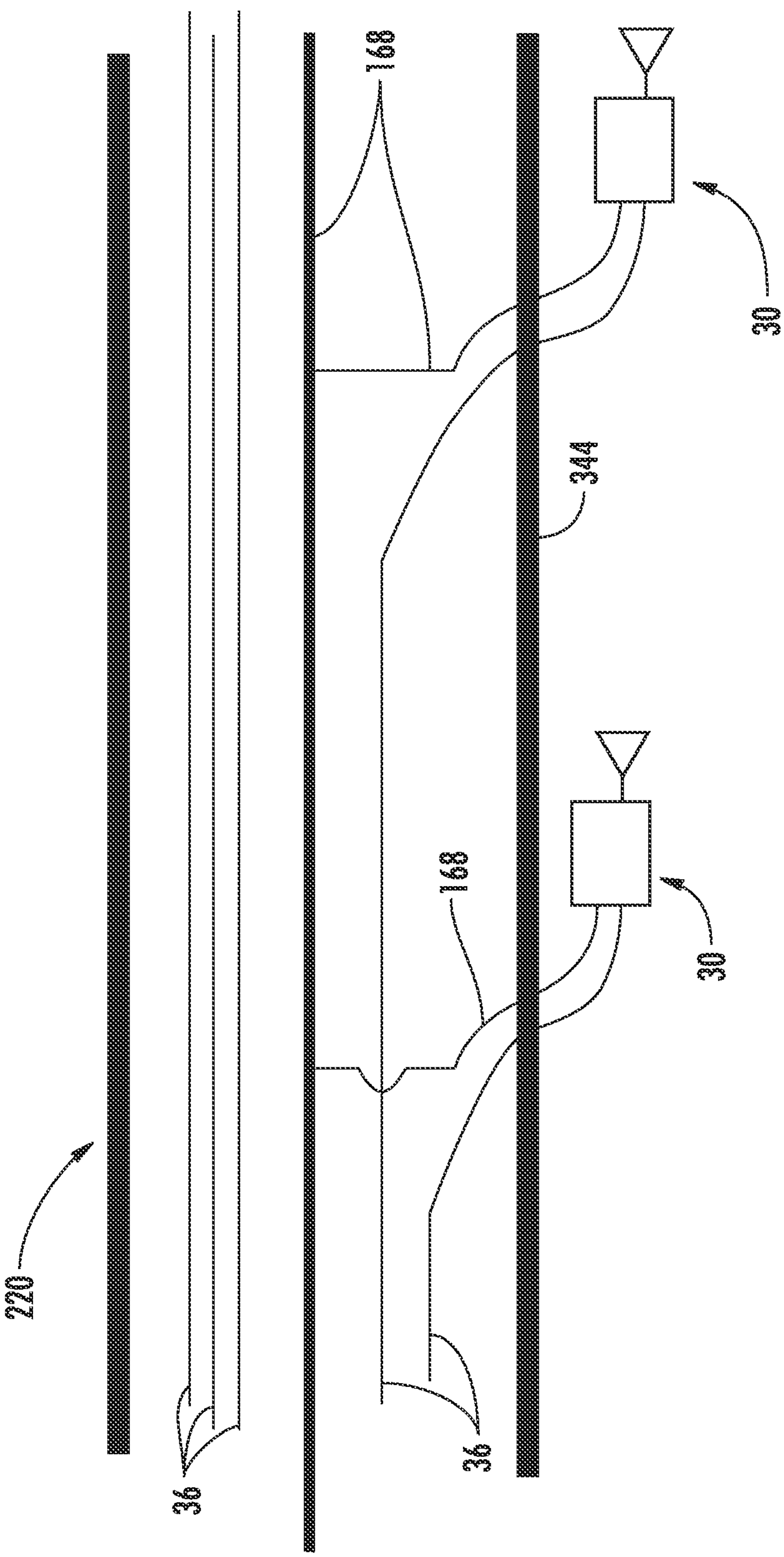
FIG. 5B is a schematic diagram of an exemplary optical fiber cable showing downlink and uplink optical fibers connected to remote units provided outside an outer jacket of the optical fiber cable.

FIG. 5A is a close-up schematic diagram of optical fiber cable 220 showing downlink and uplink optical fibers 136D and 136U and two of the six RAUs 30. Also shown is the electrical power line 168 electrically coupled to the RAUs 30. In an example embodiment, the optical fiber cable 220 includes a protective outer jacket 344. In an example embodiment, the RAUs 30 reside completely within the protective outer jacket 344. FIG. 5B is a schematic diagram similar to FIG. 5A, illustrating an example embodiment wherein the RAUs 30 lie outside of the protective outer jacket 344. Locating the RAUs 30 outside of the protective outer jacket 344 makes it easier to arrange the RAUs 30 relative to a building infrastructure after the optical fiber cable 220 is deployed, as described below.

With reference to FIGS. 3, 4, 5A and 5B, the optical fiber-based wireless system 200 operates as follows. At the central HEU 210, the service units 50A, 50B, . . . 50F each generate or pass through from one or more outside networks 223 respective electrical signals SD that correspond to the particular application of the given service unit 50. The electrical signals SD are transmitted over the RF transmission lines 230 to the downlink multiplexer 270. The downlink multiplexer 270 then combines (in frequency) and distributes the various electrical signals SD to the E/O converters 60 in the E/O converter array 360. In an example embodiment, the downlink multiplexer 270 and RF signal-directing element 280 therein are controlled by the main controller 250 via a control signal 51 (not shown) to the direct electrical signals SD to one, some or all of the E/O converters 60 in the E/O converter array 360 and thus to one, some or all of the RAUs 30, based on the particular service unit application. For example, if service unit 50A is a cellular phone unit, then in an example embodiment the electrical signals SD therefrom (e.g., passing therethrough from one or more outside networks 223) are divided (and optionally amplified) equally by the RF signal-directing element 280 and provided to each E/O converter 60 in the E/O converter array 360. This results in each RAU 30 being addressed. On the other hand, if the service unit 50F is a WLAN service unit, then the RF signal-directing element 280 may be adapted (e.g., programmed) to direct electrical signals SD to select ones of E/O converters 60 in E/O converter array 360 so that only select RAUs 30 are addressed.

Thus, one, some, or all of the E/O converters 60 in the E/O converter array 360 receive the electrical signals SD from the downlink multiplexer 270. The addressed E/O converters 60 in the E/O converter array 360 convert the electrical signals SD into corresponding optical signals SD', which are transmitted over the corresponding downlink optical fibers 136D to the corresponding RAUs 30. The addressed RAUs 30 convert the optical signals SD' back into electrical signals SD, which are then converted into electromagnetic signals SD" that correspond to the particular service unit application.

Figure 6:
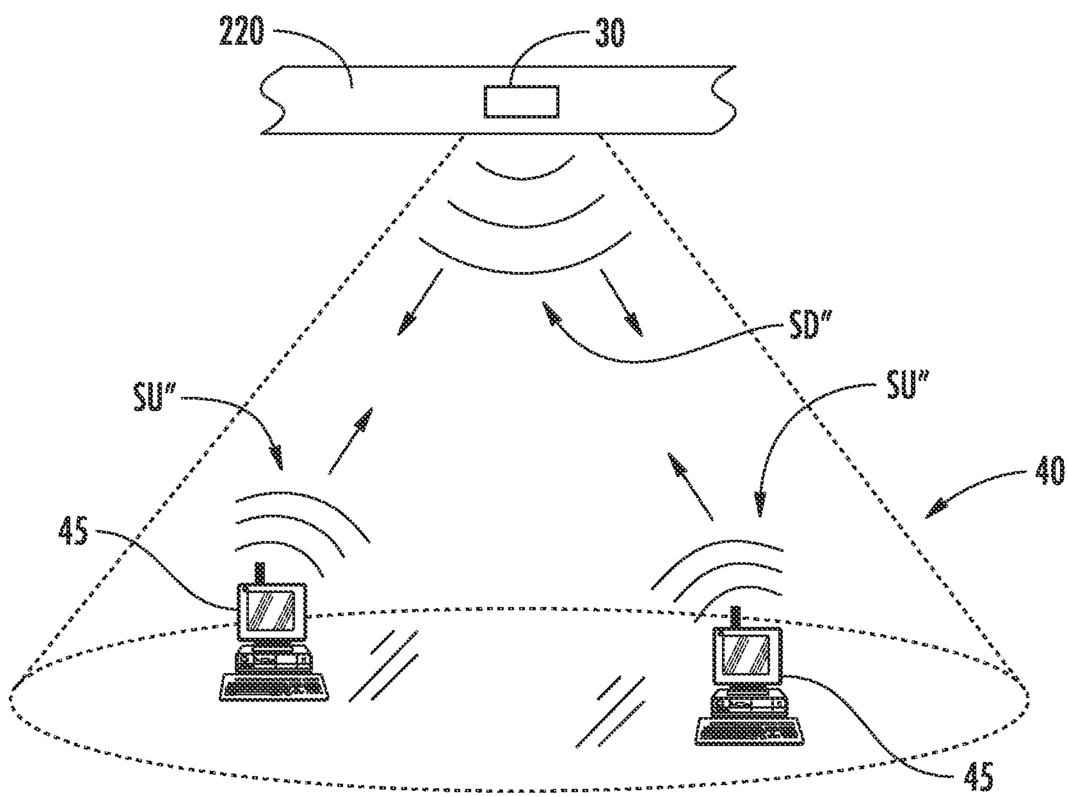
FIG. 6 is a close-up view of one exemplary remote unit illustrating a corresponding exemplary picocell and the exchange of downlink and uplink electromagnetic signals between the remote unit and client devices within the picocell.

FIG. 6 is a close-up view of one of the RAUs 30, illustrating the corresponding picocell 40 and the exchange of downlink and uplink electromagnetic signals SD" and SU" between the RAU 30 and client devices 45 within the picocell 40. In particular, the electromagnetic signals SU" are received by the corresponding RAU 30 and converted to electrical signals SU, and then to optical signals SD'. The optical signals SD' then travel over the uplink optical fiber 136U and are received by the O/E converter array 362 and the corresponding O/E converters 62 therein for the addressed RAUs 30. The O/E converters 62 convert the optical signals SU' back to electrical signals SU, which then proceed to the uplink multiplexer 320. The uplink multiplexer 320 then distributes the electrical signals SU to the service unit(s) 50 that require(s) receiving these electrical signals. The receiving service units 50 process the electrical signals SU, which in an example embodiment includes one or more of: storing the signal information; digitally processing or conditioning the signals; sending the signals on to one or more outside networks 223 via the network links 224; and sending the signals to one or more client devices 45 in the picocellular coverage area 44.

In an example embodiment, the uplink multiplexer 320 and the RF signal-directing element 328 therein are controlled by the main controller 250 via a control signal S2 (FIG. 4) to direct electrical signals SU to the service unit(s) 50 that require(s) receiving electrical signals SU. Different services from some or all of the service units 50 (i.e. cellular phone service, WiFi for data communication, RFID monitoring, etc.) may be combined at the RF signal level by frequency multiplexing.

In an example embodiment, a single electrical power line 168 from the power supply 160 at central HEU 210 is incorporated into the optical fiber cable 220 and is adapted to power each RAU 30, as shown in FIG. 6. Each RAU 30 taps off the needed amount of power, e.g., via a DC power converter 180 (FIG. 2). Since the preferred embodiment of a RAU 30 has relatively low functionality and power consumption, only relatively low electrical power levels are required (e.g., ~1 watt), allowing high-gauge wires to be used (e.g., 20 AWG or higher) for the electrical power line 168. In an example embodiment that uses many RAUs 30 (e.g., more than twelve (12)) in the optical fiber cable 220, or if the power consumption for the RAUs 30 is significantly larger than 1 watt due to their particular design, lower gauge wires or multiple wires are employed in the electrical power line 168. The inevitable voltage drop along the electrical power line 168 within the optical fiber cable 220 typically requires large-range (~30 volts) voltage regulation at each RAU 30. In an example embodiment, DC power converters 180 at each RAU 30 perform this voltage regulation function. If the expected voltage drop is known, then in an example embodiment the main controller 250 carries out the voltage regulation. In an alternative embodiment, remote voltage sensing at each RAU 30 is used, but this approach is not the preferred one because it adds complexity to the system.

Figure 7:
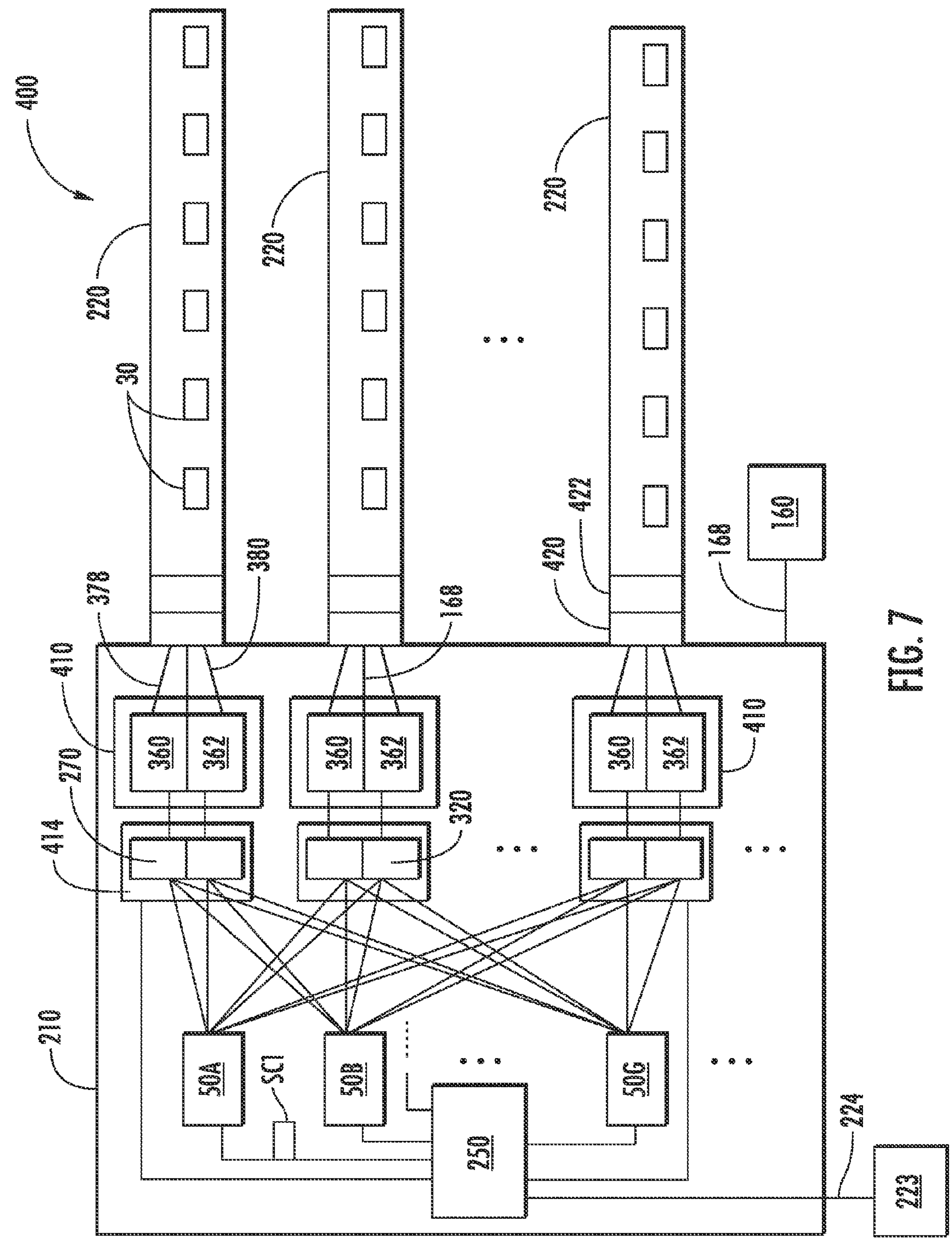
FIG. 7 is a schematic diagram of an exemplary centralized optical fiber-based wireless system.

FIG. 7 is a schematic diagram of an example embodiment of a centralized optical fiber-based wireless system 400. The centralized optical fiber-based wireless system 400 is similar to the optical fiber-based wireless system 200 as described above, but includes multiple optical fiber cables 220 optically coupled to the central HEU 210. The central HEU 210 includes a number of E/O converter arrays 360 and a corresponding number of O/E converter arrays 362, arranged in pairs in converter array units 410, with one converter array unit 410 optically coupled to one optical fiber cable 220. Likewise, the centralized optical fiber-based wireless system 400 includes a number of downlink multiplexers 270 and uplink multiplexers 320, arranged in pairs in multiplexer units 414, with one multiplexer unit 414 electrically coupled to one converter array unit 410. In an example embodiment, the main controller 250 is electrically coupled to each multiplexer unit 414 and is adapted to control the operation of the downlink and uplink multiplexers 270 and 320 therein. Here, the term "array" is not intended to be limited to components integrated onto a single chip as is often done in the art, but includes an arrangement of discrete, non-integrated components.

Each E/O converter array 360 is electrically coupled to the downlink multiplexer 270 in the corresponding multiplexer unit 414. Likewise, each O/E converter array 362 is electrically coupled to the uplink multiplexer 320 in the corresponding multiplexer unit 414. The service units 50 are each electrically coupled to both downlink and uplink multiplexers 270 and 320 within each multiplexer unit 414. Respective downlink and uplink optical fiber cables 378 and 380 optically couple each converter array unit 410 to a corresponding optical fiber cable 220. In an example embodiment, the central HEU 210 includes connector ports 420 and the optical cables 220 include connectors 422 adapted to connect to the connector ports 420. In an example embodiment, the connectors 422 are MT ("Mechanical Transfer") connectors, such as the UNICAM® MTP connector available from Corning Cable Systems, Inc., Hickory, N.C. In an example embodiment, the connectors 422 are adapted to accommodate the electrical power line 168 connected to the connector port 420.

Figure 8:
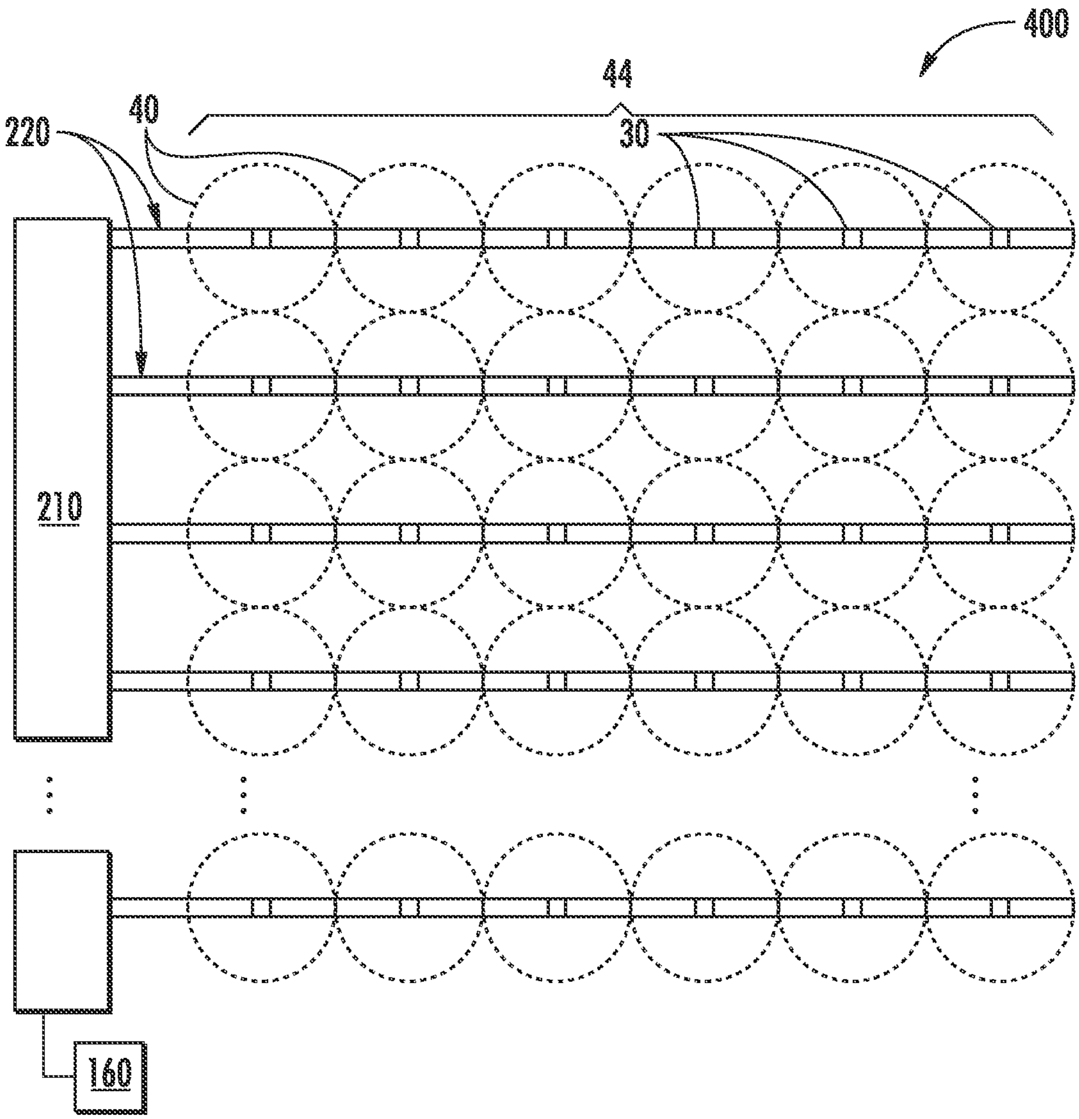
FIG. 8 is a top down view of the wireless picocellular system of FIG. 7 showing an extended picocellular coverage area formed by using multiple optical fiber cables.

FIG. 8 is a "top down" view of the centralized optical fiber-based wireless system 400, showing an extended picocellular coverage area 44 formed by using multiple optical fiber cables 220. In an example embodiment, the centralized optical fiber-based wireless system 400 supports anywhere from two RAUs 30, to hundreds of RAUs 30, to even thousands of RAUs 30. The particular number of RAUs 30 employed is not fundamentally limited by the design of the centralized optical fiber-based wireless system 400, but rather by the particular application.

In FIG. 8, the picocells 40 are shown as non-overlapping. This non-overlap is based on adjacent RAUs 30 operating at slightly different frequencies to avoid the otherwise undesirable substantial overlap that occurs between adjacent picocells that operate at the same frequency. Same-frequency overlap is discussed in greater detail below in connection with embodiments that combine two or more picocells.

The optical fiber-based wireless system 400 operates in a manner similar to the optical fiber-based wireless system 200 as described above, except that instead of the RAUs 30 being in a single optical fiber cable 220, they are distributed over two or more optical fiber cables 220 through the use of corresponding two or more converter array units 410. Electrical signals SD from the service units 50 are distributed to each multiplexer unit 414. The downlink multiplexers 270 therein convey electrical signals SD to one, some, or all of the converter array units 410, depending on which RAUs 30 are to be addressed by which service unit 50. Electrical signals SD are then processed as described above, with downlink optical signals SD' being sent to one, some or all of RAUs 30. Uplink optical signals SU' generated by client devices 45 in the corresponding picocells 40 return to the corresponding converter array units 410 at the central HEU 210. The optical signals SU' are converted to electrical signals SU at the receiving converter array unit(s) 410 and are then sent to the uplink multiplexers 320 in the corresponding multiplexer unit(s) 414. The uplink multiplexers 320 therein are adapted (e.g., programmed by the main controller 250) to direct electrical signals SU to the service unit(s) 50 that require(s) receiving electrical signals SU. The receiving service units 50 process the electrical signals SU, which as discussed above in an example embodiment includes one or more of storing the signal information; digitally processing or conditioning the signals; sending the signals to one or more outside networks 223 via network links 224; and sending the signals to one or more client devices 45 in the picocellular coverage area 44.

Figure 9A:
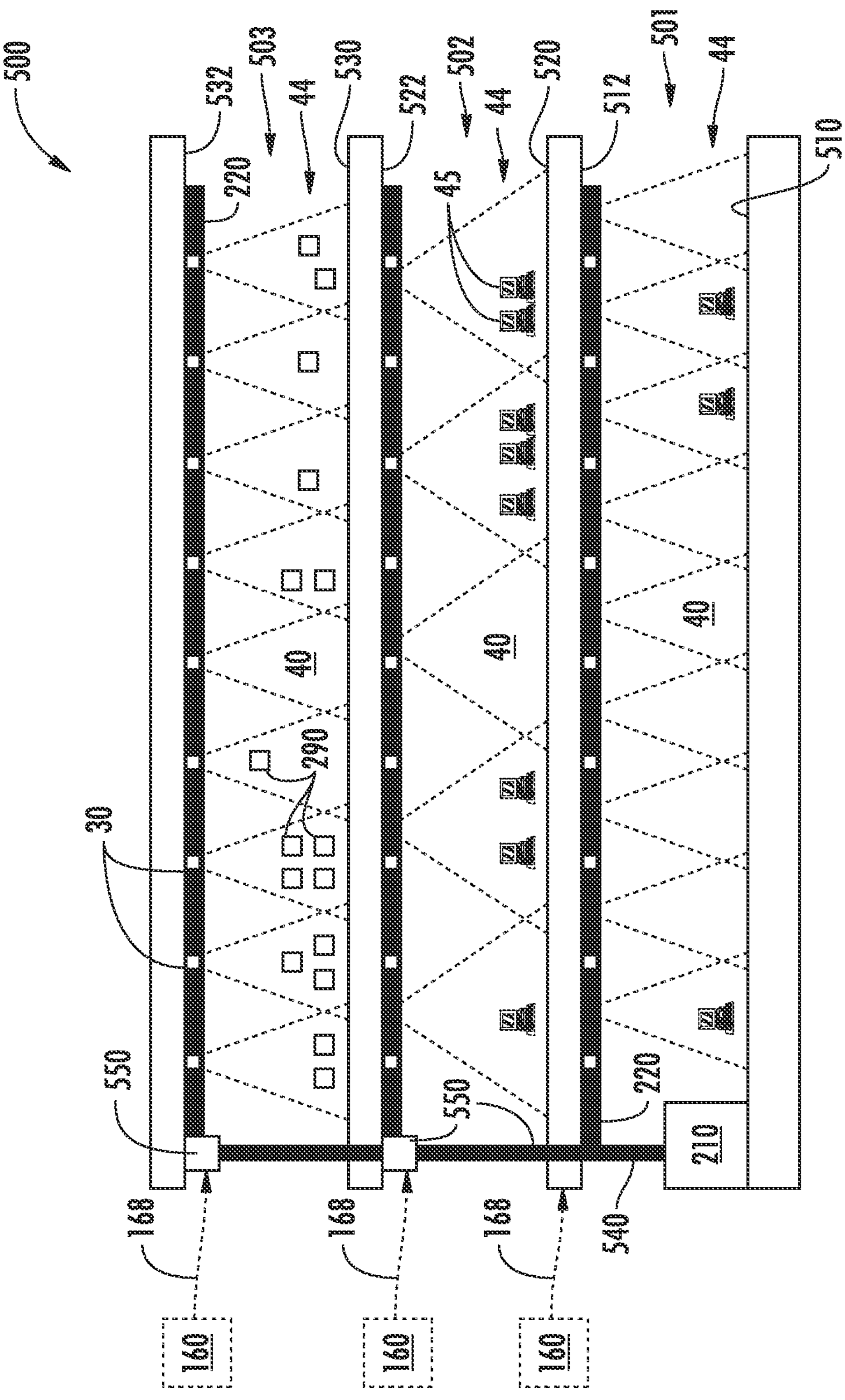
FIG. 9A is a schematic cut-away diagram of an exemplary building infrastructure in which an optical fiber-based wireless system according to the embodiments described herein could be employed.
Figure 9B:
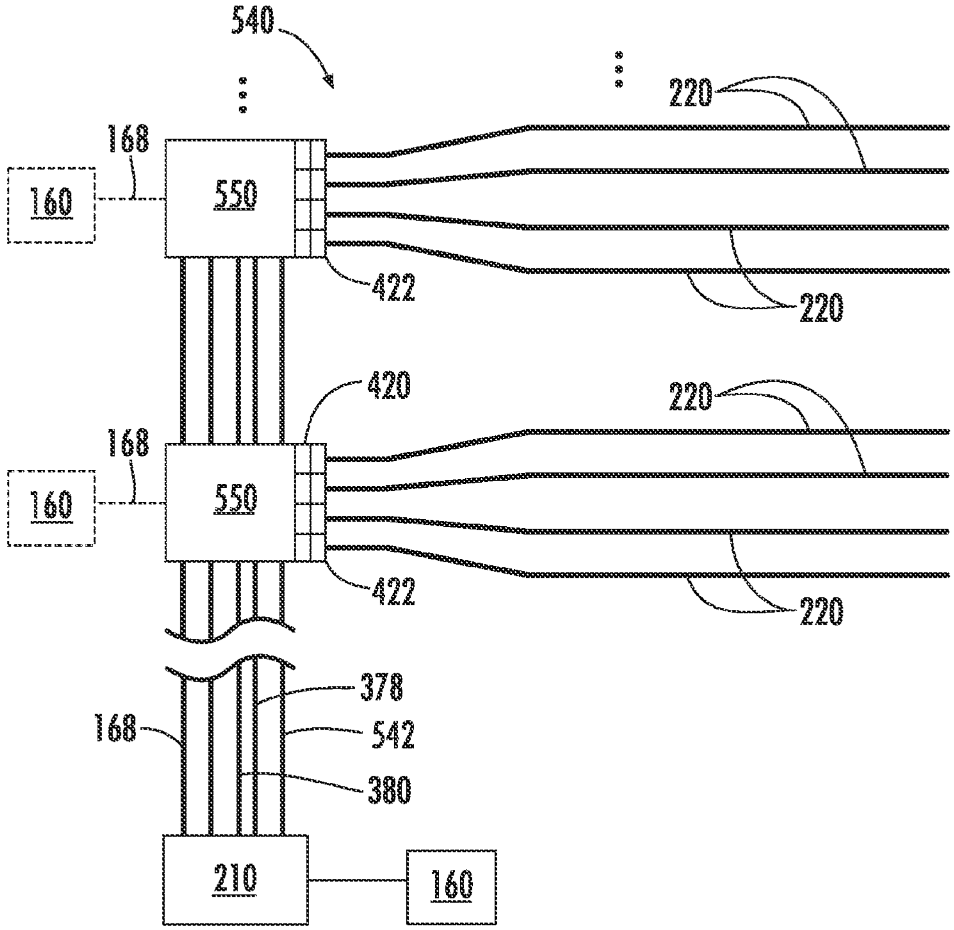
FIG. 9B is a schematic diagram of an example embodiment of a multi-section cable used in the optical fiber-based wireless system of FIG. 9A to distribute transponders throughout the building infrastructure.

FIG. 9A is a schematic cut-away diagram of a building infrastructure 500 that generally represents any type of building in which an optical fiber-based wireless system would be useful, such as office buildings, schools, hospitals, college buildings, airports, warehouses, etc. The building infrastructure 500 includes a first (ground) floor 501, a second floor 502, and a third floor 503. The first floor 501 is defined by a floor 510 and a ceiling 512; the second floor 502 is defined by a floor 520 and a ceiling 522; and the third floor 503 is defined by a floor 530 and a ceiling 532. An example centralized optical fiber-based wireless system 400 is incorporated into the building infrastructure 500 to provide a picocellular coverage area 44 that covers floors 501, 502 and 503.

In an example embodiment, the centralized optical fiber-based wireless system 400 includes a main cable 540 having a number of different sections that facilitate the placement of a large number of RAUs 30 in the building infrastructure 500. FIG. 9A is a schematic diagram of an example embodiment of the main cable 540. The main cable 540 is also illustrated by example in FIG. 9B. As illustrated therein, the main cable 540 includes a riser section 542 that carries all of the uplink and downlink optical fiber cables 378 and 380 from the central HEU 210. The cable main 540 includes one or more multi-cable (MC) connectors 550 adapted to connect select downlink and uplink optical fiber cables 378 and 380, along with the electrical power line 168, to a number of optical fiber cables 220. In an example embodiment, MC connectors 550 include individual connector ports 420, and optical fiber cables 220 include matching connectors 422. In an example embodiment, the riser section 542 includes a total of seventy-two (72) downlink and seventy-two (72) uplink optical fibers 136D and 136U, while twelve (12) optical fiber cables 220 each carry six (6) downlink and six (6) uplink optical fibers.

The main cable 540 enables multiple optical fiber cables 220 to be distributed throughout the building infrastructure 500 (e.g., fixed to the ceilings 512, 522 and 532) to provide an extended picocellular coverage area 44 for the first, second and third floors 501, 502 and 503. An example type of MC connector 550 is a "patch panel" used to connect incoming and outgoing optical fiber cables in an optical telecommunication system.

In an example embodiment of the multi-section main cable 540, the electrical power line 168 from the power supply 160 runs from the central HEU 210 through the riser section 542 and branches out into the optical fiber cables 220 at the MC connectors 550 (FIG. 8). In an alternative example embodiment, electrical power is separately supplied at each MC connector 550, as indicated by the dashed-box power supplies 160 and dashed-line electrical power lines 168 illustrated in FIGS. 9A and 9B.

In an example embodiment, the central HEU 210 and the power supply 160 are located within the building infrastructure 500 (e.g., in a closet or control room), while in another example embodiment one or both are located outside of the building at a remote location.

Figure 10:
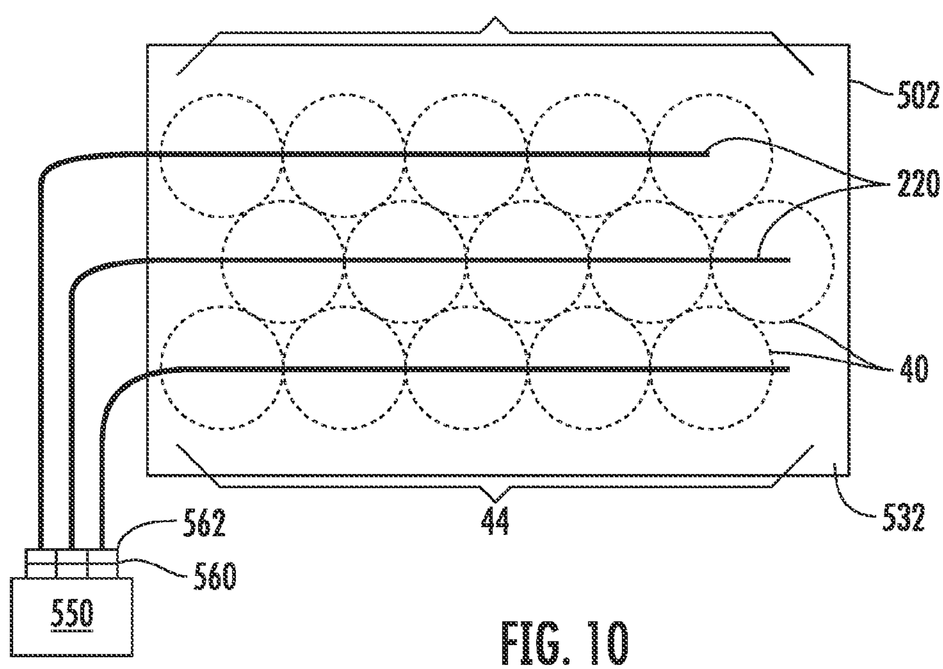
FIG. 10 is a schematic top down view of the second floor of the building infrastructure in FIG. 9A showing three exemplary optical fiber cables branching out extending over the ceiling.

An example embodiment involves tailoring or designing the picocellular coverage areas 44 for the different floors to suit particular needs. FIG. 10 is a schematic "top down" view of the second floor 502 of the building infrastructure 500, showing three optical fiber cables 220 branching out from the MC connector 550 and extending over the ceiling 532 (FIG. 10). The MC connectors 550 include connector ports 560 and the three optical cables 220 include connectors 562 adapted to connect to the connector ports 560 in this embodiment. The picocells 40 associated with RAUs 30 (not shown in FIG. 10) form an extended picocellular coverage area 44 that covers the second floor 502 with fewer, larger picocells than the first and third floors 501 and 503 (FIG. 9A). Such different picocellular coverage areas 44 may be desirable when the different floors have different wireless needs. For example, the third floor 503 might require relatively dense picocell coverage if it serves as storage for items that need to be inventoried and tracked via RFID tags 290 (FIG. 3), which can be considered simple client devices 45. Likewise, the second floor 502 may be office space that calls for larger and fewer picocells to provide cellular phone service and WLAN coverage.

Figure 11A:
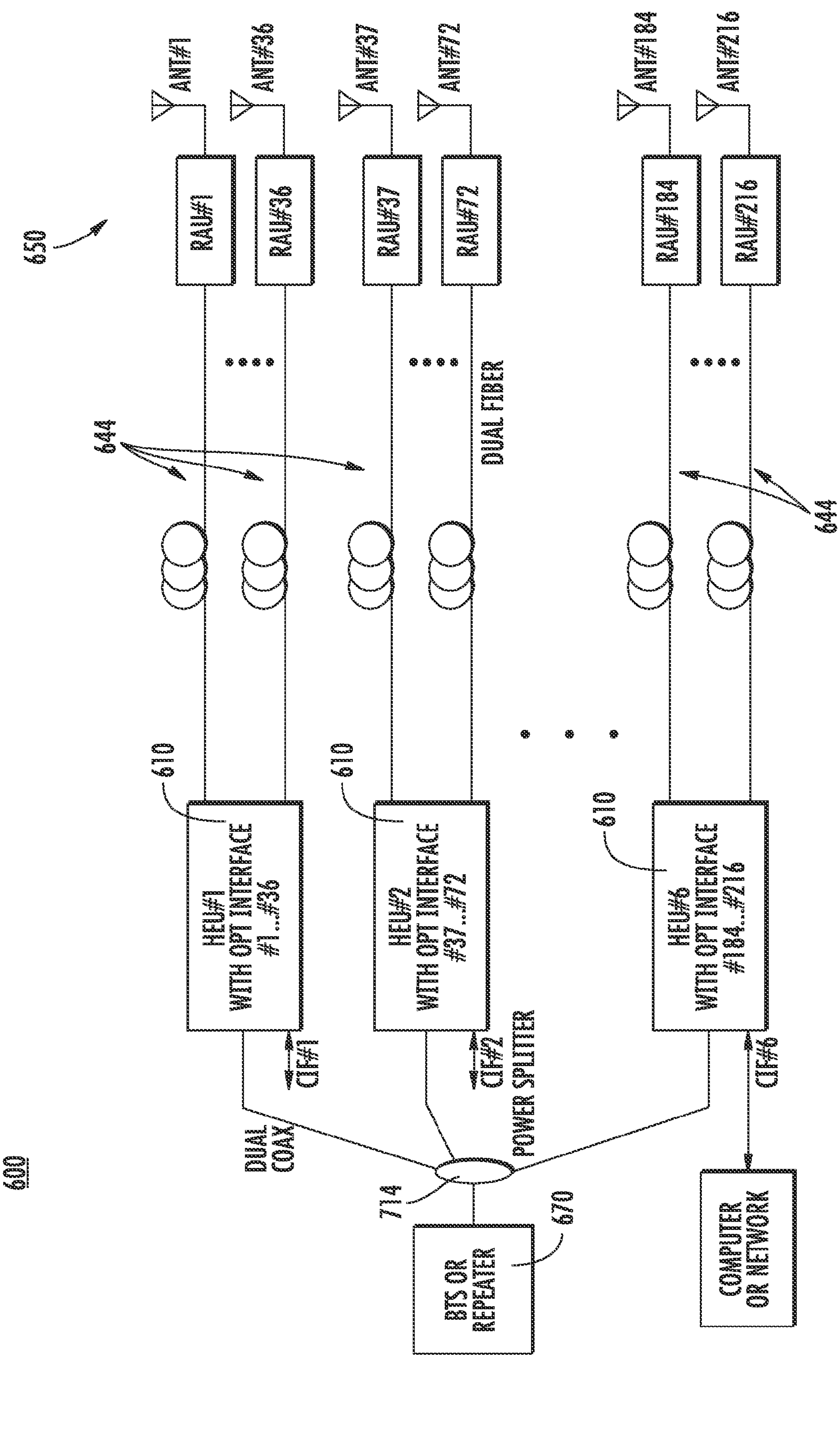
FIG. 11A is a schematic diagram of an exemplary optical fiber-based wireless system incorporating multiple head-end units or stations.
Figure 11B:
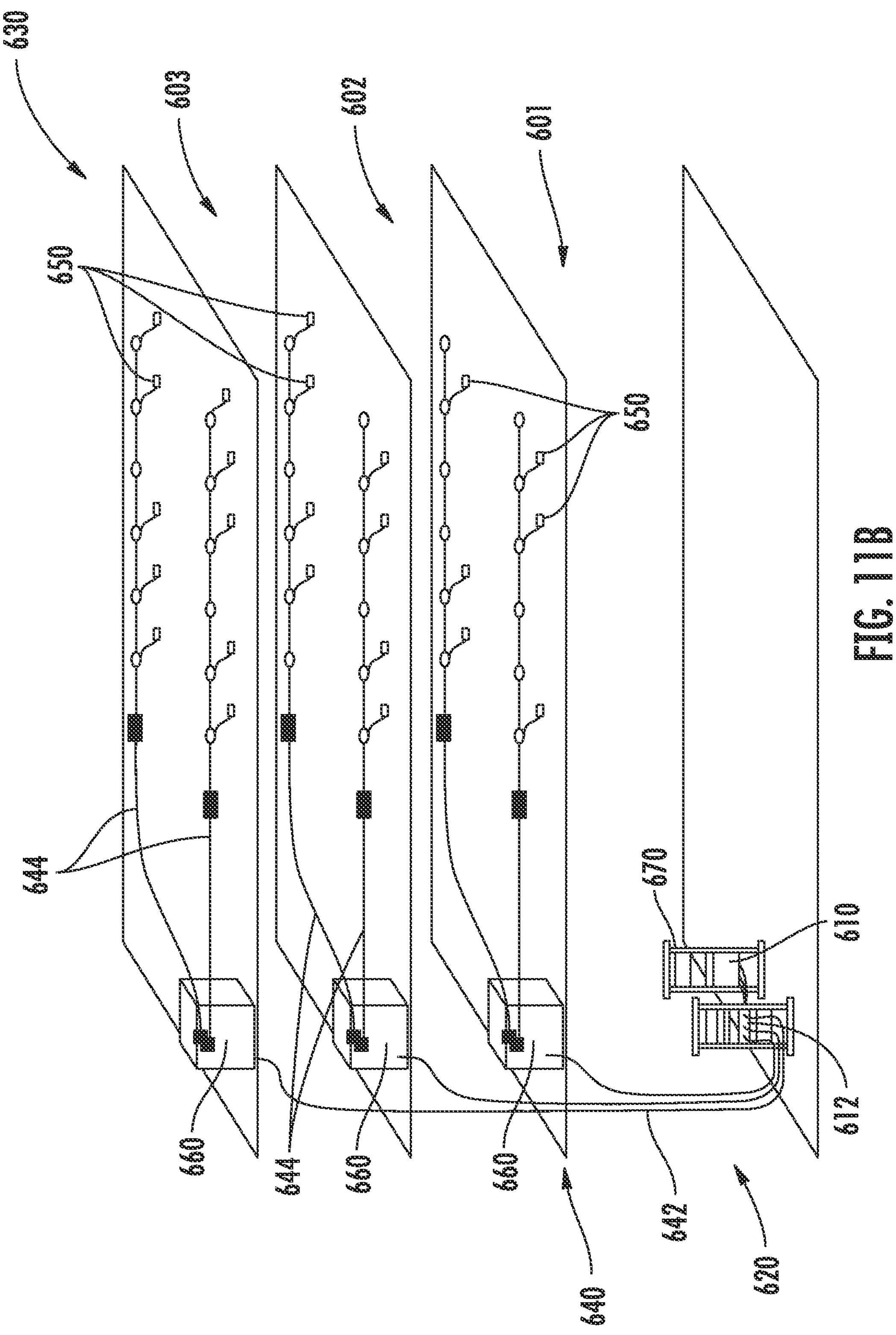
FIG. 11B is a partially schematic cut-away diagram of an exemplary building infrastructure in which the optical fiber-based wireless system of FIG. 8 can be employed.

FIG. 11A is a schematic diagram of an example embodiment of an optical fiber-based wireless system 600 incorporating multiple HEUs or stations 610 to provide various types of wireless service to a coverage area. FIG. 11B is a partially schematic cut-away diagram of a building infrastructure 620 that generally represents any type of building in which the optical fiber-based wireless system 600 might be used. This, the optical fiber-based wireless system 600 in this embodiment can be an in-door distributed antenna system (IDAS) to provide wireless service inside a building. In the embodiment discussed below, the services provided can be cellular service, wireless services such as RFID tracking, WiFi, LAN, combinations thereof, etc. FIG. 11B illustrates the coverage provided by a single HEU 610 and associated system components, although a building infrastructure can be served by multiple HEUs 610 comprising part of a optical fiber-based wireless system 600 as shown schematically in FIG. 11A.

Referring first to FIG. 11B, the building infrastructure 620 includes a first (ground) floor 601, a second floor 602, and a third floor 603. The floors 601, 602, 603 are serviced by the HEU 610, through a main distribution frame 612, to provide a coverage area 630 in the building infrastructure 620. Only the ceilings of the floors 601, 602, 603 are shown in FIG. 11B for simplicity of illustration. In the example embodiment, a main cable 640 has a number of different sections that facilitate the placement of a large number of RAUs 650 in the building infrastructure 620. Each RAU 650 in turn services its own coverage area in the coverage area 630. The main cable 640 can have, for example, the configuration as shown generally in FIG. 11, and can include a riser section 642 that carries all of the uplink and downlink optical fiber cables to and from the HEU 610. The main cable 640 can include one or more multi-cable (MC) connectors adapted to connect select downlink and uplink optical fiber cables, along with an electrical power line, to a number of optical fiber cables 644. In an example embodiment, an interconnect unit 660 is provided for each floor 601, 602, and 603, the interconnect units 660 including an individual passive fiber interconnection of optical fiber cable ports. The optical fiber cables 644 include matching connectors. In an example embodiment, the riser section 642 includes a total of thirty-six (36) downlink and thirty-six (36) uplink optical fibers, while each of the six (6) optical fiber cables 644 carries six (6) downlink and six uplink optical fibers to service six (6) RAUs 650. The number of optical fiber cables 644 can be varied to accommodate different applications, including the addition of second, third, etc. HEUs 610.

According to one aspect, each interconnect unit 660 can provide a low voltage DC current to the electrical conductors in the optical fiber cables 644 for powering the RAUs 650. For example, the interconnect units 660 can include an AC/DC transformer to transform 110V AC power that is readily available in the building infrastructure 620. In one embodiment, the transformers supply a relatively low voltage DC current of 48V or less to the optical fiber cables 644. An uninterrupted power supply could be located at the interconnect units 660 and at the HEU 610 to provide operational durability to the optical fiber-based wireless system 600. The optical fibers utilized in the optical fiber cables 644 can be selected based upon the type of service required for the system, and single mode and/or multi-mode fibers may be used.

The main cable 640 enables multiple optical fiber cables 644 to be distributed throughout the building infrastructure 620 (e.g., fixed to the ceilings or other support surfaces of each floor 601, 602 and 603) to provide the coverage area 630 for the first, second and third floors 601, 602 and 603. In an example embodiment, the HEU 610 is located within the building infrastructure 620 (e.g., in a closet or control room), while in another example embodiment it may be located outside of the building at a remote location. A base transceiver station (BTS) 670, which may be provided by a second party such as cellular service provider, is connected to the HEU 610, and can be co-located or located remotely from the HEU 610. A BTS is any station or source that provides an input signal to the HEU 610 and can receive a return signal from the HEU 610. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell.

The optical fiber-based wireless system 600 shown schematically in FIG. 11A represents essentially six (6), of which only three (3) are illustrated, of the arrangements shown in FIG. 11B interconnected or ganged as a single system. The optical fiber-based wireless system 600 can therefore provide a broader coverage area within a building infrastructure (e.g., covering additional floors). In FIG. 11A, six HEUs 610 are connected to the base transceiver station (BTS) 670 via a power splitter 714. Each optical fiber cable 644 is in turn connected to a plurality of RAUs 650 having an antenna (one RAU 650 is illustrated for each optical fiber cable 644 for simplicity of illustration), as generally illustrated in FIG. 7B. The HEUs 610 are host neutral systems in this embodiment which can provide services for one or more BTSs 670 with the same infrastructure that is not tied to any particular service provider. Each HEU 610 is connected to six (6) optical fiber cables 644 (as also shown in FIG. 11B). The exemplary optical fiber-based wireless system 600 therefore includes two hundred sixteen (216) RAUs 650, with each of the six (6) HEUs 610 being connected to thirty-six (36) RAUs 650, although fewer or more HEUs 610, optical fiber cables 644 and RAUs 650 may be included depending upon the desired coverage area. For example, fewer than six (6) HEUs 610 can be employed to obtain the same coverage capability as in FIG. 11A by increasing the capacity of each HEU 610 to support RAUs 650. Each optical fiber cable 644 may include an electrical power line running between its associated HEUs 610 and the RAUs 650 connected to the optical fiber cable 644, and/or power may be supplied at the interconnect units 660. In the illustrated embodiment, power is supplied at the interconnect units 660. The RAUs 650 can be located outside of the protective outer jacket of the optical fiber cables 644 so that it is easier to arrange the RAUs 650 relative to a building infrastructure after the optical fiber cable 644 is deployed, as discussed above.

Figure 12A:
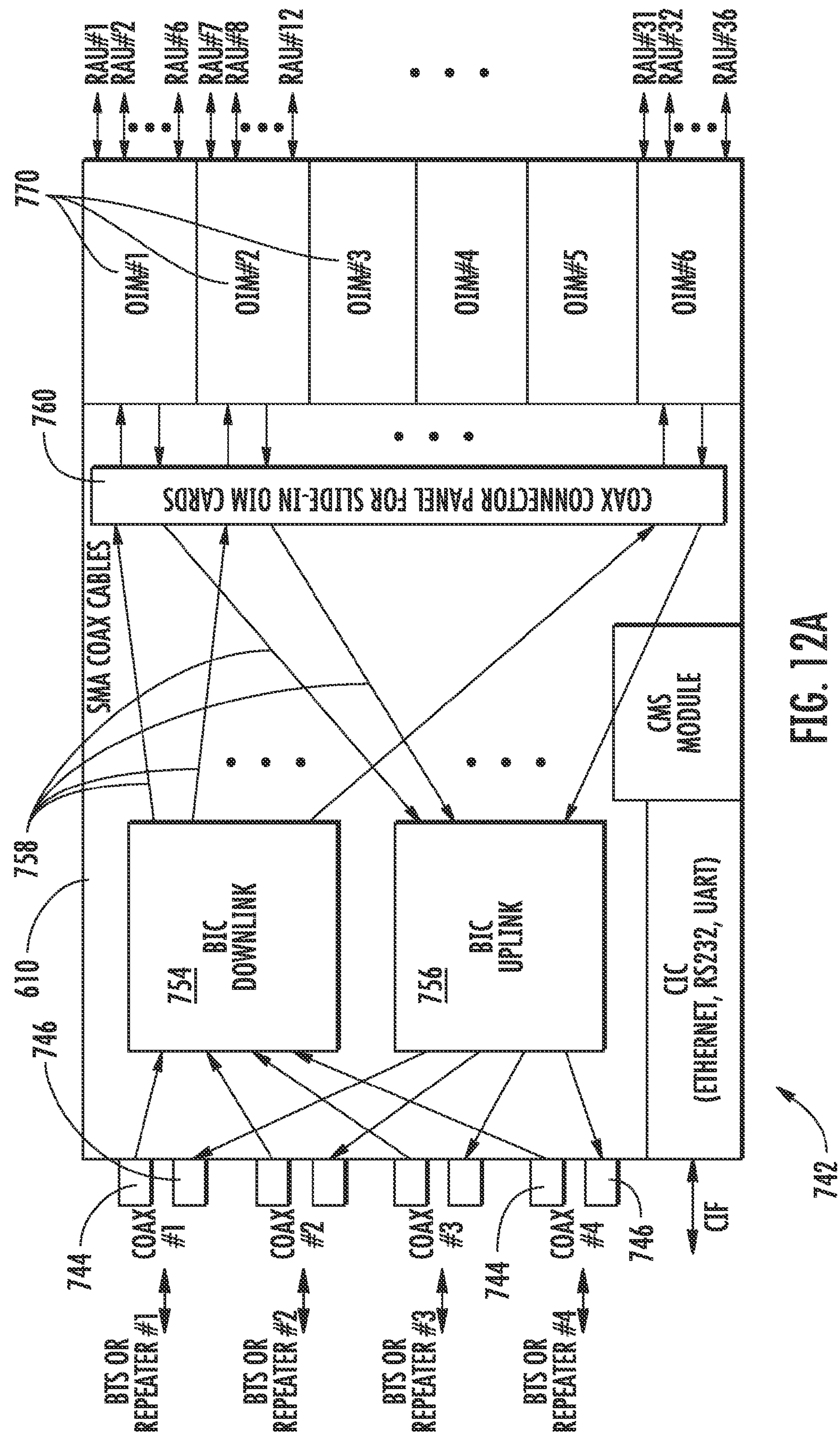
FIG. 12A is an exemplary schematic diagram of an exemplary head-end unit.

FIG. 12A is a schematic diagram of an exemplary HEU 610. In the illustrated embodiment, the HEU 610 includes a processing section 742 that manages the functions of the unit components and communicates with exterior devices via the CIF. The HEU 610 can be connected to a plurality of base transceiver stations, transceivers, etc. at connections 744, 746. The connections 744 are downlink connections and connections 746 are uplink connections. Each downlink connection 744 is connected to a downlink BTS interface card (BIC) 754 located in the HEU 610, and each uplink connection 746 is connected to an uplink BIC 756 also located in the HEU 610. The downlink BIC 754 is connected to a coaxial connector panel 760, which can be in the form of a midplane panel, by cables 758. The uplink BIC 756 is also connected to the coaxial connector panel 760 by cables 758. The coaxial connector panel 760 is in electrical communication with a plurality of optical interface modules (OIM) 770, which are in optical and electrical communication with the RAUs 650 via the optical fiber cables 644. The OIMs 770 can plug directly into the coaxial connector panel 760.

Note that the OIMs 770 are shown as supporting up to six RAUs 650, but the OIMs 770 in this embodiment consist of two optical interface card (OICs) each supporting up to three RAUs 650 each. This is further illustrated in alternative exemplary HEU 610' in FIG. 12B. As illustrated therein, two OICs 771 are provided for each OIM 770. A midplane interface card 747 can be deployed in the HEU 610' to interface the DL-BIC 754 and UL-BIC 756 to the OICs 771. A head-end controller (HEC) 773 is also included in the HEU 610' that is configured to communicate with the DL-BIC 754, the UL-BIC 756, the OICs 770 and the RAUs 771 to monitor, configure, and perform other tasks for these components, as will be described in more detail in this application. Several ports can be provided to allow external interfacing to the HEC 773 including but not limited to a RS-232 serial port 775, a universal serial bus (USB) port 777, and an Ethernet port 779. These ports allow for external information exchange with the HEC 773, such as for providing commands to the HEC 773 to configuring the DL-BIC 754, the UL-BIC 756, the OICs 770 and the RAUs 771 and receiving information regarding the monitoring and status of the DL-BIC 754, the UL-BIC 756, the OICs 770 and the RAUs 771.

Figure 12B:
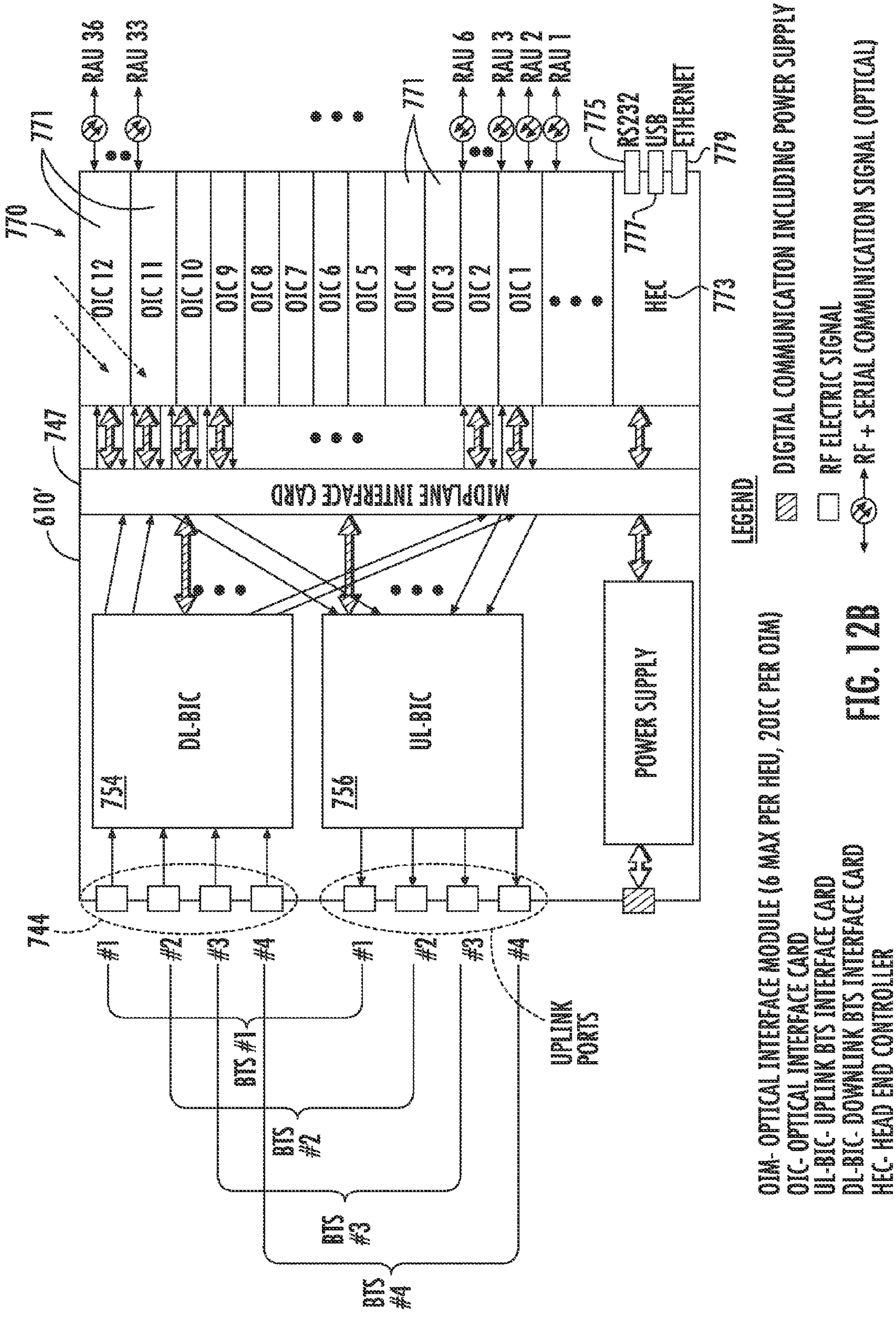
FIG. 12B is another exemplary schematic diagram of an exemplary head-end unit.
Figure 13:
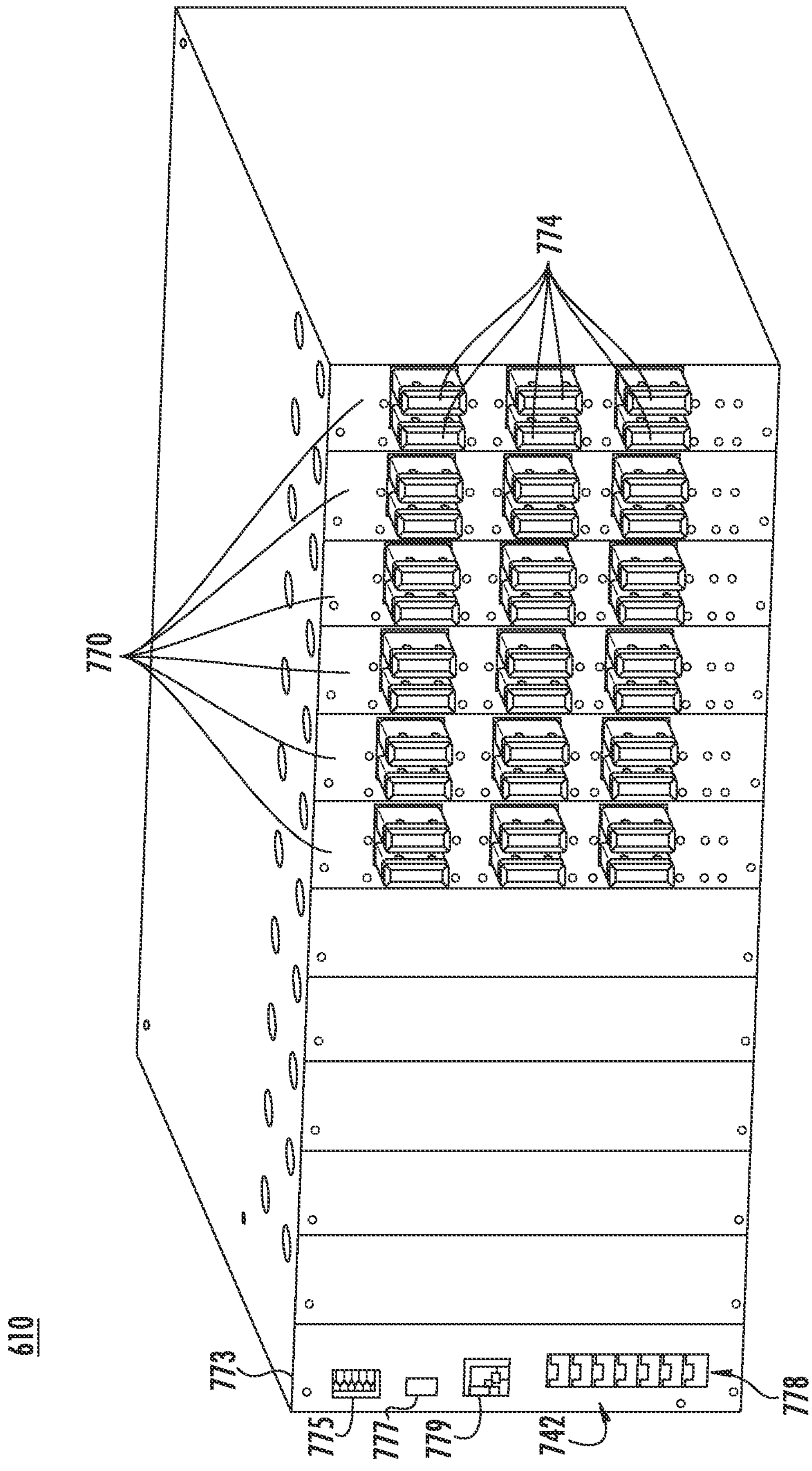
FIG. 13 is a front exterior view of the head-end unit of FIGS. 12A and 12B.
Figure 14:
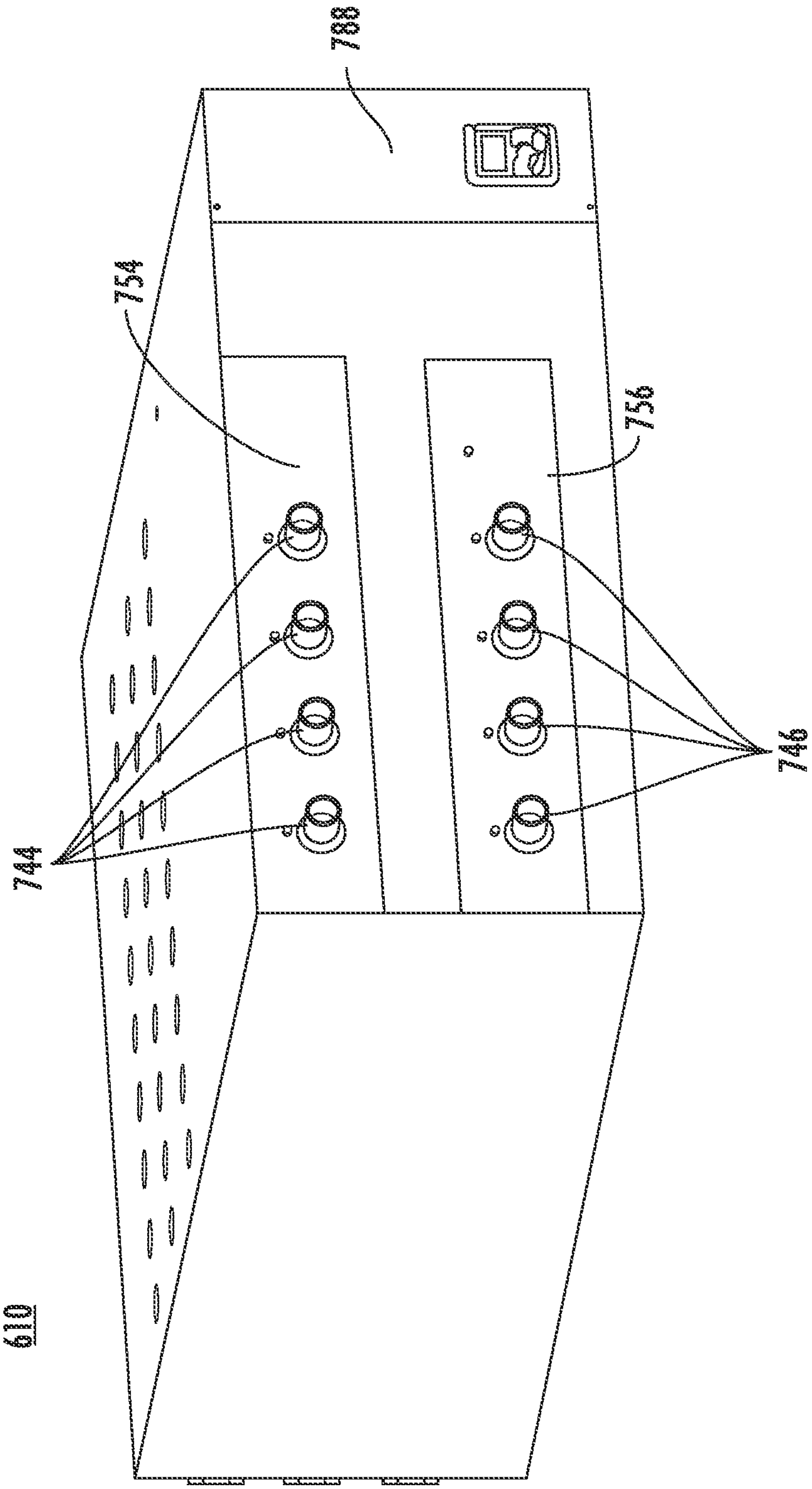
FIG. 14 is a rear exterior view of the head-end unit of FIGS. 12A and 12B.

FIG. 13 is a front exterior view and FIG. 14 is a rear exterior view of a HEU 610. FIG. 13 illustrates the OIMs 770 and connectors 774 used to connect to the RAUs 650 assigned to each OIM 770. As also illustrated in FIGS. 11B and 12, each OIM 770 connects to six (6) optical fiber cables 644 at the connections 744. FIG. 13 also shows the orientation of a switch 778 and a processing section 742 in HEC 773 of the HEU 610. As will be described in more detail below, the processing section 742 includes a software-based microprocessor to configure and monitor the components of the HEU 610 and the RAUs 771. The switch 778 is provided to allow additional HEUs 610 to be connected to the HEU 610 in a slave arrangement to allow the HEU 610, as a master unit, to control and provide access to additional OIMs 770 and RAUs 771, as will be described in more detail below. Alternatively, the switch 778 and the processing section 742 may be included in a separate board or module from the HEC 773. The processing section 742 can be, for example, a commercially available computer such as the EP440C single board computer available from Embedded Planet of Warrensville, Ohio. The processing section 742 can include components such as DDR memory interfaces, and integrated Ethernet, USB, UART, I2C, SPI, and PCI interfaces. FIG. 14 illustrates the connections 744, 746 on the downlink and uplink BICs 754, 756 and a power supply 788 for the HEU 610. In the illustrated embodiment, the power supply 788 is a model MPS-200 available from Astrodyne.

Figure 15A:
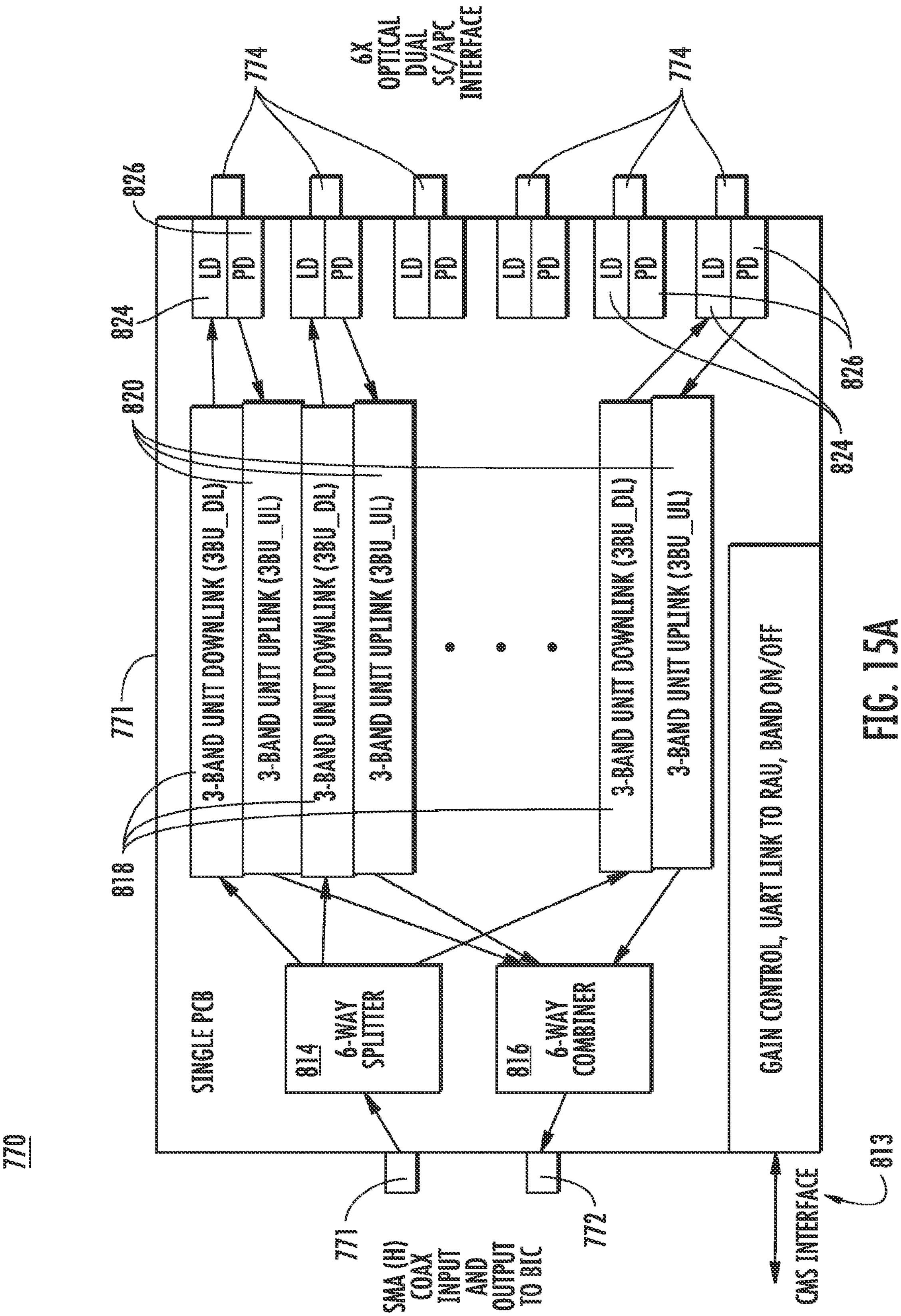
FIG. 15A is a schematic diagram of an optical interface card (OIC) which can be employed in the head-end unit of FIGS. 12A and 12B.
Figure 15B:
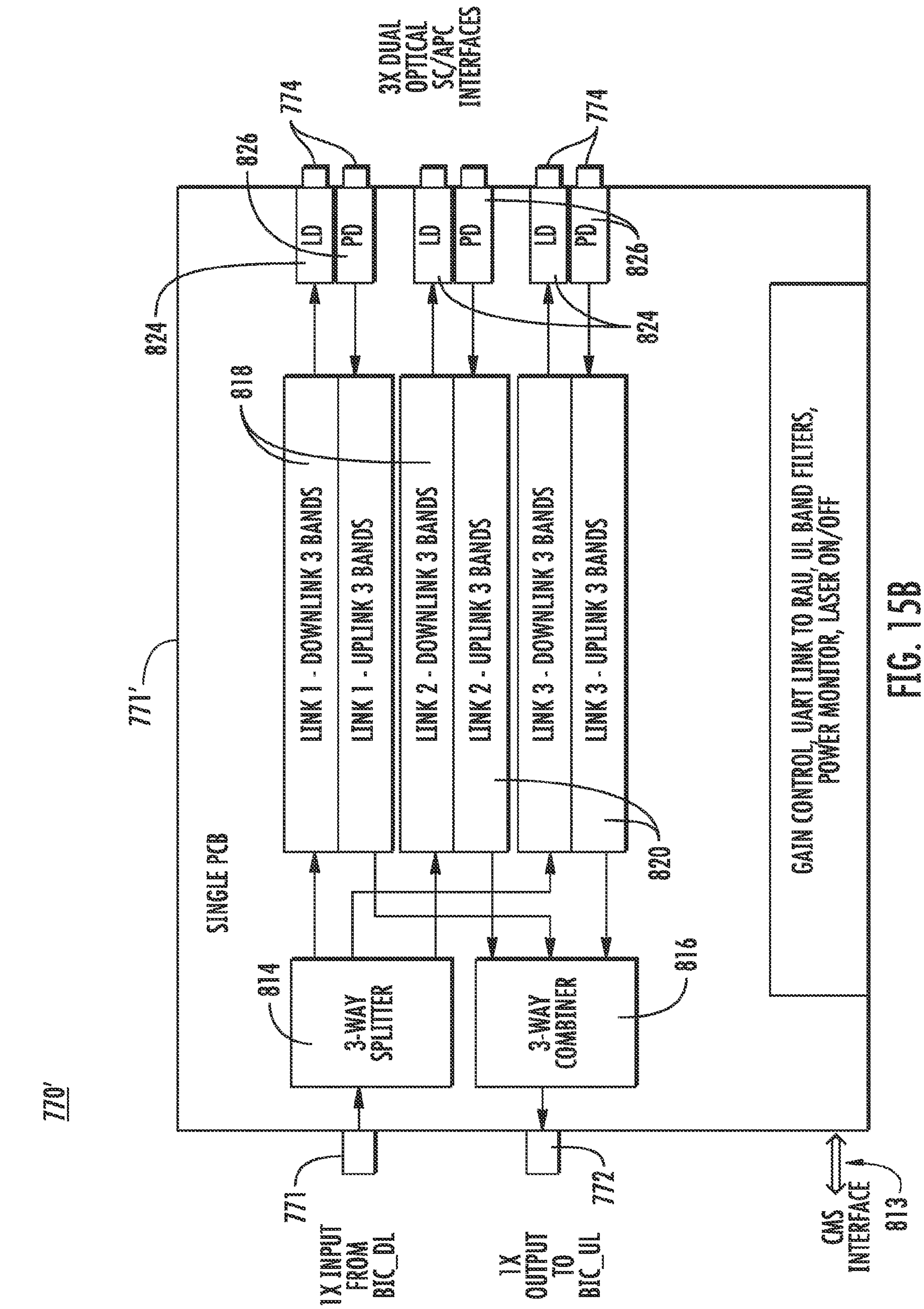
FIG. 15B is a schematic diagram of an alternative OIC which can be employed in the head-end unit of FIGS. 12A and 12B.

FIG. 15A is a schematic diagram of an OIM 770 comprised of an OIC 771 that supports up to six (6) RAUs 650 on a single printed circuit board (PCB). FIG. 15B illustrates an OIM 770' comprising an OIC 771' that supports up to three (3) RAUs 650 on a single PCB. Two OICs 771' may be packaged together in a common chassis (not shown) to provide the same function of the OIM 770 of FIG. 15A. The OIC 771' in FIG. 15B contains similar components to the OIC 771 and thus the OIC 770' will be discussed as equally applicable to the OIC 771' in FIG. 15B with common element numbers shared between the two. A computer management system (CMS) interface 813 is provided to connect the OIM 770 to a port on the mid-plane interface card 747 to connect the OIM 770 to the DL-BIC 754 and UL-BIC 756, as illustrated in FIG. 12B, as will be described in more detail below. The CMS interface 813 provides access to the internal bus that allows communication between the HEU 773 and DL-BIC 754, the UL-BIC 756, the OIMs 770 and RAUs 771 as will be described in more detail below.

Figure 16A:
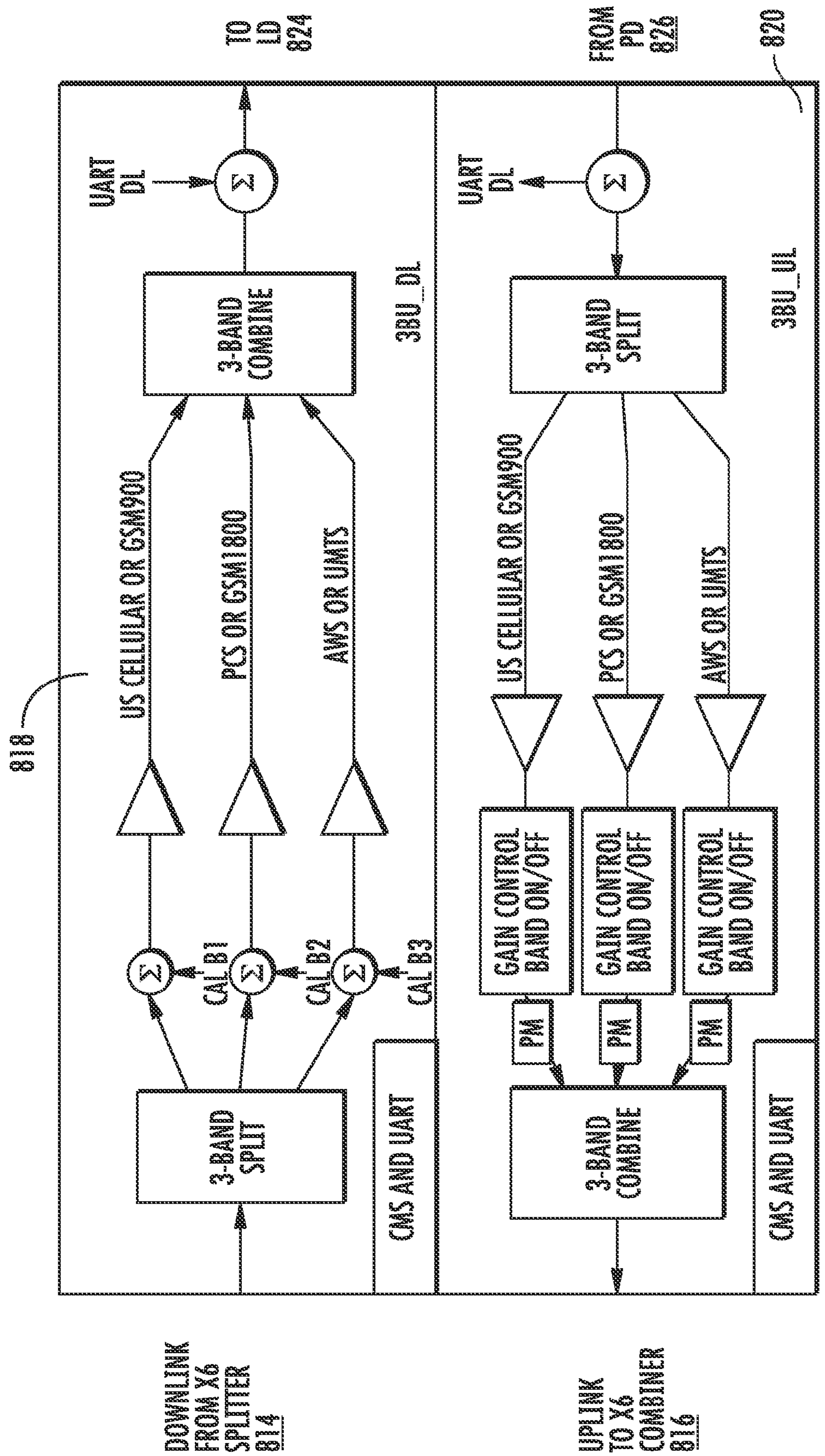
FIG. 16A is an another schematic diagram of the OIC of FIG. 15A and/or FIG. 15B.
Figure 16B:
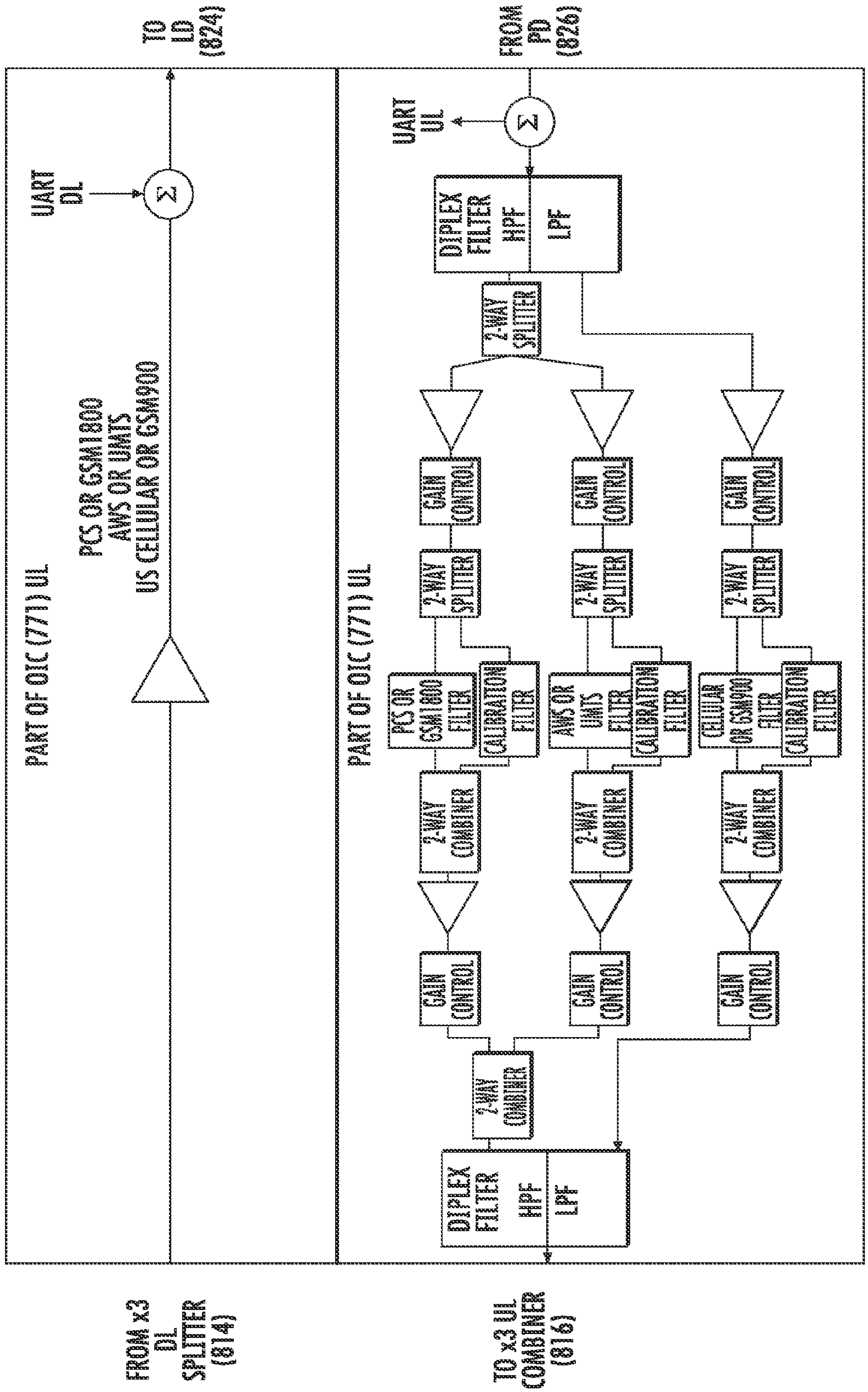
FIG. 16B is an another schematic diagram of the OIC of FIG. 15A and/or FIG. 15B.
Figure 17:
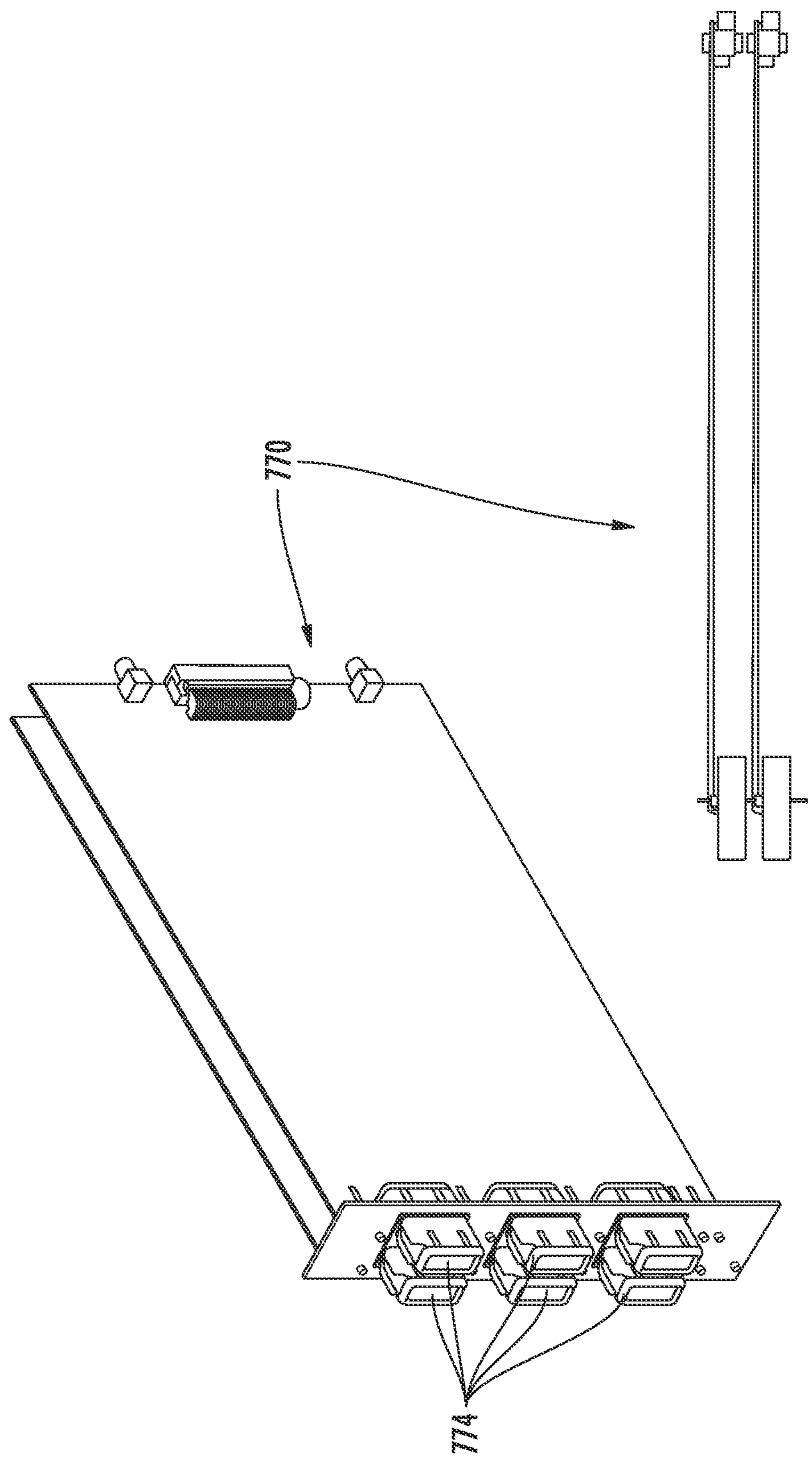
FIG. 17 illustrates perspective and end views of an exemplary optical interface module (OIM)

As illustrated in FIG. 15A, the OIC 770' comprises a six-way downlink splitter 814 electrically coupled to an uplink coaxial connection 771, a six-way uplink combiner 816 electrically coupled to a downlink coaxial connection 772, six downlinks 818, six uplinks 820, six E/O converters 824, six O/E converters 826, and connectors 774. As illustrated, each OIC 770' is designed to support at least six RAUs 650. The number of RAUs 650 can be varied, however, depending upon the particular application. In the illustrated embodiment, the connectors 774 are dual SC/APC interfaces. Referring also to FIG. 16A, the downlink splitter 814 divides an RF electrical downlink signal into multiple RF electrical signals, as desired, each being forwarded to a multi-band downlink 818, which filters the RF signal into a number of desired separate bands. If the optical fiber-based wireless system 600 is used to provide cell phone service alone, for example, the 3-band downlink 818 can be used. If the optical fiber-based wireless system 600 is to be used to support other and/or additional services, such as WiFi, LAN, etc., the HEU 610 can be adapted to accommodate the required bands. The filtered signals from each multi-band downlink 818 are forwarded to an E/O converter 824, each E/O converter 824 supporting a RAU 650. Each E/O converter 824 converts the filtered electrical RF signal into an optical signal for use by a RAU 650. The combiner 816 receives electrical downlink signals from multi-band downlinks 818, which in turn receive electrical signals from O/E converters 826. Each O/E converter 826 receives optical signals from a RAU 650 and converts it to an electrical signal. As shown in FIG. 16A, calibration signals B1, B2, B3 can be inserted into the RF paths of the three bands in the multi-band downlink 818. FIG. 17 shows a perspective and an end view of the OIM 770. FIG. 16B illustrates an alternative OIC 771 where the downlink splitter 814 does not spilt of the RF downlink signal into multiple bands.

Figure 18A:
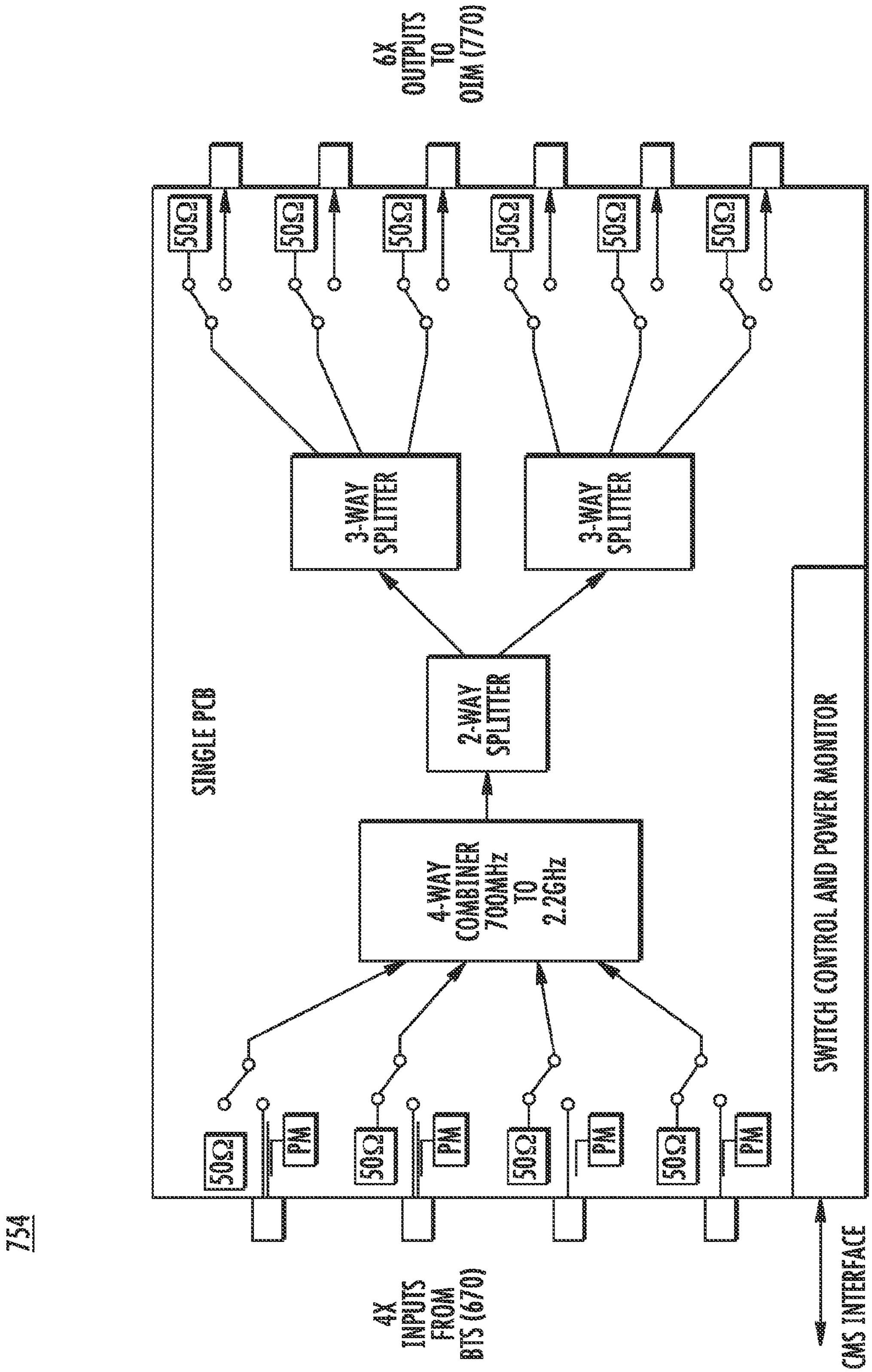
FIG. 18A is a schematic diagram of an exemplary downlink base transceiver station (BTS) interface card (BIC)
Figure 18B:
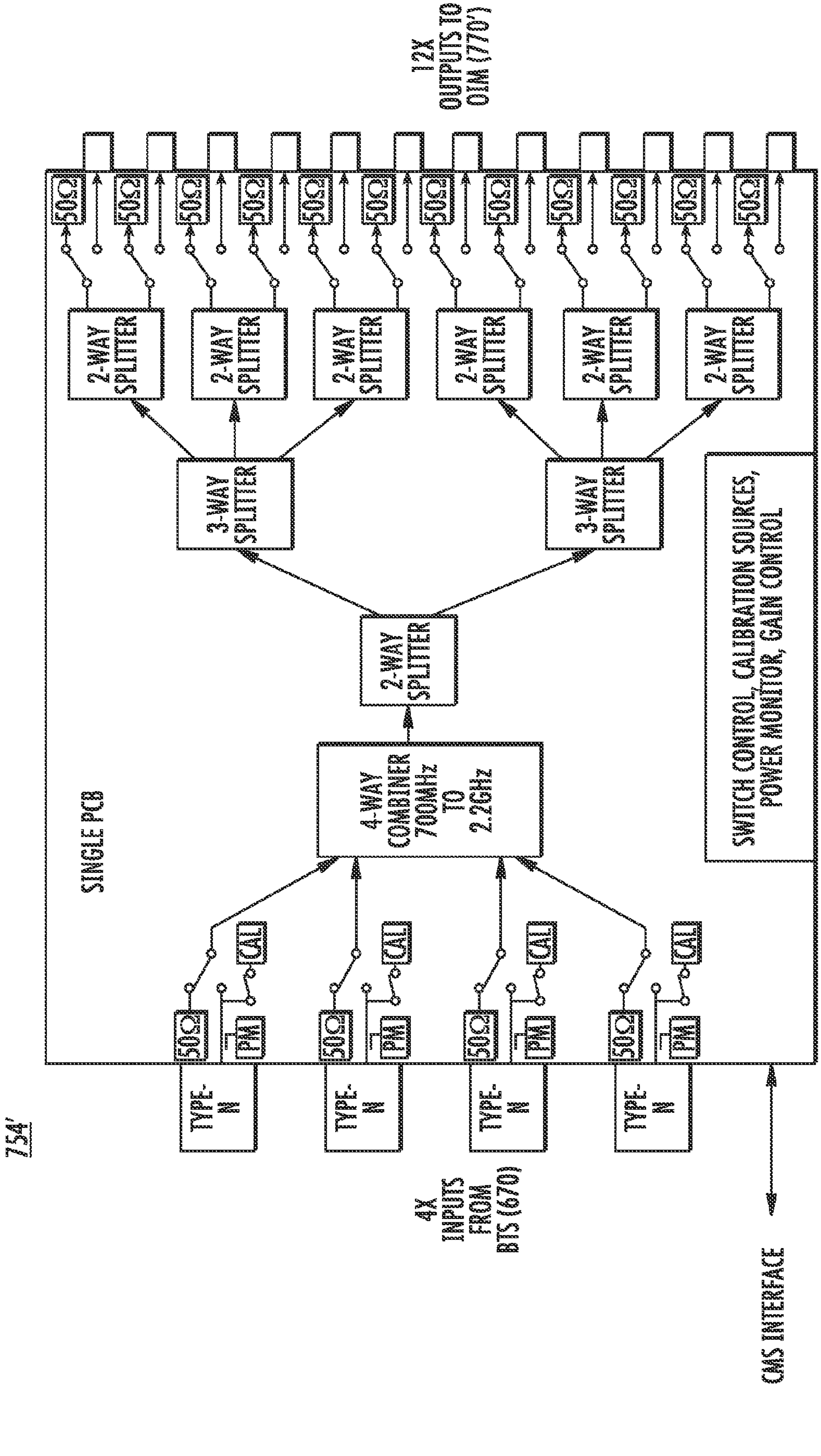
FIG. 18B is a schematic diagram of another exemplary downlink BIC.

FIG. 18A is a schematic diagram of the downlink BIC 754, which can comprise a single printed circuit board. FIG. 18B illustrates another downlink BIC 754, supporting up to twelve output to OIMs 770 instead of six outputs to OIMs 770 as provided in FIG. 18A. The downlink BIC 754 receives input signals from the BTS 670, combines the inputs, and then splits the combined signal into six outputs for use by the OIMs 770. Switching in the downlink BIC 754 can be controlled by the processing section 742 of the HEU 773 (see FIG. 12B). Further, as illustrated in FIGS. 18A and 18B, the ports of the downlink BIC 754 may be terminated when not in use by a resistor, which in this example is fifty (50) Ohms. Switches under software control may be provided that can be controllably switched to couple the resistor to the termination port when not in use. For example, termination may be desired when a port is not in use to minimize or eliminate reflections in the optical paths of the communication downlink.

Figure 19A:
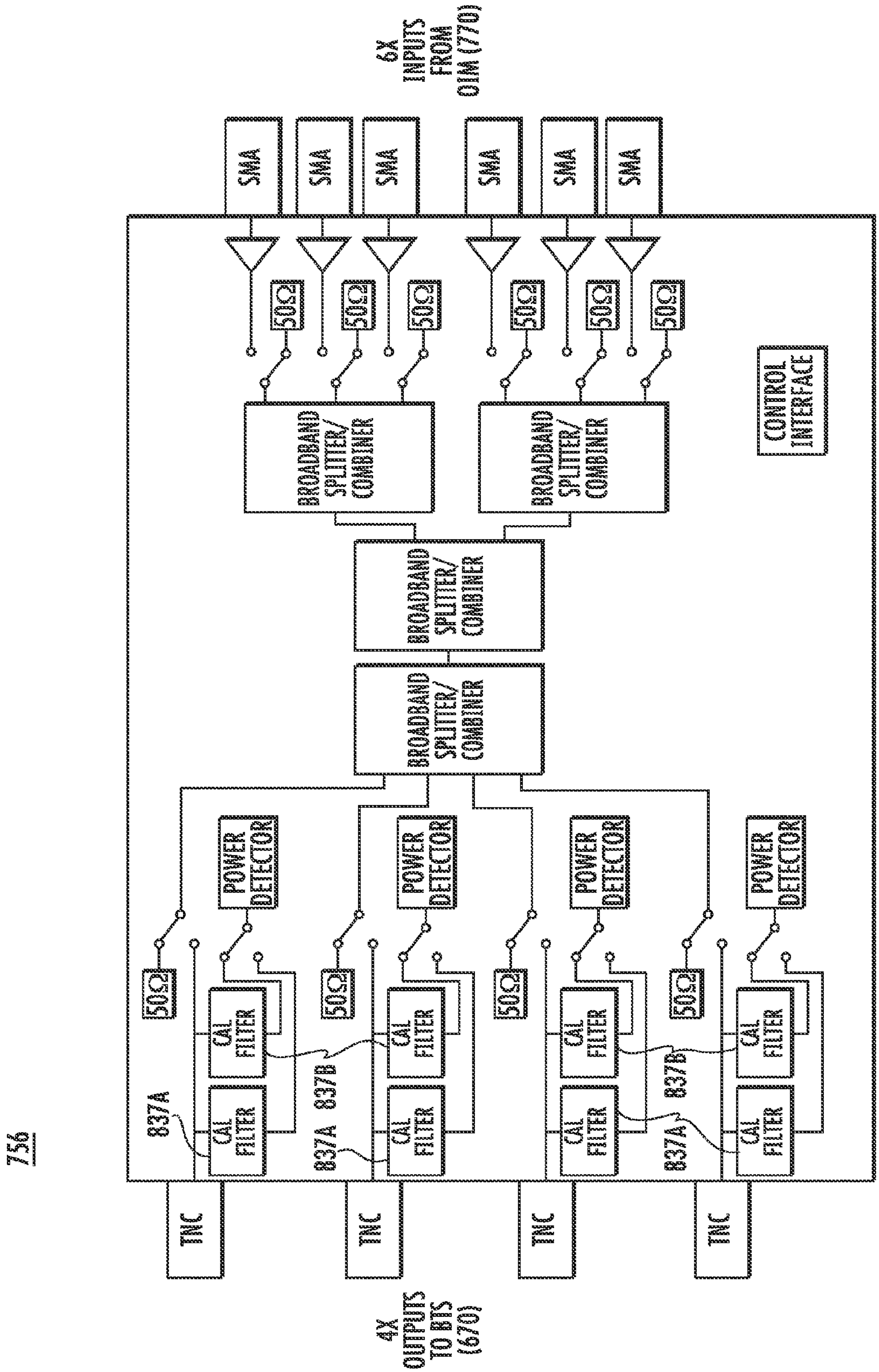
FIG. 19A is a schematic diagram of an exemplary downlink BIC uplink.
Figure 19B:
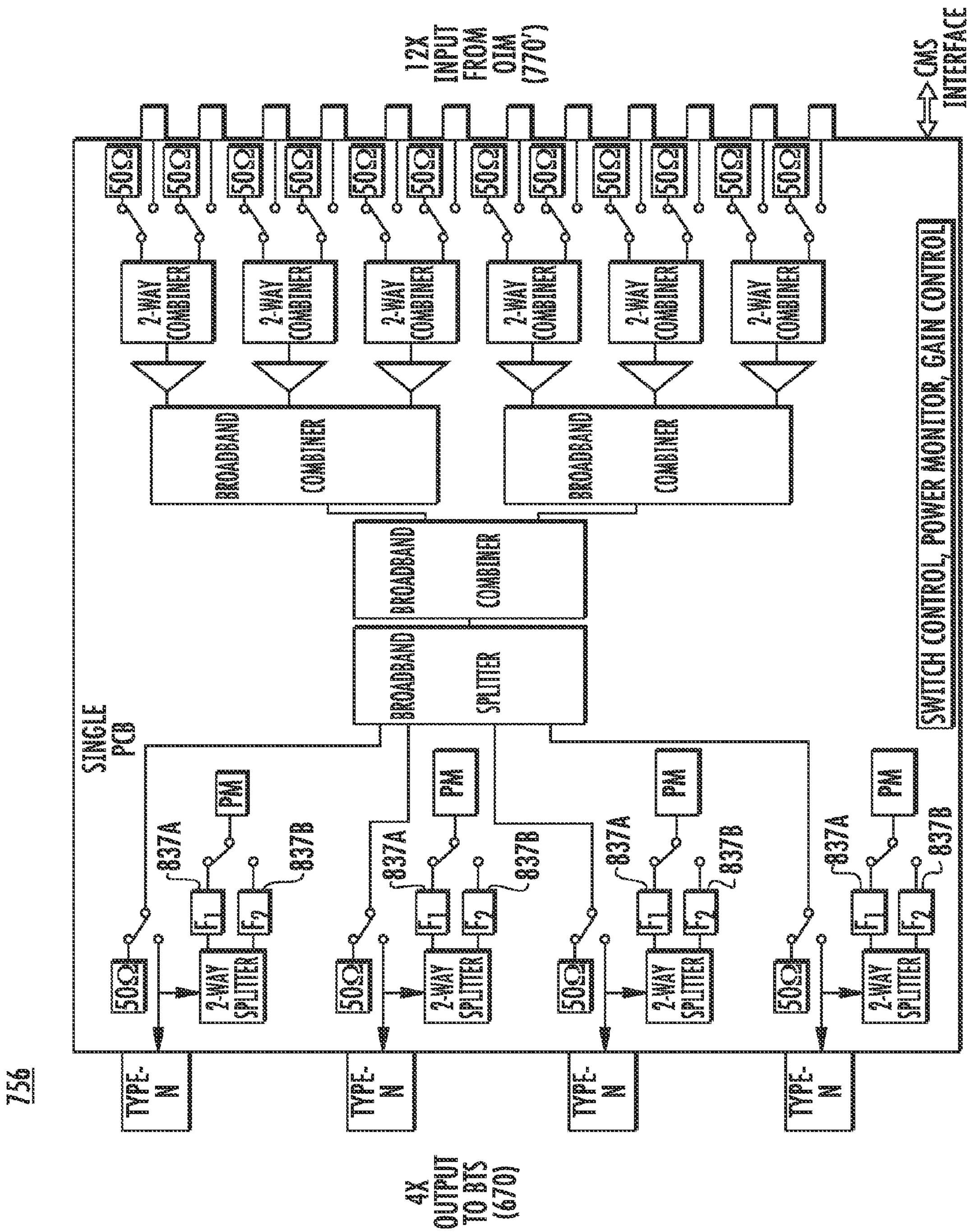
FIG. 19B is a schematic diagram of another exemplary downlink BIC uplink.

FIG. 19A is a schematic diagram of the uplink BIC 756, which can comprise a single printed circuit board. The uplink BIC 756 combines the electrical output signals from up to six (6) OIMs 770 and generates four output signals to the BTS 670. Two calibration filters 837A, 837B are provided for each output signal to the BTS 670 to filter out each of the two frequencies employed for the calibration signal from the output signal in this embodiment, as will be described in more detail below. FIG. 19B is a schematic diagram of the uplink BIC 756, which can comprise a single printed circuit board. The uplink BIC 756 combines the electrical output signals from up to twelve (12) OIMs 770 and generates four output signals to the BTS 670. Further, as illustrated in FIGS. 19A and 19B, the ports of the uplink BIC 756 may also be terminated when not in use by a resistor, which in this example is fifty (50) Ohms. Switches under software control may be provided that can be controllably switched to couple the resistor to the termination port when not in use. For example, termination may be desired when a port is not in use to minimize or eliminate reflections in the optical paths of the communication downlink.

Figure 20:
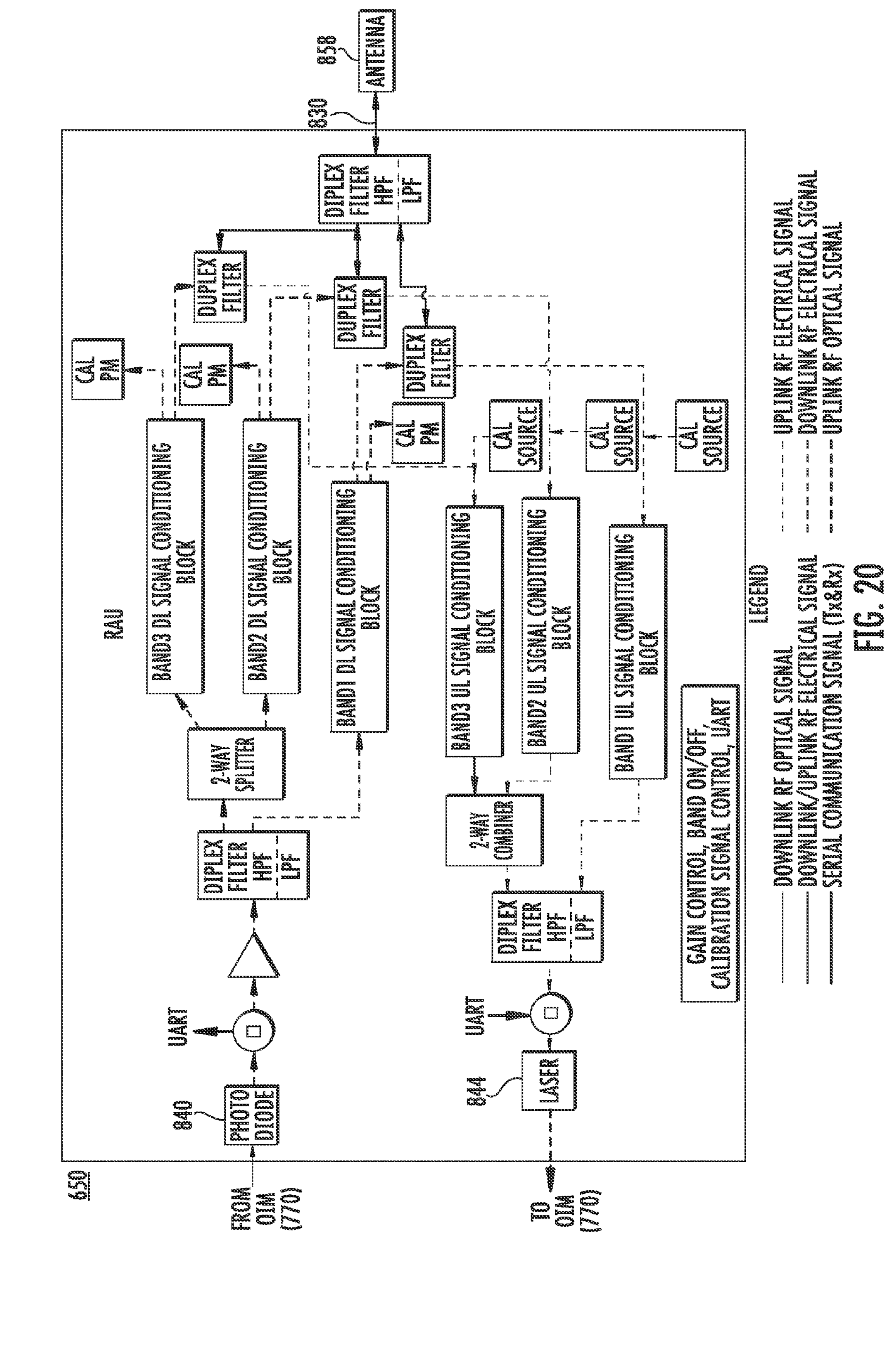
FIG. 20 is a schematic diagram of an exemplary remote unit which provides remotely located endpoints for service signal distribution for the wireless picocellular system of FIG. 8.
Figure 21:
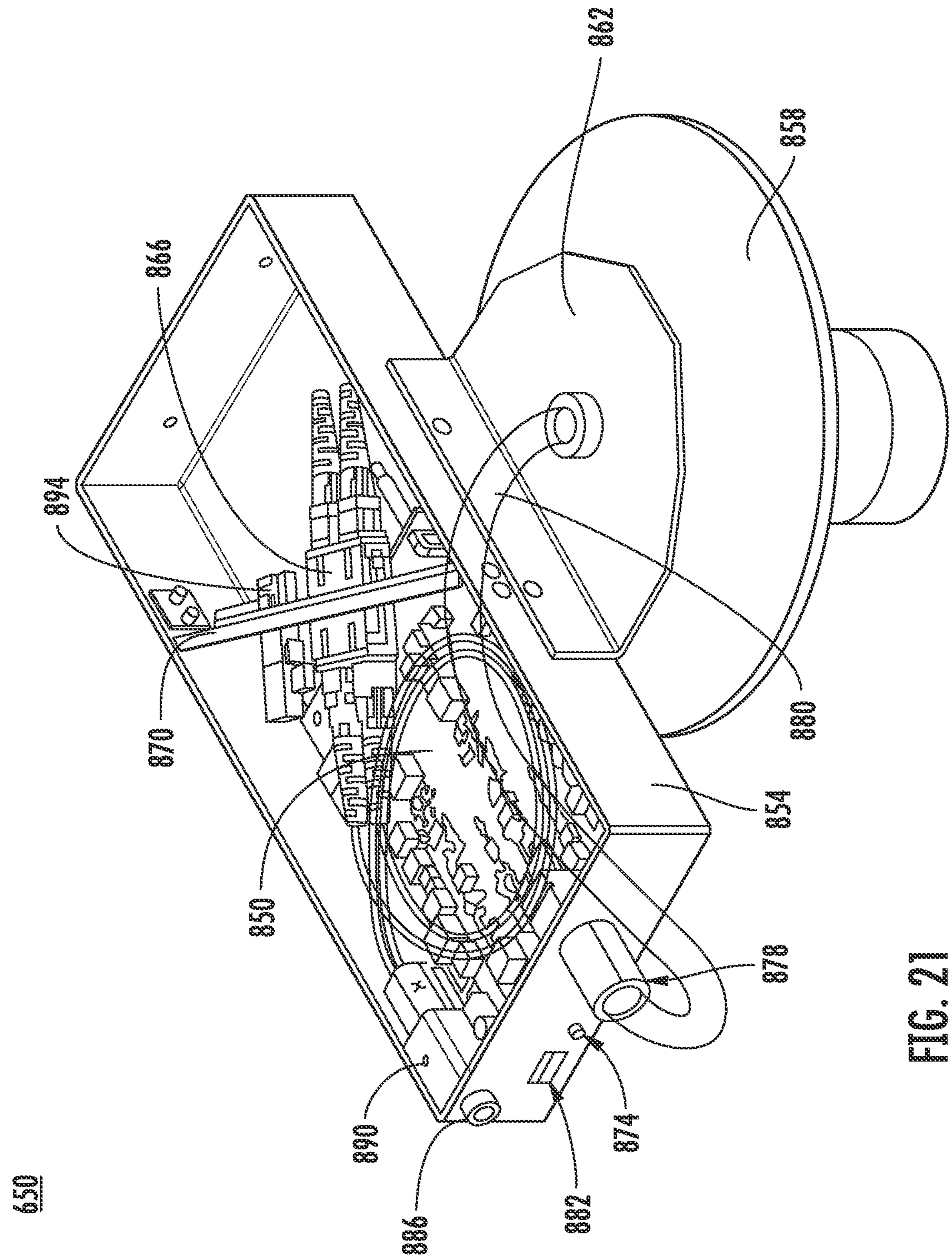
FIG. 21 is a perspective view of an exemplary remote unit with the cover of the remote unit omitted to show the interior of the remote unit.
Figure 22:
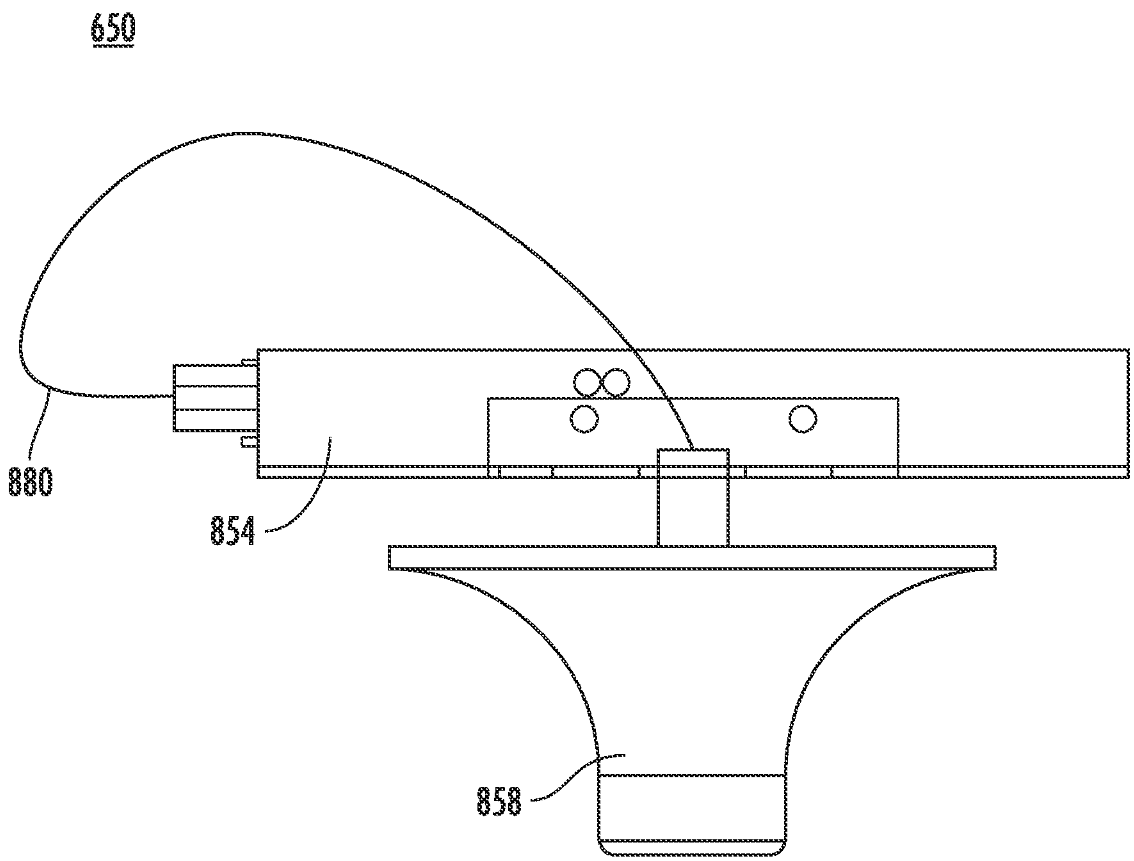
FIG. 22 is a side view of the exemplary remote unit of FIG. 21.

FIG. 20 is a schematic diagram of a RAU 650. The RAUs 650 are the remotely located endpoints for service signal distribution in the optical fiber-based wireless system's 600 service area. The RAUs 650 provide signal conditioning such that client devices can operate as if they were communicating with a BTS 670 directly. The illustrated RAU 650 includes a connector 830 that interfaces with an antenna system (shown in FIGS. 21 and 22). In an example embodiment, the antenna system 858 includes one or more patch antennas, such as disclosed in the previously incorporated U.S. patent application Ser. No. 11/504,999. The RAU 650 interfaces to the HEU 610 via optical fibers in the optical fiber cables 644 that provide the conduit for radio, control signals, etc. and interfaces with the client device via radio signals. The RAU 650 receives downlink signals conveyed by the optical fiber cable 644 sent from a HEU 610, where an O/E converter 840 converts the optical signal to an RF electrical signal. An E/O converter 844 converts RF uplink data into an optical signal forwarded to a HEU 610.

The functions that the RAU 650 may perform include setting the output power or gain of the downlink signals, providing signal conditioning for the uplink to properly interface radio signals to the optical conversion module, and providing status information back to a HEU 610. The signal on the optical link can be broadband containing the bands of signals supported by the optical fiber-based wireless system 600. The RAU 650 splits these signals in three and routes them to separate band-limited circuits. For each band, the signal path consists of amplifiers, filters and attenuators that adjust the signal to the proper level at the antenna 858 for transmission. The minimum gain of the signal path may be determined from the maximum output power that can be transmitted (+14 dBm) and from a minimum desired input power for the multi-band downlink 818. For example, to transmit at a level of +14 dBm (composite total across the band) Code Division Multiple Access (CDMA) signal formats (which have peak to average power ratios of 10 dB), the output stage of the downlink signal must have a one dB compression point of +24 dBm. The output of the amplifier goes through a duplexor that combines the bands before it is transmitted.

The downlink circuitry may have the ability to be turned on or off based upon the user setup for the optical fiber-based wireless system 600. It may be desired to turn off unused circuits, for example, for power conservation and to also reduce the possibility of interference or crosstalk between the other frequency bands. The downlink also detects and measures the calibration signals B1, B2, B3 generated by the multi-band downlink 818 (FIG. 16A). The calibration signals B1, B2, B3 are used to calculate the loss of the optical path and also to calculate the downlink gain. These two measurements are used to control the overall signal gain/output power from the BTS 670 to the antenna 858 of the RAU 650. All of the downlink individual band signals are combined and interfaced to the antenna 858. The duplexer combines the three downlink bands as well as interfaces the antenna to the uplink amplifiers.

The downlink circuitry carries RF communication signals to the E/O converter 824 to be communicated to the RAU 650 and to client devices wireless communicating with the RAUs 650. The uplink circuitry conditions signals received at the antenna 858 from client devices and converts them to optical signals for transmission to the OIM 770 via the optical fiber cables 644. The uplink circuitry provides gain for the signal prior to the optical conversion, injects the calibration signal for calculation of the uplink gain, and inserts the data communications signal. The amount of gain for the uplink amplifiers is set from the requirement for the maximum input signal received by the antenna 858, and also by the maximum signal level that can be input into the transmitting optical subassembly. The RAU 650 can communicate with the OIM 770 to pass status information to the OIM 770 and to receive operational and configuration information from the RAU 650. An amplitude-modulated signal can be combined with radio signals to allow communications between the RAU 650 and the OIM 770. Simple On/Off keying of the frequency source should provide a low cost and sufficient solution. The carrier frequency is 10.7 MHz using a standard RS-232 protocol. The FIGS. 21 and 22, respectively, are a perspective view and a side view of a RAU 650 with the cover of the unit omitted to show the unit interior. The RAU 650 includes a printed circuit board 850 that can support the unit's circuit components, a protective housing 854, and an antenna 858 mounted on a bracket 862. An SC duplex adapter 866 mounted on a bracket 870 provides optical connectivity. A visual indicator 874 such as a light-emitting diode (LED) can be provided to indicate when the RAU 650 is in operation. An RF N-type connector 878 provides RF connectivity between the RAU 650 and the antenna 858. A universal serial bus (USB) port 882 provides connectivity between the printed circuit board 850 and a computer user interface (not shown). An entry point 886 allows for entry of optical and power cables in the unit and a furcation mount 890 provides a mechanical mounting bracket for optical and/or power cable furcation. A power connector 894 connects the cable electrical conductor to the printed circuit board 850.

According to the above embodiments, a variety of wireless services may be provided to a coverage area. Optical signals are used to transmit data to the RAUs 650, which allows the RAUs 650 to operate using a relatively low voltage source. A low operating voltage of 48V or less, for example, avoids many of the more onerous requirements of the National Electrical Code. The optical fiber-based wireless system 600 provides the advantage of modularity in that the RAUs 650 can be selected to have a number of differing functionalities, with the HEUs 610 also being capable of multiple functionalities, such as varying operating bands. The exemplary optical fiber-based wireless system 600 is described as supporting three bands to support a variety of services for the coverage area of the optical fiber-based wireless system 600. The optical fiber-based wireless system 600 can be adapted, however, to support additional frequency bands. The RAUs 650 can be placed selectively in the coverage area to ensure a good signal at each subscriber location. After the passive cabling has been deployed, client devices can be added at any time. Frequency bands can also be added or changed after initial deployment to support capacities such as 3G, cellular, WIMAX, LTE, retail, healthcare applications, RFID tracking, WiFi, and other capabilities.

An optical fiber-based wireless system 600 as illustrated in FIGS. 11A-22 is capable of operating in one or more of the following bands (MHz) on downlink in this embodiment: 869-894 (US Cellular), 1930-1990 (US PCS), 2110-2155 (US AWS), 925-960 (GSM 900), 1805-1880 (GSM 1800), and 2110-2170 (GSM 2100). The optical fiber-based wireless system 600 is capable of operating in one or more of the following bands (MHz) on uplink in this embodiment: 824-849 (US Cellular), 1850-1910 (US PCS), 1710-1755 (US AWS), 880-915 (GSM 900), 1710-1785 (GSM 1800), 1920-1908 (GSM 2100). Input power to the HEU 610 is between 110-220 VAC, 350 W in this embodiment. The input power to the RAUs 650 is about 48 VDC in this embodiment.

To provide flexibility in installing, operating, and maintaining an optical fiber-based wireless system, microprocessors that execute software of firmware (referred to collectively herein as "software") can be employed in such systems and their components to provide certain functionalities. Such optical fiber-based wireless systems can include the optical fiber-based wireless system 100, 200, 400, and 600 previously described. Software provides flexibility in system operation and communication between various components of an optical fiber-based wireless system for a variety of purposes and functionality, as will be described in more detail below.

Figure 23:
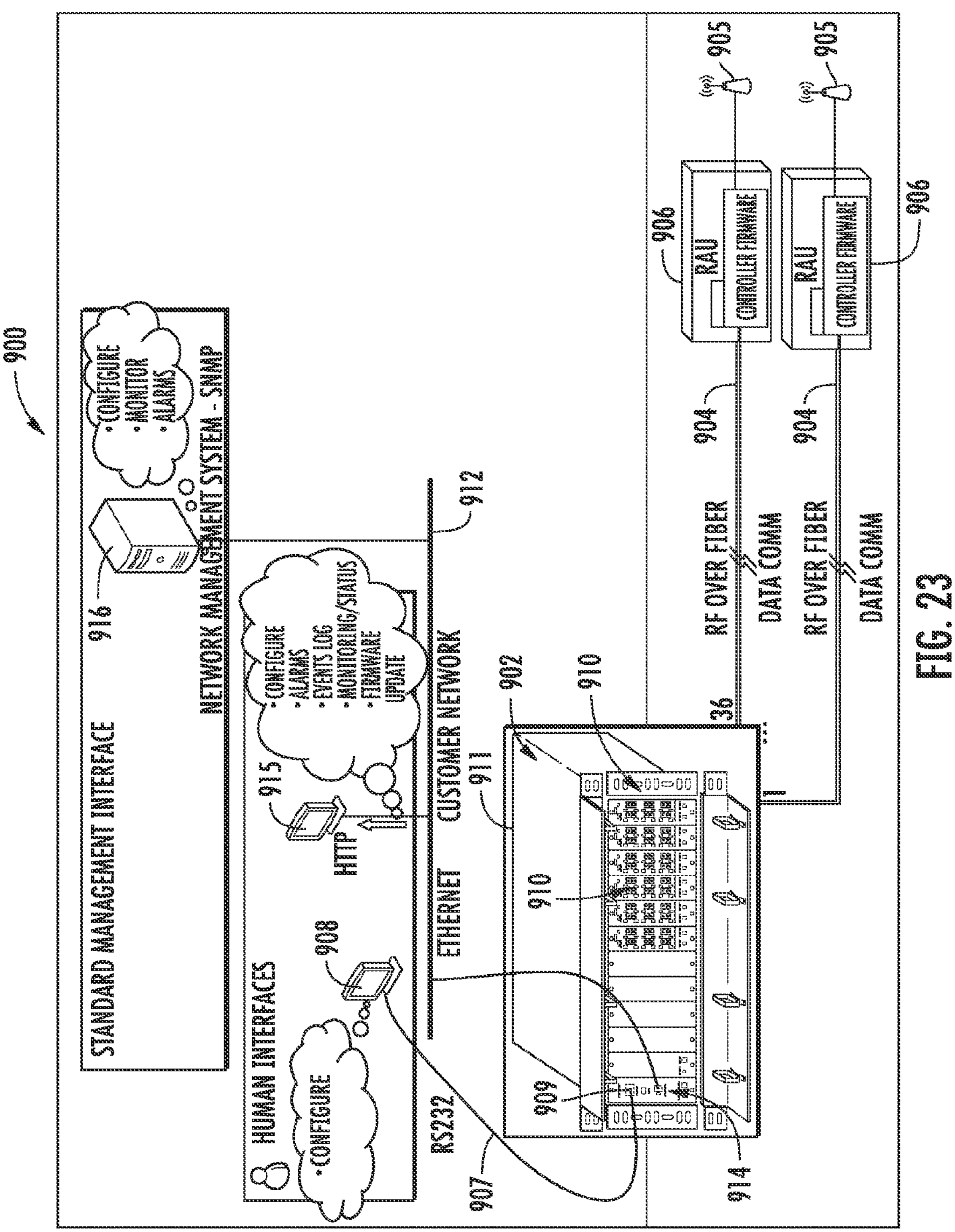
FIG. 23 is a schematic diagram of another exemplary optical fiber-based wireless system that includes components employing microprocessors executing software to provide certain access and functionalities.

For example, as illustrated in FIG. 23, another exemplary optical fiber-based wireless system 900 is illustrated. A head-end unit (HEU) 902 is provided that includes software executing on one or more microprocessors or microcontrollers. As will be described in more detail below, the microprocessor/microcontroller included in the HEU 902 is a distinct system from the RF components in the HEU 902. Thus, the microprocessor/microcontroller included in the HEU 902 can operate even if the RF components are not operational, and vice versa. This allows the microprocessor/microcontroller included in the HEU 902 to operate to perform various functions, including monitoring and generating alarms and logs, as will be discussed in more detail below, without interrupting the RF signals communicated in the optical fiber-based wireless system. This provides an advantage of being able to power-down, reboot, troubleshoot, and/or load or reload software into the HEU 902 without interrupting RF communications. Further, because the microprocessor/microcontroller included in the HEU 902 is distinct from RF communications, swapping in and out RF-based modules is possible without interrupting or requiring the microprocessor/microcontroller included in the HEU 902 to be disabled or powered-down. The microprocessor/microcontroller included in the HEU 902 can continue to perform operations for other RF-based modules that have not been removed while other RF-based module(s) can be removed and replaced.

The HEU 902 also includes downlink and uplink BICs 903 that receive and transmit RF carrier signals, respectively, to and from one or more RAUs (RAUs) 906 via optical fiber links, as previously discussed. The downlink and uplink BICs (not shown) in the HEU 902 also contain one or more microprocessors or microcontrollers that execute software for performance in this embodiment, as will be described in more detail below. The RAUs 906 are interfaced to the HEU 902 via OIMs 910 as previously discussed to transport Radio-over-Fiber (RoF) communication signals (or "optical RF signals") between the BICs 903 and the RAUs 906 over the optical fiber links 904, as previously discussed. The OIMs 910 in this embodiment also contain one or more microprocessors executing software, as will be described in more detail below. The RAUs 906 include optical-to-electrical converters (not shown) to convert received RoF signals from the OIMs 910 into RF signals that are radiated via antennas 905 connected to the RAUs 906. The RAUs 906 also each contain one or more microprocessors that execute software, as will be described in more detail below. More detail regarding the components of the optical fiber-based wireless system 900 and their operability is discussed in more detail below with regard to FIGS. 25-54.

With continuing reference to FIG. 23, by providing microprocessors or microcontrollers executing software in the components of the optical fiber-based wireless system 900, and more particularly the HEU 902, software-based interfaces to the optical fiber-based wireless system 900 can be provided. Interfacing to the optical fiber-based wireless system 900 can allow flexibility in configuring and monitoring the optical fiber-based wireless system 900, as will be described by example in more detail below. For example, the HEU 902 in FIG. 23 can be configured to provide a direct connection interface 907 to a local client 908 via a local access port 909, which may be a serial port for example. The local access port 909 may be communicatively coupled to components in the HEU 902 via a midplane interface card provided in a chassis 911 housing the HEU 902, as an example. The local client 908 may be a human interface that is provided by a computer or terminal as an example. The direct connection interface 907 may be provided according to any type of physical connector (e.g., USB) and protocol desired (e.g., RS-232).

Figure 24:
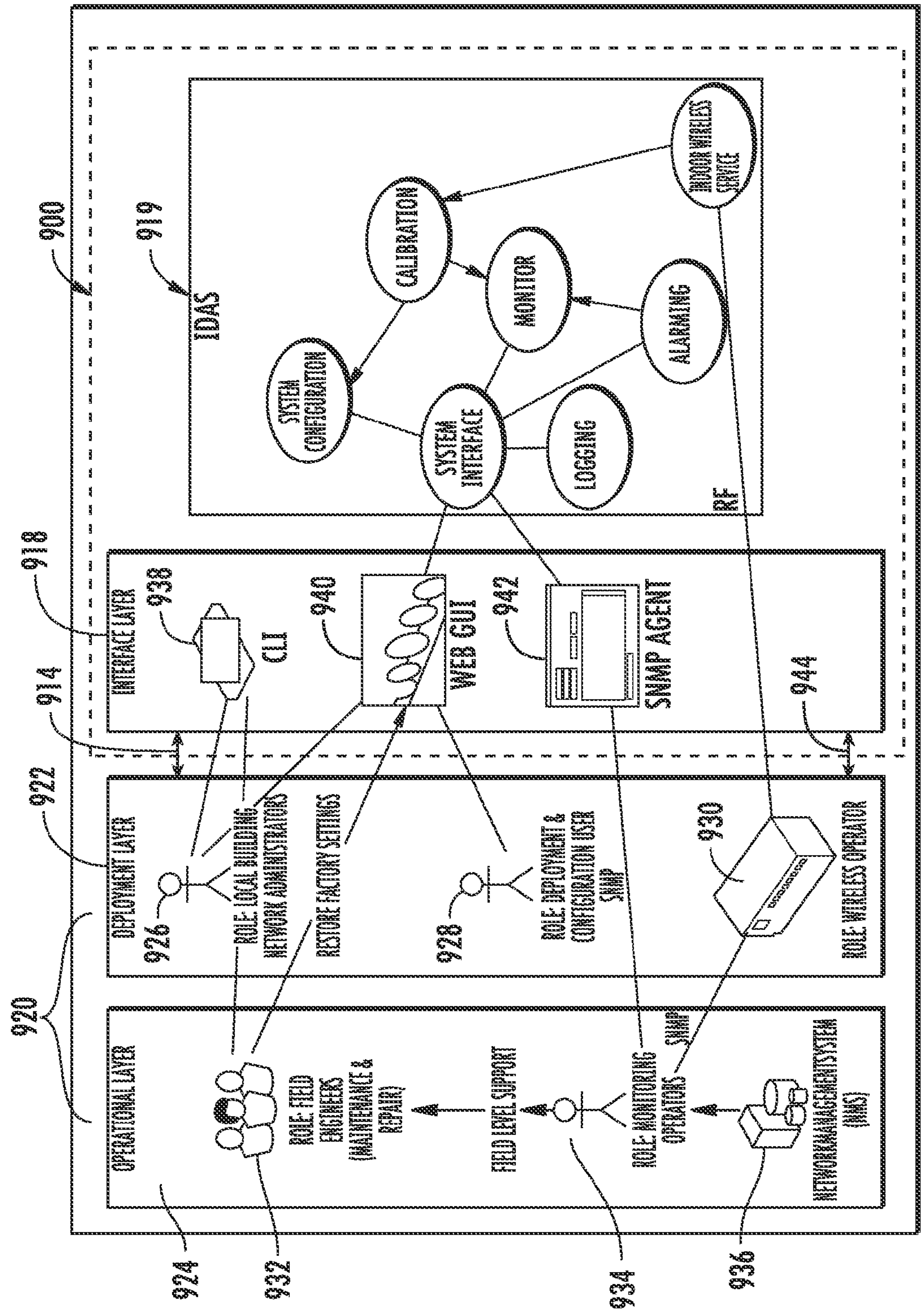
FIG. 24 is a schematic diagram of the optical fiber-based wireless system of FIG. 23 illustrating an interface layer and exemplary clients accessing the optical fiber-based wireless system via the interface layer.

As also illustrated in FIGS. 23 and 24, the HEU 902 can also be configured to interface over one or more networks 912 to provide remote access to functionalities configured to be provided by the optical fiber-based wireless system 900 over the network 912, including the HEU 902 and its components and the RAUs 906. Network interfaces also facilitate remote access to the optical fiber-based wireless system 900. Remote access and functionalities may include the ability to configure, monitor status, receive and view alarms and event logs, and update software for the optical fiber-based wireless system 900 and its components, as will be described in more detail below. These various functionalities and remote access are included in communication operations that can be performed by the HEU 902. One or more network interface cards or boards 914 may be provided in the chassis 911 of the HEU 902 to communicatively couple components of the optical fiber-based wireless system 900 to the network 912. As examples, the network 912 may include an Ethernet physical connection. The HEU 902 may include an Ethernet board to facilitate connection to the network 912 and to other HEUs 902, as will be described in more detail below.

As illustrated in FIG. 24, the HEU 902 may include an interface layer 918 that handles communication responses and requests regarding the optical fiber-based wireless system 900 and its components and services 919 that will be described in further detail below, to and from clients 920 over the network 914. Clients 920 may include deployment clients 922 that access the optical fiber-based wireless system 900 during deployment and operational clients 924 that access the optical fiber-based wireless system 900 during operation. The clients 920 may be human clients or other systems. Examples of deployment clients 922 include administrators 926, users 928, and wireless operators 930. Examples of operational clients 924 include engineers 932, monitoring operators 934, and network management systems 936.

The communication services provided by the interface layer 918 to the clients 920 may be provided according to any communication interface and protocol desired. As illustrated in FIG. 24, examples include a command line interface module 938, a hypertext transfer protocol (HTTP) interface module 940, and/or a Machine Interface (MI) protocol interface module 942 may be provided in the interface layer 918 to provide simultaneous client interfacing for clients 920 the optical fiber-based wireless system 900. The interface modules 938, 940, 942 may be designed so that software specific to the optical fiber-based wireless system 900 may not be required to be installed on the clients 920. In this embodiment, the command line interface module 938 facilitates interfacing with a serial emulator client using any terminal emulation software installed on a client 920 (e.g., Telnet, HyperTerm, etc.) The command line interface module 938 allows a client 920 to configure the HEU 902, including the ability to configure either a static or dynamic internet protocol (IP) address for network communications.

The HTTP interface module 940 facilitates interfacing with web browser clients executing a web browser (e.g., Internet Explorer®, Firefox®, Chrome®, and Safari® browsers, etc.). The MI interface module 942 facilitates interfacing with an MI client through an MI protocol. An example of an MI protocol is Simple Network Management Protocol (SNMP). In this example, the MI protocol interface 942 could be an SNMP agent. Certain features may be exclusively accessible through certain interface modules 938, 940, 942. More detail regarding the interface layer 918 and accessing of the optical fiber-based wireless system 900 via the interface layer 918 and the services 919 provided by the optical fiber-based wireless system 900, including through the interface layer 918, are described in more detail below.

Figure 25A:
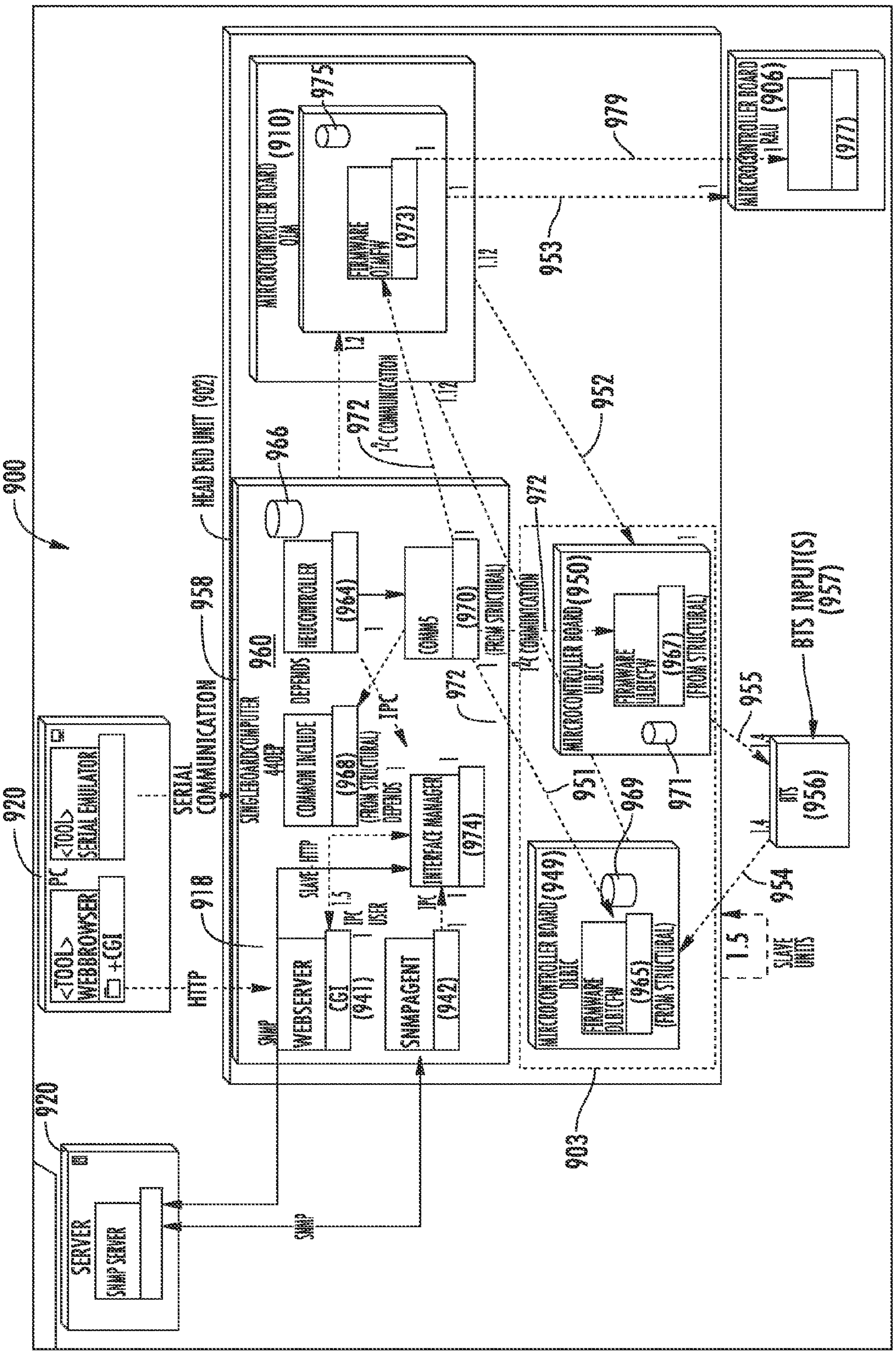
FIG. 25A is a schematic diagram of an exemplary microprocessor and software deployment diagram of the optical fiber-based wireless system of FIG. 23 and external components that can interface with the optical fiber-based wireless system.

Before discussing the various features and functions provided by the optical fiber-based wireless system 900 and the HEU 902 in this embodiment via software-based applications executing on microprocessors, an exemplary hardware and software deployment diagram of the optical fiber-based wireless system 900 and external components is first discussed. In this regard, FIG. 25A is a schematic diagram illustrating an exemplary microprocessor and software deployment diagram of the optical fiber-based wireless system 900 and external components that can interface to the optical fiber-based wireless system 900. More particularly, the diagram in FIG. 25A illustrates the various microprocessors or microcontrollers provided in the HEU 902, including the BICs 903, the OIMs 910, and the RAUs 906 to facilitate a discussion of the microprocessor and software-based features and controls of the optical fiber-based wireless system 900. As illustrated in FIG. 25A and previously discussed, RF-based modules that include a downlink BIC 949 and an uplink BIC 950 are coupled to the OIMs 910 via RF links 951, 952 to send and receive RF electrical signals to the OIMs 910, which are communicated as RoF signals over RoF links 953 to and from the RAUs 906. The downlink BIC 949 and the uplink BIC 950 are coupled via RF links 954, 955, respectively, to a BTS 956 to receive and provide RF carrier signals. In this embodiment, up to twelve (12) OIMs 910 can be provided in the HEU 902 and interfaced to the downlink BIC 949 and uplink BIC 950.

As illustrated in FIG. 25A, the HEU 902 in this embodiment includes a single board HEU controller 958. The HEU controller 958 includes an HEU microprocessor 960 in this embodiment that executes an operating system and application software to perform various features and functions, as will be described in more detail below. These various features and functions are provided by the HEU controller 958 carrying out communication operations as will be described in more detail below. In this embodiment, the HEU controller 958 can be provided as a general purpose commercially available computer board or a customer design computer board and may be provided on a single PCB. One example of a commercially available computer board that may be employed is manufactured by EmbeddedPlanet. The HEU microprocessor 960 can be the 440EP™ microprocessor in this embodiment. The HEU microprocessor 960 is configured to and executes the Linux® operating system in this embodiment; however, any other operating system desired could be employed. The application software and operating system reside in memory or datastore 966 (e.g., Flash, EEPROM, RAM, etc.) provided as part of the HEU controller 958. The application software provided in this embodiment is specific to the optical fiber-based wireless system 900.

The HEU controller 958 includes several software components or modules that provide the features and functionality of the HEU 902 and optical fiber-based wireless system 900, as will be described in more detail below. As illustrated in FIG. 25A, the HEU controller 958 includes a HEU controller software module 964 that provides the application software that controls the overall process and features and functions carried out by the HEU microprocessor 960 in the HEU controller 958 for the HEU 902. The HEU microprocessor 960 executes the HEU controller software module 964 along with other processes in a multi-threaded system. The HEU controller software module 964 is stored in datastore 966 and retrieved by the HEU microprocessor 960 during execution as one process. In this embodiment, the HEU controller software module 964 is configured to call upon a common module (COMMON_INCLUDE) 968 that contains a library of software functions used to assist carrying out various features and functions of the HEU controller software module 964. For example, the common module 968 may contain a dynamically linked library (DLL) of software functions. The common module 968 can include software functions that interface with the different hardware components in the HEU 902 via $I^2C$ communications in this embodiment.

The HEU controller 958 in this embodiment also includes a communications module (COMMS) 970 that contains the communications layer for the HEU controller software module 964. The HEU controller software module 964 initiates the communications module 970 to communicate with the other modules and components of the HEU 902, including the downlink and uplink BICs 949, 950 and the OIMs 910, to carry out features and functionalities in the optical fiber-based wireless system 900. During initialization, the software in the communications module 970 dynamically links HEU controller software module 964. In this manner, the communications layer provided in the communications module 970 is abstracted from the HEU controller software module 964 to provide flexibility for updating or altering the communications layers in the HEU 902 without requiring updating of the HEU controller software module 964.

In this embodiment, the communications module 970 communicates to the downlink and uplink BICs 949, 950 and the OIMs 910 via addressable messages communicated over an $I^2C$ communication bus 972, as illustrated in FIG. 25A. The $I^2C$ communication bus 972 may have a designed bus speed, such as 100 kHz as a non-limiting example. In this manner, the downlink and uplink BICs 949, 950 and the OIMs 910 are individually addressable in the HEU 902 over the $I^2C$ communication bus 972. Other types of communication buses could be employed. The communications to the downlink and uplink BICs 949, 950 and the OIMs 910 are independent of the RF communications involving these modules. Thus, RF communications are not interrupted if the communications module 970, the HEU controller 958, or other software or processes executed by the HEU controller 958 are not operational. This provides an advantage of the RF communications not being dependent on the operation of the HEU controller 958 in case of failure. Further, this allows the HEU controller 958 or its software to be upgraded, rebooted, powered down, replaced, repaired, etc. without interrupting RF communications in the system 900. This may also be advantageous if Quality of Service (QoS) requirements are stringent.

Figure 26:
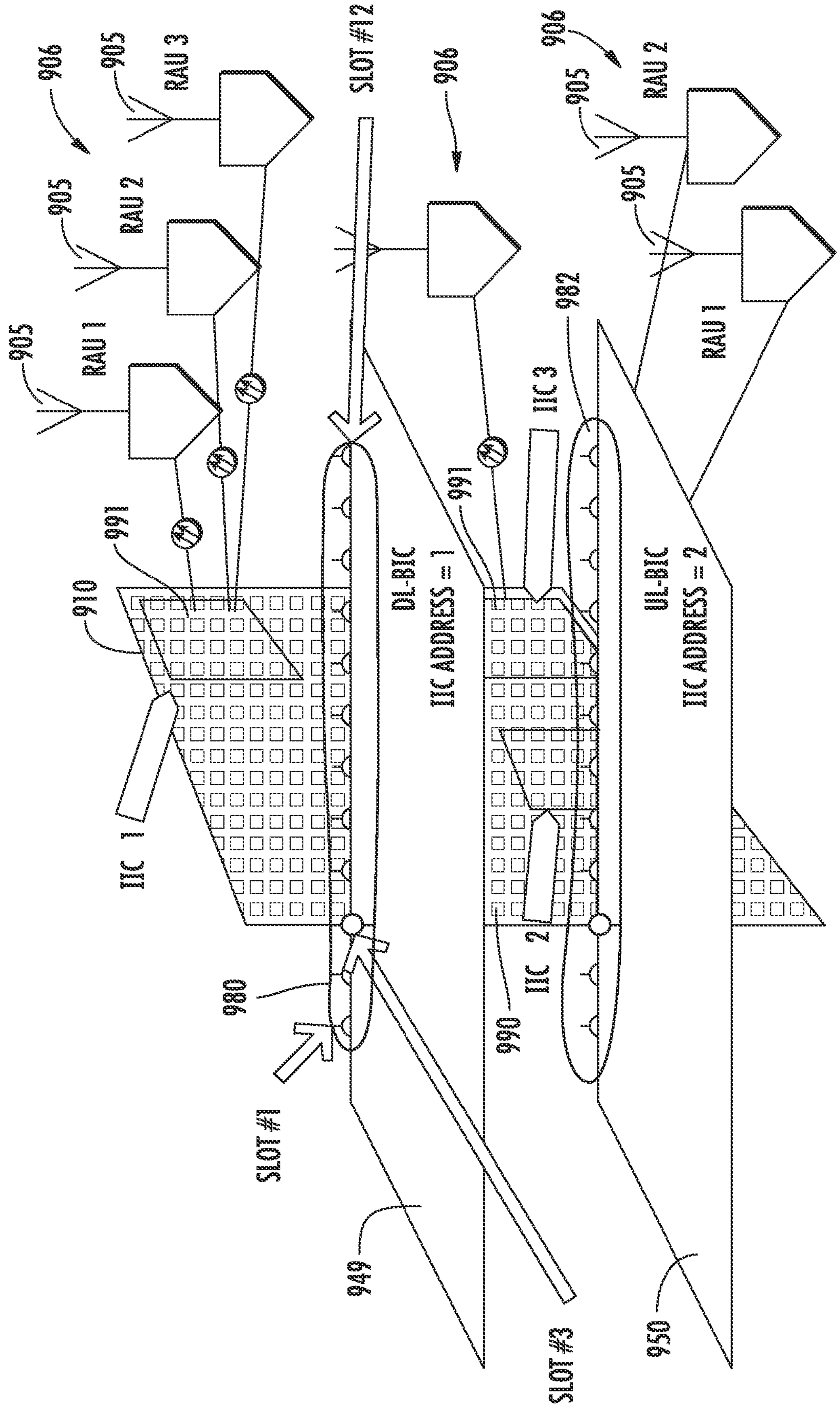
FIG. 26 is a schematic diagram of the exemplary addressing between downlink and uplink base transceiver (BTS) interface cards (BICs), optical interface OICs, and remote antenna units (RAUs)

The downlink and uplink BICs 949, 950 each have their own microprocessors or microcontrollers 965, 967 that execute software stored in their respective datastore 969, 971, respectively, to process the $I^2C$ messages from the communications module 970, and to provide responses over the $I^2C$ communication bus 972 to the communications module 970 to be passed on to the HEU controller software module 964 and additionally to control board functions. The microprocessors 965, 967 communicate with components in their respective downlink and uplink BICs 949, 950 to provide services requested by the HEU controller software module 964. The OIMs 910 also each have their own microprocessor 973 that executes software stored in datastore 975 to process the $I^2C$ messages from the communications module 970. The microprocessor 973 messages to microprocessors 977 in the RAUs 906 over direct links 979 to configure RAUs 906 and to provide other functionalities initiated by the HEU controller 958 and the HEU controller software module 964, as will be described in more detail below. As illustrated in FIG. 26 and discussed below, $I^2C$ communications are not employed between the OIMs 910 and the RAUs 906 in this embodiment, because the RAUs 906 connect directly via serial communications to UART chips on the OIMs 910. As illustrated in FIG. 25A, up to twelve (12) OIMs 910 can be provided in the HEU 902 and interfaced to the HEU controller 958 in this embodiment.

The HEU controller 958 in this embodiment also includes an interface manager module (INTERFACE MANAGER) 974 that controls the interface between the HEU controller software module 964 and the interface modules 940, 942. In this embodiment, the interface module 940 is a web server, and the interface module 942 is an SNMP agent. When the HEU controller software module 964 communicates to the interface modules 940, 942, the HEU controller software module 964 calls upon the interface manager module 974 which in turn calls upon the appropriate interface modules 940, 942 for external communications to clients 920 (FIG. 24). Similarly, communication requests received by the clients 920 for the HEU 902 are communicated from the interface modules 940, 942 to the HEU controller software module 964 for processing via the interface manager module 974. In this manner, the interface manager module 974 is abstracted from the HEU controller software module 964 to provide flexibility for updating or altering the interface layers 918 or adding new interface modules and protocol capabilities to the HEU 902 without requiring updating of the HEU controller software module 964. The HEU controller 958, the interface manager module 974 and the interface modules 940, 942 are each separate processes executed by the HEU microprocessor 960. The HEU controller 958, the interface manager module 974, and the interface modules 940, 942 communicate to each other via inter process communications (IPC).

Visual indicators, such as light emitting diodes (LEDs) for example, may be included in the HEU 902 and its various components and the RAU 906 to visually indicate the status of such components to a technician or other personnel when on-site at the HEU 902 and/or RAUs 906. In this manner, general status information can be determined without having to log in to the HEU 902, unless desired. In this regard, FIG. 25B illustrates a table of the HEU 902 and RAU 906 modules with labels 959 on each module. The labels 959 represent a single visual indicator, which in this embodiment is an LED. The module controls its visual indicators to indicate status visually. The status of the module is indicated by controlling the visual indicator on the module as either "Off" 961, "Green" 963, "Yellow" 981, or "Red" 983 state in this embodiment. The meaning of each state is noted in the table in FIG. 25B.

In this embodiment, the HEU controller 958 is a distinct system from the RF modules (i.e., downlink BIC 949, uplink BIC 950, OIMs, 910, and RAUs 906) and their components. Thus, the HEU controller 958 can operate even if the RF modules and their components are not operational, and vice versa. This allows the HEU controller 958 to operate to perform various functions, including without limitation monitoring and generating alarms and logs, and other tasks as will be described in greater detail below, for RF components without interrupting the RF signals communicated in the RF modules. These various functions are provided by the HEU controller 958 carrying out communication operations with modules in the system 900 including the downlink BIC 949, the uplink BIC 950, the OIMs 910, and/or the RAUs 906. This provides an advantage of being able to power-down, reboot, troubleshoot, and/or load or reload software into the HEU controller 958 without interrupting RF communications in the HEU 902 or RAUs 906. Further, because the HEU controller 958 can be distinct from RF communications, swapping in and out the modules in the HEU 902 and RAU 906 is possible without interrupting or requiring the HEU controller 958 to be disabled or powered-down. The HEU controller 958 can continue to perform operations for other RF modules that have not been removed while other RF-based module(s) can be removed and replaced.

FIG. 26 illustrates more detail regarding the RF link communication specification between the HEU 902 and the downlink BIC 949, the uplink BIC 950, and the OIMs 910 coupled to the OIM 910 in this embodiment. The downlink BIC 949 and the uplink BIC 950 each have their own absolute $I^2C$ addresses (e.g., address 1 and 2). As illustrated therein, there are twelve (12) slots 980, 982 provided in each of the downlink and uplink BICs 949, 950 in this embodiment. Up to twelve (12) OIMs 910 can be coupled to the downlink and uplink BICs 949, 950 in the HEU 902 via the slots 980, 982 to provide hardware addressing between the downlink and uplink BICs 949, 950 and the OIMs 910 The downlink BIC 949 carries an RF signal from the BTS 956 (FIG. 25A) to the OIMs 910 destined for a particular RAU 906. Similarly, the uplink BIC 950 carries signals from the RAUs 906, via the OIMs 910, to the BTS 956. The OIMs 910 also each have individual $I^2C$ addresses that each allow communications individually to RAU 906 coupled to the OIMs 910. As illustrated in FIG. 26, one OIM 910 (which is an OIC in this embodiment) is illustrated as connected to slot number three (3) on the downlink and uplink BICs 949, 950 via a midplane interface card; thus, the hardware address of the illustrated OIM 910 is slot number 3. Providing an communication message to slot number 3 provides communications from the downlink and uplink BICs 949, 950 connected to slot 3 with the OIMs 910 coupled to slot 3 as illustrated in FIG. 26.

Figure 27:
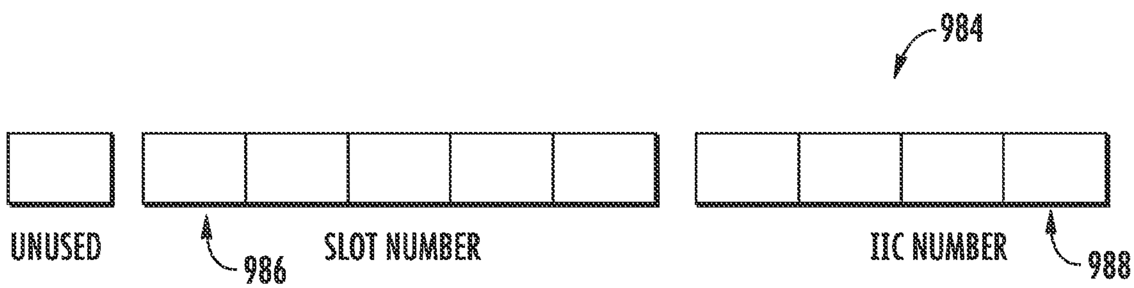
FIG. 27 is an exemplary communication address format for communications between the downlink and uplink BICs and the OICs and RAUs.

An example of a hardware address format 984 is provided in FIG. 27. As illustrated therein, the hardware address format 984 in this embodiment is comprised of ten (10) bits. Five (5) bits are provided to accommodate a slot number 986, and four (4) bits are provided to accommodate an $I^2C$ number 988. Each OIM 910 can accommodate up to three (3) $I^2C$ addresses 991 in this embodiment, as illustrated in FIG. 26, to accommodate up to three (3) individually addressable RAUs 906 in this embodiment. Each RAU 906 is connected directly to the OIM 910 and thus $I^2C$ communications are not used for communications between the OIMs 910 and the RAUs 906. Thus, to address a particular RAU 906, the slot number of the OIM 910 coupled to the RAU 906 to be addressed is provided in the slot number 986 followed by the $I^2C$ number 988 of the RAU 906. Thus, in this embodiment, the hardware address format 984 can accommodate up to thirty-two (32) slot numbers on the downlink and uplink BICS 949, 950, if provided, and up to sixteen (16) $I^2C$ addresses per OIM 910 for a maximum of forty-eight (48) RAUs 906 per OIM 910.

Figure 28A:
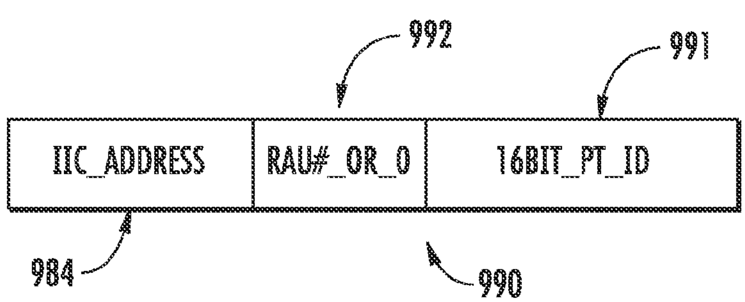
FIG. 28A is an exemplary point format for points communicated in the optical fiber-based wireless system of FIG. 23.

FIG. 28A illustrates an exemplary $I^2C$ point address 990, which includes the $I^2C$ address 984 with an RAU 906 number 992 and a point identification (ID) 991 for $I^2C$ communications between the HEU 902 and modules to communicate point information. Thus, the $I^2C$ address 984 is the destination for the $I^2C$ communication message. The point ID 991 represents a type of point regarding a component of the optical fiber-based wireless system 900. Point information or a point value regarding the point follows the point $I^2C$ address 991 in an $I^2C$ communication message. Point IDs are defined during the design of the optical fiber-based wireless system 900 and are built into the software architecture of the optical fiber-based wireless system 900 so that information regarding modules (i.e., OIMs 910 and RAUs 906) can be monitored by the HEU controller 958. The points IDs 991 can be static or dynamic points. Static points are used to provide static information regarding a component that does not change. Dynamic points are used to provide dynamic information that can change to provide a current status or information regarding a component. Points can also be alarmable or non-alarmable as will be discussed in more detail below.

Clients 920 accessing the optical fiber-based wireless system 900 may be interested in points for a variety of reasons. For example, by monitoring a point, a check on status and health of a component in the optical fiber-based wireless system 900 can be performed. The points can be monitored and used to calculate alarms (e.g., if a particular hardware component is operating outside a tolerable range). Points can also be used to provide information or point values to clients 920 and used to calculate and/or generate alarms. Multiple points can be associated with the different hardware boards in the optical fiber-based wireless system 900 (i.e., HEU 902, downlink BIC 949, uplink BIC 950, OIMs 910, and RAUs 906). The point values monitored can also be used to determine aging of the modules. For example, the degradation of performance can be tracked over time by tracking the performance indicators communicated in points from the modules to the HEU 902.

Different microprocessors for different components of the HEU 902 and optical fiber-based wireless system 900, as previously described and illustrated in FIG. 25A, are capable of providing a point address 990 and point information in an $I^2C$ communication message. The point format 992 is provided as part of a header to the $I^2C$ communication message to allow information regarding components and their status to be communicated to the different software modules in the HEU 902 and in particular to the HEU controller software module 964. The HEU controller software module 964 will provide certain functionalities to clients 920 based on the point ID 994, as will be described in more detail below.

FIG. 28B illustrates an exemplary points list 993 that may used to store points 994 based on hardware details. The points 994 may be associated with point address that contain point IDs 991 to be identified with the HEU controller 958. Four (4) points are shown in the points list 993, one for each board type 995 (i.e., RAU, DL BIC, UL BIC, and OIM). However, this point list 993 is only a partial list in this embodiment. A plurality of points may be provided for each board type 995. A device type 996 where the point 994 is located can be provided in the points list 993, which the points 994 example illustrated in FIG. 28B is a microprocessor. The point 994 may map to hardware information 996, including a hardware signal name 996A, a pin name 996B and pin number 996C of the device, a hardware characteristics 996D of the pin (e.g., input, output), and a hardware description 996E among other information. FIG. 28C illustrates the points list 993 in FIG. 28C as a points list 999 accessible at the communications module 970 (FIG. 25A) level. As illustrated therein, the points have a code variable name 998A for the software as well as a point abbreviation name 998B. The point abbreviation name 998B is used to provide the point information to clients 920.

The point abbreviation name 998B may follow a standard configuration. For example, the first letter in the point abbreviate name 998B may be the board type (e.g., "R"=RAU; "D"=downlink BIC; "U"=uplink BIC; and "O"=OIM). The second and third letters in the point abbreviation name 998B may be the direction of the point (e.g., "IN"=input; "OU"=output; "MO"=module; "Bx"=band number, "Ox"=oscillator number, etc.). The fourth letters in the point abbreviation name 998B may be the component type (e.g., "A"=amplifier; "N"=attenuator; "O" is oscillator, "S"=switch, etc.). The fifth and sixth letters in the point abbreviation name 998B may be the component characteristic (e.g., "L"=level; "S"=status; "E"=enable/disable, etc.) and its instance identification.

As discussed above, points are defined by the optical fiber-based wireless system 900. More particularly, the component of the optical fiber-based wireless system 900 responsible for providing particular points is also responsible for providing characteristic information regarding the points to the HEU controller 958, and more particularly to the HEU controller software module 964 when the component is enumerated or initialized. In this manner, each component in the optical fiber-based wireless system 900 can provide information on the meaning of points under its responsibility and how such points should be handled or treated by the HEU controller software module 964 for flexibility. The enumeration process for components of the optical fiber-based wireless system 900 will be described in more detail below.

As illustrated in FIG. 29, characteristics regarding each point are provided by flagbits 999 in this embodiment. The flagbits 999 are provided for each point on enumeration of a component in the optical fiber-based wireless system 900 responsible for providing such point. The flagbits 999 are received by the HEU controller software module 964 and are used to determine characteristic information represented by bit flags and how received points should be handled, including for calculating alarms on the points. As illustrated in FIG. 29, thirty-two (32) bits are provided in the flagbits 999 in this embodiment. Bit number 31, UL/DL PATH, indicates whether a point is associated with a downlink or uplink path of the optical fiber-based wireless system 900. Bit numbers 30-28 provide three (3) bits to provide a units hi, mid, and lo (UNITS HI, UNITS MID, and UNITS LO) for the point. Bit numbers 27 and 26 (TYPE HI and TYPE LO) represent a two-bit value indicating whether a point value or information provided for the point is in ASCII or 16-bit binary format (i.e., "00" means binary, "01" means 16 byte ASCII value, "10" means 32 byte ASCII value, and "11" means 64 byte ASCII value). Bit number 25 (WRITEABLE) indicates if the point's value is writeable by the HEU 902. Bit number 24 (ALARMABLE) indicates whether the point may report alarm bits to be used to provide alarm information, as will be described in more detail below.

With continuing reference to FIG. 29, bit number 23 (MODULE ALARM) can indicate that an alarm point is set by hardware and not calculated by the HEU 902, if modules can provide alarms to the HEU 902. Bit numbers 22 and 21 (ALARM TYPE HI, ALARM TYPE LO) indicate the type of alarm provided by the point (i.e., "00" means Boolean alarm; "01" means high alarm; "10" means low alarm; and "11" means sticky alarm). The alarm type may control how the alarm is handled by the HEU 902 and/or the client 920. Bit number 20 (DYNAMIC) indicates whether the point is a static or dynamic point. (i.e., "0" means static; and "1" means dynamic in this embodiment). Static points cannot change their point value, but dynamic points can change their point value. Bit numbers 19-14 in this embodiment provide the initial offset (INIT OFFSET FCN), initial stepsize (INIT SETPSZ FCN), initial hysteresis stepsize (INIT HYSTER FCN), initial threshold (INIT THOLD FCN, initial setpoint (INIT SETPT FCN) and initial value (INIT VALUE FCN). The "FCN" notation indicates that the initial values for these bits are defined by a function rather than a predefined, fixed value.

Bit numbers 13-12 in this embodiment (UNALLOCATED) are unallocated. Bit number 10 (VALUE) indicates whether a point value is present for the point followed in an enumeration query. Bit number 9 (NAME) indicates that there is an ASCII character name associated with the point. Bit number 8 (SETPOINT) indicates that there is a 16-bit setpoint associated with the point. Bit number 7 (THRESHOLD) indicates that there is a 16-bit threshold value associated with the point. Bit number 6 (HYSTERESIS) indicates that there is a 16-bit hysteresis value associated with the point. Bit numbers 5 and 4 (MIN THRESHOLD and MAX THRESHOLD) indicate that there are minimum and maximum threshold values associated with the point. Bit numbers 3 and 2 (MIN HYSTERESIS and MAX HYSTERESIS) indicate that there are minimum and maximum hysteresis values associated with the point. Bit number 1 (STEP SIZE) indicates that there is a 32-bit floating point step size associated with the point. Bit number 0 (OFFSET) indicates that there is a 32-bit float point offset associated with the point.

Figure 30:
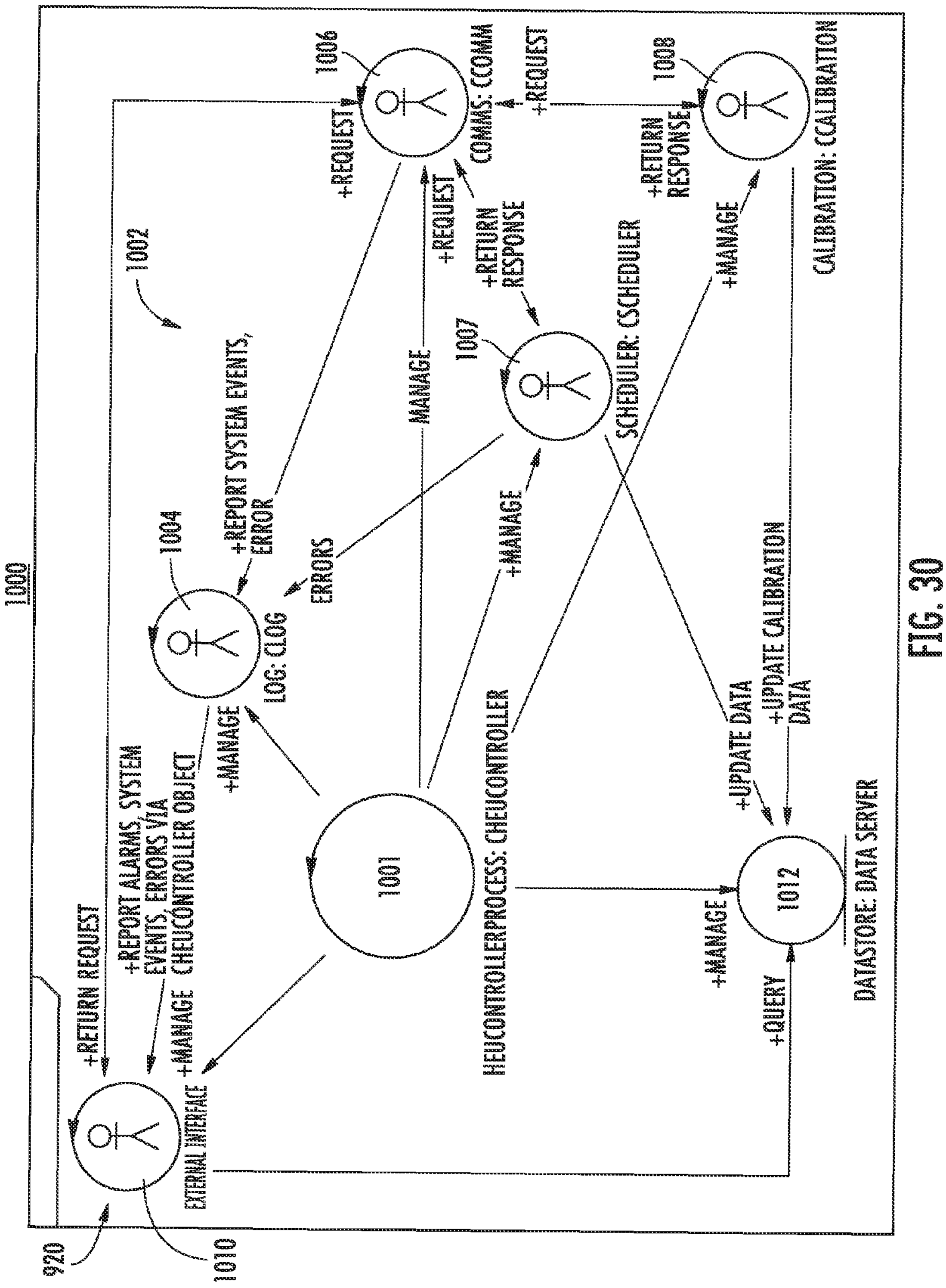
FIG. 30 is an exemplary thread diagram in an HEU controller of the HEU of the optical fiber-based wireless system of FIG. 23.

Against the backdrop of the microprocessor and software architecture and communication of the HEU 902 and the HEU controller 958 discussed above, the remainder of this disclosure will discuss the exemplary features and functions that can be carried out by the HEU controller 958. In this regard, FIG. 30 illustrates an exemplary thread diagram 1000 in the HEU controller 958 of the HEU 902 of the optical fiber-based wireless system of FIG. 23. More specifically, the thread diagram 1000 includes threads 1002 or software processes executed by the HEU microprocessor 960 in a multitasking environment. The threads perform various features and functions, some of which involve communicating with components of the HEU 902 and optical fiber-based wireless system 900. FIG. 30 also illustrates the inter-thread communication (i.e., request and response) paths between the different threads 1002 and modules to carry out designed features and functions of the HEU 902 and the optical fiber-based wireless system 900. In this embodiment, the communications between different threads 1002 are carried out by interprocess communications (IPC) as previously discussed. Each thread 1002 includes a message queue (not shown) stored in datastore 966 that receives requests from other threads 1002. Each thread 1002 reviews its own request queue to process any requests and to then provide responses to the requesting thread 1002. Further, the datastore 966 can be configured as shared memory to allow different threads 1002 to access the datastore 966 to access or share information.

As illustrated in FIG. 30, six (6) threads 1002 are provided in the HEU controller 958 and executed by the HEU microprocessor 960. A HEU controller process 1001 is the first process that starts upon start-up or reset of the HEU 902 and HEU controller 958. The HEU controller process 1001 is provided as software that executes at startup or reset from the HEU controller software module 964 in this embodiment. The HEU controller process 1001 controls the overall process performed by the HEU controller 958. The HEU controller process 1001 starts and controls five (5) other threads 1002 at initialization or reset of the HEU 902. In general, one thread 1002 started by the HEU controller process 1001 is the logger thread (LOG) 1004. The logger thread 1004 is responsible for logging event information for the HEU 902 and the optical fiber-based wireless system 900 in datastore 966 (FIG. 23). More information regarding the logger thread 1004 and its functions are discussed in more detail below. Another thread 1002 initiated by the HEU process 1001 that is executed by the HEU microprocessor 960 is the communications thread 1006 (COMM). The communications thread 1006 provides the communications interface between the HEU controller process 1001 and other components of the HEU 902 and RAUs 906 in the optical fiber-based wireless system 900 as previously discussed. The communications thread 1006 calls upon the communications module 970 to communicate with such other components as previously discussed with regard to FIG. 23.

Another thread 1002 initiated by the HEU controller process 1001 that is executed by the HEU microprocessor 960 is the scheduler thread 1007 (SCHEDULER). Among other features, the scheduler thread 1007 is responsible for discovering and initializing or enumerating components or modules in the HEU 902 and the optical fiber-based wireless system 900, generating point list information based on the flagbits 999 (FIG. 29), updating module states and point information, and calculating and reporting alarms for modules in the optical fiber-based wireless system 900. These features will be discussed in more detail below. Another thread 1002 initiated by the HEU controller process 1001 that is executed by the HEU microprocessor 960 is the calibration thread (CALIBRATION) 1008. The calibration thread 1008 is responsible for calibrating the RF links in the optical-fiber wireless based systems 900. Another thread 1002 initiated by the HEU controller software module 964 that is executed by the HEU microprocessor 960 is the external interface thread (EXTERNAL INTERFACE) 1010. The external interface thread 1010 can be called upon by other threads 1002 to communicate data to external clients 920 and to receive requests from those clients 920. Such requests can include requests to retrieve and view information, calibrate the optical fiber-based wireless system 900 and its components, and other various tasks as will be described in more detail below.

A datastore module 1012 is also provided in the HEU controller 958 to store data in datastore 966 from other threads 1002. The datastore 966 can involve different and multiple memory types and include separate partitions for configurations information, alarm information, and log information as will be described in more detail below. The datastore module 1012 also facilitates the storage of information, including lists or tables of modules present, their points and point information, and configuration information of the HEU 902 and optical fiber-based wireless system 900, in datastore 966 for retrieval, when needed or requested. This information may be obtained from the datastore 966 by the threads 1002 and the clients 920 via the external interface thread 1010. The datastore module 1012 can provide one or more registers for writing and reading data regarding the optical fiber-based wireless system 900 stored in datastore 966. However, the datastore module 1012 is not a separate thread in this embodiment. The datastore module 1012 is provided as part of the HEU controller software module 964 and its process.

Because the datastore 966 is provided apart and distinct from the RF communications in the HEU 902, any information stored in the datastore 966, such as configuration information for example, can be retained and preserved even if RF modules are disabled, interrupted, or otherwise not operating. When an RF module is disabled and restored for example, after the module is discovered, the configuration information stored in the datastore 966 for such module can be reestablished.

Figure 31:
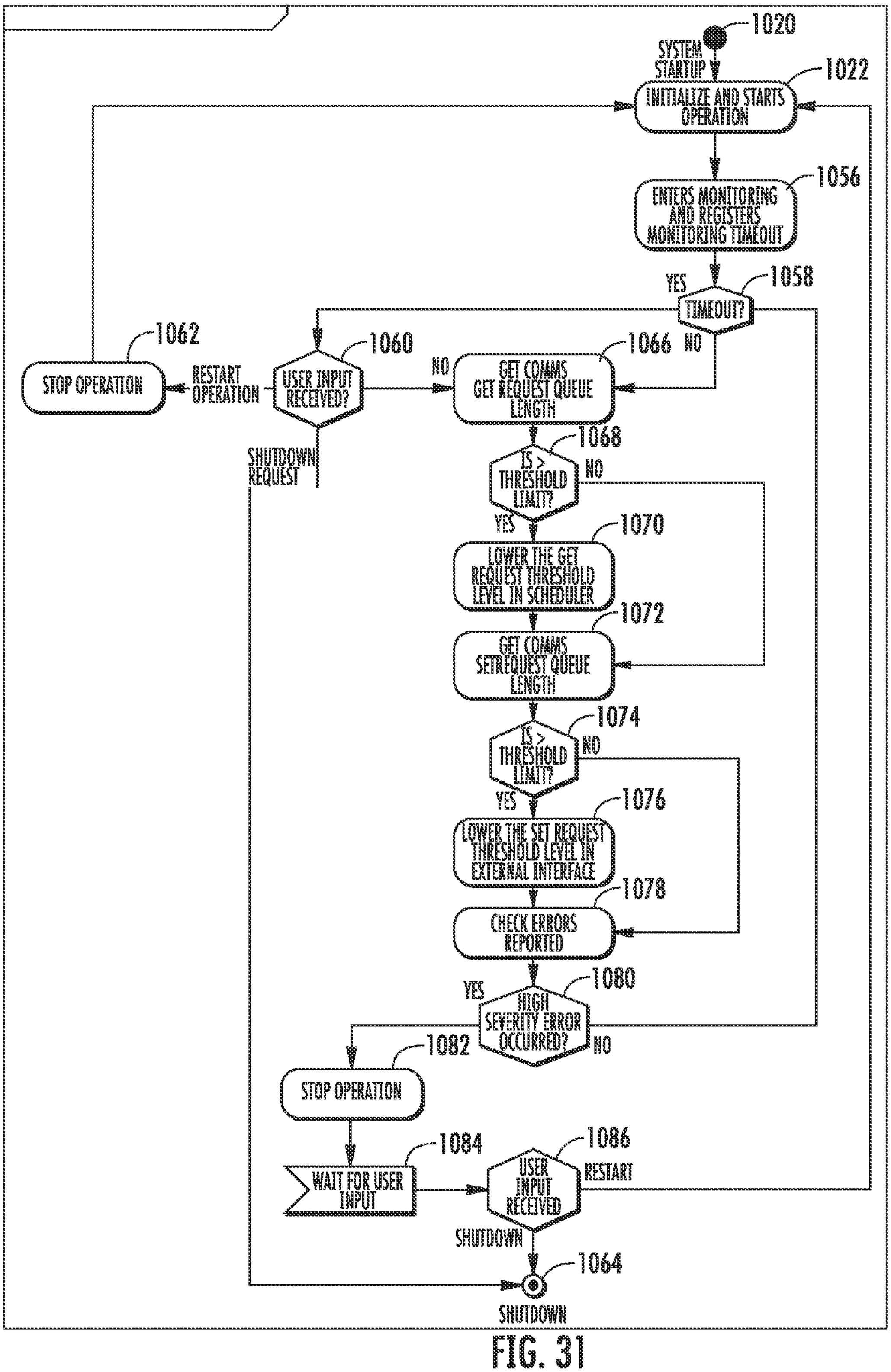
FIG. 31 is a flowchart illustrating an exemplary process performed by the HEU controller in the optical fiber-based wireless system.
Figure 32:
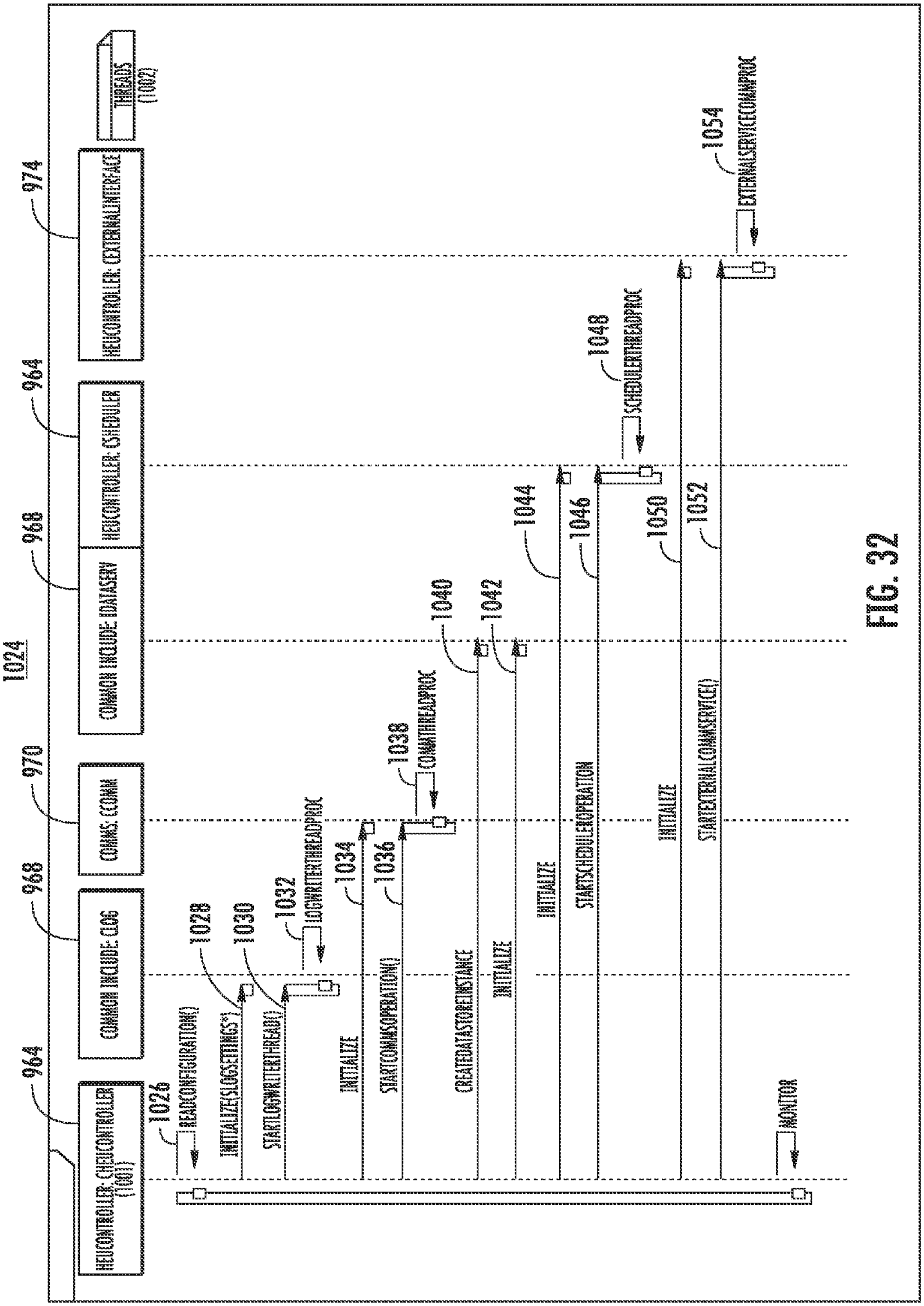
FIG. 32 is an exemplary HEU controller thread startup sequence communication diagram for the HEU controller.

FIG. 31 is a flowchart that illustrates an exemplary process performed by the HEU controller 958 upon startup or reset of the HEU 902. The process is performed by the HEU controller 958 to perform the overall software-based operation of the HEU 902 and to continuously determine the status of the program and external user requests. The process is provided as part of the HEU controller process 1001, which is executed by the HEU controller 958 at startup or reset. As illustrated in FIG. 31, the process starts via a startup or reset (block 1020). The first step performed is to initialize and start operations of the HEU controller 958 (block 1022). This task initiates the thread startup sequence 1024 illustrated in the exemplary communication diagram of FIG. 32 to start the threads 1002 in the HEU controller 958 as previously discussed. As illustrated in FIG. 32, the HEU controller process 1001 first reads the configuration of the HEU controller 958 (block 1026) and then makes a call to the common module 968 (FIG. 25A) to initialize the logger settings (block 1028) and to start the logger thread 1004 (FIG. 30) (block 1030). The logger thread 1004 will then execute its own logger thread process to carry out the functions of the logger thread 1004 and to handle logger thread requests from the HEU controller process 1001 and the scheduler and communications threads 1007, 1006 (see FIG. 30) (block 1032). The logger thread 1004 may be desired to be started first so that event logging is activated to be able to store event information generated by the other threads 1002.

With continuing reference to FIG. 32, the HEU controller process 1001 then makes a call to the communications module 970 (FIG. 25A) to initialize the communication settings (block 1034) and to start the communications thread 1006 (FIG. 30) (block 1036). The communications thread 1006 will then execute its own communications thread process to carry out the functions of the communications thread 1006 and to handle communication requests from the HEU controller process 1001 and the scheduler and calibration threads 1007, 1008 (see FIG. 30) (block 1038). The communications thread 1006 is started before the scheduler, calibration, and external interface threads 1007, 1008, 1010 in this embodiment, because those threads perform functions and features that may require or cause communications to components within the HEU 902 and RAUs 906 that require the services of the communications thread 1006.

With continuing reference to FIG. 32, the HEU controller process 1001 then makes a call to the common module 968 (FIG. 25A) to create and initialize the datastore module 1012 to provide datastore for store events (blocks 1040, 1042). As previously discussed, the datastore module 1012 is not provided in a separate thread or process in this embodiment. The datastore module 1012 handles data storage from the scheduler, calibration, and external interface threads 1007, 1008, 1010 (see FIG. 30) (block 1038).

With continuing reference to FIG. 32, the HEU controller process 1001 next makes a call to the HEU controller software module 964 (FIG. 25A) to initialize the scheduler settings (block 1044) and to start the scheduler thread 1007 (FIG. 30) (block 1046). The scheduler thread 1007 will then execute to carry out certain functions, including discovery, enumeration, and monitoring functions for modules in the optical fiber-based wireless system 900 see FIG. 30) (block 1048).

Lastly, as illustrated in FIG. 32, the HEU controller process 1001 makes a call to the interface manager module 974 (FIG. 25A) to initialize the external interface settings (block 1050) and to start the external interface thread 1010 (FIG. 30) (block 1052). The external interface thread 1010 will then execute its own external interface thread process to carry out the functions of the external interface thread 1010 and to handle communication requests from the HEU controller process 1001 and the logger and communications threads 1004, 1006 (see FIG. 30) (block 1054). After the initialization of the threads 1002 is performed, the HEU controller process 1001 then returns to the main process in FIG. 31.

With reference back to FIG. 31, the HEU controller process 1001 next performs some optional steps (blocks 1056-1058, 1066-1086). For example, the HEU controller process 1001 may enter monitoring and register monitoring timeout information to periodically check status according to a configurable interval of time (block 1056). This is to setup two process handling loops with the main HEU controller process 1001. The first process is to receive and handle requests from the threads 1002 that are not involved with user requests. These requests are checked more frequently than user requests initiated via the external interface process 1010. In this regard, as illustrated in FIG. 31, the HEU controller process 1001 determines if a timeout has occurred (block 1058) such that the HEU controller process 1001 should determine if a user input to restart operation or shutdown the HEU 902 has been received via the external interface process 1010 (block 1060). Alternatively, the HEU controller process 1001 could simply wait for user input (block 1060) after initializing and starting operations (block 1022). If so, the HEU controller 958 either stops operation if a restart operation request was received (block 1062) and the HEU controller 958 is reinitialized (block 1022), or the HEU controller 958 is shut down (block 1064) if the user input was a shutdown request. If the user input is not to restart or shutdown the HEU controller 958, the user input is handled as part of the normal HEU controller process 1001 operation, as described below.

The normal HEU controller process 1001 involves checking the communications thread 1006 queue length to ensure that any communications bottlenecks that occur between inter-thread communications to the communications thread 1006 are resolved. The main features and functions of the HEU controller 958 are performed within the other threads 1002, as will be discussed in more detail below. In this regard, the HEU controller process 1001 sends a message to the communications thread 1006 to get the length of the communications thread 1006 get request queue (block 1066). The get request queue is a message queue provided in datastore 966 that the communications thread 1006 reviews to receive communications requests from the scheduler thread 1007 (see FIG. 30). If the length of the get request queue is longer than a given threshold limit (block 1068), the get request threshold provided in the scheduler thread 1007 is lowered (block 1070). This is because the scheduler thread 1007 may be responsible for providing a request rate to the communications thread 1006 that exceeds a desired threshold limit for the get request queue, thus providing a latency issue in the HEU controller 958.

Thereafter, the HEU controller process 1001 sends a message to the communications thread 1006 to obtain the length of the set request queue (block 1072). The set request queue is the message queue provided in datastore 966 that the communications thread 1006 reviews to receive communications requests from the external interface thread 1010. If the length of the set request queue is longer than a given threshold limit (block 1074), the set request threshold provided in the external interface thread 1010 is lowered (block 1076). This is because the external interface thread 1010 may be responsible for providing a request rate to the communications thread 1006 that exceeds a desired threshold limit for the set request queue, thus providing a latency issue.

Next, with continuing reference to FIG. 31, the HEU controller process 1001 checks for any reported errors by the other threads 1002 (block 1078) and determines if such errors are of a high severity that operation of the HEU controller 958 should be stopped (block 1080). For example, the HEU controller 958 may determine if there has been a reset on the HEU 902 or a watchdog error has occurred (e.g., timer expired that is not reset by the software) to determine if the software executing in the HEU controller 958 has incurred an error or exception such that a restart is required. Events are generated by alarms that are either reported or calculated by other threads 1002 of the HEU controller 958 as will be discussed in more detail below. The events are stored in datastore 966 as part of the logger thread 1004. In this embodiment, high severity or critical alarms may be stored in a non-volatile memory partition, and non-critical alarms may be in a separate partition as part of the datastore 966. System events, discussed in more detail below, may be stored in either non-volatile or volatile memory in a separate partition in the datastore 966. If the event is not of high severity, the process loops back to the check timeout task (block 1058) to repeat the process in a continually looping fashion. If the event is of high severity, the HEU controller process 1001 stops operation of the HEU controller 958 (block 1082) and waits for user input (block 1084). The user input can either be to shut down the HEU controller 958 or to restart the HEU controller 958 (block 1086). If the unit input is to shutdown, the HEU controller 958 executes a shutdown operation to terminate the threads 1002 and their message queues in a design manner (block 1064). If the user input is to restart, the HEU controller 958 executes a restart operation by returning back to the initialization of the threads 1002 (block 1022), previously discussed above.

Figure 33A:
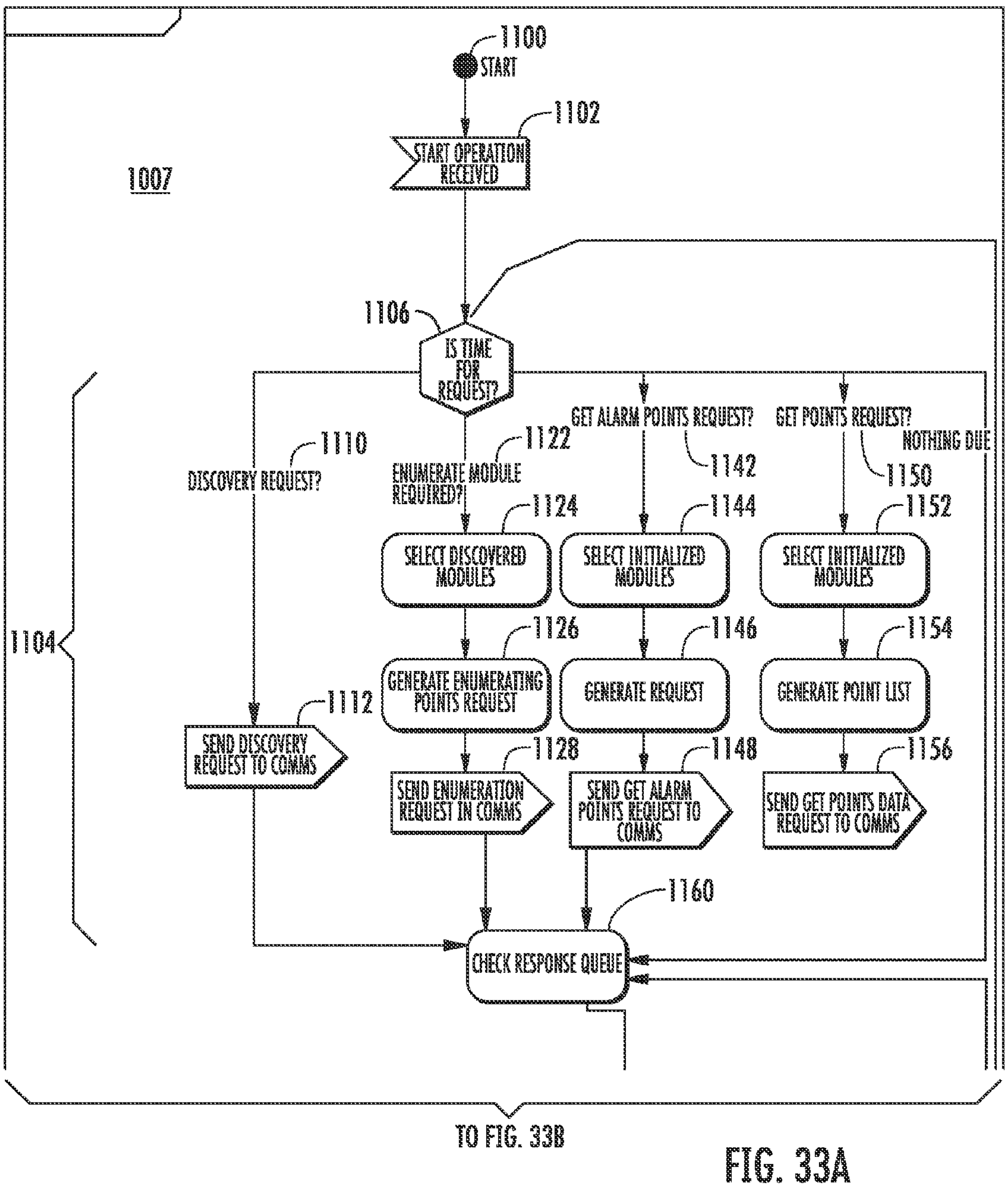
FIGS. 33A and 33B are a flowchart illustrating an exemplary process performed by a scheduler thread in the HEU controller.
Figure 33B:
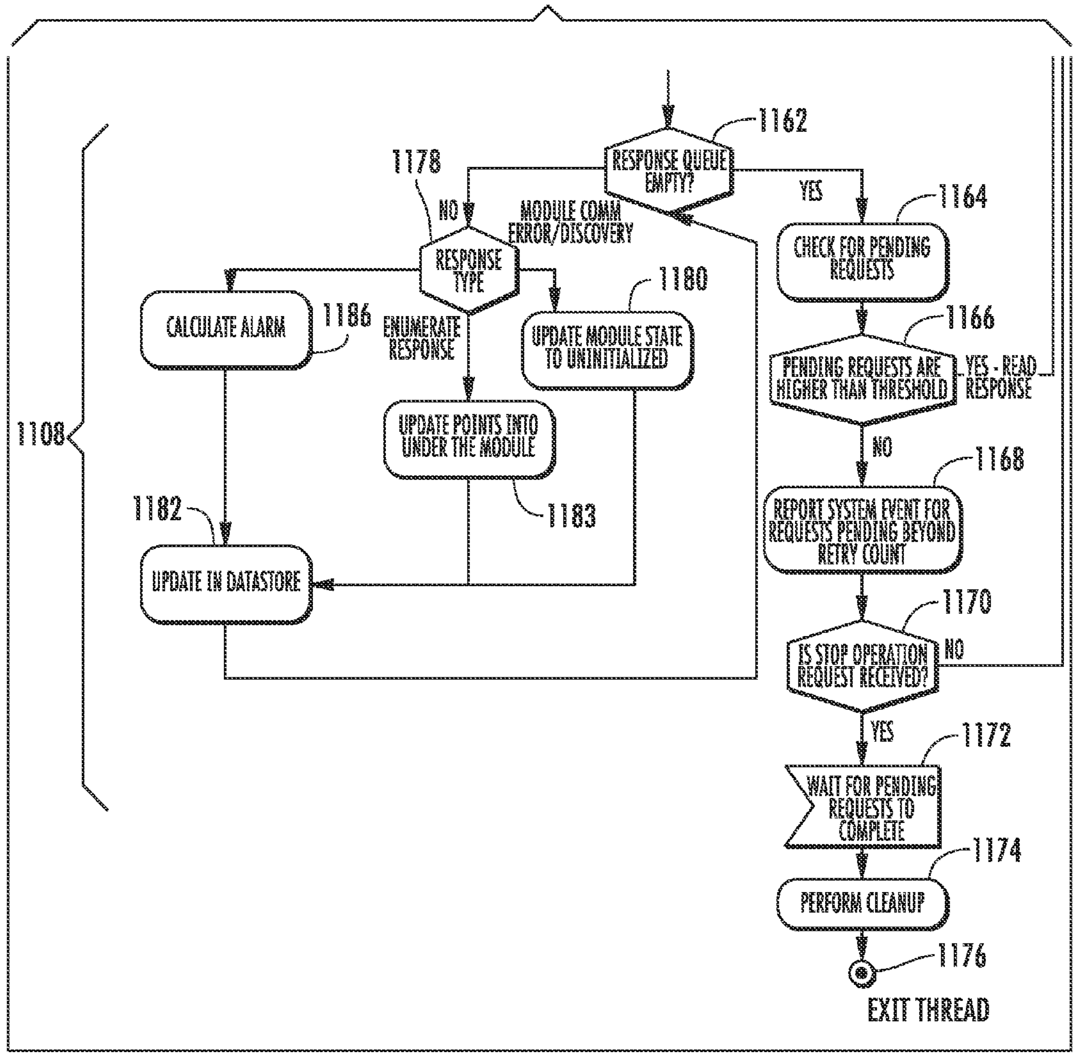

FIGS. 33A and 33B are a flowchart illustrating the process performed by the scheduler thread 1007 illustrated in FIG. 30. As will be discussed in more detail below, the scheduler thread 1007 is responsible for discovery and initialization of modules. Modules include components in the HEU 902 (DL-BIC 949, UL-BIC 950, and OIM 910) and the RAUs 906. For example, each component may be provided on a physical PCB. Modules are initialized by the HEU controller 958 before they are operational. The scheduler thread 1007 also generates a point list for components in the HEU 902 and the RAU 906 according to the flagbits 999 provided for each point type configured in datastore 966 of the HEU controller 958, as previously discussed and illustrated in FIG. 29. The scheduler thread 1007 sends messages to the communications thread 1006 to carry out these features. Further, the scheduler thread 1007 is responsible for updating the state of modules, updating dynamic points, calculating alarms, and reporting point alarms in the datastore 966, which may be assessed by clients 920 via the external interface process 1010.

With reference to FIG. 33A, the scheduler thread 1007 starts by receiving an initialization event (block 1100) from the HEU controller process 1001 (block 1102). The scheduler thread 1007 operates on a time interval. In this regard, the scheduler thread 1007 next determines if it is time to perform one of four requests sent to the communications thread 1006 in a request stage 1104 (block 1106). Only one of the four types of requests is performed on each iteration of the scheduler thread 1007. However, each type of request need not necessarily be executed with the same frequency. Each type of request may be performed at different periodic intervals depending on the desired timing resolution of the four types of communications thread 1006 requests. The desired timing intervals can be configured by a client 920 in a configuration process, which will be described in more detail below. After the request stage 1104 is performed by performing one of the four types of communication requests, the scheduler thread 1007 executes a response stage 1108. The response stage 1108 involves reviewing a scheduler message queue for messages sent to the scheduler thread 1007 by other threads 1002 and performing the request. The response stage 1108 is performed in each iteration of the scheduler thread 1007. As will be described in more detail below, the scheduler thread 1007 is responsible for discovering modules, updating module statuses, updating points information, and calculating and reporting alarms; thus, the other threads 1002 send requests to the scheduler queue to perform these tasks when needed or desired.

With continuing reference to FIG. 33A, a first type of request in the request stage 1104 is a discovery request (block 1110) for modules sent to the communications thread 1006. The discovery request may be performed automatically and periodically, for instance, every fifteen (15) seconds as an example. Thus, as modules are removed and replaced, the replaced modules are automatically discovered. Thus, hot swapping of modules is possible while the HEU controller 958 is operational. The discovery requests involve communicating discovery requests asynchronously to $I^2C$ addresses in the HEU 902 and the optical fiber-based wireless system 900 via the communications thread 1006 to discover the modules present. Modules that are present and have a functional $I^2C$ address are discovered. The modules include the DL-BIC 949, UL-BIC 950, OIMs 910, and RAUs 906 in this embodiment. Likewise, the discovery process will also indicate if a previously discovered module has been removed from the HEU 902 or optical fiber-based wireless system 900. The discovery process will result in a response from the module as well which contains the number and types of points configured for the module as the points configured for the module.

Each module contains certain configured points that provide either static or dynamic information about the module and its components to the HEU controller 958. In this manner, the modules are responsible for reporting their point capabilities to the HEU controller 958 for flexibility. In this embodiment, the first point communicated back to the schedule thread 1007 indicates the total number of points for the module that can be requested by the HEU controller 958. After a module is discovered, the scheduler thread 1007 places the discovered module list of all modules as well as their configured points in datastore 966 (FIG. 25A). In this manner, the HEU controller 958, via the threads 1002, can communicate with the various modules to provide certain functionalities and features described herein. Responses from the modules as a result of the discovery requests are communicated back to the scheduler thread 1007 queue and processed in the response stage 1108.

Figure 34:
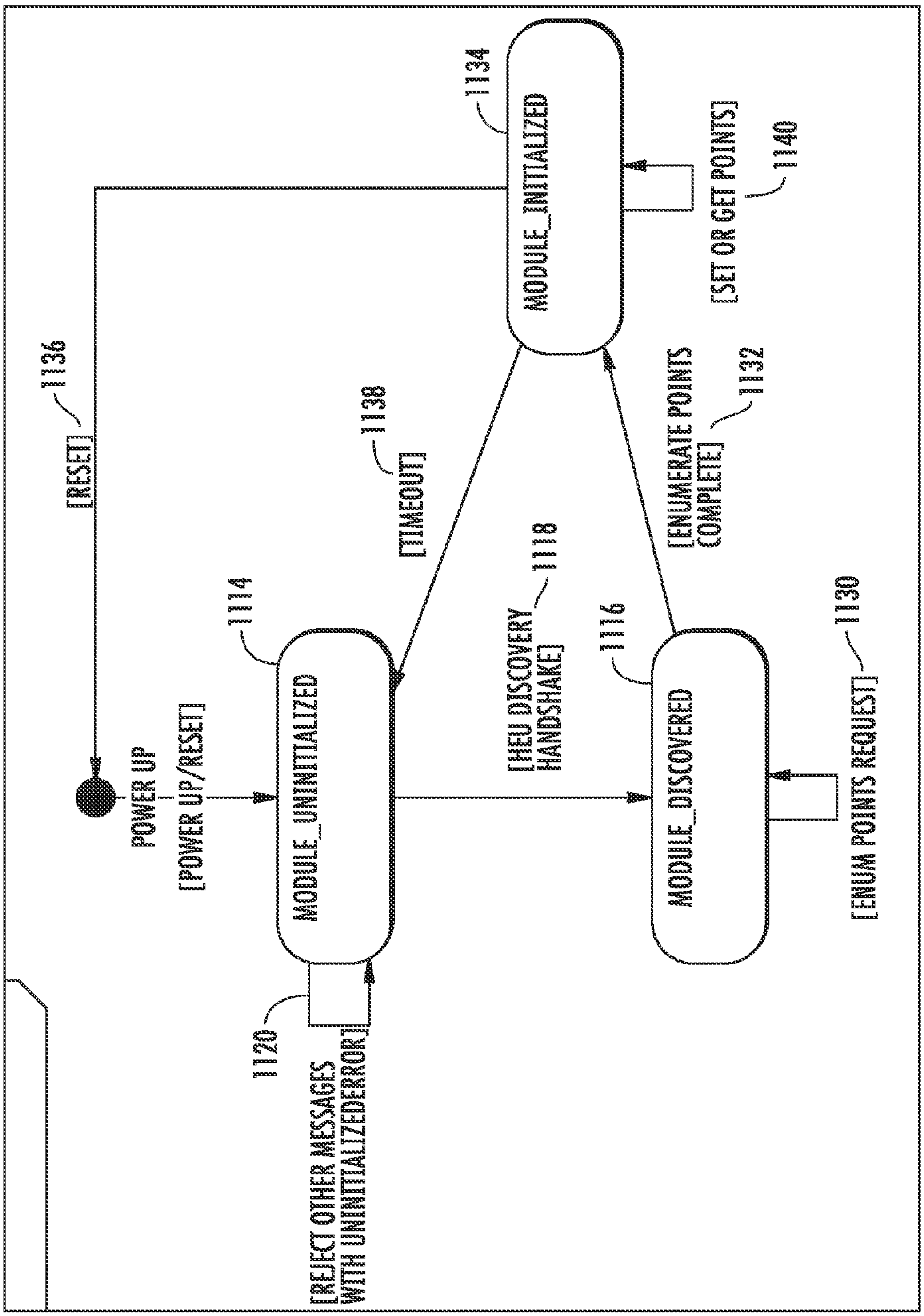
FIG. 34 is an exemplary module state diagram for modules in the optical fiber-based wireless system of FIG. 23.

The module discovery determines the number of OIMs 910 provided in the HEU 902 and in which slots the OIMs 910 are connected to the downlink and uplink BICs 949, 950. In this embodiment, up to two hundred fifty-six (256) modules can be discovered by the HEU controller 958, however, such is not a limitation. Further, module discovery also determines the RAUs 906 connected to each OIM 910 via communications from the communications thread 1006 to the OIM 910. As previously discussed, the RAUs 906 are not directly addressable on the $I^2C$ communication bus 972, but each RAU 906 has a unique $I^2C$ address for access via the OIMs 910 (FIG. 25A). After a module is discovered by the scheduler thread 1007, the module state is changed from an uninitialized state (MODULE_UNINITIALIZED) 1114 to a discovered state (MODULE_DISCOVERED) 1116, as illustrated in the module state diagram of FIG. 34. The module state diagram in FIG. 34 illustrates a state diagram that is executed in the modules by their respective microprocessors in response to module requests from the scheduler thread 1007 via the communications thread 1006. The module executes a discovery handshake communication 1118 with the communications thread 1006 and transitions to the discovered state 1116 if no error occurs. If the module receives other communications messages while in the uninitialized state 1114, the module will reject such other messages 1120 until the module is discovered, as illustrated in FIG. 34.

Figure 35:
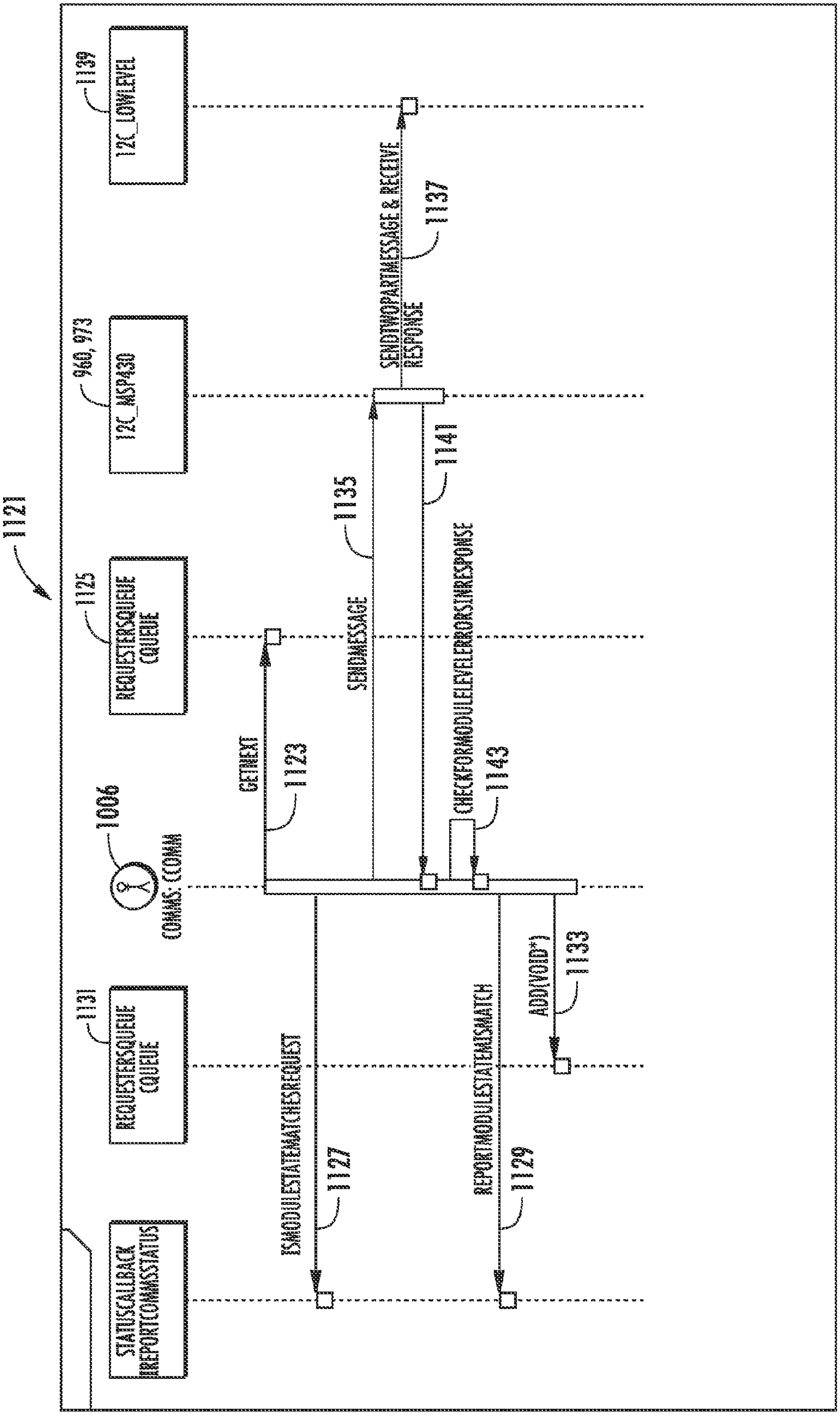
FIG. 35 is an exemplary communications thread communication diagram to receive and process communication requests.

FIG. 35 illustrates an exemplary communications sequence 1121 to the communications thread 1006 to further illustrate communications to the communications thread 1006. As illustrated therein, the communications thread 1006 makes a call (block 1123) to a request queue 1125 to determine if a request has been communicated to the communications thread 1006. The request is related to a particular module. The communications thread 1006 checks to determine if the module state matches the request (block 1127). For example, as illustrated in FIG. 34, a module in the uninitialized state 1114 cannot receive messages other than discovery requests from the scheduler thread 1007. If a mismatch is present between the module state and the request, the communications thread 1006 makes a call to report the mismatch (block 1129) and adds the mismatch to the requester's queue 1131 (block 1133). If there is not a mismatch, the communications thread 1006 sends the request message to the microprocessors 960, 973 of the module (FIG. 25A) (block 1135), which in turn sends the message (block 1137) to the $I^2C$ address of a module 1139. The module microprocessors 960, 973 communicate a response back to the communications thread 1006 (block 1141). The communications thread 1006 can then check the module response for errors (block 1143).

Turning back to FIG. 33A, another type of request performed by the scheduler thread 1007 in the request stage 1104 is the enumerate module request 1122. Enumeration is the process of requesting and receiving point information for the points from the discovered modules. The point information will be used to provide status of module and certain of its components as well as to receive and calculate alarms, as will be discussed in more detail below. For modules that are discovered and in a discovered state (block 1124), the scheduler thread 1007 generates an enumeration points request (block 1126) and sends the enumeration points request to the discovered module via the communications thread 1006 (block 1128). The HEU controller 958 does not already need to be aware of the points that can be provided by the module. If the points change for a particular module, upon enumeration of the module, the point information for such module will be updated in the HEU controller 958 by the scheduler thread 1007 automatically.

The scheduler thread 1007 generates the enumerating points request (block 1126) and sends the enumerating points request for a discovered module to the communications thread 1006 destined for the module via $I^2C$ communications (block 1128). The module receives the enumerating points request 1122 from the communications thread 1006 while in the module discovered state 1116, as illustrated in FIG. 34. In response, the module will enumerate the points configured for the module. This includes receiving the flagbits 999 configured for each point to provide the HEU controller 958 with the characteristic information for the points for the module. The point information received from a module by the scheduler thread 1007 will be updated in the points information stored in the datastore 966 for access by the HEU controller 968. Because the scheduler thread 1007 receives the points for each discovered module, the scheduler thread 1007 can track whether enumeration is complete by determining if all point information has been received for each discovered module in the request stage 1104. After enumeration is completed 1132, the module transitions to the module initialized state 1134. In the initialized state 1134, the module can either receive requests from the HEU controller 958 to set point information or get point information 1140 to update the points information stored in datastore 966 of the HEU controller 958. As will be discussed below, the points information may be used to calculate or report alarms and may be accessed by clients 920 via the external interface thread 1010.

As also illustrated in FIG. 34, an initialized module remains in the initialized state 1134 until a reset 1136 or timeout 1138 occurs, both of which place the module back in the uninitialized state 1114 until the scheduler thread 1007 discovers the module. In this manner, the optical fiber-based wireless system 900 supports removing and replacing (also called swapping in and out) OIMs 910 from the HEU 906 and RAU 906 connections to the OIMs 910 during operation or when "hot" to provide "hot swapping." If an OIM 910 is removed, a failure to receive an acknowledgement will be detected by the HEU controller 958 via the scheduler thread 1007 when the module is attempted to be re-discovered by the HEU controller 958 thus removing the module from the list of discovered modules in the datastore 966. When the module is inserted or reinserted, or communications otherwise reestablished with the HEU controller 968, the scheduler thread 1007 will be able to discover, enumerate the points, and initialize the module automatically. Hot swapping OIMs 910 and RAUs 906 in and out of the optical fiber-based wireless system 900 will not affect the communications with other OIMs 910 and RAUs 906.

In this embodiment, there are four types of alarms that are either calculated by the HEU controller 958, and the scheduler thread 1007 in this embodiment, or by the module that provides the point. Bit number 23 in the flagbit 999 settings for each point previously discussed and illustrated in FIG. 29 controls the configuration as to whether an alarm for a point is calculated by the HEU controller 958 or the module that provides the point. The four types of alarms are Boolean, High Alarm, Low Alarm, and Sticky Alarm in this embodiment. Boolean alarms indicate that either the actual value of the point is the expected value. A High Alarm indicates that the value for the point exceeded a configured threshold value. A Low Alarm indicates that the value for the point dropped below a configured threshold value. A Sticky Alarm stays set for a point until the point is read, whether or not the value for the point leaves the threshold range that caused the alarm. The ability to provide threshold values for alarm points allows the HEU 902 to not only detect failures but to predict failures. The thresholds for alarm points can be set such that exceeding the threshold is indicative of a predicted or possible future failure as opposed to an actual failure.

This alarm scheme allows any point to be defined as an alarm as needed for any module. When the points are enumerated by the scheduler thread 1007, as discussed above, the HEU controller 958 will know which points are alarm from the flagbits 999 and also whether each alarm is to be calculated, either by the HEU controller 958 or the module itself. This allows flexibility for any modules to provide its own alarms rather than requiring the HEU controller 958 to calculate an alarm. As an example, an example of a module determined alarm may be a point named "RINMVL" which means that RAU 906 input module voltage level. The scheduler thread 1007 will have noticed the alarm module bit (bit number 23) in the flagbits 999 is set for this point alarm during enumeration of the module and understand that this alarm point is calculated or set by the RAU 906. When the alarm point is obtained as a dynamic point as part of the get alarm point processing by the scheduler thread 1007 discussed below, the scheduler thread 1007 will receive the Boolean value of the alarm and report the alarm for posting.

Returning to FIG. 33A, another type of request performed by the scheduler thread 1007 in the request stage 1104 is the get alarm points request 1142. In this embodiment, providing a separate get alarm points request 1142 is optional since all points could be handled generically in a get points request 1150, discussed in more detail below. If provided as a separate request, the get alarm points request 1142 is part of a monitoring functionality of the HEU controller 958 to monitor the status of the points for the modules, including alarms. For modules that are in the initialized state (block 1144), the scheduler thread 1007 generates the get alarm points request (block 1146) and sends the get alarm points request to the initialized modules via the communications thread 1006 (block 1148). The module receives the get alarm points request, via the communications thread 1006, while in the initialized state 1134 (FIG. 34) and provides the alarmable points for the module back to the scheduler thread 1007, via the communications thread 1006, to be processed in the response stage 1108, as discussed below.

Alarmable points are points in which an alarm can be calculated or determined by the scheduler thread 1007 according to conditions provided for the point in the flagbits 999, as previously discussed (FIG. 29). The alarms for certain points are calculated by the scheduler thread 1007 and alarms for other points may be determined by the module itself. Points that have alarms calculated by the scheduler thread 1007 are configured in this manner to give a user or client 920 the ability to configure the alarm thresholds for such points. The ability to configure thresholds can be used to predict failures in the optical fiber-based wireless system 900. The thresholds for certain points can be set such that if exceeded, an actual failure has not occurred, but may be indicative of potential failure that should be noted and reported. Points that have alarms may be calculated by either the module or the HEU controller 958. The information in the alarms may be used to predict failure or aging of a module based on the information configured for the alarm. For example, the flagbits 999 for a particular point may be configured to generate a Low Alarm when performance degrades, but not to a point of failure.

Another type of request performed by the scheduler thread 1007 in the request stage 1104 is the get points request 1150. For modules that are in the initialized state (block 1152), the scheduler thread 1007 generates a point list based on the enumeration response from the discovered modules (block 1154). The scheduler thread 1007 then sends a get points request to the initialized modules via the communications thread 1006 (block 1156). The module receives the get points request, via the communications thread 1006, while in the initialized state 1134 (FIG. 34) and provides the points for the module back to the scheduler thread 1007, via the communications thread 1006, to be processed in the response stage 1108, as discussed below. The points can be stored in the datastore 966 for access by the HEU controller 958 and clients 920 via the interface manager module 974. In this embodiment, clients 920 access the points, event information, and other information regarding the HEU 902 via the interface manager 966, which retrieves the information from datastore 966. In this regard, the datastore 966 is shared memory that acts as a method of sharing data between different threads 1002 via direct interfacing to the datastore 966.

After the scheduler thread 1007 performs the request stage 1104, the scheduler thread 1007 performs the response stage 1108. The scheduler thread 1007 checks the scheduler response queue in datastore 966 to determine if any responses are pending in the queue from other threads 1002 (block 1160). Responses can be generated and placed in the scheduler response queue in response to requests in the request stage 1104 of the scheduler thread 1007. As continued on FIG. 33B, if the scheduler response queue is empty (block 1162), the scheduler thread 1007 checks for pending requests (block 1164). If requests are pending, responses are to be expected to be provided in the scheduler response queue. The scheduler response queue should not be empty if there are pending requests. If pending requests are higher than a certain threshold configured (block 1166), then the scheduler thread 1007 is not processing requests fast enough. Thus, the scheduler thread 1007 returns back to the check response queue task (block 1160) to process responses prior to performing another request in the request stage 1104.

The scheduler thread 1007 will continue to process responses until the response queue is lower than the threshold value (blocks 1166, 1160). If the pending requests were not higher than the threshold value (block 1166), the scheduler thread 1007 reports a system error event since requests are not being received in response to responses (block 1168). The scheduler thread 1007 then determines if a stop operation request has been received (block 1170). If not, the process returns to the request stage 1104 (block 1106). If a stop operation has been received (block 1170), the scheduler thread 1007 waits for pending requests to complete (block 1172) and performs a clean up procedure (block 1174) before exiting the scheduler thread 1007 (block 1176). In this case, the scheduler thread 1007 is no longer active and the scheduler thread 1007 must be reinitiated by the HEU controller process 1001 in order to be reactivated.

If the scheduler response queue is not empty (block 1162), this means there is a response in the scheduler response queue to be processed. In this event, the scheduler thread 1007 determines the response type (block 1178). If the response type is a module communication or discovery error, the module state is updated to an uninitialized state in the HEU controller 958 (block 1180) and this information is updated in the datastore 966 via a call to the datastore module 1012 (block 1182). If the response type is a module enumerated response, the module is discovered. The scheduler thread 1007 updates the points for the discovered module to the scheduler thread 1007 via the communications thread 1006 (block 1183). The points include the point itself as well as characteristics of the point according to the flagbits 999 (FIG. 29), as previously discussed. The points are stored in the datastore 966 via a call to the datastore module 1012 so that the scheduler thread 1007 and the external interface thread 1010 can access the points and stored point information received from the modules from the datastore 966 (e.g., via get alarm points request 1142 and get points request 1150).

With continuing reference to FIG. 33B, the scheduler thread 1007 is also configured if the response type is a get points response type (resulting from either a get alarm points request 1142 or a get points request 1150) the scheduler thread 1007 calculates an alarm for the point (block 1186). The module defines whether a point is alarmable in the flagbits 999 setting for the point, as previously discussed (FIG. 29). Again, this configuration allows the modules to provide to the HEU controller 958 whether a point is alarmable or not. If not alarmable, the scheduler thread 1007 does not calculate an alarm for the point and the point information is stored in datastore 966. If calculated, the alarm for the point is updated in datastore 966 (block 1182).

Figure 36:
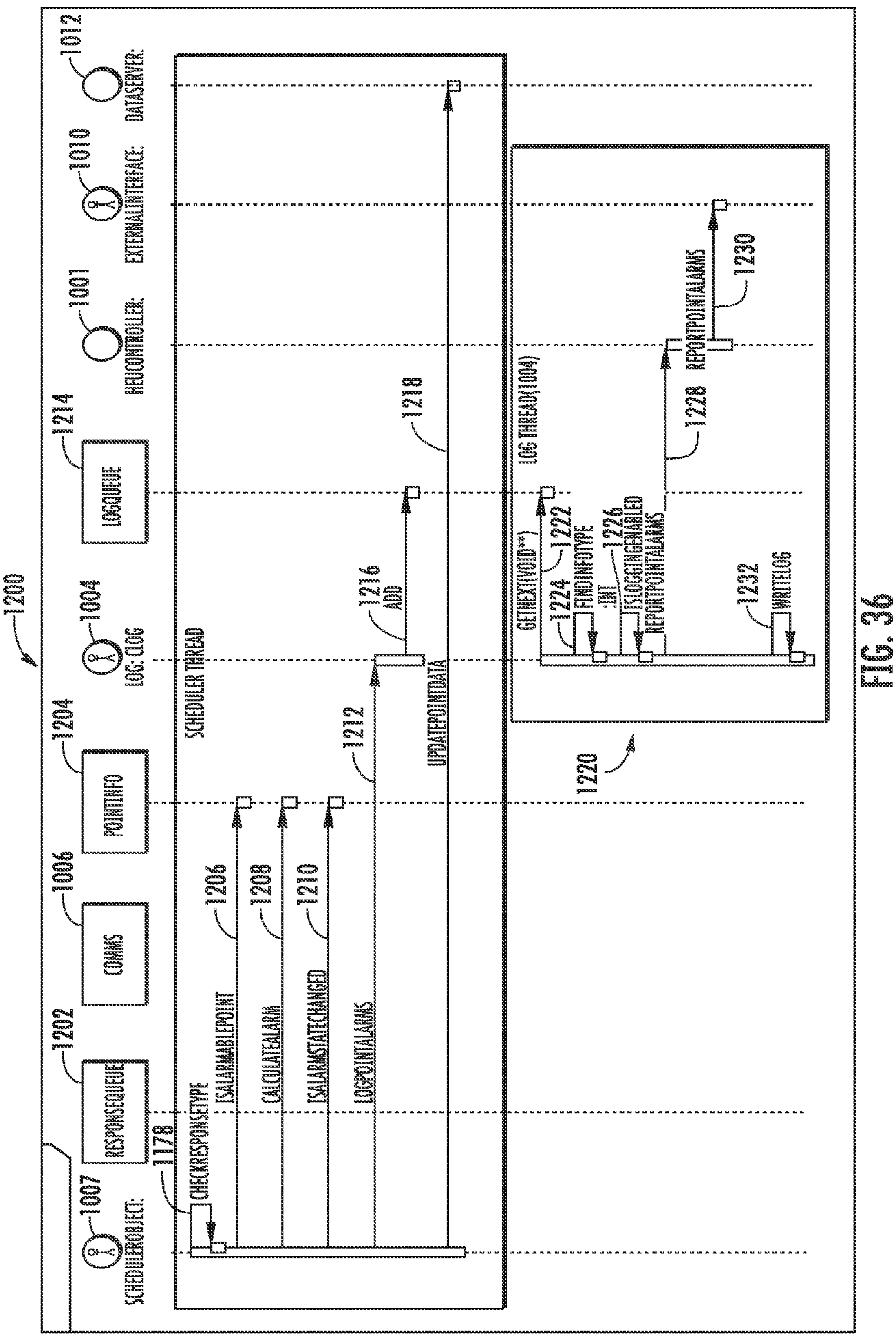
FIG. 36 illustrates an exemplary sequence diagram illustrating calls made to process alarm points involving scheduler and logger threads.

FIG. 36 illustrates a communication or sequency diagram 1200 that further illustrates the calls made by the scheduler thread 1007 to process alarm points. As illustrated therein, the scheduler thread 1007 checks the response type of the response message in a scheduler response queue 1202 (block 1178) (see also FIGS. 33A and 33B). The scheduler thread 1007 then makes a call to a point information list 1204 where the flagbits 999 of the point information are stored when points are enumerated as part of the request stage 1108 in the scheduler thread 1007 (block 1206). The point information list 1204 may be provided as part of an object-oriented class, as an example. If the point is alarmable, the scheduler thread 1007 makes a call on the point information list 1204 to calculate the alarm for the point (block 1208). The alarm is calculated based on the information stored in the flagbits 999. The scheduler thread 1007 determines if the desired or configured characteristics provided in the flagbits 999 of the point by the module providing the point (e.g., OIM 910, RAU 906) are within current operating conditions. If the alarm state of the point has changed (block 1210), the scheduler thread 1007 reports the change to a log file via a message placed in a logger queue for the logger thread 1004 (block 1212), which adds the alarm state to a logger queue 1214 in datastore 966 (block 1216). The scheduler thread 1007 also stores the point information in the points list 997 (FIG. 28C) in datastore 966 via a call to the datastore modules 1012 (block 1218). If there is no change in alarm state, the scheduler thread 1007 does not report the alarm to the logger queue 1214.

With continuing reference to FIG. 36, in response to receipt of the report in the change of alarm state from the scheduler thread 1007 (block 1212), the logger thread 1004 executes a process according to a communication diagram 1220 also illustrated in FIG. 36. As illustrated therein, the logger thread 1004 first sends a call to the logger queue 1214 to determine if a message has been placed in the logger queue 1214 for the logger thread 1004 (block 1222). In the example of a changed alarm state of a point discussed above and illustrated in FIG. 36, a message to log an alarm for a point will be present in the logger queue 1214. If a message is present in the logger queue 1214, the logger thread 1004 determines the type of message (block 1224) and determines if logging of point information or the alarming point is enabled (block 1226). The logger thread 1004 may also be configurable to is communicated externally. If enabled, the point alarm is reported to the HEU controller process 1001 (block 1228) and from the HEU controller process 1001 to the external interface thread 1010 (block 1230) so that the point alarm can be reported to clients 920 via a call to the external interface thread 1010. Thereafter, the logger thread 1004 writes the point alarm to the log file in datastore 966 (block 1232) and reiterates to process the next message in the logger queue 1214, if a message is present (block 1222).

Figure 37:
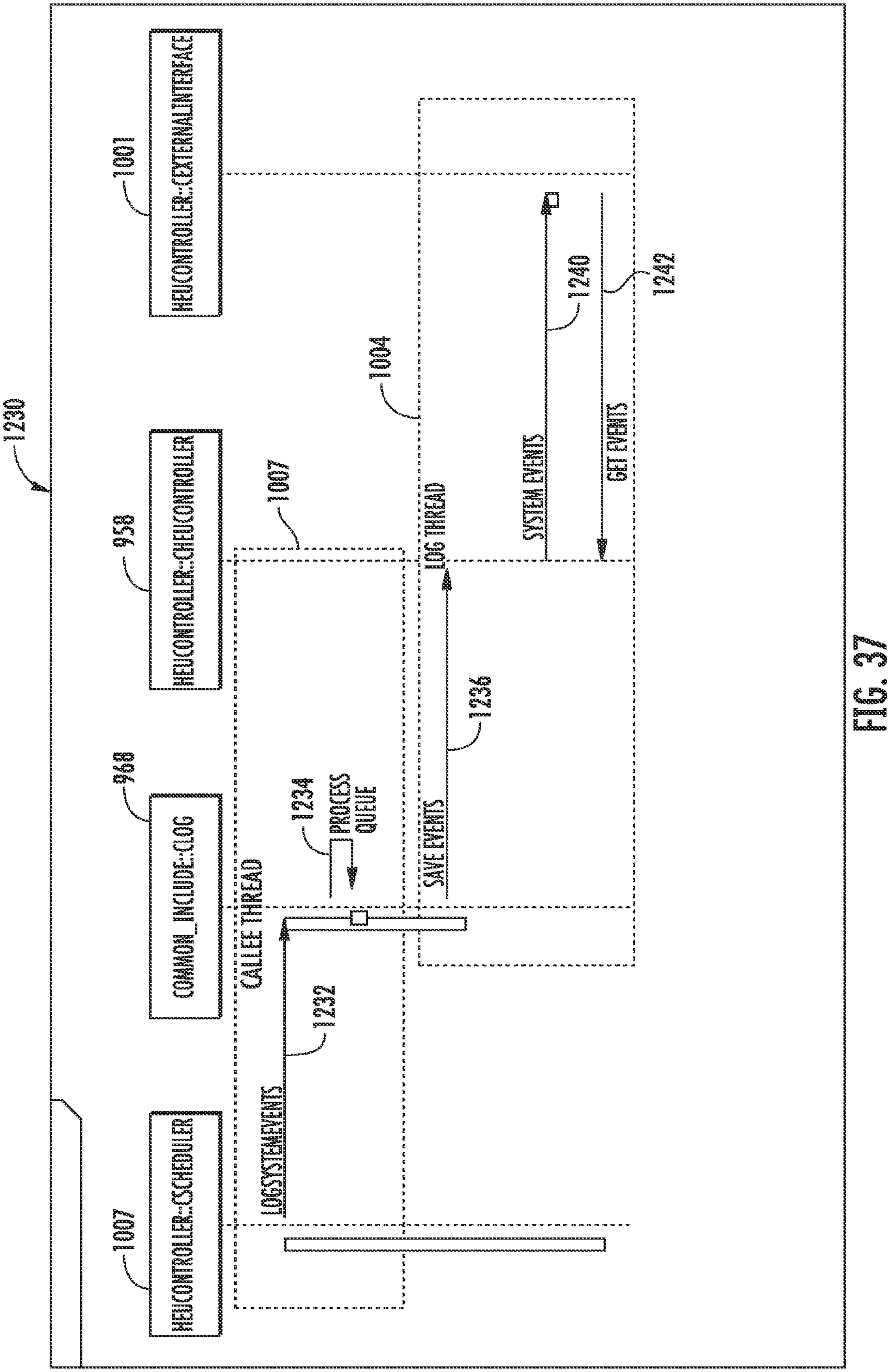
FIG. 37 illustrates an exemplary event logging sequences to log system events for the optical fiber-based wireless system optical fiber-based wireless system.

FIG. 37 illustrates a sequence diagram 1230 of communication requests to the logger thread 1004 in general that allow threads 1002 to send log requests to store events for the optical fiber-based wireless system 900. Different types of events can be logged using the logger thread 1004 in this embodiment. The scheduler thread 1007 and other threads

1002 can initiate system events. A first type of system event is an error message. An error message may be logged whenever an error is determined to have occurred by a process carried out by a thread 1002 in the HEU controller 958. A second type of system event is a thread message to provide tracing of communications through threads 1002 for troubleshooting and debugging purposes. A third type of system event is to log an alarm for a point. This function was previously illustrated in the FIG. 36 and in the communication diagram 1220 illustrated therein. A fourth type of system event is a trace message that indicates the current activity being performed by the HEU 902.

In this regard, taking the example of the scheduler thread 1007 reporting a system event for logging, the scheduler thread 1007 calls upon the common module 968 to log a system event (block 1232). The common module 968 places the log request into the logger queue 1214 (block 1234) (see also, FIG. 36). The logger thread 1004 retrieves the message from the logger queue 1214 (block 1236). The system event details of the log request are communicated to the external interface thread 1010 via the HEU controller process 1001 so that clients 920 can be updated with the system event (block 1240). Not every system event is communicated to the HEU controller thread 1001 to be communicated to clients 920 via the external interface thread 1010 in this embodiment. This function is configurable. Note that other threads 1002 in addition to the scheduler thread 1007 may request a system event to be logged via a communication request to the logger thread 1004, such a the external interface thread 1010 via a get events request block (block 1242).

Another feature provided for the optical fiber-based wireless system 900 by the HEU 902 in this embodiment is calibration. Calibration involves determining the signal strength loss as a result of conversion of the electrical RF signal to an RoF signal on a downlink and vice versa on an uplink and compensating for such losses. Signal strength loss can be encountered on the downlink communication path when incoming electrical RF signals from the BTSs 956 provided to the downlink BIC 949 are converted to RoF signals in the OIMs 910 and communicated to the RAUs 906. Gains in the various components in the communication path between the BTSs 956 and the RAUs 906 can be adjusted to compensate for such losses. Calibration can also involve determining the signal strength loss encountered on the uplink communication path. Signal strength losses can also be incurred when incoming electrical RF signals to the RAUs 906 are converted to RoF signals and communicated to the OIMs 910, which are converted back to electrical RF signals to communicate such signals to the uplink BIC 950. As provided for the downlink communication path, gains in the various components in the communication path between the RAUs 906 and the BTSs 956 can also be adjusted to compensate for such losses. Typically, the gain is set to increase the power level of the signals communicated in the downlink and uplink communication paths, although the gains could be set to decrease the signal strength. For example, it may be desirable to normalize the signal strengths between the various signal inputs among different BTS inputs 957 (FIG. 25A) provided to the downlink BIC 949 to provide consistency in signal strength among different communication frequencies from different BTS inputs 957.

Figure 38A:
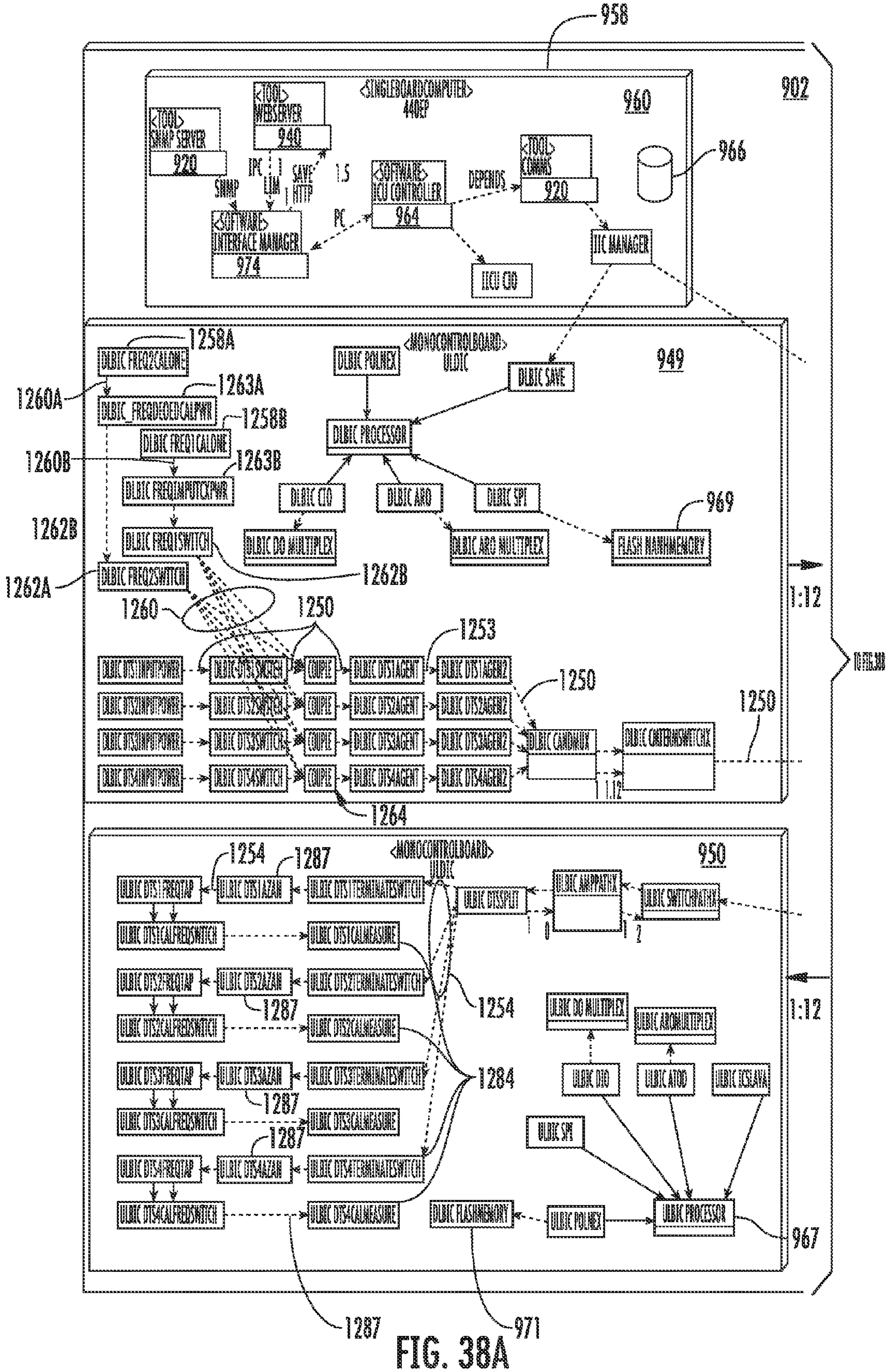
FIGS. 38A-38C illustrate an exemplary schematic diagram of the optical fiber-based wireless system of FIG. 23 illustrating the components of the HEU, the uplink and downlink BICs, the OIMs, and the RAUs and the downlink and the uplink communication paths therein.
Figure 38B:
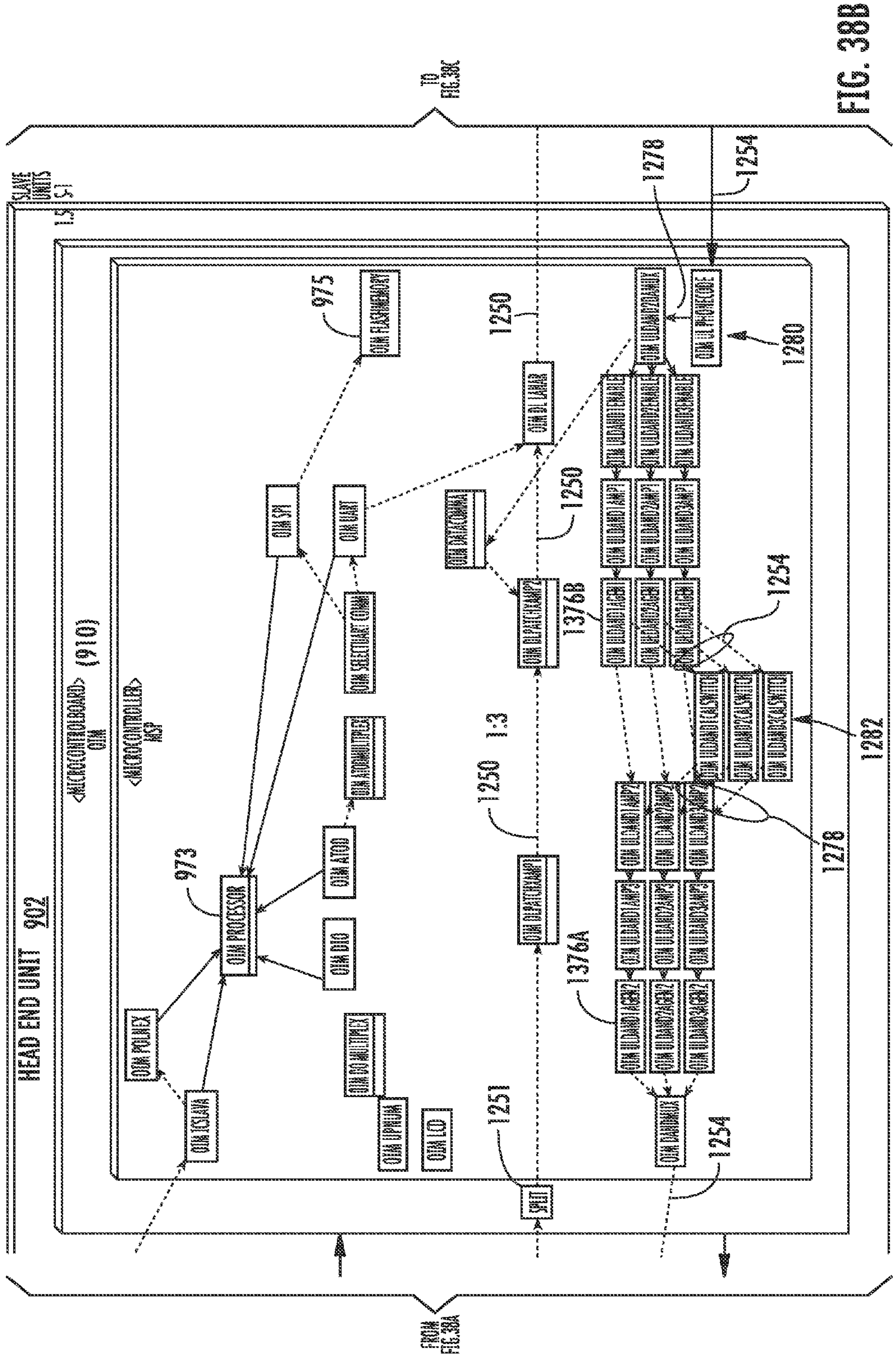

To facilitate further discussion of calibration, the schematic diagrams of FIGS. 38A-38B are provided to illustrate the optical fiber-based wireless system 900 and its components involved in calibration, including the HEU 902, the downlink BIC 949, the uplink BIC 950, the OIMs 910, and the RAUs 906, and the RF communication links FIGS. 38A-38B illustrate the downlinks or the downlink communication path 1250 of incoming electrical RF signals 1252 from the BTSs 956 input into the downlink BIC 949 and communicated from the downlink BIC 949 to the OIMs 910 and RAUs 906 and their various components. As illustrated in FIG. 38A, the downlink communication path 1250 is split into parallel communication paths between the downlink BIC 949 and the OIMs 910 via a splitter 1251. As previously discussed, up to twelve (12) OIMs 910 may be coupled to a downlink BIC 949 in this embodiment (hence the 1:12 designation in FIG. 38A). Further, as illustrated in FIGS. 38A-38B, the downlink communication path 1250 is further split into parallel communication paths between the OIMs 910 and the RAUs 906. As previously discussed, up to three (3) RAUs 906 may be coupled to each OIM 910 in this embodiment. Further, FIGS. 38A-38B illustrate the uplinks uplink communication path 1254 of incoming electrical RF signals 1256 from the RAU antennas 905 input into the RAUs 906 and communicated from the RAUs 906 to the OIMs 910 and the uplink BIC 950 and their various components.

To calibrate the optical fiber-based wireless system 900 and its components in this embodiment, two calibration oscillators 1258A, 1258B are provided in the downlink BIC 949, as illustrated in FIG. 38A. The calibration oscillators 1258A, 1258B are provided to generate two independent electrical calibration signals 1260A, 1260B at expected power levels or signal strengths at two different frequencies in order to calibrate the optical fiber-based wireless system 900 for two different frequencies in this embodiment. The calibration signals 1260A, 1260B are each provided to frequency switches 1262A, 1262B that are under control of the downlink BIC microprocessor 965. In this manner, the downlink BIC microprocessor 965 can switch the frequency switches 1262A, 1262B on when desired or when instructed by the HEU controller 958 when in a calibration mode to assert or inject the calibration signals 1260A, 1260B onto the downlink communication path 1250. Calibration involves providing the calibration signals 1260A, 1260B into couplers 1264 for each of the four BTS inputs 957 in this embodiment.

In this embodiment, the HEU microprocessor 960 can instruct the downlink BIC microprocessor 965 to switch the frequency switches 1262A, 1262B via $I^2C$ communications between the HEU microprocessor 960 and the downlink BIC microprocessor 965. This calibration action or mode propagates the calibration signals 1260A, 1260B over the downlink communication path 1250 through the downlink BIC 949 and its components. In this manner, the calibration signals 1260A, 1260B are downlink calibration signals. The signal strength of the calibration signals 1260A, 1260B are measured by calibration measuring components 1263A, 1263B for comparison purposes to determine the loss as a result of the conversion of the electrical RF signals to RoF signals. This signal strength level is the expected signal strength for the calibration signals 1260A, 1260B. The calibration signals 1260A, 1260B will reach the OIMs 910 and their components, where the calibration signals 1260A, 1260B will be converted into RoF signals for communication to the RAUs. 906. The calibration signals 1260A, 1260B in this embodiment are carried over the same RF links that carry the electrical RF signals so that calibration can be performed while RF communications are being provided by the HEU 902.

In this embodiment, one calibration frequency is for high frequency communication calibration and the other calibration frequency is for low frequency communication calibration. For example, the two calibration frequencies could be 915 MHz and 2017 MHz. In this manner, the optical fiber-based wireless system 900 is calibrated for both high and low frequency signals. The frequencies of the calibration signals 1260A, 1260B are selected in this embodiment to not overlap and thus interfere with the expected frequencies of RF signals communicated over the downlink communication path 1250 and/or the uplink communication path 1254 so that calibration can occur even while RF communications are occurring and without requiring RF communications to be disabled. However, note that any number of calibration signals 1260 may be employed and at any frequency or frequencies desired.

Eventually, the RoF signals generated as a result of the OIM's 910 receipt and conversion of the calibration signals 1260A, 1260B to RoF signals will reach the RAUs 906, as illustrated in FIGS. 38A and 38B. The RAUs 906 will convert the RoF signals back into electrical RF signals before transmitting the signals via the antennas 905. Thus, in this embodiment, downlink calibration measurement components 1265 are provided in the RAUs 906 and coupled to the output of final stage amplifiers 1266. The downlink calibration measurement components 1265 receive electrical RF signals 1268 representing the calibration signals 1260A, 1260B before the electrical RF signals 1268 are communicated to the antennas 905 in the RAUs 906.

In this regard, the power or signal strength of the electrical RF signals 1268 can be measured by the downlink calibration measurement components 1265 to be compared against the expected power or signal strength of the calibration signals 1260A, 1260B as measured by the calibration measuring components 1263A, 1263B (block 1321). Losses can be determined as a result of the calibration signals 1260A, 1260B being propagated along the downlink communication path 1250. Losses may be incurred due to propagation of the calibration signals 1260A, 1260B through various components in the downlink communication path 1250 as well as from conversion of the calibration signals 1260A, 1260B from electrical RF signals to RoF signals in the OIMs 910. Losses can also be incurred when the RoF signals are converted back to electrical RF signals in the RAUs 906. Gains can be adjusted in components present in the downlink communication path 1250 of the optical fiber-based wireless system 900, including but not limited to adjustments to gains in amplifiers and/or attenuators, to compensate for such losses, as will be described in more detail below. As illustrated, the downlink communication path 1250 is split into three bands in this embodiment, although any number may be included. In this embodiment, the gain adjustment for calibration of the downlink communication path 1250 will be performed in the RAUs 906, as discussed in more detail below.

Similarly, the uplink communication path 1254 can also be calibrated to compensate for losses incurred from converting received electrical RF signals 1270 from the antennas 905 of the RAUs 906 on the uplink communication path 1254 into RoF signals 1254. Losses can be incurred by converting the received electrical RF signals 1270 to RoF signals in the RAUs 906 and back to electrical RF signals in the OIMs 910 before being communicated to the uplink BIC 950. Gain adjustments can also be made to compensate for these losses in the uplink communication path 1254 in the optical fiber-based wireless system 900. In this regard, the same calibration signals 1260A, 1260B that are used to calibrate the downlink communication path 1250 can also be used to calibrate the uplink communication path 1254, although such is not required.

Figure 38C:
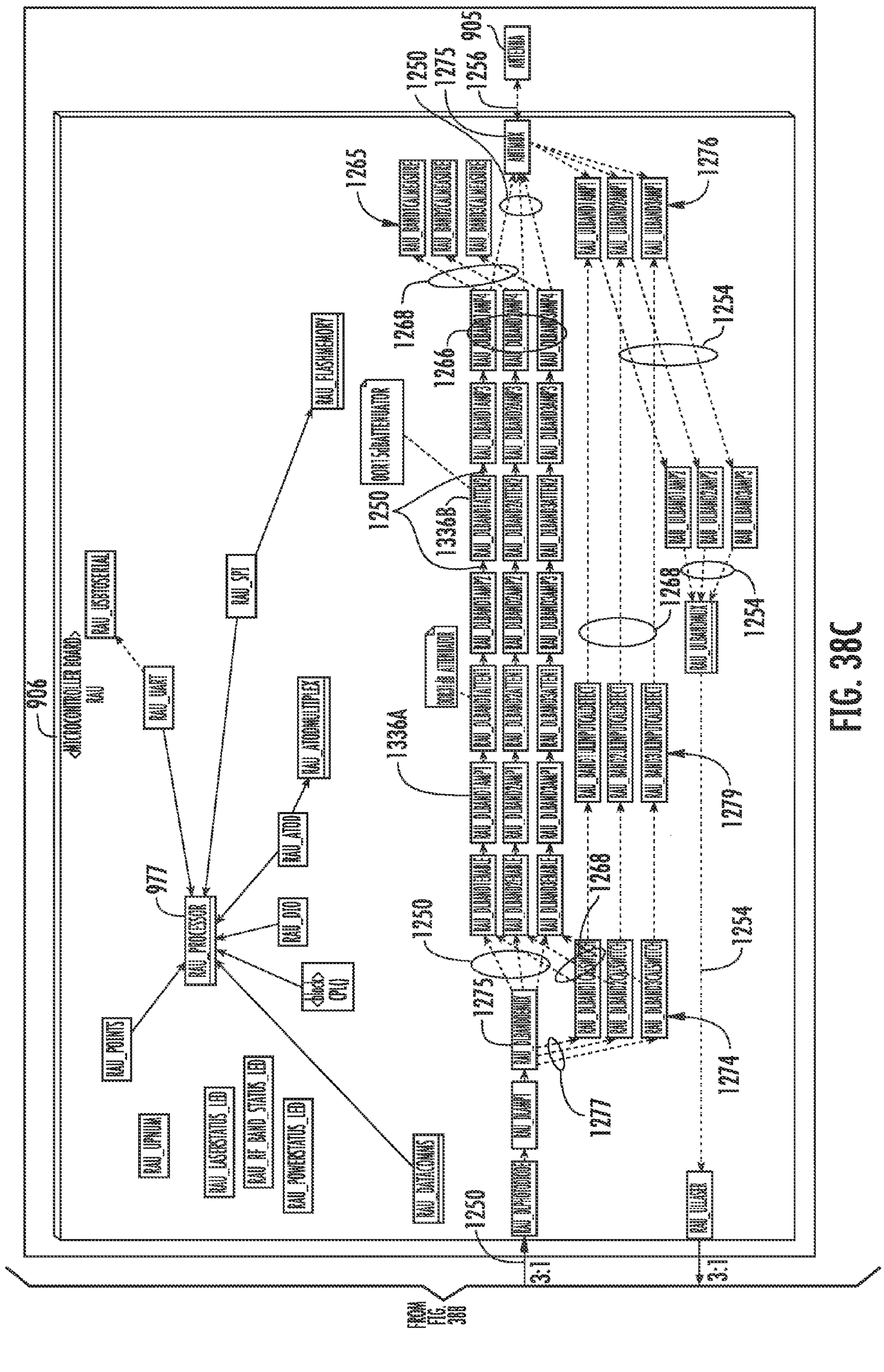

As illustrated in FIG. 38C, downlink calibration switches 1274 are provided in the RAU 906. The downlink calibration switches 1274 receive filtered electrical RF signals 1277 representative of the calibration signals 1260A, 1260B from a downlink multiplexor 1275 to control whether either the downlink communication path 1250 or the uplink communication path 1254 is calibrated. The downlink calibration switches 1274 control whether the electrical RF signals 1277 representative of the calibration signals 1260A, 1260B are directed in the downlink communication path 1250 to an antenna multiplexer 1275 in the RAU 906 to calibrate the downlink communication path 1250, or to RAU band amplifiers 1276 in the uplink communication path 1254 to calibrate the uplink communication path 1254 (labeled signals 1268). If directed to the uplink communication path 1254, the calibration signals 1260A, 1260B are also uplink calibration signals. The power of the signals 1268 will be measured by measurement calibration components 1279 to determine the expected signal strength for comparison purposes and calibration to offset any losses desired. The electrical RF signals 1268 will be converted back to RoF signals 1278 by an E/O converter 1280 in the OIM 910, as illustrated in FIG. 38B. When calibrating the uplink communication path 1254, calibration switches 1282 will be switched to direct the RoF signals 1278 and to communicate the RoF signals 1278 to the UL BIC 950.

Alternatively, instead of the calibration signals 1260A, 1260B being redirected to the uplink communication path 1254 to calibrate the uplink as discussed above, uplink calibration signal generators separate from the calibration oscillators 1258A, 1258B. It may be desirable to provide separate uplink calibration signal generators if the losses in the downlinks cause the signal strength of the calibration signals 1260A, 1260B to be too weak for use to measure losses on the uplinks, as one example. In this regard, uplink calibration oscillators could be employed in the RAUs 910 to generate uplink calibration signals overt the uplink communication path 1254 to determine the losses on the uplinks. The signal strength of the uplink calibration signals could be measured in the RAUs 910 and then measured as the UL-BIC 950, just as described above, to calculate the loss in the uplinks.

The RoF signals 1278 on the uplink communication path 1254 will reach the uplink BIC 950, as illustrated in FIG. 38A. In this embodiment, uplink calibration measurement components 1284 are provided in the uplink BIC 950 and coupled to the output of uplink calibration frequency switches 1286, which are coupled to the final output stage of the uplink BIC 950. The uplink calibration measurement components 1284 receive electrical RF signals 1287 representing the calibration signals 1260A, 1260B. In this regard, the power or signal strength of the electrical RF signals 1287 can be measured by the uplink calibration measurement components 1284 to be compared against the expected power or signal strength of the calibration signals 1260A, 1260B. Losses can then be determined as a result of the calibration signals 1260A, 1260B being propagated along the uplink communication path 1254. Losses may be incurred due to propagation of the calibration signals 1260A, 1260B through various components in the uplink communication path 1254 as well as from conversion of the calibration signals 1260A, 1260B from RoF signals to electrical signals in the OIMs 910. Like the downlink communication path 1250, gains can be adjusted in components of the optical fiber-based wireless system 900 in the uplink communication path 1254 to compensate for such losses, as will be described in more detail below. In this embodiment, the gain adjustment for calibration of the uplink communication path 1254 will be performed in the OIMs 910, as discussed in more detail below.

The calibration of the optical fiber-based wireless system 900 is performed for each of the calibration oscillators 1258A, 1258B in this embodiment. Further, the calibration of the optical fiber-based wireless system 900 may be performed for each of the four (4) possible BTS inputs 957, for up to a total of thirty-six (36) possible RAUs 906 (i.e., three (3) bands times twelve (12) OIMs 910 times three (3) RAUs 906 per OIM 910). This involves a possible total of four hundred thirty-two (432) calibration processes for the optical fiber-based wireless system 900 in this embodiment. By the module discovery process previously described above, the calibration performed for the optical fiber-based wireless system 900 will automatically and adaptively be performed and adapted to the downlink and uplink communication paths 1250, 1254 and the OIMs 910 and RAUs 906 present. Thus, if temperature variations or an aging effect cause changes in the gain or loss of the components, recalibration of the OIMs 910 and RAUs 906 will account for such changes automatically and periodically. Gain adjustments made in the RAUs 906 as part of the gain adjustment during calibration will only affect the individual RAU 906 and not other RAUs 906.

To allow the HEU controller 958 to control the calibration process, the calibration thread 1008 is provided in the HEU controller 958 and executed by the HEU microprocessor 960. The calibration thread 1008 was previously introduced and illustrated in FIG. 30. The calibration thread 1008 is provided to initiate and control calibration of the HEU 902 and its components, which includes the OIMs 910 and the RAUs 906 in this embodiment. The calibration thread 1008 makes calls that cause the HEU controller 958 to instruct the downlink BIC 949 (e.g., via $I^2C$ communications) to switch the frequency switches 1262A, 1262B to generate the calibration signals 1260A, 1260B. Likewise, the measurements made by the downlink and uplink calibration measurement components 1265, 1284 from the RAUs 906 for the downlink communication path 1250 and from the uplink BIC 950 for the uplink communication path 1254, respectively, can be provided to the HEU controller 958 and the scheduler thread 1007 to make decisions regarding gain adjustments.

Figure 39A:
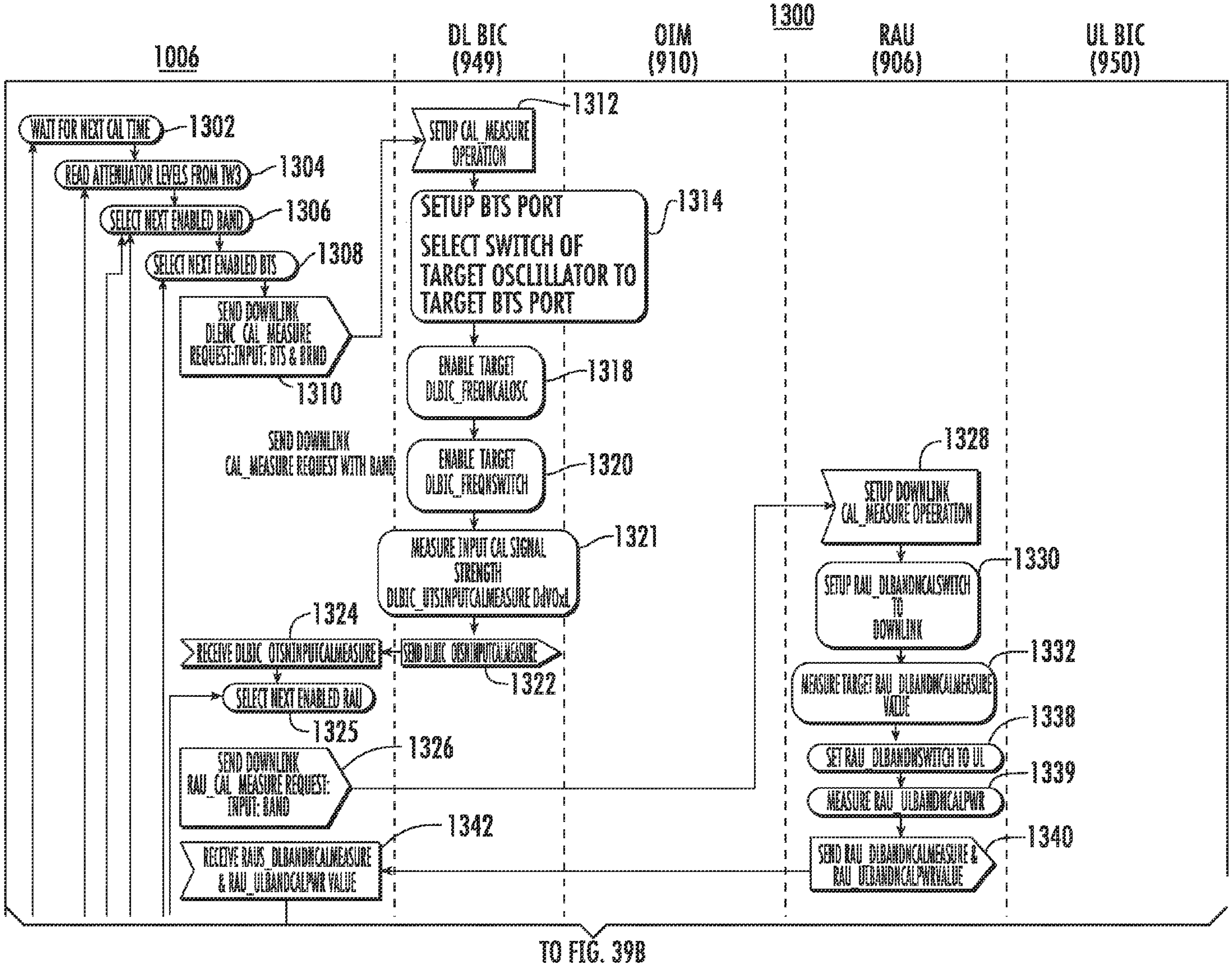
FIGS. 39A and 39B illustrate a flowchart illustrating an exemplary calibration thread to calibrate components of the optical fiber-based wireless system.
Figure 39B:
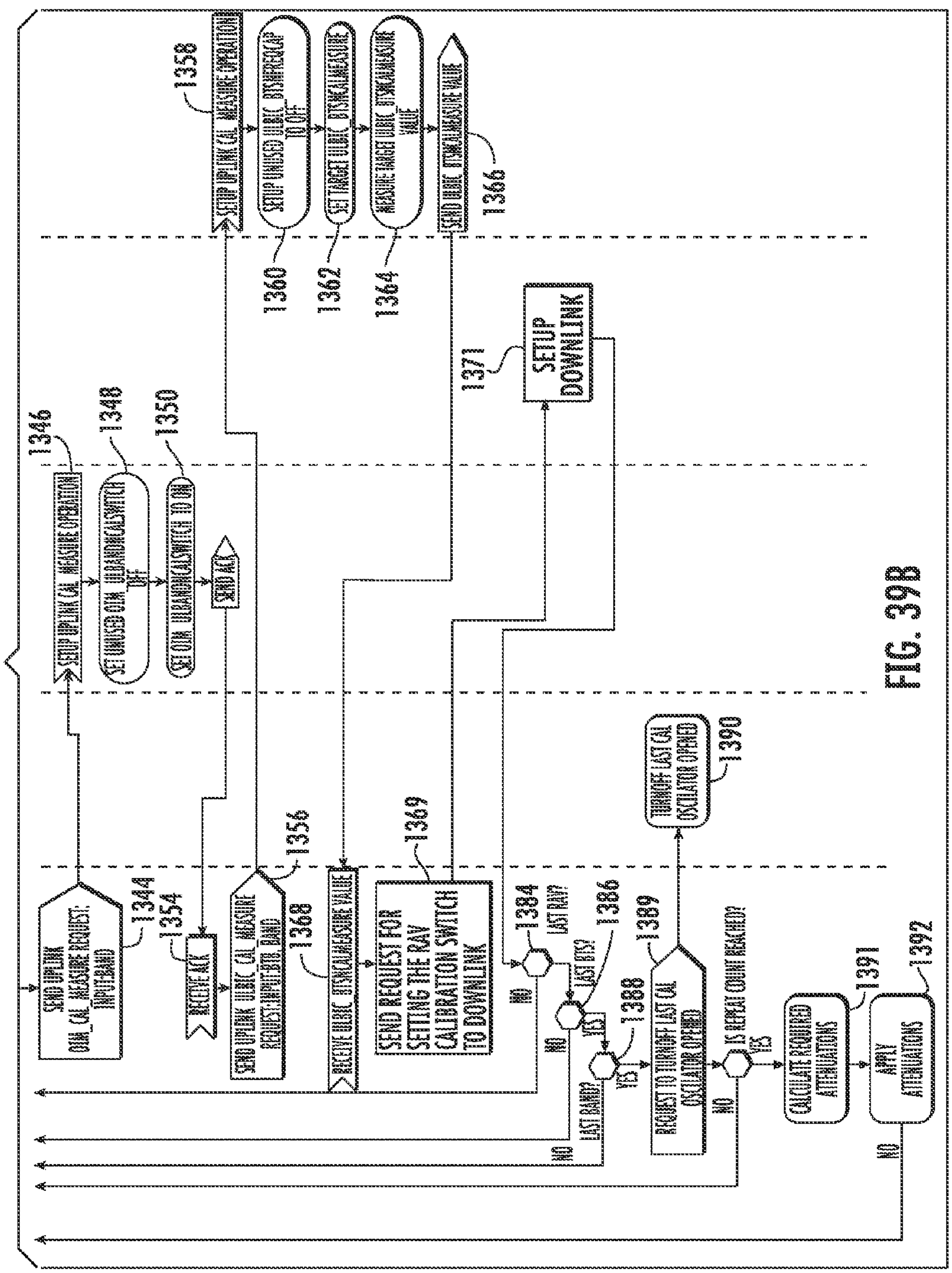

In this regard, FIGS. 39A and 39B illustrate an exemplary flowchart providing the process carried out by the calibration thread 1008 in the HEU controller 958 in this embodiment. FIGS. 39A and 39B are discussed in conjunction with the component diagrams of the optical fiber-based wireless system 900 in FIGS. 38A-38B, which illustrated the components, including the HEU 902, the downlink BIC 949, the uplink BIC 950, the OIMs 910, and the RAUs 906. The calibration thread 1008 performs a calibration loop 1300. The first step performed by the calibration thread 1008 is to wait for the next time to perform the calibration process (block 1302). The HEU controller 958 can be configured to customize how often the calibration process and the calibration loop 1300 in the calibration thread 1008 is performed. Thus, the HEU controller 958 can be configured to perform calibration periodically and automatically without the need for a manual start, such as by directive of a technician. When the calibration process is to be performed, the calibration thread 1008 selects the next communication band to use to calibrate the optical fiber-based wireless system 900 (block 1304). As previously discussed, in this embodiment, one of two frequency bands is selected by selecting one of the two frequency switches 1262A, 1262B that control which calibration signal 1260A, 1260B is asserted on the downlink communication path 1250 in the downlink BIC 949, as illustrated in FIG. 38A. Next, the calibration thread 1008 selects the next RAU 906 to calibrate for the downlink calibration (block 1306). In this embodiment, only one RAU 906 is calibrated at one time since each RAU 906 provides its own unique downlink communication path 1250 once the common portion of the downlink communication path 1250 is split to different OIMs 910 by the downlink BIC 949 and then split to different RAUs 906 from the different OIMs 910.

With continuing reference to FIG. 39A, the calibration thread 1008 selects the next BTS 956 to be calibrated among the four (4) BTS inputs 957 provided in this embodiment (block 1308). Thus, each discovered and initialized RAU 906 is calibrated for each of the four (4) BTS inputs 957 for each of the two (2) frequencies of the calibration signals 1260A, 1260B in this embodiment (e.g., up to two hundred eighty-eighty (288) calibration processes from thirty-six (36) RAUs 906 times four (4) BTS inputs 957 times two (2) calibration bands). In this regard, the calibration thread 1008 provides three nested loops (blocks 1304, 1306, 1308) in this embodiment to provide each of these calibration permutations for the RAUs 906. Next, the calibration thread 1008 is ready to perform calibration (block 1310). The calibration thread 1008 instructs the HEU controller 958 to send a message to the downlink BIC 949 (block 1312). As previously discussed, this involves sending an $I^2C$ communication message from the HEU controller 958 to the downlink BIC microprocessor 965. The downlink BIC 949, via the downlink BIC microprocessor 965, will next set up the frequency switch 1262 of the target calibration oscillator 1258 to the target BTS input 957 (block 1314) and enable the desired calibration oscillator 1258 (block 1318) and frequency switch 1262 (block 1320) to generate the calibration signal 1260 at the desired calibration band. Note that in this embodiment, when one calibration oscillator 1258 is selected, the other calibration oscillator 1258 is automatically switched off and does not require a separate command to be disabled.

The signal strength of the calibration signal 1260 is measured by 1263A, 1263B. The downlink BIC microprocessor 965 will send an acknowledgement (ACK) message back to the HEU controller 958 to acknowledge receipt of the calibration message (block 1322).

When the acknowledgement message is received by the calibration thread 1008 from the downlink BIC 949 (block 1324), the calibration thread 1008 next issues a calibration request for the selected calibration band to the selected RAU 906 (block 1326). The selected RAU 906, and more particularly the RAU microprocessor 977 in this embodiment (see FIG. 38B), to be calibrated receives the calibration request from the HEU controller 958 to initiate the calibration process (block 1328). The RAU microprocessor 977 of the selected RAU 906 will set the downlink calibration switches 1272 (FIG. 38B) to send the electrical RF signals representative of the calibration signal 1260 to the antenna multiplexor 1275 to calibrate the downlink communication path 1250 for the selected RAU 906, as previously discussed (block 1330). Next, the selected RAU 906 will read the signal strength from the downlink calibration measurement components 1265 to determine the downlink communication path 1250 loss for the selected RAU 906 (block 1332).

Next, the uplink communication path 1254 involving the selected RAU 906 is calibrated. In this regard, the selected RAU 906 switches the downlink calibration switches 1272 to send the electrical RF signals representative of the calibration signal 1260 to the RAU band amplifiers 1276 for uplink calibration, as previously discussed (block 1338). The calibration measurement components 1276 measure the expected signal strength (block 1339). The selected RAU 906 then sends an acknowledgement (ACK) message back to the HEU controller 958 to indicate that the downlink calibration process is complete (blocks 1340, 1342). Thereafter, as illustrated in FIG. 39B, the calibration thread 1008 sends a calibration request for the selected calibration band to the OIM 910 supporting the selected RAU 906 (block 1344). The OIM microprocessor 973 for the selected OIM 910 receives the calibration request (block 1346) and sets the unused uplink calibration switches 1282 off and sets the used uplink calibration switch 1282 on (blocks 1348, 1350). This is because only one uplink communication path 1254 in the OIM 910 supports the selected RAU 906. Thereafter, the selected OIM 910 sends an acknowledgement (ACK) message to the HEU controller 958 (block 1352). When received (block 1354), the calibration thread 1008 sends a calibration request for the selected BTS input 957 and calibration band to the uplink BIC 950 (block 1356).

The uplink BIC 950 receives the calibration request from the HEU controller 958 (block 1358). The uplink BIC 950 sets the uplink calibration frequency switches 1286 to the selected BTS input 957 (block 1360). The signal strength of the calibration signal is then measured and the loss calculated using the uplink calibration measurement component 1284 (blocks 1362, 1364). The uplink BIC 950 then sends an acknowledgement (ACK) return message to the HEU controller 958 along with the calculated loss (blocks 1366, 1368). The HEU controller 958 then sends a request for setting the downlink calibration switches 1274 to the downlink (block 1369) to set up the next calibration loop, in which case the RAU 906 receives the message and sets the RAU calibration switch 1274 to the downlink setting (block 1371). The calibration thread 1008 then returns to calibrate the other BTS inputs 957 (block 1384). Thereafter, RAUs 906 are selected for the BTS inputs 957 until all discovered and initialized RAUs 906 are calibrated for the selected calibration band (block 1386). Then, the same process is repeated for the previously unselected calibration band (block 1388) to complete the calibration loop 1300.

When calculations in the required attenuations for the downlink (block 1391 in FIG. 39B), the total error for each downlink from the DL-BIC 949 to each RAU 906 is determined and stored. The total error for the communication downlinks in this embodiment is the input calibration signal strength (block 1321 in FIG. 39A) minus the end downlink calibration signal strength (block 1332 in FIG. 39A), and minus the initial gain set for the BTS input 957 by the user (default is 0 dBm in this embodiment) and minus any calibration offset configured in the DL-BIC 949 and RAU 906 selected. The total error is calculated for all downlink paths for all enabled BTS inputs 957. Next, the error attributed across all BTS inputs 957, the BTS error, is determined by determining the least common error across all losses for all downlink paths for all enabled BTS inputs 957. In this manner, the attenuator(s) in the DL-BIC 949 can be set to compensate for the loss attributed to the BTS inputs 957 such that this error is not compensated in RAUs 906 that have distinct paths in the downlink. The loss attributed to the BTS inputs 957 is then subtracted from the total loss calculated for each communication downlink path for all enabled BTS inputs 957 to determine the error attributed to the RAUs 906. The RAU 906 attenuation levels are then calculated from this remaining communication downlink error for each BTS input 957 for all enabled RAUs 906. For example, a weighted average loss or median loss for each RAU 906 for each enabled BTS input 957 may be used to determine the attenuation levels for each RAU 906. Values outside a given threshold tolerance may be discarded as incorrect values or indicative of other errors, which may generate an alarm.

The total error for each communication uplink from each RAU 906 to the UL-BIC 950 is determined and stored in a similar manner to the downlinks. The total error for the uplinks in this embodiment is the input calibration signal strength (block 1321 in FIG. 39A) minus the end uplink calibration signal strength (block 1364 in FIG. 39B), and minus the initial gain set for the a BTS input 957 by the user (default is 0 dBm in this embodiment) and minus any calibration offset configured in the UL-BIC 950 and OIM 910 selected. The total error is calculated for all uplink paths for all enabled BTS inputs 957. Next, the error attributed to all BTS inputs 957 is determined by determining the least common error across all losses for all downlink paths for all enabled BTS inputs 957. In this manner, the attenuator(s) in the UL-BIC 950 can be set to compensate for the loss attributed to the BTS inputs 957 such that this error is not compensated in OIMs 910 having distinct paths in the uplink. The loss attributed to the BTS inputs 957 is then subtracted from the total loss calculated for each uplink path for all enabled BTS inputs 957 to determine the error attributed to the OIMs 910. The OIM 910 attenuation levels are then calculated from this remaining error for each BTS input 957 for all enabled OIMs 910. For example, a weighted average loss or median loss for each OIM 910 for each enabled BTS input 957 may be used to determine the attenuation levels for each OIM 910. Values outside a given threshold tolerance may be discarded as incorrect values or indicative of other errors, which may generate an alarm.

When the attenuations levels are calculated, the attenuation levels can be applied, as illustrated in block 1392 in FIG. 39B. When multiple RAUs 906 are provided, an order of setting attenuators can be as follows: the DL-BIC 949 attenuators, the UL-BIC attenuators 950, the RAU 910 attenuators for all BTS inputs 957 on the downlink, and the OIM 910 attenuators for all BTS inputs 957 on the uplink. Further, alternative embodiments include not setting the attenuators to correct for the entire calculated error so that overshoot is not corrected in attenuation levels and/or to prevent intermittent noise from moving link gain to a much higher or lower value in a single calibration calculation iteration. For example, if an error is calculated, the attenuators may be compensated by increase or decrease in increments, for example, 1 dBm per calculation. Further, calibration may only be performed for one BTS input 957 or less than all BTS inputs 957. Attenuation levels may be set to maximum thresholds to minimize impact to shared links in the downlinks and uplinks.

The calibration thread 1008 checks to see if calibration has been turned off before repeating (block 1389), in which case it is turned off (block 1390). If calibrations are required, they are calculated (block 1391) and applied to the attenuators (block 1392). For the downlinks, the RAU microprocessor 977 can set the gain of two RAU attenuators 1336A, 1336B (FIG. 38B) and attenuators 1253 in the downlink BIC 949 to compensate for calculated losses from actual versus expected signal strengths after which the downlink communication path 1250 for the selected RAU 906 is calibrated. Similarly, the calibration thread 1008 calculates the attenuation for the selected OIM 910 to compensate for the loss in the uplink communication path 1254 (block 1391). The calibration thread 1008 then sends the attenuation settings to the selected OIM 910, which in turn sets the OIM 910 attenuation by setting the attenuation of the attenuators 1376A, 1376B (FIG. 38B) in the uplink communication path 1254 for the selected RAU 906 and in the attenuators 1287 in the uplink BIC 950.

Figure 40:
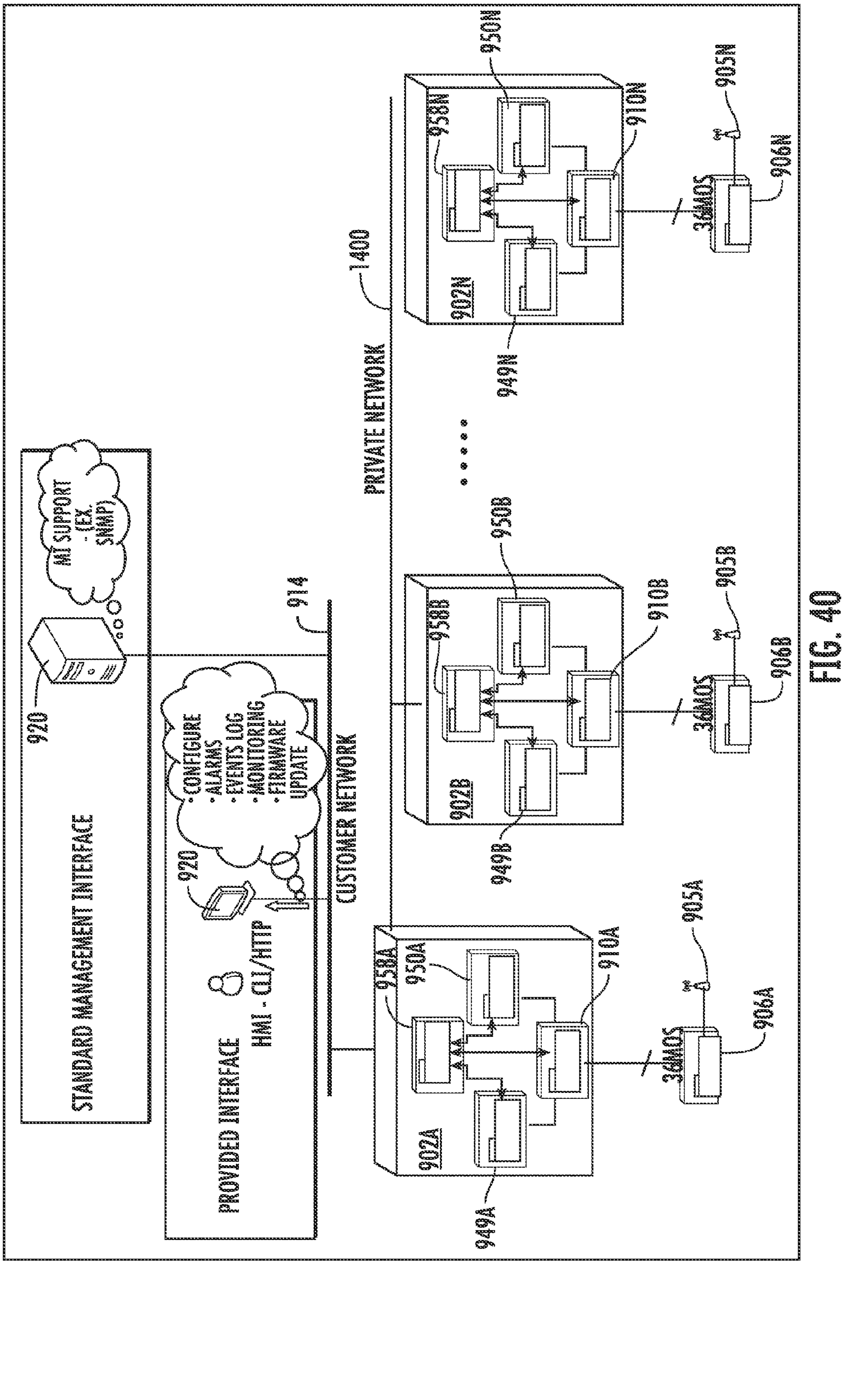
FIG. 40 is a schematic diagram of an exemplary master and slave HEU configuration.

As previously discussed, the embodiment of the HEU 902 is configured to support up to thirty-six (36) RAU s 906, via up to twelve (12) OIMs 910 supporting up to three (3) RAUs 906 each. However, in certain configurations, more than thirty-six (36) RAUs 906 may be needed or desired to provide the desired coverage areas. For example, the RAUs 906 may provide picocellular coverage areas. In this regard, a plurality of HEUs 902 may be provided 902A, 902B, 902N as illustrated in FIG. 40. In this example, one HEU 902A is configured as a master HEU with other HEUs 902B, 902N provided as slave units off of the master HEU 902A. The slave HEUs 902B, 902N are coupled to the master HEU 902A, and more particularly, the HEU controller 958A, via a private network 1400. The private network 1400 may be provided as any type of communication link and according to any protocol desired, such as Transport Communication Protocol (TCP)/Internet Protocol (IP), as an example. Each HEU 902A, 902B, 902N may be configured with its own TCP/IP address that supports data packet communications. In this manner, clients 920 can communicate over a customer network 914 with the master HEU 902A to not only retrieve and configure information from the master HEU 902A and the RAUs 906A, but also the slave HEUs 902B, 902N and RAUs 906B, 906N. The slave HEUs 902B, 902N and RAUs 906B, 906N are only accessible by clients 920 from the master HEU 902 in this embodiment.

Figures 41A, 41B, 41C:
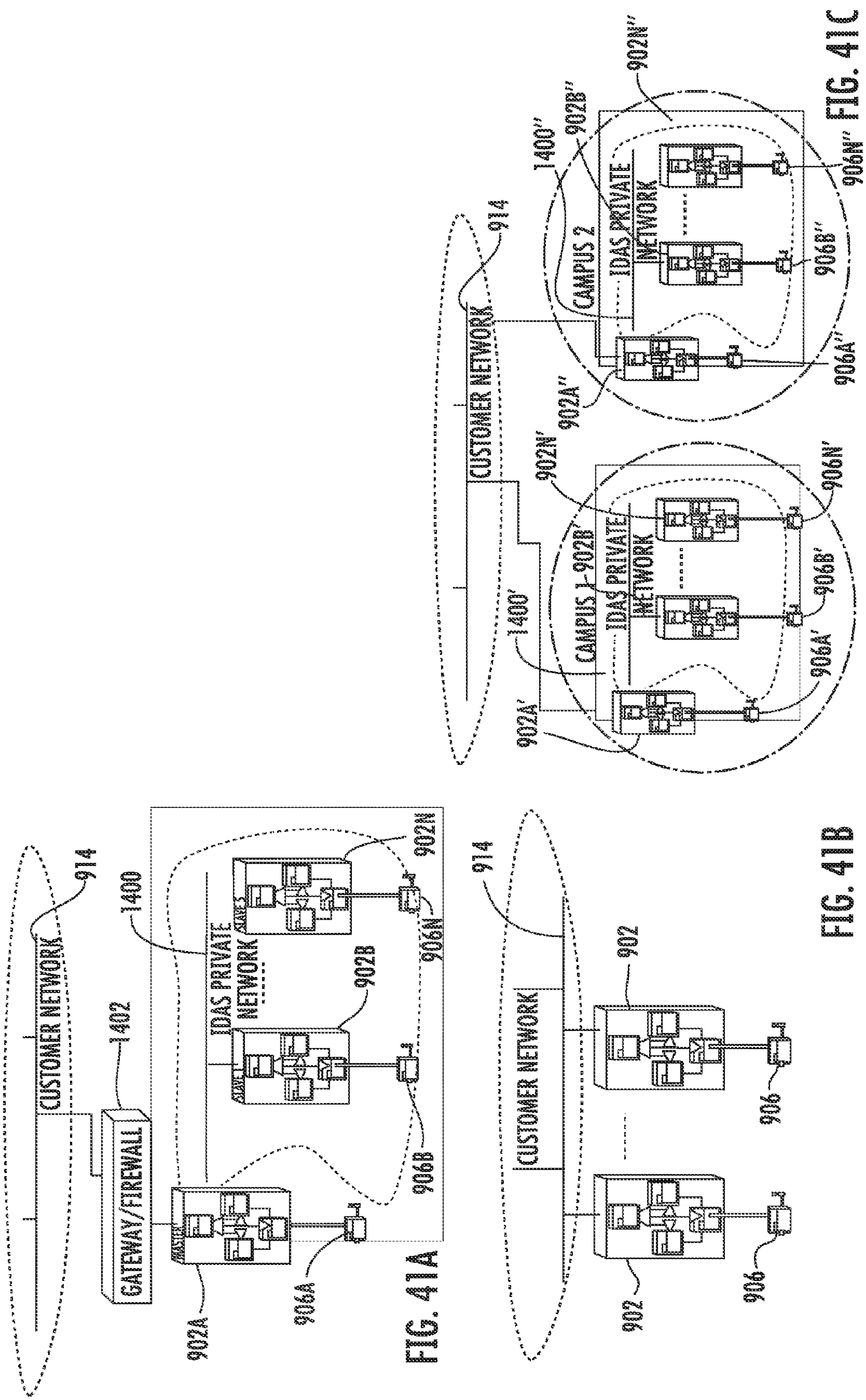
FIGS. 41A-41C are schematic diagram of other exemplary multiple HEU configurations.

FIG. 41A illustrates a similar HEU configuration to FIG. 40, except that a gateway/firewall 1402 is installed between the customer network 914 and the master HEU 902A. The gateway/firewall 1402 may allow private IP addresses between the master HEU 902A and the slave HEUs 902B, 902N on the private network 1400 and one public IP address to access the master HEU 902A via the customer network 914 (FIG. 24). The master HEU 902A may also employ Dynamic Host Configuration Protocol (DHCP) to assign private IP addresses to the slave HEUs 902B, 902N.

FIGS. 41B and 41C also illustrate configurations employing multiple HEUs 902. In FIG. 41B, each HEU 902 is connected and accessible on the customer network 914. Thus, both HEUs 902 are master units that each operate independently of each other. Still this embodiment, allows clients access from one master HEUs 902 to all other HEUs 902 on the customer network 914. The customer network 914 has to access each HEU 902 in FIG. 41B independently. In FIG. 41C, a configuration is provided that is a hybrid configuration of the configurations in both FIGS. 41A and 41B. In FIG. 41C, multiple master HEUs 902A', 902A" are provided that are each accessible over the customer network 914. Each master HEU 902A', 902A" is coupled to its own private network 1400', 1400" to communicate with slave HEUs 902B', 902N', 902B", 902N", respectively. Thus, as illustrated in FIGS. 40-41C, multiple configurations involving multiple HEUs 902 are possible and can be provided to configure the optical fiber-based wireless system(s) 900 in different configurations.

As previously discussed and illustrated in FIGS. 24, 25, and 30, the HEU 902 is configured to provide the external interface services via the external interface thread 1010. The external interface thread 1010 supports both the web server 940 for web browser interfacing and the SNMP agent 942 for interfacing to the SNMP server 920. The external interface thread 1010 allows access to data that has been previously described above regarding the optical fiber-based wireless system 900. For example, as illustrated in FIG. 30, the external interface thread 1010 includes an external interface queue that receives messages from other threads 1002 in the HEU controller 958 in this regard. For example, the logger thread 1004 sends communication messages to the external interface thread 1010 to report alarms, system events, errors, to calibrate and/or restart the HEU controller 958 and/or its threads 1002, etc. The HEU controller process 1001 also sends messages to the external interface thread 1010. The SNMP agent 942 and web server 940 can also be directly accessed via the external interface manager module 974. The external interface thread 1010 also has direct access to datastore 966 to be able to obtain information stored in datastore 966 by the other threads 1002, including points and point information and module configurations. Some of these features will be discussed now in more detail by example of the web server 940 in the HEU 902. As previously discussed, the web server 940 allows the ability for web clients 920 to access the HEU 902 and the HEU controller 958.

The web server 940 in this embodiment can support a number of the previously described features provided in the HEU 902. For example, the web server 940 can allow a client 920 to configure the HEU 902. This includes enabling or disabling BTS 956 bands, adjusting BTS input 957 power levels, and setting gains for RAUs 906. The web server 940 in this embodiment also allows configuring network addresses for the HEU 902, user access management, saving the configuration of the HEU 902 to an external file or uploading a configuration from a file, configuring the SNMP interface, and managing floor plans for the optical fiber-based wireless system 900.

The web server 940 also allows a client 920 to monitor the overall status of the optical fiber-based wireless system 900. The client 920 can view the status of the points by allowing access to the point list 993. The web server 940 also allows a client 920 to set properties for the points. The web server 940 allows client 920 access to alarms and logs reported by the HEU controller 958. The web server 940 also allows a client 920 to upgrade firmware or software for the various microprocessor-based components of the optical fiber-based wireless system 900. These same features and services can also be provided by the SNMP agent 942.

Figure 42:
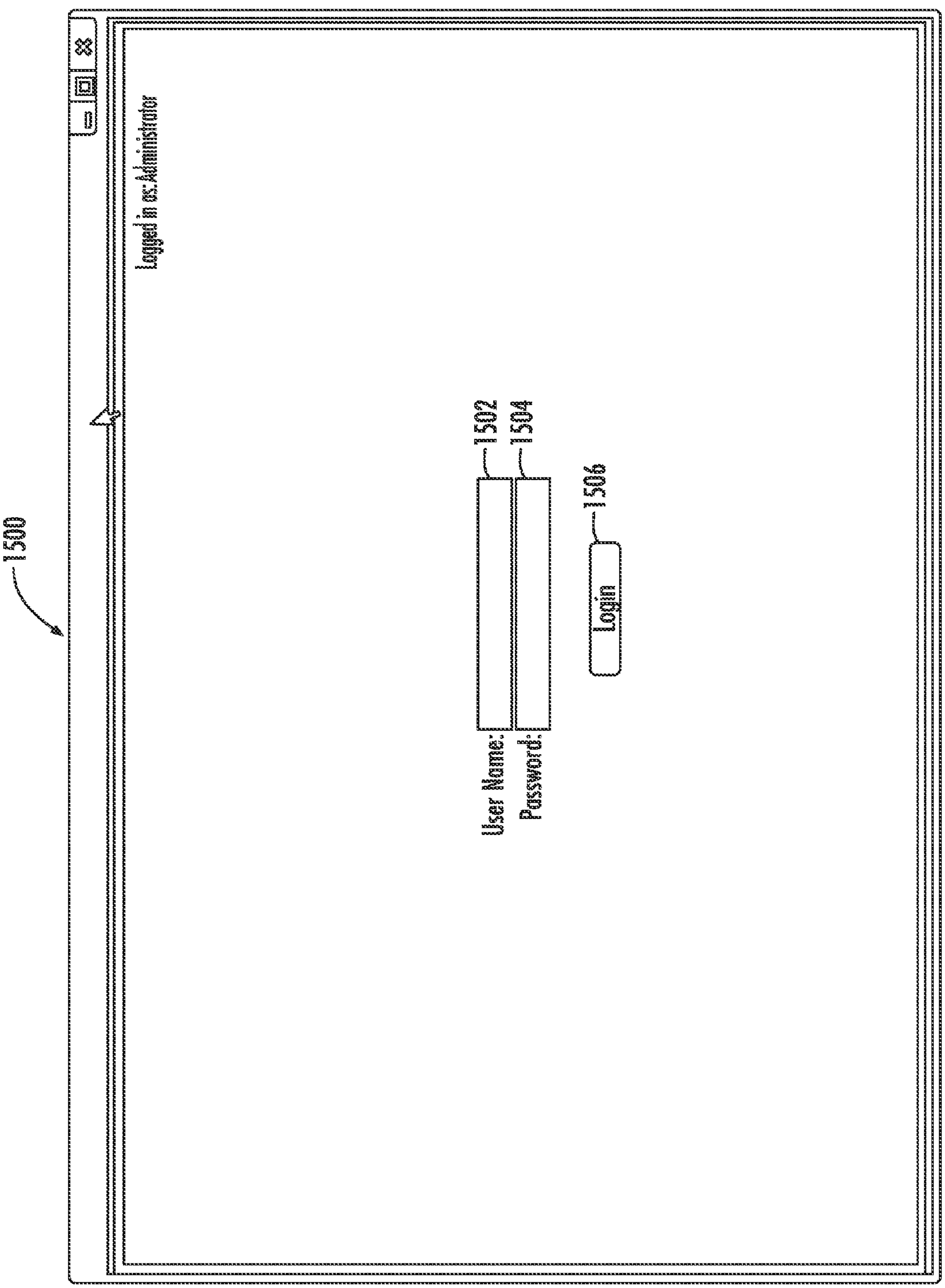
FIG. 42 is an exemplary web browser login page for web client access the HEU.

In this regard, FIGS. 42-48 illustrate exemplary web browser graphical user interface (GUI) screens that are supported by the web server 940 in this embodiment to allow web clients 920 to access the HEU 902 and to perform various features and functions. FIG. 42 illustrates a login page 1500 displayed on the browser of a client 920 that may be provided by the web server 940 to the client 920 when the IP address of the HEU 902 is accessed by the client 920. The web server 940 may require a user name and password that has been previously established in the web server 940 and stored in a user name and password list in datastore 966 before granting a client 920 access to further features for the HEU 902 provided by the web server 940. A user would type in their user name in the user name box 1502 and their corresponding password in the password box 1504 and select the "Login" button 1506 on the login page 1500 to log into the HEU 902. The web server 940 will authenticate the user name and password before granting further access to the client 920. The web server 940 may support different types of logins with different authorization or access ability.

Figure 43:
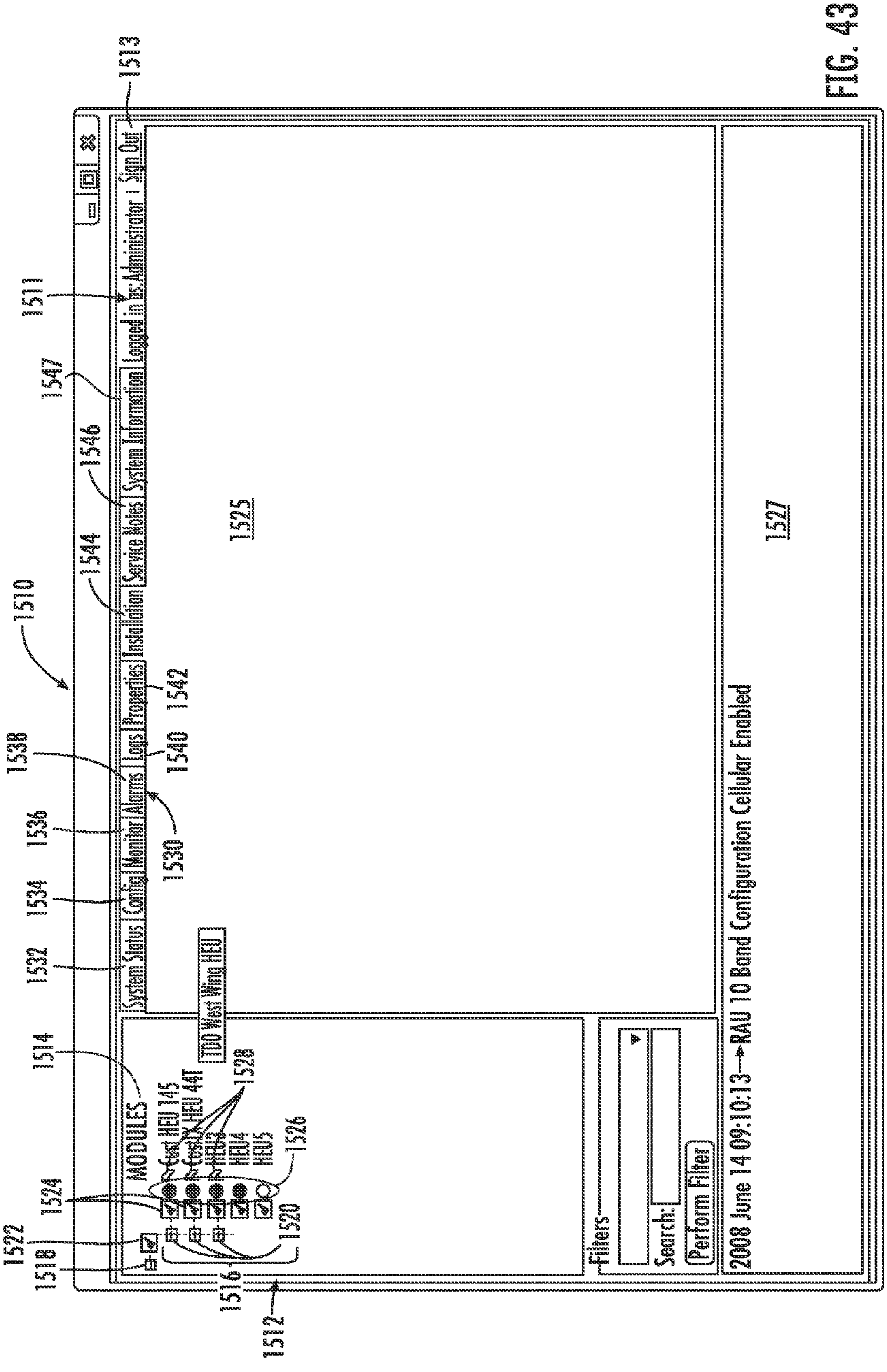
FIG. 43 is a default page supported by the HEU and displayed on a web browser client.

FIG. 43 illustrates a various categories of access to the HEU 902. The name of the user currently logged in is displayed in a user login name area 1511. If the user desires to log out, the user can select the "Sign Out" link 1513. A banner 1512 is provided on the left-hand side of the page 1510 that illustrates the current optical fiber-based wireless systems ("IDAS System") currently provided in a hierarchal or tree structure. For example, underneath an IDAS System heading 1514, there are five (5) HEUs 1516 listed. An expansion button 1518 by the IDAS System heading 1514 can be selected to show the HEUs 1516 included in the system. Each of the HEUs 1516 can be given customer names, if desired, which can be alias names. As will be described in more detail below, expansion buttons 1520 are also provided beside each HEU 1516 to further expand access to modules in the HEU 1516, which in this case would be discovered and initialized OIMs 910. OIMs 910 can be expanded to show discovered and initialized RAUs 906 coupled to the OIMs 910. Selection boxes 1522, 1524 allow selection of the desired HEUs 1516. Operations performed in a feature section 1525 of the default page 1510 will be performed on selected devices or modules. If the selection box 1522 for the IDAS System is checked, the selection boxes 1524 for HEUs 1516 therein will be checked automatically. However, each HEU 1516 can be unchecked or checked individually as desired.

The status of each HEU 1516 is shown in a status icon 1526 to provide a visual status indication of the component shown, which in this example is an HEU 902. For example, the status icons 1526 could be color coded. A green color could indicate no errors or warning for the HEU 902 and its components in this embodiment. A yellow color could indicate that at least one warning is present for the HEU 902 in this embodiment. A red color could indicate a critical error is present for the HEU 902 in this embodiment. Beside the status icons 1526 are flags 1528 that are provided if a component within the HEU 902 has a fault, which in this case would be either an OIM 910 or a RAU 906. The feature section 1526 includes a banner 1530 that provides the various functions and features made available to the client 920 with regard to the selected HEU(s) 902 or modules. The "System Status" tab 1532 can be selected to view the status of a selected HEU 902. The "Config" tab 1534 can be selected to configure certain aspects of the HEU 902 or its modules. The "Monitor" tab 1536 can be selected to monitor the selected HEU 902 and its modules that have been discovered and initialized. The "Alarms" tab 1538 can be selected to view alarms either reported by the modules or calculated by the scheduler thread 1007 in an HEU controller 958. The "Logs" tab 1540 can be selected to view the log of system events recorded by the logger thread 1004 in a HEU controller 958. The "Properties" tab 1542 can be selected to provide certain properties about selected HEUs 902 or other components. The "Installation" tab 1544 can be selected to provide information about installation. The "Service Status" tab 1546 can be selected to view the overall status of a selected HEU 902 or module. The "System Information" tab 1547 can be selected to display a table of module information for each detected module in the HEU 902 and RAUs 906 connected thereto. Each of the features available through the external interface functionality of the HEU 902 will be discussed in more detail below. A tracer event can also be displayed in the trace message section 1527.

Figure 44:
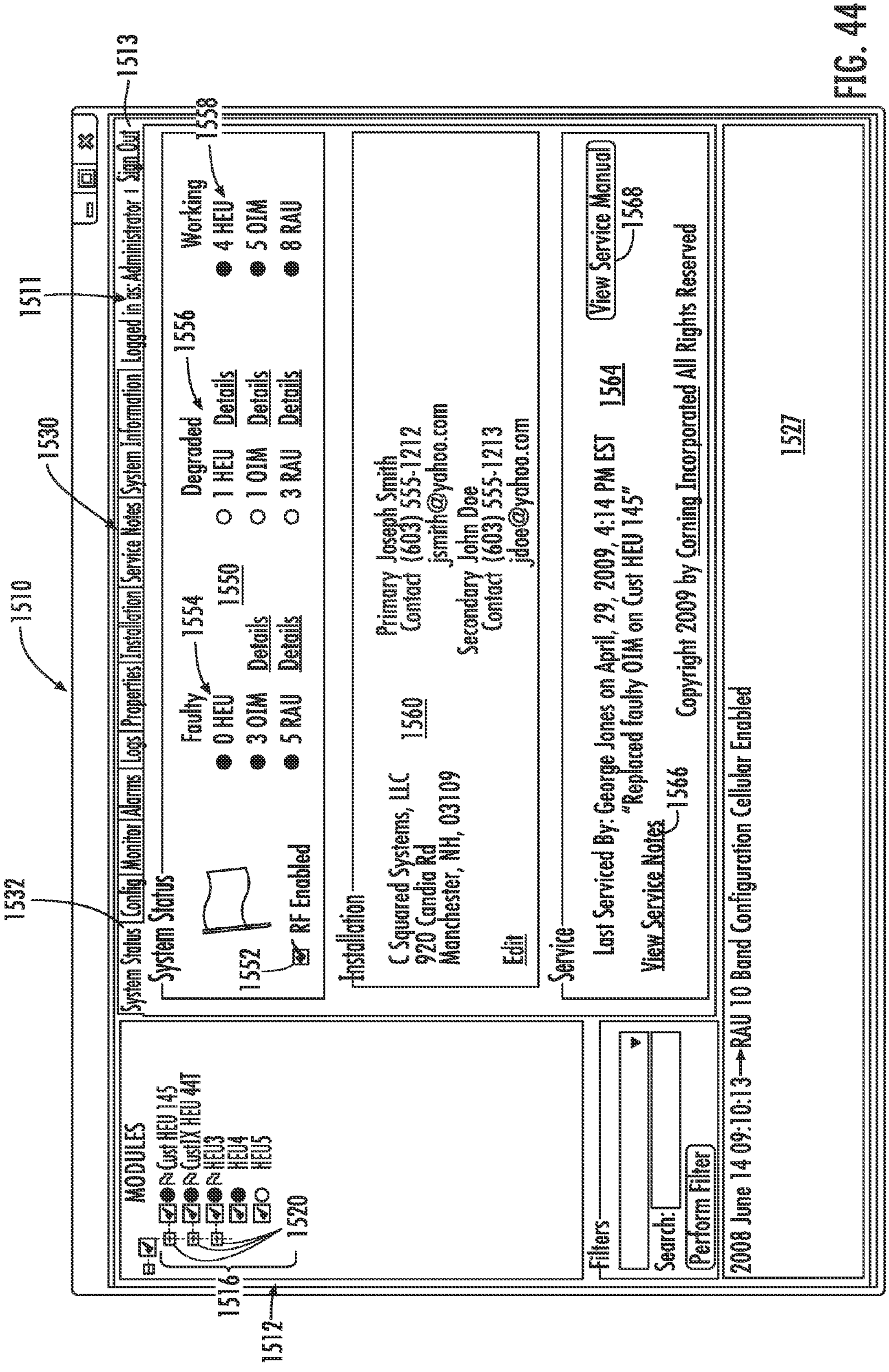
FIGS. 44-45 are exemplary default pages illustrating a default statuses supported by the HEU and displayed on a web browser client.
Figure 45:
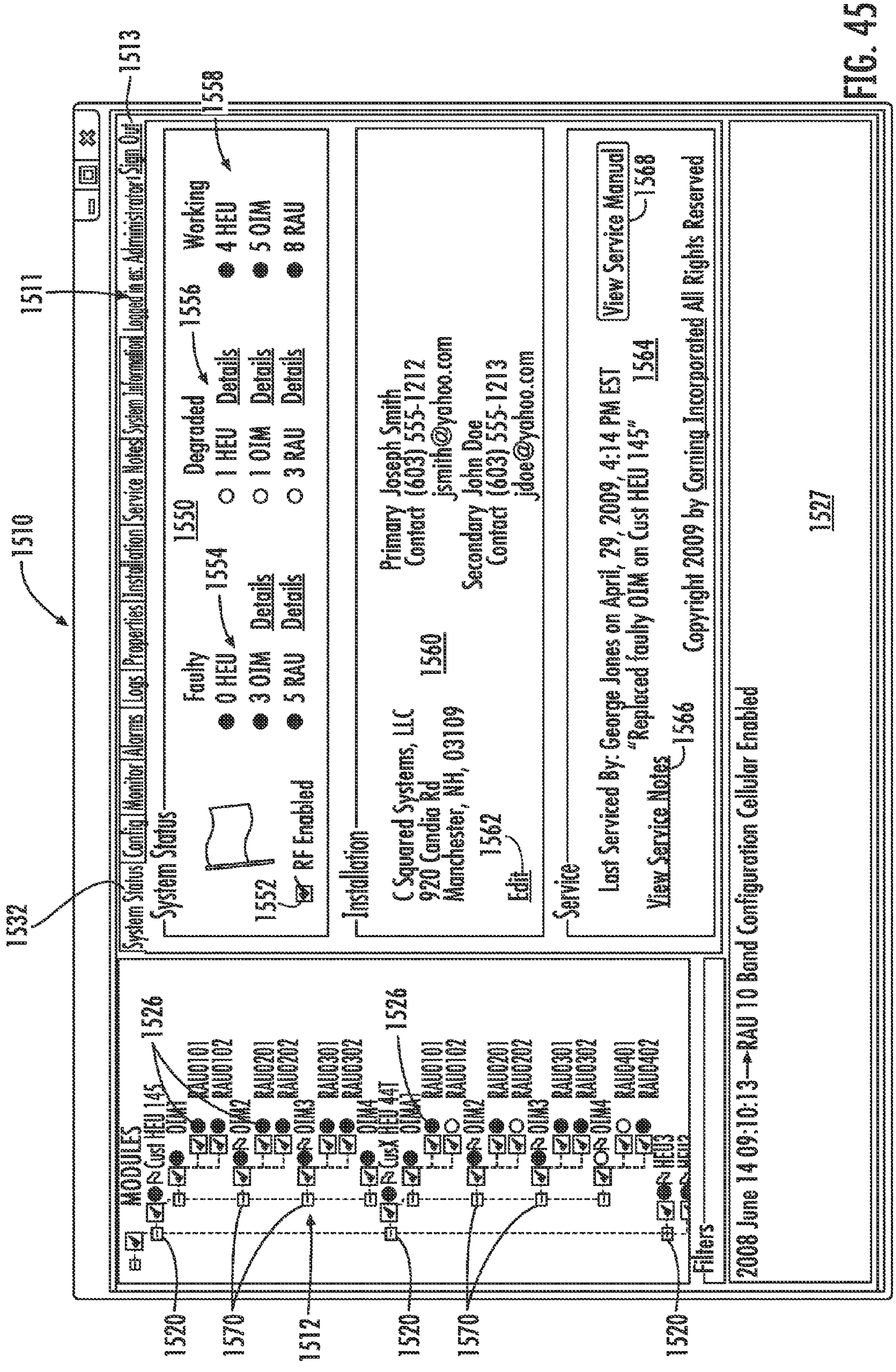

FIG. 44 illustrates the default page 1510 when the "System Notes" tab 1532 has been selected by a client 920. The default page 1510 is also displayed as the initial page after a user has logged in. As illustrated, the overall or "snapshot" of the system status is provided in a "System Status" area 1550. If RF communication has been enabled, an "RF Enabled" check box 1552 is selected. RF communications can be disabled by unselecting the "RF Enabled" check box 1552 if such permission is granted to the user, otherwise the "RF Enabled" check box 1552 will be unselectable. The number of faulty HEUs 902, OIMs 910, and RAUs 906 are listed in a "Faulty" section 1554, meaning these components are at fault. The number of degraded components is also listed in a "Degraded" section 1556, meaning a fault condition exists, but the components may be operational. The number of operational components without faults are listed in a "Working" section 1558. The details regarding the installer and primary and secondary contacts can be displayed in an installation area 1560. This information can be edited by selecting the "Edit" link 1562. Notes regarding the last service are displayed in a "Service" area 1564. Service notes entered by a service technician can be displayed by selecting the "View Service Notes" link 1566. The service manual can be viewed by selecting the "View Service Manual" link 1568. If more information regarding identifying which HEUs 902, OIMs 910, and RAUs 906 in particular are at fault, the expansion buttons 1520 can be selected to expand and display the OIMs 910 for each expanded HEU 902 in the banner 1512, as illustrated in FIG. 45. Expansion buttons 1570 for each OIM 910 can be further selected to display the RAUs 906 for each expanded OIM 910. Status icons 1526 and status flags 1528 are displayed beside the modules that contain warning or errors. Status flags 1528 are not displayed beside the RAUs 906, because the RAUs 906 have no further sub-components that are tracked for errors at the system level accessible externally through the HEU 902.

Figure 46:
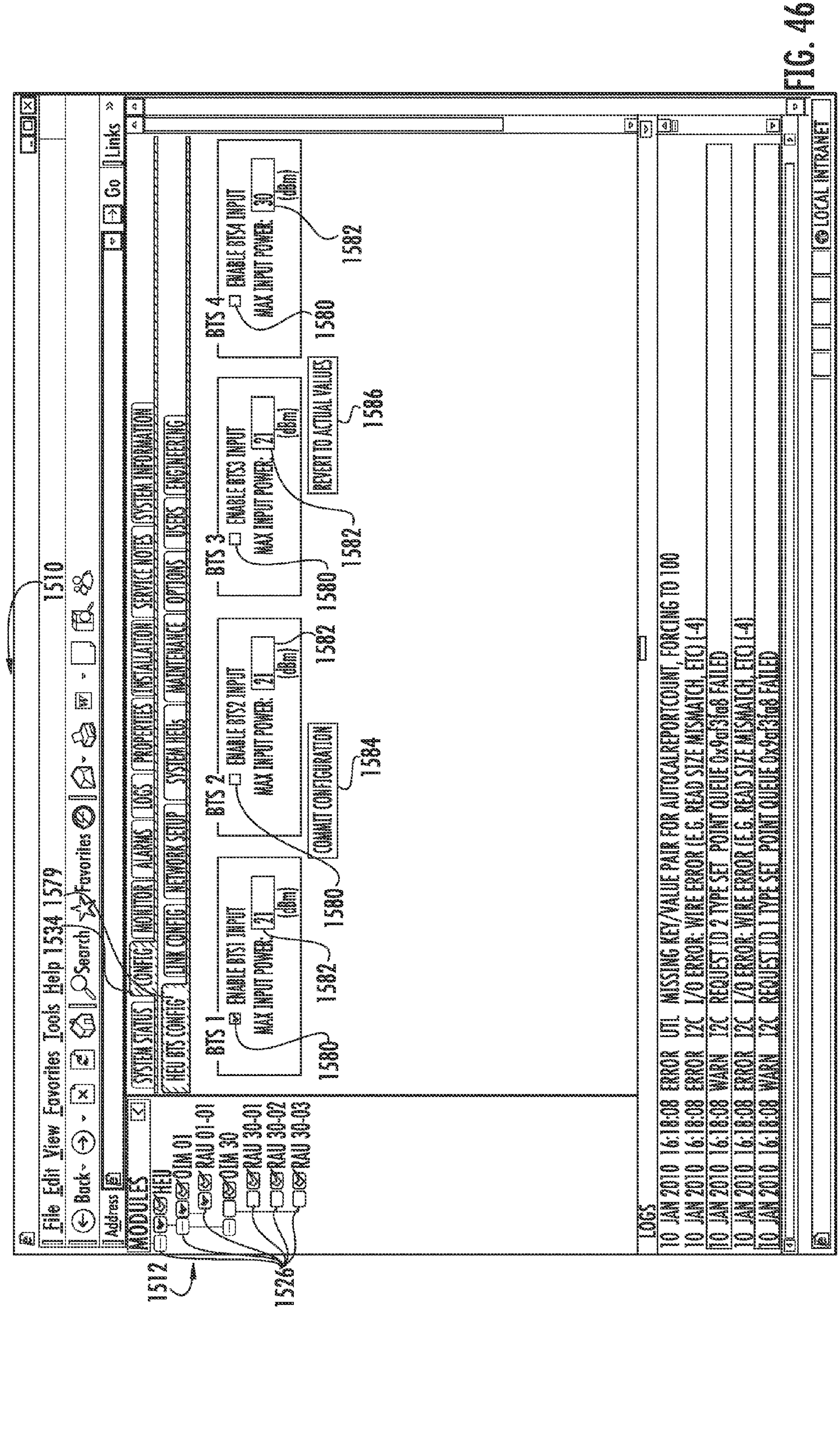
FIG. 46 is an exemplary HEU configuration page supported by the HEU and displayed on a web browser client.

FIG. 46 illustrates an exemplary configuration page displayed on a client's 920 web browser when a "HEU BTS Config" tab 1579 has been selected under the "Config" tab 1534. The HEU 902 supports the ability of a client 920 to configure certain aspects of the HEU 902. Configuration can involve configuring the HEU 902 and configuring the communications links for the HEU 902. For example, as illustrated in FIG. 46, the web server 940 allows the client 920 to enable or disable BTS inputs 957 for selected HEUs 902 in the banner 1512 by selecting a BTS input enable box 1580 for each BTS input 957 (i.e., BTS 1, BTS 2, BTS 3, BTS 4). If the BTS input enable box 1580 is not selected for a particular BTS input 957, the BTS input power for such BTS input 957 is defaulted to 0 dBm in this embodiment. If the BTS input enable box 1580 is enabled, the maximum input power or gain (in dBm) for the BTS inputs 957 can be provided by typing a number in an input power input box 1582. The BTS inputs 957 may be limited, for example, between −10 and 30 dBm, with 30 dBm being the maximum input power. Different BTS inputs 957 may be provided by different carriers or service providers and may be normalized for this reason via configuration. Uplink BIC ports may also be limited for maximum power input although not configurable by a client in this embodiment. Thereafter, the new configuration can be committed by selecting a "Commit Configuration" button 1584, which will then cause the HEU controller 958 to apply the power level settings to the BTS inputs 957 for the RAUs 906 per BTS input band. The gain level will affect the calibration of the links. Alternatively, by selecting a "Revert to Actual Values" button 1586, the previously committed input power values will be retained and displayed in the input power input boxes 1582 for the RAUs 906 for the selected HEUs 902.

Figure 47A:
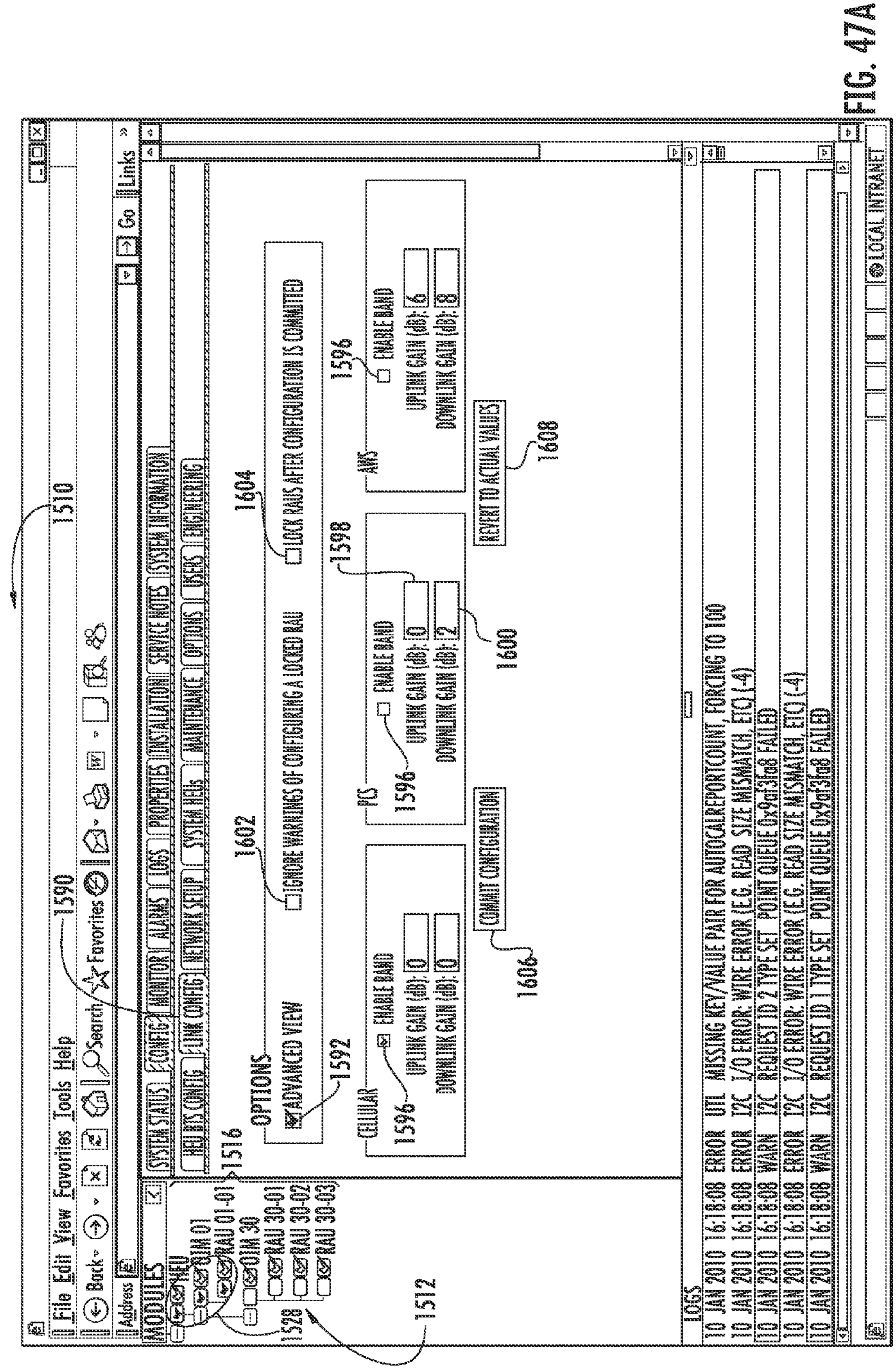
FIG. 47A is an exemplary link configuration page supported by the HEU and displayed on a web browser client.

FIG. 47A illustrates an exemplary configuration page displayed on a client's 920 web browser when a "Link "Config" tab 1590 has been selected. The HEU 902 supports the ability of a client 920 to configure links for the HEU 902. For example, as illustrated in FIG. 47A, the web server 940 allows, as an option, the client 920 to select an advanced view by selecting an "Advanced View" selection box 1592. If selected, separate gains for uplinks and downlinks can be provided, otherwise only one gain setting is allowed for both the downlink and uplink of a given band. In response, the possible bands that can be enabled will be displayed in a band display area 1594. Each band can be enabled or disabled by selecting or deselecting "Enable Band" selection boxes 1596. The uplink gain and downlink gain (in dB) can be set by the client 920 for enabled bands by typing in the desired gains in an "Uplink Gain" input box 1598 and a "Downlink Gain" input box 1600 for each band. Warnings can be ignored if configuring a locked RAU 906 by selecting an ignore warning selection box 1602. The link configuration for the RAUs 906 can be locked after a link configuration has been committed by selecting a lock RAUs section box 1604. Locking the configuration locks the gain for the RAUs 906 and other set values such that they cannot be changed without unlocking and proper authorization. These link configurations can be committed by selecting a "Commit Configuration" button 1606, which will then cause the HEU controller 958 to apply the link configurations to the RAUs 906, as previously discussed (see FIG. 38B). Alternatively, by selecting a "Revert to Actual Values" button 1608, the previously committed link configurations will be retained and displayed. When a module is selected, if an alarm is already present, it can be displayed and viewed.

Figure 47B:
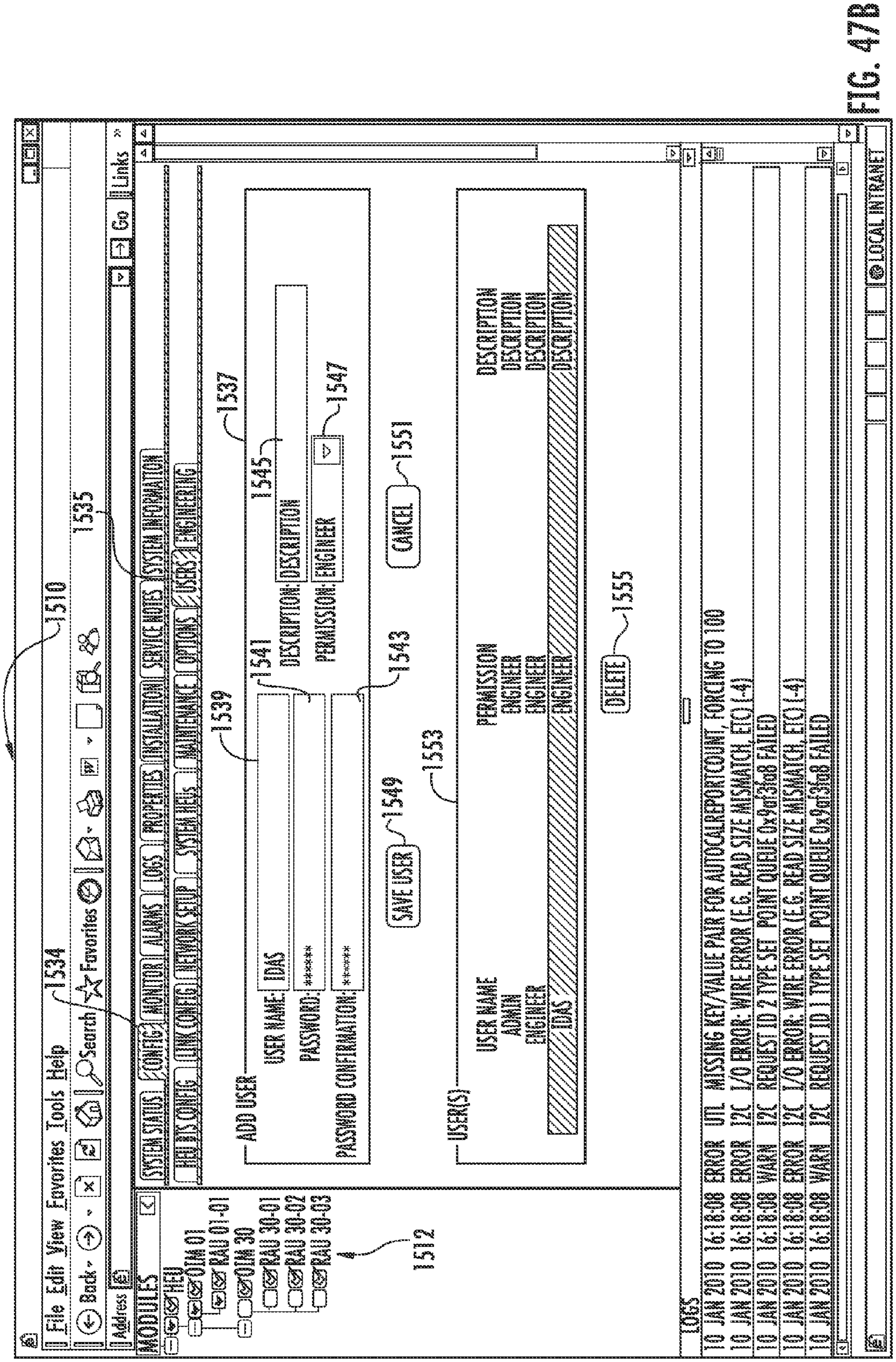
FIG. 47B is an exemplary add user page supported by the HEU and displayed on a web browser client.

FIG. 47B illustrates an exemplary users page displayed on a client's 920 web browser when the "Users" tab 1535 under the "Config" tab 1534 has been selected. This allows authorized users to be created and provides a list of established users. The "Users" tab 1535 may be restricted based on the permission level for the current user. In this regard, an "Add User" section 1537 is provided whereby a new user can be added. A user name 1539 and password 1541, 1543 can be entered for an added user. A description 1545 for the added user and a permissions setting 1547 for the added user can be selected. Different permissions can be selected to control various accesses to the HEU controller 958 and its functionality. Once the information for the new user is provided, the user information can be saved by selected a "SAVE USER" button 1549 or the addition of the user can be cancelled by selecting a "CANCEL" button 1551. If it is desired to edit or delete a previously added user, a users list 1553 is displayed wherein any of the users can be selected. For example, a user with the user name "IDAS" is selected in the users list 1553. The user can be deleted by selecting a delete button 1555, if desired.

Figure 47C:
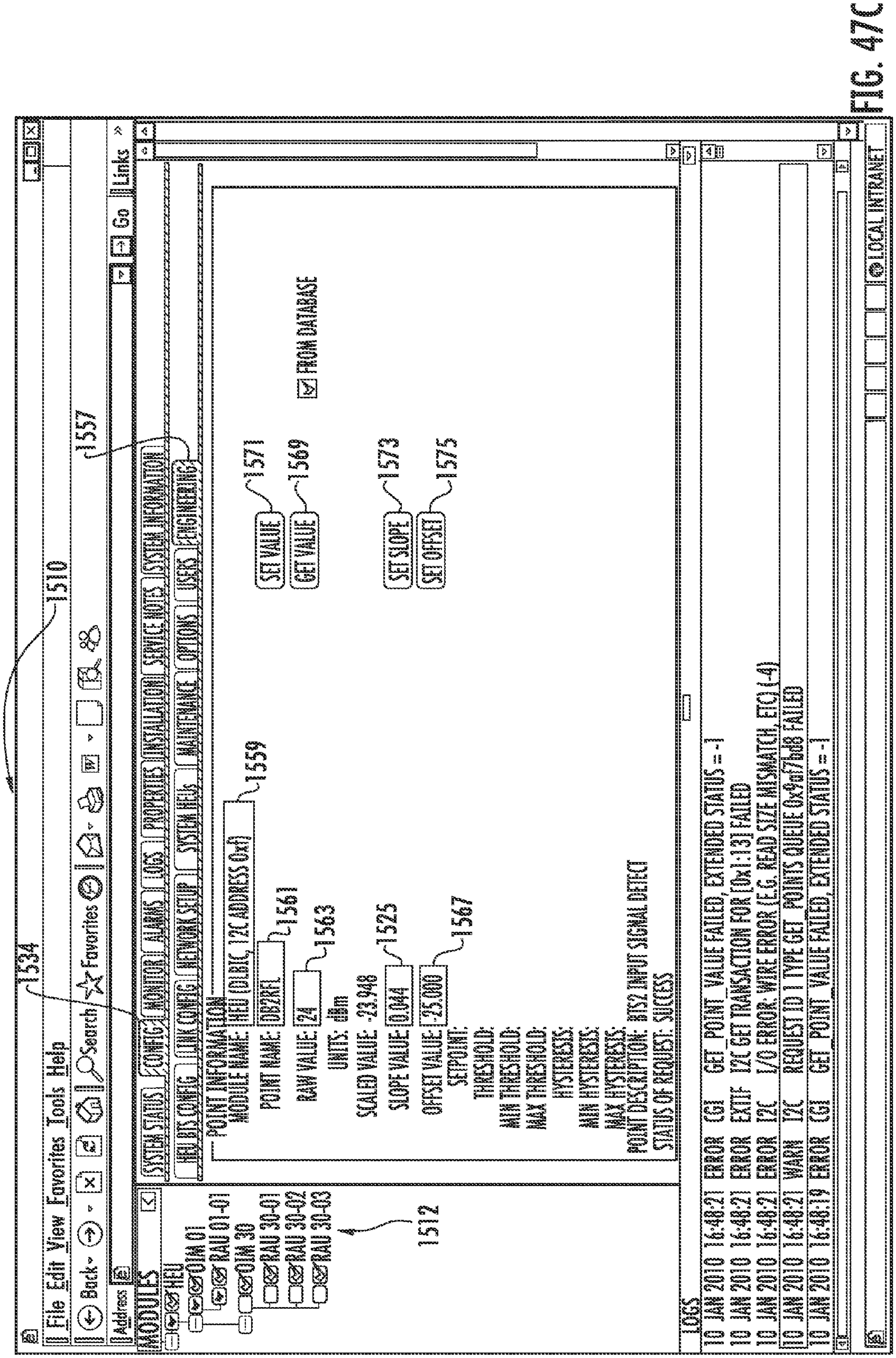
FIG. 47C is an exemplary points information page supported by the HEU and displayed on a web browser client.

FIG. 47C illustrates an exemplary engineering page displayed on a client's 920 web browser when the "Engineering" tab 1557 under the "Config" tab 1534 has been selected. This allows point information that is configurable to be edited by a user to be edited. For points for modules, as indicated by the module name 1559 and point name 1561, the raw value 1563, slope value 1565, and offset value 1567 of the point can be edited by a user. The raw value 1563 sets the VALUE bit in the flagbits 999, as previously discussed and illustrated in FIG. 29. The slope value 1565 and offset value 1567 set the STEP SIZE and OFFSET bits in the flagbits 999, as previously discussed and illustrated in FIG. 29. If it is desired to see the current value of the raw value 1563, slope value 1565, and offset value 1567, a get value button 1569 can be selected, in which case these values are displayed to the user. To set the raw value 1563, slope value 1565, and offset value 1567 to the values entered by the user, a set value button 1571, set slope button 1573, and set offset button 1575 can be selected, respectively, wherein the HEU controller 958 will update such information for the selected point name 1561.

Figure 48:
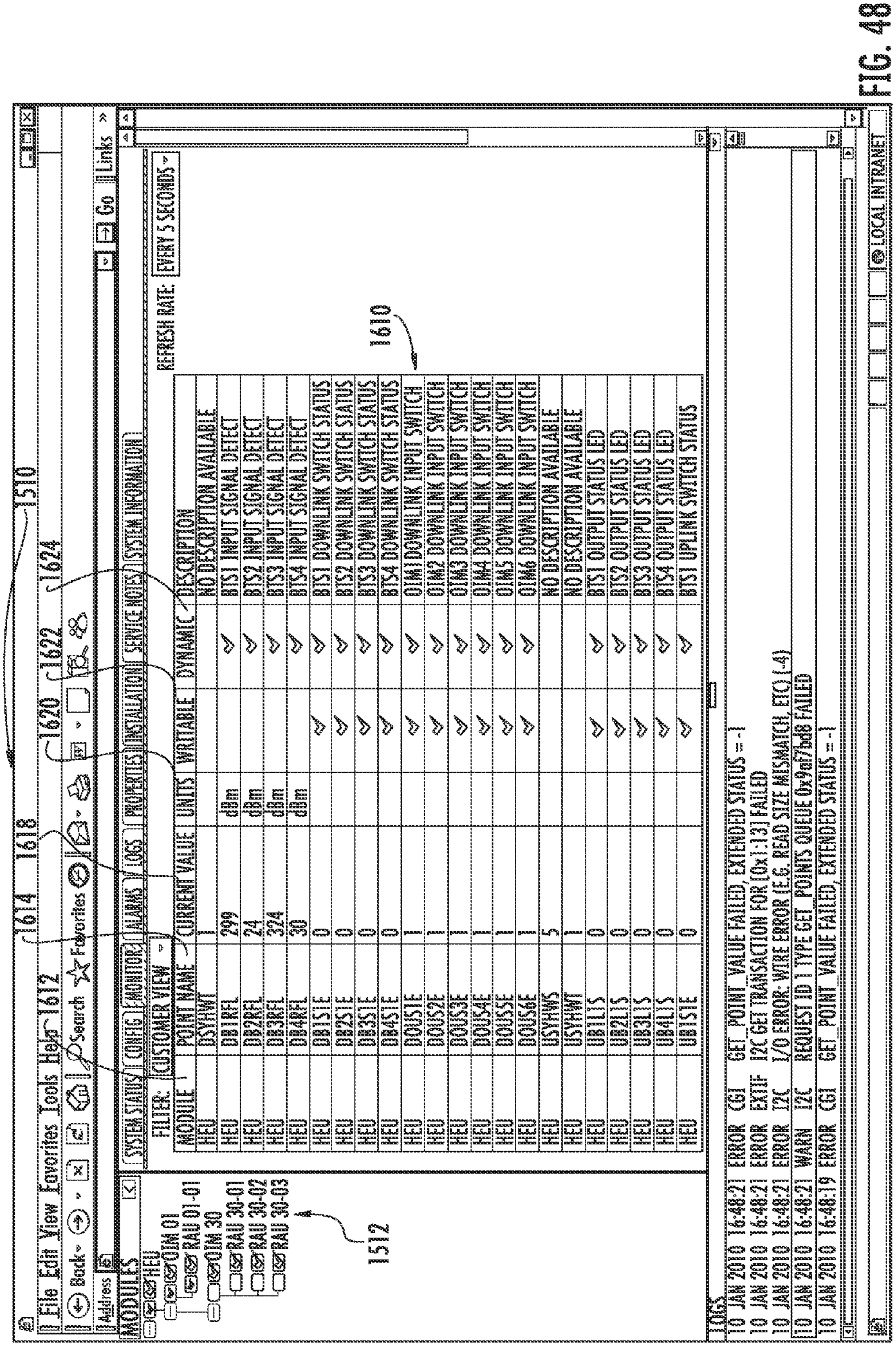
FIG. 48 is an exemplary system monitor page supported by the HEU and displayed on a web browser client.

FIG. 48 illustrates an exemplary system monitor page displayed on a client's 920 web browser when the "Monitor" tab 1536 has been selected and at least one module has been selected. The HEU 902 supports the ability of a client 920 to monitor points for the HEU 902. For example, as illustrated in FIG. 48, the web server 940 allows the client 920 to see a listing 1610 of all points for all modules 1612 by point name 1614, the current value of the point 1618, the units 1620, and whether the point is writeable 1622 and dynamic 1624.

Figure 49:
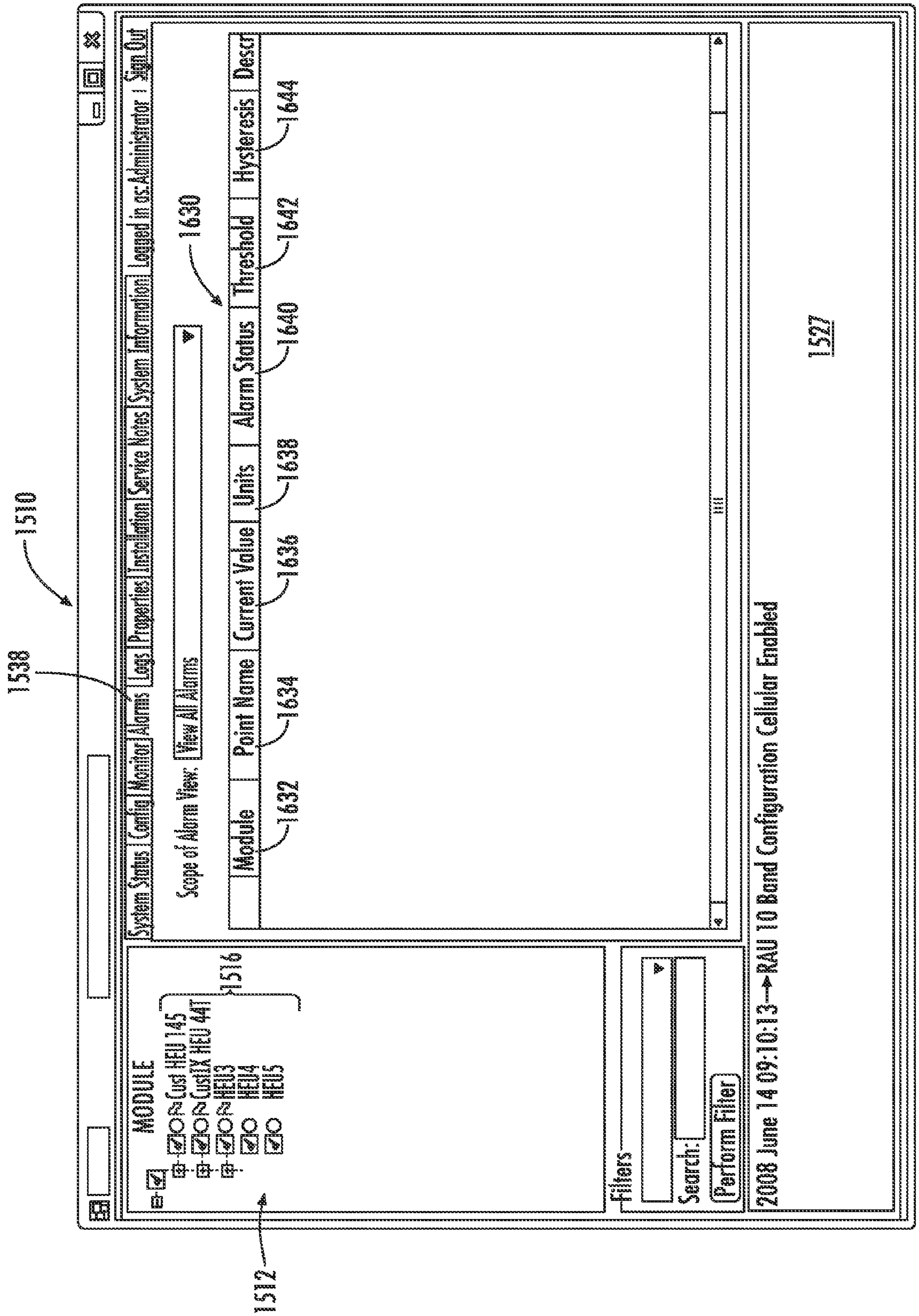
FIG. 49 is an exemplary system alarm page supported by the HEU and displayed on a web browser client.

FIG. 49 illustrates an exemplary system alarm page displayed on a client's 920 web browser when the "Alarms" tab 1538 has been selected. The HEU 902 supports the ability of a client 920 to see alarms generated for the HEU 902. For example, as illustrated in FIG. 49, the web server 940 allows the client 920 to see a listing of all alarms 1630 by module 1632, point name 1634, current value 1636, units 1638, alarm status 1640, threshold 1642, hysteresis 1644, and other characteristics that may be provided in the flagbits 999 (FIG. 29).

Figure 50A:
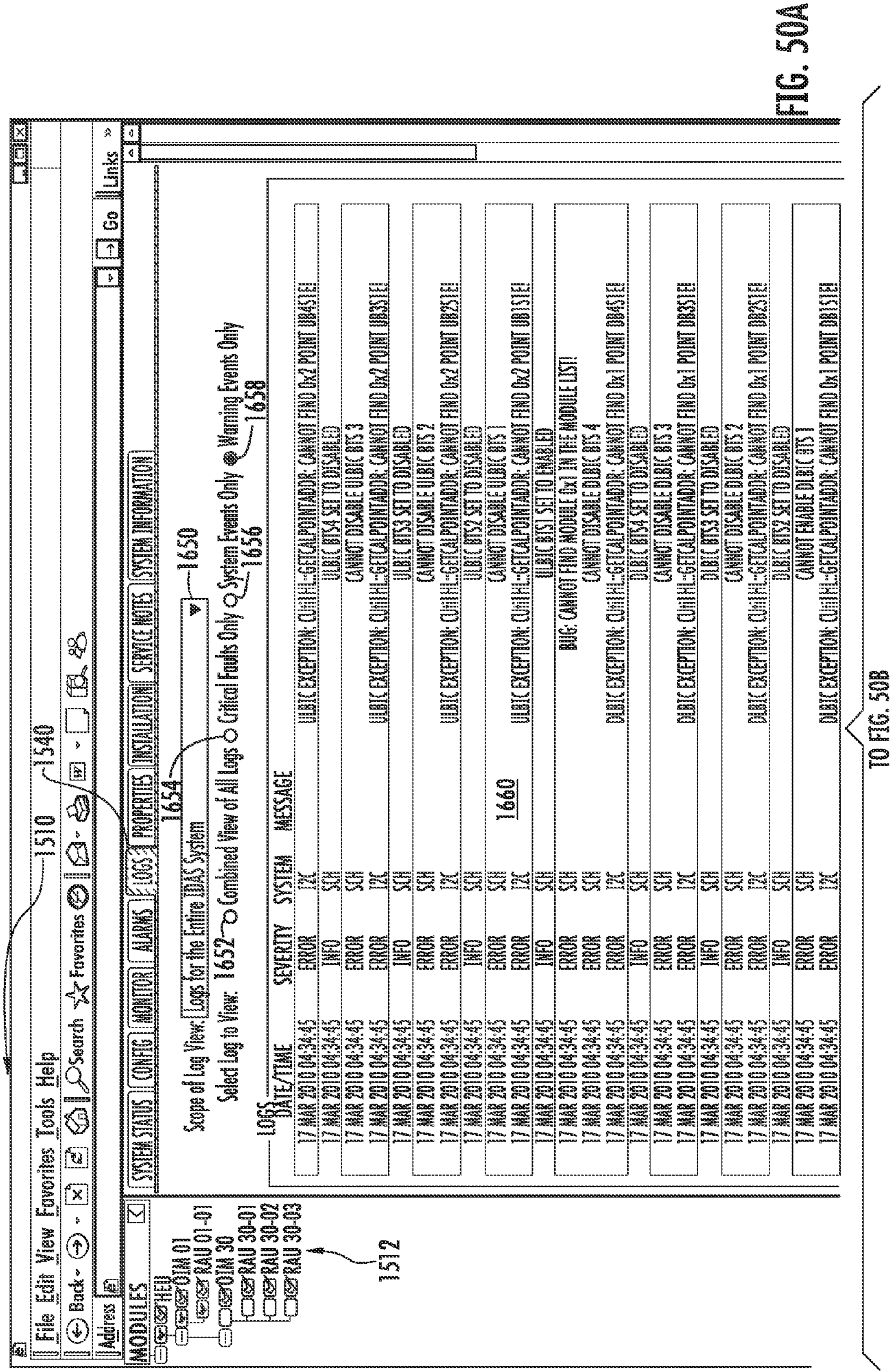
FIGS. 50A and 50B illustrate an exemplary log page supported by the HEU and displayed on a web browser client.
Figure 50B:
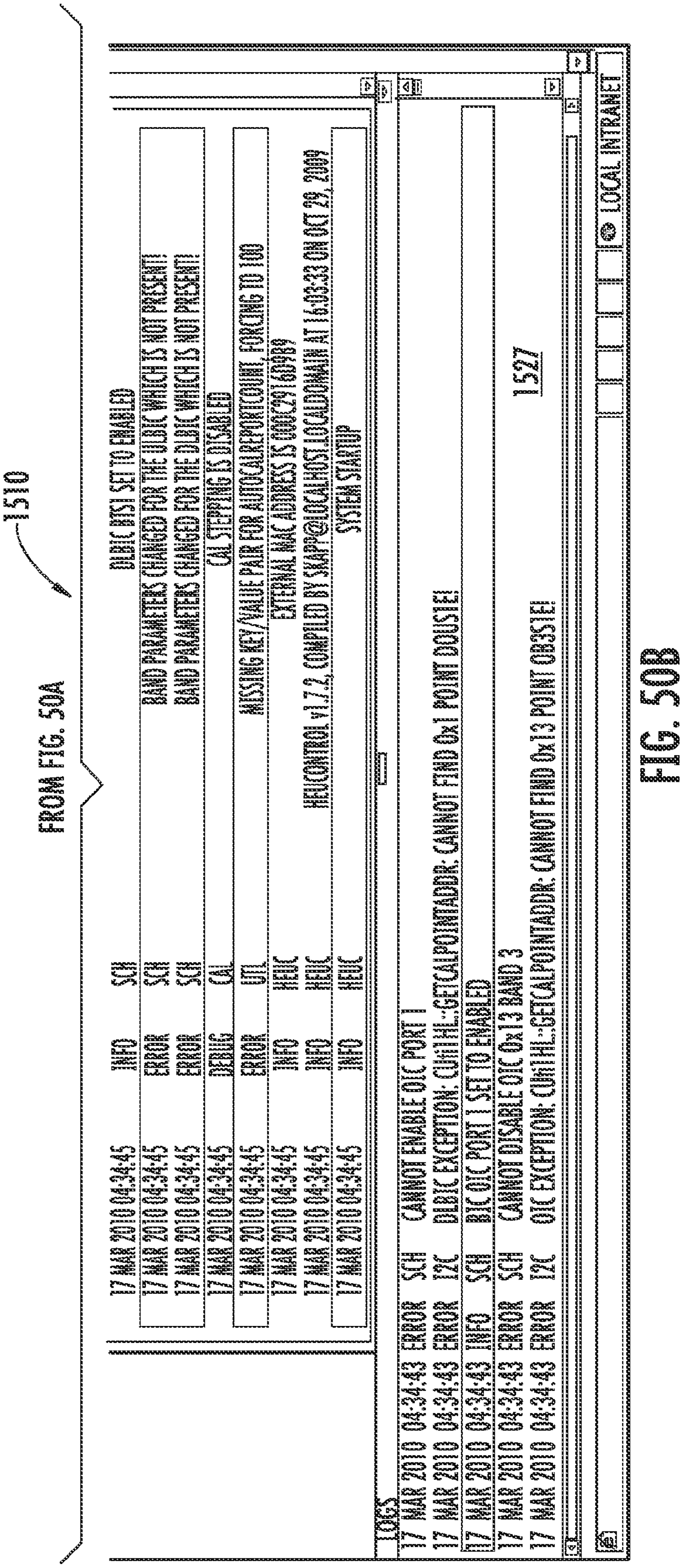

FIGS. 50A and 50B illustrate an exemplary log page displayed on a client's 920 web browser when the "Logs" tab 1540 has been selected. The HEU 902 supports the ability of a client 920 to see logs, which are system events, generated for the HEU 902. For example, as illustrated in FIGS. 50A and 50B, the web server 940 as an option allows the client 920 to select the logs desired to be viewed by selecting an option in a "Scope of Log View" selection drop down menu 1650. Optional radio buttons 1652, 1654, 1656, and 1658 can be selected individually to see a list of all logs, critical faults only, system events only, or warning events only, respectively. The logs, whichever options are selected, are displayed in a listing 1660 on the default page 1510.

Figure 51A:
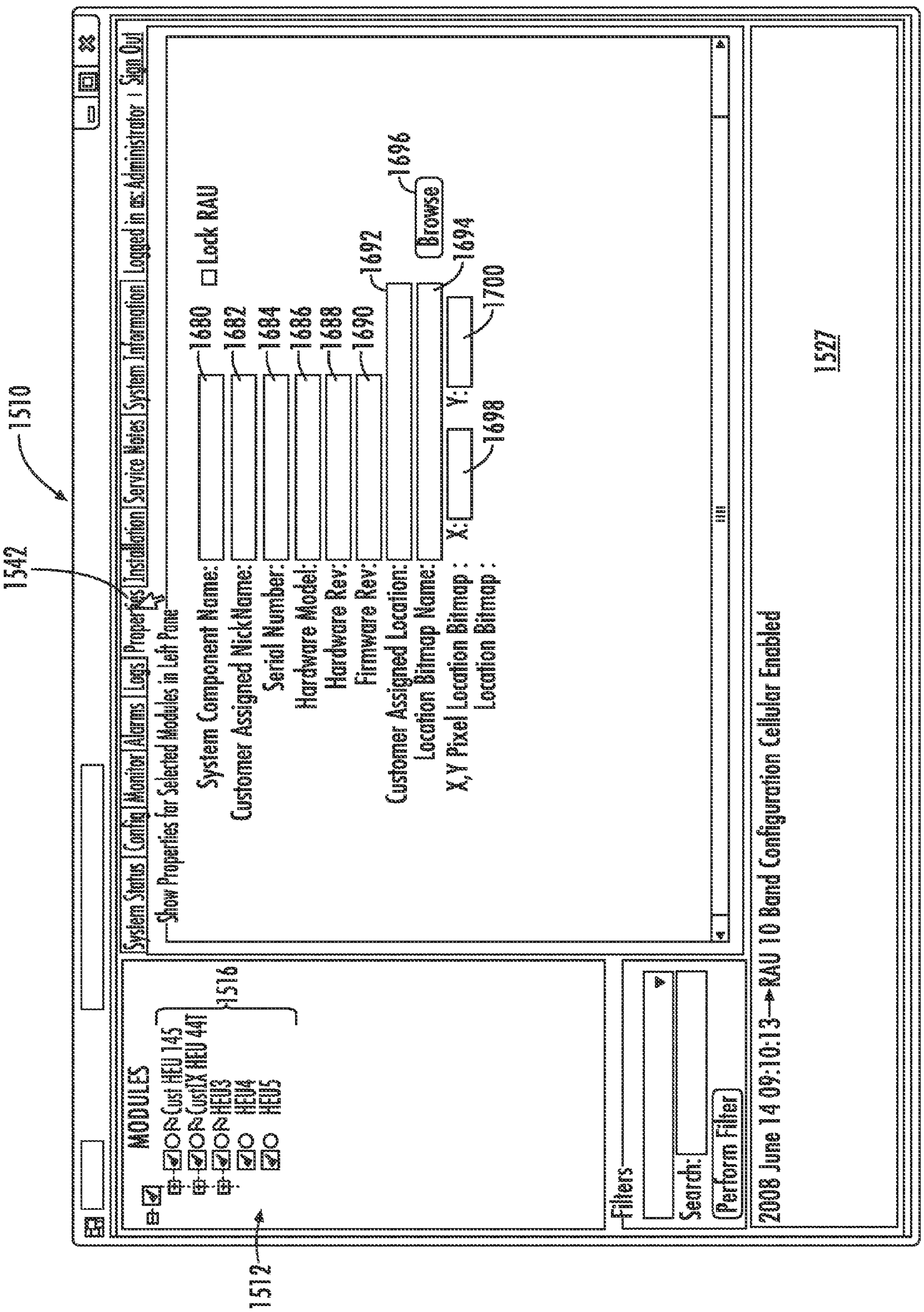
FIG. 51A is an exemplary properties page supported by the HEU and displayed on a web browser client.

FIG. 51A illustrates an exemplary properties page displayed on a client's 920 web browser when the "Properties" tab 1542 has been selected. The HEU 902, and more particularly, the HEU controller 958, supports the ability of a client 920 to see and provide properties for selected components in the banner 1512. These properties may be useful to store information about the HEUs 902 and their components for maintenance or other reasons. For example, as illustrated in FIG. 51A, the name of the selected component is provide in a "System Component Name" box 1680. A nickname can be added or modified in a "Customer Assigned NickName" input box 1682. A serial number and hardware model of the selected component can be provided in a "Serial Number" input box 1684 and a "Hardware Model" input box 1686, respectively. A hardware revision number and firmware revision number are displayed in a read only in a "Hardware Rev" input box 1688 and a "Firmware Rev" input box 1690, respectively. A customer assigned location can be provided in a "Customer Assigned Location" input box 1692. If it is desired to provide a picture or graphic of a system configuration (e.g., flow plan), a bitmap can be provided by providing a bitmap name in a "Location Bitmap Name" input box 1694. A "Browse" button 1696 allows browsing of directories and file names to select the desired bitmap file. The selected component can be identified in particular on the bitmap by providing an X and Y coordinate in X and Y input boxes 1698, 1700.

Figure 51B:
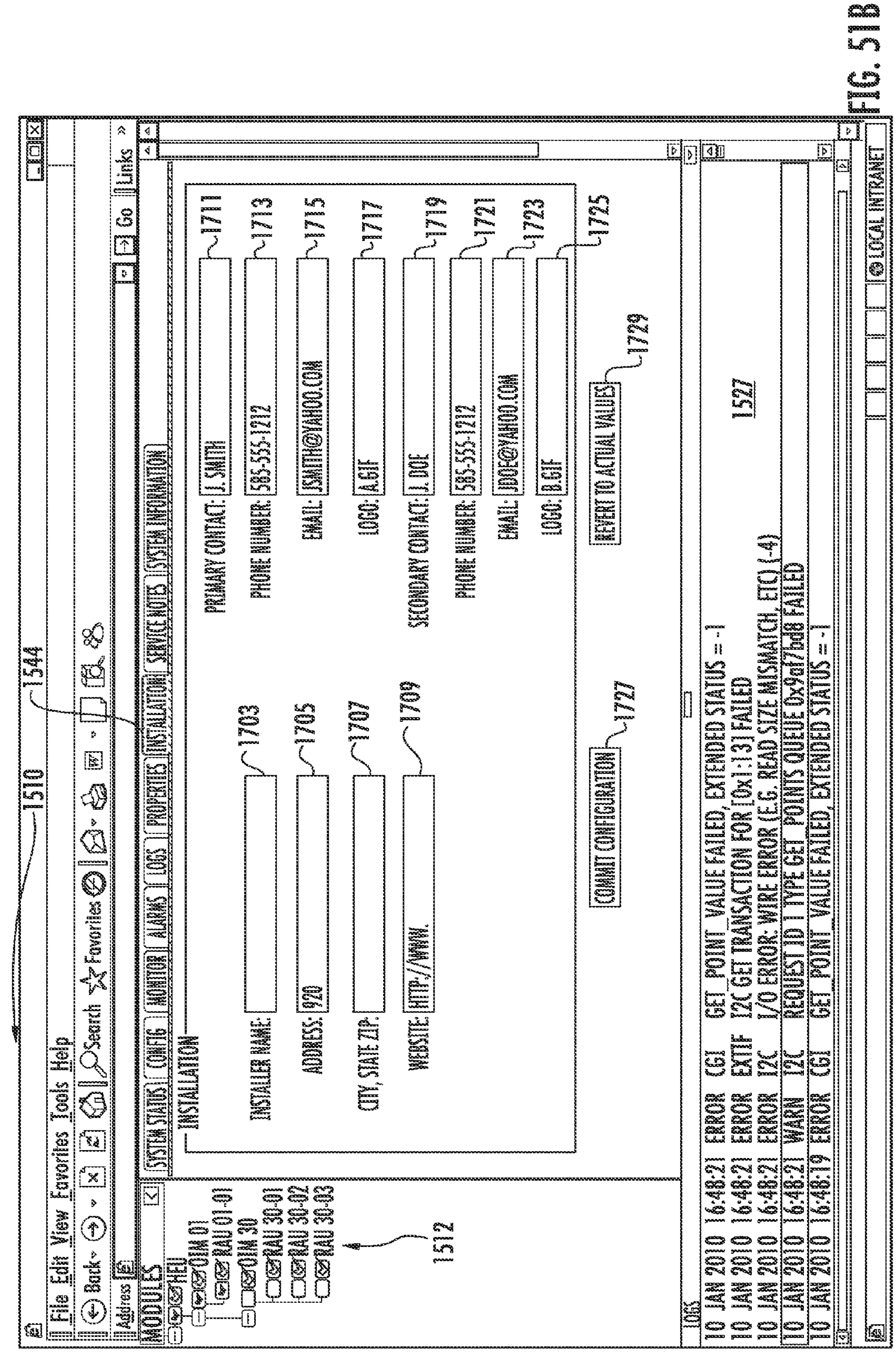
FIG. 51B is an exemplary installation page supported by the HEU and displayed on a web browser client.

FIG. 51B illustrates an exemplary systems information page displayed on a client's 920 web browser when the "Installation" tab 1544 has been selected. The HEU controller 958 supports the ability of a user to provide installation information regarding the installer for a particular installation for the HEU 902. In this manner, users can pull up this information to contact the installer, if desired. In this regard, the installer's name 1703, address 1705, city, state, and zip code 1707, and website address 1709 can be provided as illustrated in FIG. 51B. A primary contact 1711 and his or her phone number 1713, email address 1715, and logo 1717 can be provided, as well as a secondary contact 1719 and his or her phone number 1721, email address 1723, and logo 1725. When additions or changes are completed, the current configuration for the HEU 902 and RAUs 906 can be committed by selecting a commit configuration button 1727, or the HEU controller 958 can revert to actual values of configured information for the HEU 902 and RAUs 906 by selecting a revert to actual values button 1729.

Figure 52:
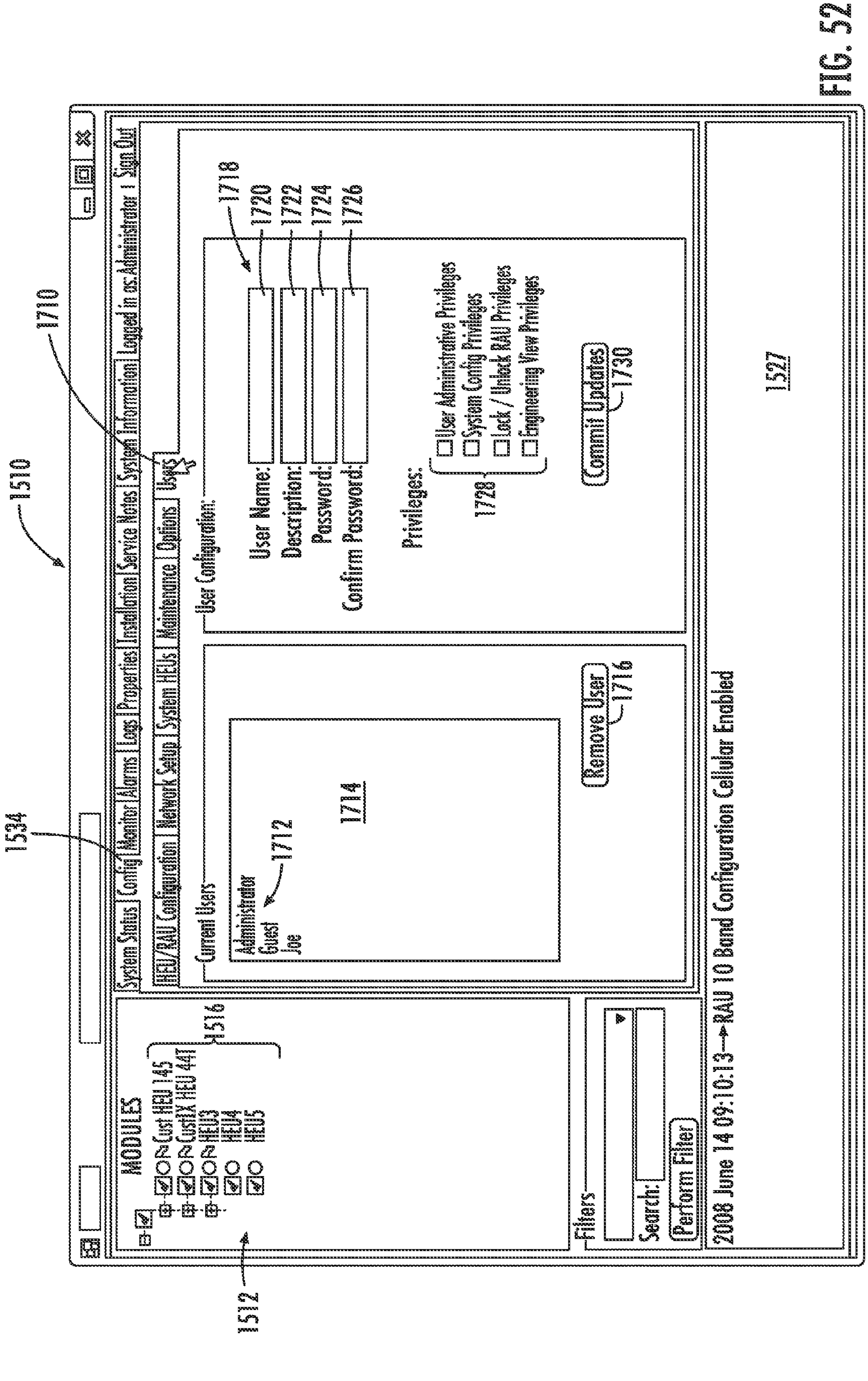
FIG. 52 is an exemplary user configuration supported by the HEU and displayed on a web browser client.

FIG. 52 is an exemplary user configuration supported by the HEU controller 958 and displayed on a client's 920 web browser. As illustrated therein, the client 920 can select to configure users authorized to access the HEU 902 via the web server 940 by selecting a "Users" tab 1710 under the "Config" tab 1534. The current setup users are displayed by user id 1712 in a current user's area 1714. A particular user can be removed if the current user has sufficient permission by selecting a "Remove User" 1716 button when the user to be removed is selected from the current users area 1714. To create a new or update or edit a previously established user, a user configuration area 1718 is provided. The user's login name can be provided in a "User Name" input box 1720. A description of the user can be provided in a "Description" input box 1722. The user's password and confirmation of password can be provided in a "Password" input box 1724 and a "Confirm Password" input box 1726, respectively. The user's privileges can be selected among various privilege settings 1728 illustrated in FIG. 52. All updates can be committed to the HEU 902 by selected a "Commit Updates" button 1730.

Figure 53:
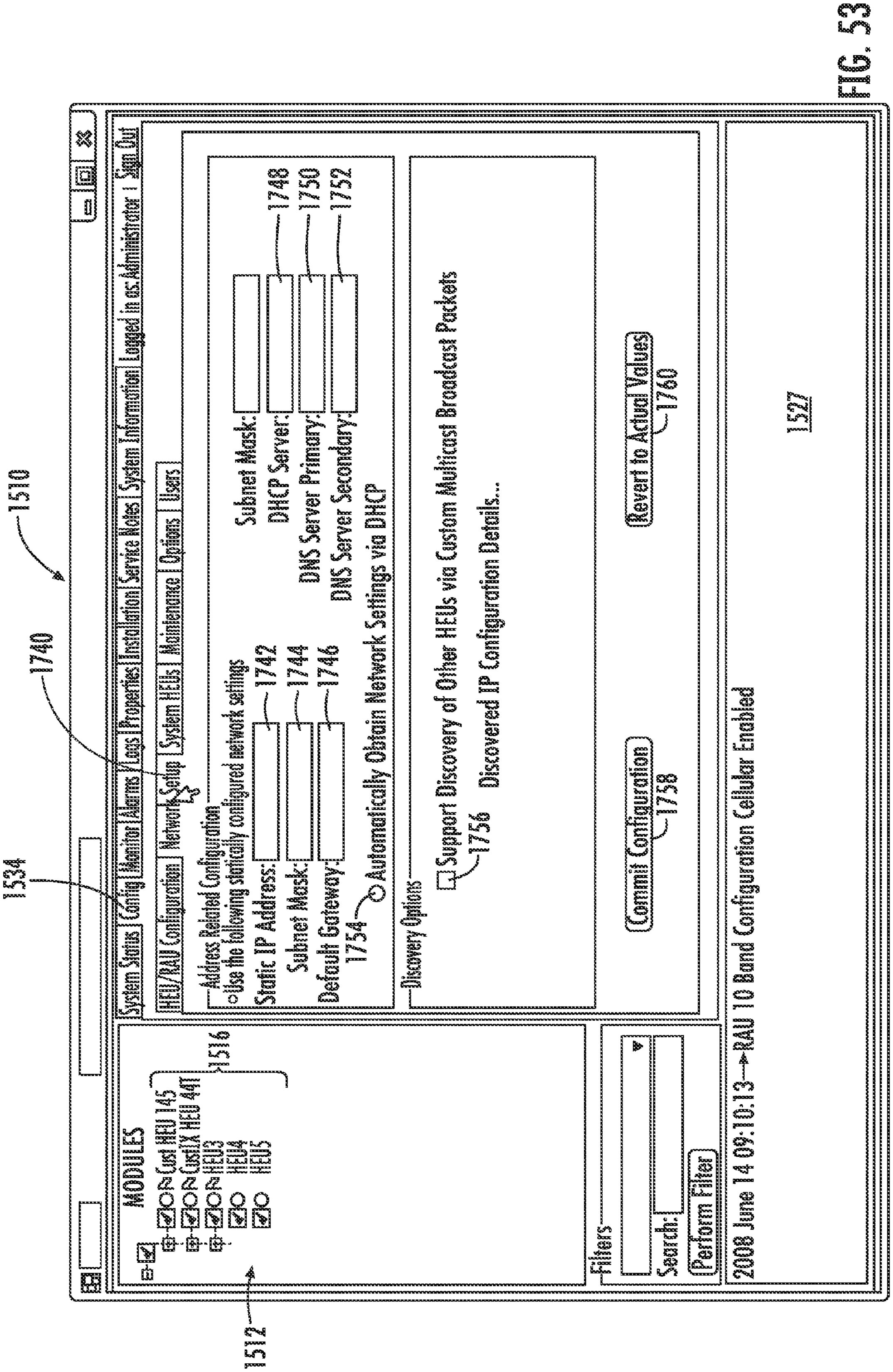
FIG. 53 is an exemplary network setup configuration supported by the HEU and displayed on a web browser client.

FIG. 53 is an exemplary network setup configuration supported by the HEU controller 958 and displayed on a client's 920 web browser for network access to the HEU 902. As illustrated, a client 920 can provide a network setup for the HEU 902 by selecting a "Network Setup" tab 1740 under the "Config" tab 1534. When selected, network setup options for the selected HEU 902 will be displayed. The IP address of the HEU 902 can either be assigned statically via a static IP address, subnet mask, and default gateway provided in a "Static IP address" input box 1742, "Subnet Mask" input box 1744, and "Default Gateway" input box 1746, respectively. The DHCP server, Domain Name System (DNS) server primary and DNS server secondary can be provided in a "DHCP Server" input box 1748, a "DNS Server Primary" input box 1750, and a "DNS Server Secondary" input box 1752, respectively. Alternatively, the HEU 902 can be configured to automatically obtain network settings via DHCP by selecting a radio button 1754. If the HEU 902 is to be configured in a private network or master/slave configuration, a support discovery check box 1756 can be selected to discover other HEUs 902. The HEUs 902 can be configured in the desired configuration, including the configurations previously discussed and illustrated in FIGS. 40-41C. All network configurations selected can be committed by selecting a "Commit Configuration" button 1758. Alternatively, by selecting a "Revert to Actual Values" button 1760, the previously committed network configurations will be retained and displayed.

Figure 54:
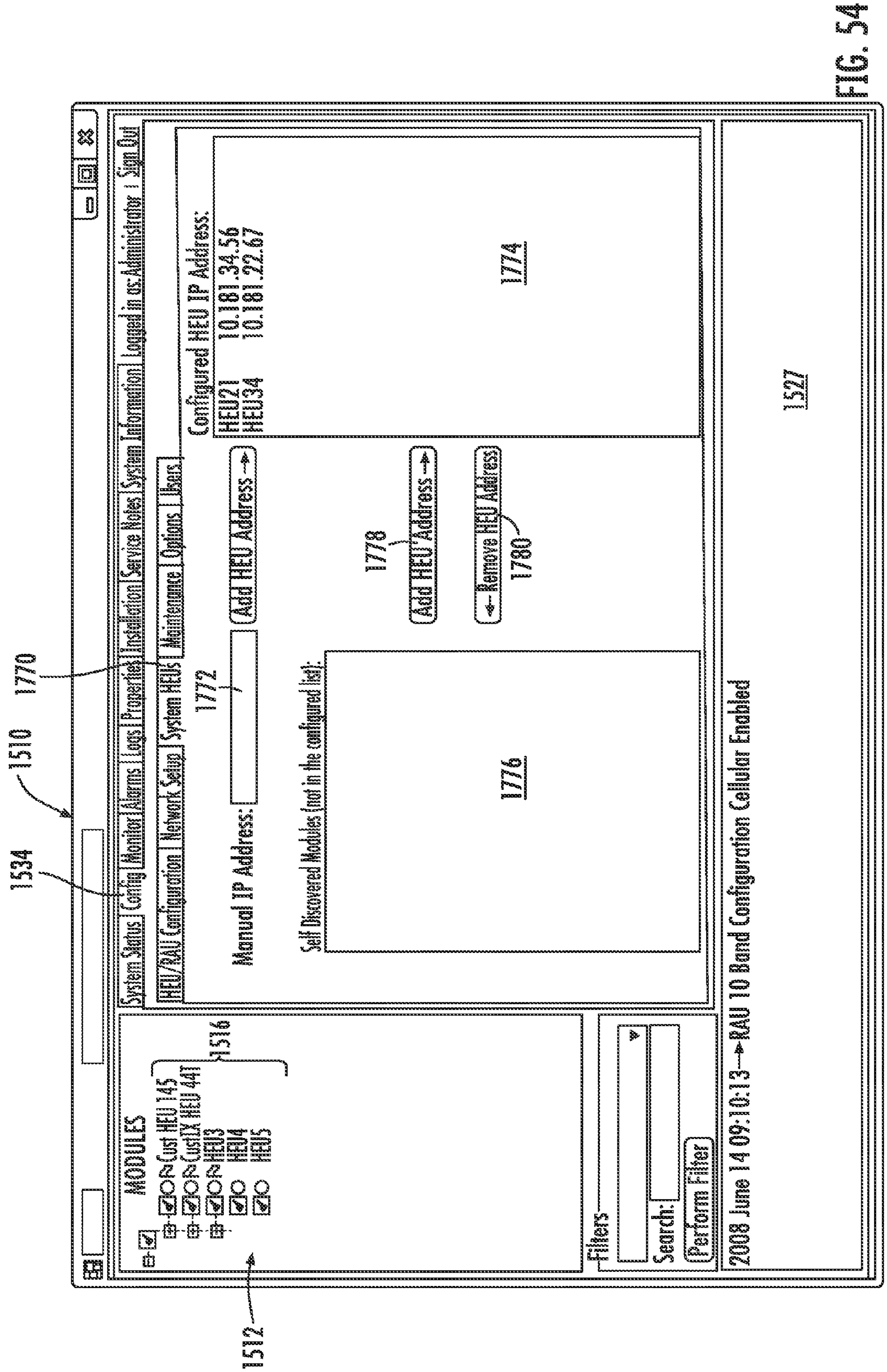
FIG. 54 is an exemplary system HEUs page supported by the HEU and displayed on a web browser client.

FIG. 54 is an exemplary HEU configuration page supported by the HEU controller 958 and displayed on a client's 920 web browser. As illustrated, a client 920 can provide a System HEU configuration for the HEU 902 by selecting a "System HEUs" tab 1770 under the "Config" tab 1534. When selected, HEU system information for the selected HEU 902 will be displayed. Manual IP addresses for HEUs 902 to be discovered can be typed into a "Manual IP Address" input box 1772 and added to a list 1774 of configured HEU IP addresses. Alternatively or in addition, self discovered HEUs 902 can be selected from a list 1776 by selecting the desired self discovered HEU 902 from the list 1776 and adding the HEU address to the list 1774 by selecting an "Add HEU Address" button 1778. This is populated if the support discovery check box 1756 in FIG. 53 was selected. HEU addresses can also be removed by selecting the IP address to be removed from list 1774 and selecting a "Remove HEU Address" button 1780. The software avoids the need for additional customer interface software running under the customer's control and involving multiple types of machines, operating systems and environments. IDAS will use industry standard client interface hosting applications that will include a Web browser and Terminal Emulator hardware, and will promote the selection of industry standard management interfaces.

Figure 55:
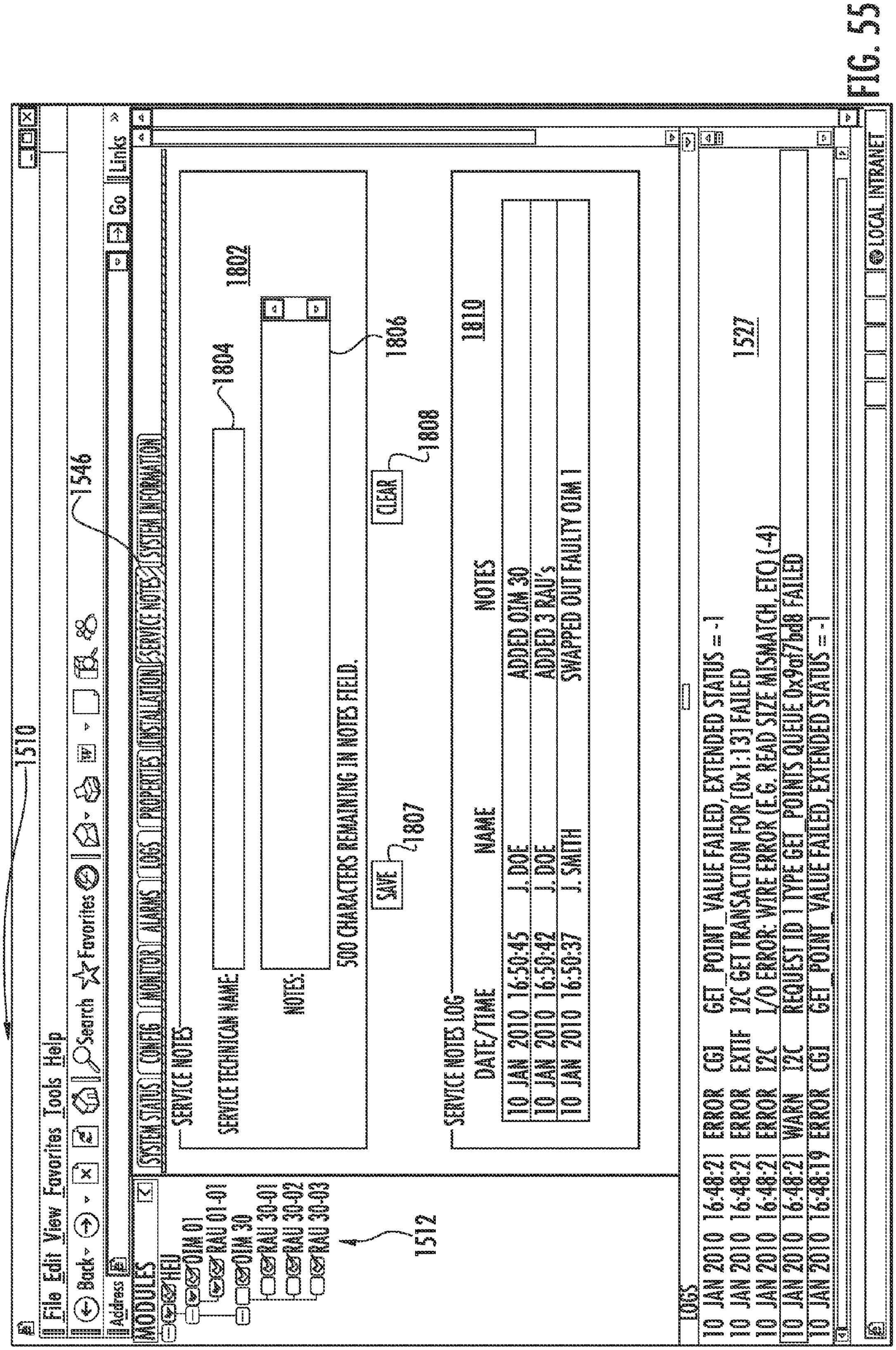
FIG. 55 is an exemplary service notes page supported by the HEU and displayed on a web browser client.

FIG. 55 is an exemplary service notes page supported by the HEU controller 958 and displayed on a client's 920 web browser. The service notes allow a technician to enter notes about servicing of the HEU 902 so that this information can be stored in a log for later review, if needed or desired. In this regard, the user can select the "Service Notes" tab 1546. The "Service Notes" tab 1546 may be restricted to only technicians that are authorized to perform service actions on the HEU 902. Services notes can be entered in a service notes window 1802, wherein a technician name 1804 and notes 1806 can be entered and saved by selecting a "SAVE" button 1807. If it is desired to clear information provided in these fields, a "CLEAR" button 1808 can be selected. Previous service notes entered in order of most recent are displayed in a "Service Notes Log" window 1810.

Figure 56:
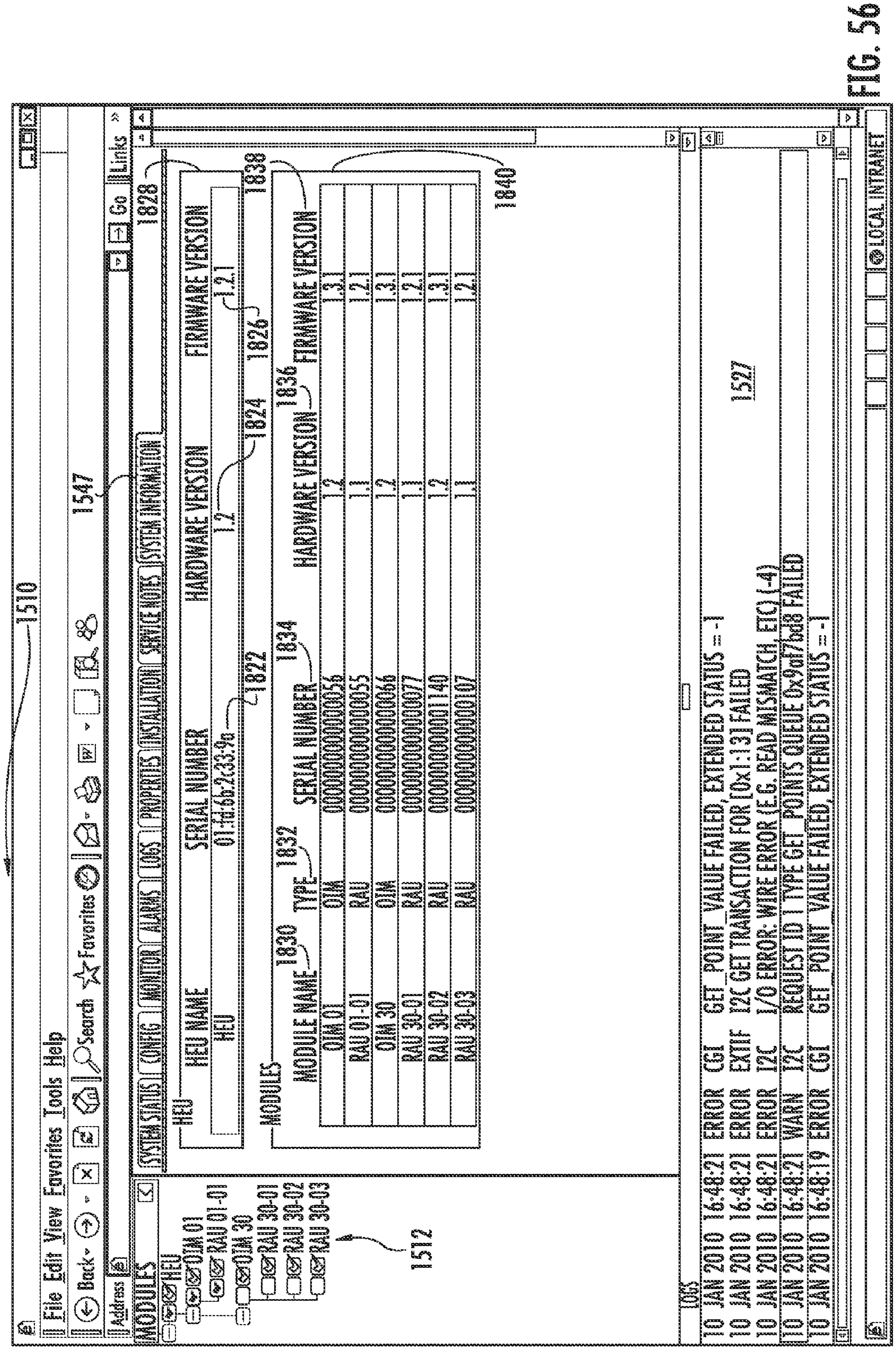
FIG. 56 is an exemplary system information page supported by the HEU and displayed on a web browser client.

FIG. 56 is an exemplary system information page supported by the HEU controller 958 and displayed on a client's 920 web browser. The system information page allows a technician or user to review information about the HEU 902 and modules. This information may be useful in servicing or upgrading the HEU 902 and other modules. In this regard, the user can select the "System Information" tab 1547. When selected, a serial number 1822, hardware version 1824, and firmware version 1826 for the HEU 902 is shown in an HEU window 1828. Module names 1830, and their type 1832, serial number 1834, hardware version 1836, and firmware version 1838 are also displayed in a modules window 1840.

The optical-fiber based wireless system discussed herein can encompass any type of electronic or fiber optic equipment and any type of optical connections and receive any number of fiber optic cables or single or multi-fiber cables or connections. Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. Many modifications and other embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wireless communication system, comprising:

a downlink base transceiver station (BTS) interface configured to receive downlink electrical radio frequency (RF) signals from at least one BTS;

at least one optical interface module (OIM) configured to:

receive and convert the downlink electrical RF signals from the downlink BTS interface into downlink Radio-over-Fiber (RoF) signals on at least one communication downlink; and receive and convert uplink RoF signals from at least one remote antenna unit (RAU) into uplink electrical RF signals on at least one communication uplink;

an uplink BTS interface configured to receive and communicate the uplink electrical RF signals from the at least one communication uplink to the at least one BTS; and
a controller configured to:
inject at least one calibration signal over the at least one communication downlink;
calibrate at least one downlink gain in the at least one communication downlink based on a loss incurred in the at least one calibration signal in the at least one communication downlink;
cause the at least one calibration signal to be switched from the at least one communication downlink to the at least one communication uplink; and
calibrate at least one uplink gain in the at least one communication uplink based on a loss incurred in the at least one calibration signal in the at least one communication uplink.

2. The wireless communication system of claim 1, wherein the controller is configured to calibrate a downlink BTS calibration gain in the downlink BTS interface by setting the downlink BTS calibration gain in at least one attenuator in the downlink BTS interface.

3. The wireless communication system of claim 1, wherein the controller is configured to calibrate at least one RAU calibration gain in the at least one RAU by setting the at least one RAU calibration gain in at least one attenuator in the at least one RAU.

4. The wireless communication system of claim 1, wherein a frequency of the at least one calibration signal is different from a frequency of the downlink electrical RF signals.

5. The wireless communication system of claim 1, wherein the controller is configured to receive an input signal strength of the at least one calibration signal on the at least one communication downlink.

6. The wireless communication system of claim 5, wherein the controller is configured to determine a total downlink loss by comparing an end signal strength of the at least one calibration signal at the at least one RAU with the input signal strength of the at least one calibration signal.

7. The wireless communication system of claim 1, wherein the at least one calibration signal is comprised of a plurality of calibration signals each having a different frequency.

8. The wireless communication system of claim 3, wherein the controller is configured to calibrate the downlink BTS calibration gain and the at least one RAU calibration gain while electrical RF signals and RoF signals are communicated over the at least one communication downlink.

9. The wireless communication system of claim 3, wherein the controller is configured to automatically calibrate the downlink BTS calibration gain in the downlink BTS interface and the at least one RAU calibration gain in the at least one RAU.

10. The wireless communication system of claim 1, wherein the controller is further configured to:
determine a total uplink loss for the at least one communication uplink;
determine an uplink BTS loss from the total uplink loss;
calibrate an uplink BTS calibration gain in the uplink BTS interface based on the uplink BTS loss; and
calibrate at least one OIM calibration gain in the at least one OIM as the total uplink loss minus the uplink BTS loss.

11. The wireless communication system of claim 10, wherein the at least one OIM is comprised of a plurality of OIMs, and wherein the controller is configured to calibrate a separate OIM calibration gain for each of the plurality of OIMs.

12. The wireless communication system of claim 11, wherein the controller is further configured to cause at least one uplink calibration signal to be communicated over the at least one communication uplink.

13. The wireless communication system of claim 12, wherein a frequency of the at least one uplink calibration signal is different from a frequency of the uplink electrical RF signals.

14. The wireless communication system of claim 12, wherein the controller is configured to receive an input signal strength of the at least one uplink calibration signal on the at least one communication uplink.

15. The wireless communication system of claim 14, wherein the controller is configured to determine the total uplink loss by comparing an end signal strength of the at least one uplink calibration signal at the uplink BTS interface with the input signal strength of the at least one uplink calibration signal at the at least one RAU.

16. The wireless communication system of claim 10, wherein the controller is configured to calibrate the uplink BTS calibration gain in the uplink BTS interface and the at least one OIM calibration gain in the at least one OIM while electrical RF signals and RoF signals are communicated over the at least one communication uplink.

17. The wireless communication system of claim 10, wherein the controller is configured to automatically calibrate the BTS calibration gain in the uplink BTS interface and the at least one OIM calibration gain in the at least one OIM.

18. A wireless communication system, comprising:
a downlink base transceiver station (BTS) interface configured to receive downlink electrical radio frequency (RF) signals from at least one BTS;
at least twelve (12) optical interface modules (OIM) each configured to:
receive and convert the downlink electrical RF signals from the downlink BTS interface into downlink Radio-over-Fiber (RoF) signals on at least one of at least thirty-six (36) communication downlinks; and
receive and convert uplink RoF signals from at least three (3) remote antenna units (RAUs) into uplink electrical RF signals on at least one of at least thirty-six (36) communication uplinks;
an uplink BTS interface configured to receive and communicate the uplink electrical RF signals from the at least thirty-six (36) communication uplinks to the at least one BTS; and
a controller configured to calibrate at least one downlink gain for each of the thirty-six (36) communication downlinks.

19. The wireless communication system of claim 18, wherein the controller is further configured to cause first and second downlink calibration signals to be communicated over each of the thirty-six (36) communication downlinks.

20. The wireless communication system of claim 18, wherein the controller is further configured to:
determine a total uplink loss for the at least thirty-six (36) communication uplinks;
determine an uplink BTS loss from the total uplink loss;
calibrate a BTS calibration gain in the uplink BTS interface based on the uplink BTS loss; and
calibrate at least one OIM calibration gain in one of the at least twelve (12) OIMs as the total uplink loss minus the uplink BTS loss.

21. A wireless communication system, comprising:
a downlink base transceiver station (BTS) interface configured to receive downlink radio frequency (RF) signals from at least one BTS;

at least one optical interface module (OIM) configured to:

receive the downlink RF signals from the downlink BTS interface for transmission as Radio-over-Fiber (RoF) signals on at least one communication downlink; and receive uplink RoF signals from at least one remote antenna unit (RAU) for transmission as uplink RF signals on at least one communication uplink;

an uplink BTS interface configured to receive and communicate the uplink RF signals from the at least one communication uplink to the at least one BTS; and a controller configured to:

inject at least one calibration signal over the at least one communication downlink;

calibrate at least one downlink gain in the at least one communication downlink based on a loss incurred in the at least one calibration signal in the at least one communication downlink;

cause the at least one calibration signal to be switched from the at least one communication downlink to the at least one communication uplink; and calibrate at least one uplink gain in the at least one communication uplink based on a loss incurred in the at least one calibration signal in the at least one communication uplink.

22. The wireless communication system of claim 21, wherein the controller is further configured to:

calibrate a downlink BTS calibration gain in the downlink BTS interface by setting the downlink BTS calibration gain in at least one attenuator in the downlink BTS interface; and calibrate at least one RAU calibration gain in the at least one RAU by setting the at least one RAU calibration gain in at least one attenuator in the at least one RAU.

23. The wireless communication system of claim 21, wherein the controller is further configured to:

determine a total uplink loss for the at least one communication uplink;

determine an uplink BTS loss from the total uplink loss; and calibrate an uplink BTS calibration gain in the uplink BTS interface based on the uplink BTS loss.

* * * * *